United States Patent
Kuwayama et al.

(10) Patent No.: US 10,338,290 B2
(45) Date of Patent: Jul. 2, 2019

(54) CELLULOSE ESTER FILM, POLARIZING PLATE, AND LIQUID CRYSTAL DISPLAY DEVICE

(71) Applicant: FUJIFILM Corporation, Tokyo (JP)

(72) Inventors: Yasukazu Kuwayama, Kanagawa (JP); Hiroshi Inada, Kanagawa (JP); Aiko Yoshida, Kanagawa (JP); Yoshitaka Maeda, Kanagawa (JP); Yusuke Ino, Kanagawa (JP); Shuuji Kanayama, Kanagawa (JP); Nobutaka Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 15/253,179

(22) Filed: Aug. 31, 2016

(65) Prior Publication Data

US 2016/0370522 A1   Dec. 22, 2016

Related U.S. Application Data

(63) Continuation of application No. PCT/JP2015/055889, filed on Feb. 27, 2015.

(30) Foreign Application Priority Data

Mar. 31, 2014  (JP) ................. 2014-074641

(51) Int. Cl.
| | |
|---|---|
| *G02B 5/30* | (2006.01) |
| *C09D 7/63* | (2018.01) |
| *G02B 1/14* | (2015.01) |
| *G02F 1/1335* | (2006.01) |
| *C08K 5/12* | (2006.01) |
| *C08K 5/20* | (2006.01) |
| *C08K 5/205* | (2006.01) |
| *C08K 5/315* | (2006.01) |
| *C08K 5/3417* | (2006.01) |
| *C08K 5/3462* | (2006.01) |
| *C09D 101/10* | (2006.01) |
| *C09D 5/00* | (2006.01) |
| *C08L 1/10* | (2006.01) |
| *C08L 1/12* | (2006.01) |

(52) U.S. Cl.
CPC .............. *G02B 5/3033* (2013.01); *C08K 5/12* (2013.01); *C08K 5/20* (2013.01); *C08K 5/205* (2013.01); *C08K 5/315* (2013.01); *C08K 5/3417* (2013.01); *C08K 5/3462* (2013.01); *C08L 1/10* (2013.01); *C08L 1/12* (2013.01); *C09D 5/00* (2013.01); *C09D 7/63* (2018.01); *C09D 101/10* (2013.01); *G02B 1/14* (2015.01); *G02F 1/133528* (2013.01); *G02F 2001/133562* (2013.01)

(58) Field of Classification Search
CPC ......... G02B 5/3033; G02B 1/14; C09D 7/63; C09D 5/00; C09D 101/10; G02F 1/133528; G02F 2001/133562; C08K 5/12; C08K 5/20; C08K 5/205; C08K 5/315; C08K 5/3417; C08K 5/3462; C08L 1/00; C08L 1/12
See application file for complete search history.

(56) References Cited

U.S. PATENT DOCUMENTS

| | | | |
|---|---|---|---|
| 8,922,889 B2 | 12/2014 | Fukagawa et al. | |
| 2013/0120839 A1* | 5/2013 | Fukagawa | G02B 5/3025 359/483.01 |
| 2015/0361036 A1 | 12/2015 | Inada et al. | |

FOREIGN PATENT DOCUMENTS

| | | |
|---|---|---|
| CN | 105026479 A | 11/2015 |
| CN | 105122100 A | 12/2015 |
| CN | 105392833 A | 3/2016 |
| JP | 2004-175971 A | 6/2004 |
| JP | 2011-052205 A | 3/2011 |
| JP | 2011-227274 A | 11/2011 |
| JP | 2013-127058 A | 6/2013 |
| WO | 2014/133041 A1 | 9/2014 |

OTHER PUBLICATIONS

Notification of Reasons for Refusal issued by the Japanese Patent Office dated Jul. 4, 2017, in connection with Japanese Patent Application No. 2016-511470.
International Search Report issued in PCT/JP2015/055889 dated May 19, 2015.
Written Opinion issued in PCT/JP2015/055889 dated May 19, 2015.
Office Action issued by Chinese Patent Office dated Jun. 5, 2018, in connection with Chinese Patent Application No. 201580014644.9.

* cited by examiner

*Primary Examiner* — Amina S Khan
(74) *Attorney, Agent, or Firm* — Edward Neils, LLC; Jean C. Edwards, Esq.

(57) ABSTRACT

A cellulose ester film contains a compound having a structural unit denoted by —NR—(C=O)— in which R represents a hydrogen atom or a substituent, a surface having knoop hardness of greater than or equal to 210 N/mm$^2$ is provided, and loss tangent tan δ at 25° C. is greater than or equal to 0.03.

21 Claims, 1 Drawing Sheet

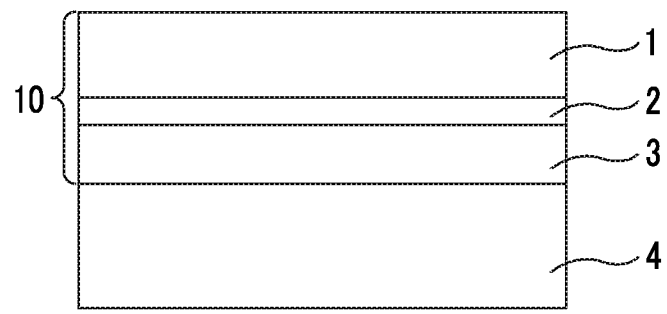

CELLULOSE ESTER FILM, POLARIZING PLATE, AND LIQUID CRYSTAL DISPLAY DEVICE

CROSS-REFERENCE TO RELATED APPLICATIONS

This application is a Continuation of PCT International Application No. PCT/JP2015/55889, filed on Feb. 27, 2015, which was published under PCT Article 21(2) in Japanese, and which claims priority under 35 U.S.C. § 119(a) to Japanese Patent Application No. 2014-074641, filed on Mar. 31, 2014. The above applications are hereby expressly incorporated by reference, in their entirety, into the present application.

BACKGROUND OF THE INVENTION

1. Field of the Invention

The present invention relates to a cellulose ester film, a polarizing plate, and a liquid crystal display device. In particular, the present invention relates to a cellulose ester film which is useful as a polarizing plate protective film, a polarizing plate including the cellulose ester film, and a liquid crystal display device including the polarizing plate.

2. Description of the Related Art

A cellulose ester film has been widely used as an optical compensation film, a protective film, a substrate film, or the like of a display device such as a liquid crystal display device. Various compounds have been proposed as an additive for improving the performance of such a cellulose ester film (for example, refer to JP2004-175971A, JP2011-227274A, and JP2011-52205A).

SUMMARY OF THE INVENTION

The cellulose ester film has been practically required to have excellent scratch resistance. Accordingly, a scratch is prevented from being generated on the film at the time of processing the cellulose ester film, at the time of using the cellulose ester film as the protective film of the liquid crystal display device on the visible side, or the like. It is also considered that a hard coat layer is disposed on the surface of the film as means for improving the scratch resistance, but a film member is required to be thin according to a reduction in the thickness of the liquid crystal display device, and thus, it is desirable that the scratch resistance of the film itself is high.

In such a circumstance, the present inventors have attempted to improve the scratch resistance by increasing the surface hardness of the cellulose ester film containing various additives, but have determined that the cellulose ester film having excellent scratch resistance is not necessarily obtained simply by increasing the surface hardness.

Therefore, an object of the present invention is to provide a cellulose ester film having excellent scratch resistance.

The present inventors intensively study for attaining the object described above. As a result, the present inventors have newly found the following. It is possible to improve the scratch resistance of the cellulose ester film by increasing loss tangent tan δ at 25° C. (hereinafter, also referred to as "tan δ (25° C.)") obtained by dynamic viscoelasticity measurement along with knoop hardness which is the index of the surface hardness of the film. It is possible to simultaneously increase the knoop hardness and tan δ (25° C.) by adopting a compound having a structural unit denoted by —NR—(C=O)— (here, R represents a hydrogen atom or a substituent) (hereinafter, also referred to as a "compound having an NRCO structure") from various compounds as an additive to be added to the cellulose ester film, and by variously controlling the structure.

More specifically, in the scratch resistance of the film, it has been known that the result of a pencil hardness test has an excellent correlation with the practical scratch resistance of the film. However, in the studies of the present inventors for attaining the object described above, a new fact has been determined in which the improvement in the pencil hardness is not necessarily attained even in a case where the surface hardness of the film increases. Therefore, as a result of more intensive studies of the present inventors, it has been found that it is possible to improve the pencil hardness by increasing both of the surface hardness of the film and tan δ at 25° C. The pencil hardness test is a test which evaluates not the presence or absence of the scratch at the time of simply pressing a test indenter against the surface of a sample, but the presence or absence of the scratch at the time of pressing and moving a pencil lead on the surface of the sample. Therefore, it is difficult to obtain an excellent result in the pencil hardness test unless an initial scratch at the time of pressing the pencil lead against the surface of the sample is prevented from being generated, and a scratch at the time of moving the pencil lead on the surface of the sample (a scratch) is also prevented from being generated. Here, it is considered that increasing film surface hardness (knoop hardness) contributes to the prevention of the initial scratch from being generated. The loss tangent tan δ is tan δ=a modulus of loss elasticity E"/a modulus of storage elasticity E', and indicates a balance between the modulus of loss elasticity and the modulus of storage elasticity. It is considered that a cellulose ester film having a modulus of loss elasticity larger than a modulus of storage elasticity at 25° C. has an excellent force (restoring force) which resists against a force generating a scratch over time since the molecular mobility of a polymer at room temperature is high. Accordingly, it is assumed that it is possible to resist against the force generating a scratch, and it is possible to recover from the scratch according to a change in the shape even in a case where the scratch is generated. That is, it is considered that a cellulose ester film having high tan δ (25° C.) is able to be restored from the scratch over time even in a case where the force generating a scratch is applied, and thus, it is possible to prevent the scratch at the time of moving the pencil lead on the surface of the sample (the scratch) from being generated in the pencil hardness test described above. Thus, according to the present invention, it is possible to provide a cellulose ester film having excellent scratch resistance.

The present invention has been completed on the basis of the findings described above.

One embodiment of the present invention relates to A cellulose ester film, containing: a compound having a structural unit denoted by —NR—(C=O)— in which R represents a hydrogen atom or a substituent, in which a surface having knoop hardness of greater than or equal to 210 N/mm$^2$ is provided, and loss tangent tan δ at 25° C. is greater than or equal to 0.03.

In one embodiment, the loss tangent tan δ is less than 0.1.

In one embodiment, the knoop hardness is less than or equal to 315 N/mm$^2$.

In one embodiment, a molecular weight of the compound is greater than or equal to 250 and less than or equal to 1,500.

In one embodiment, the compound does not have absorption with respect to light in a wavelength range of greater than or equal to 280 nm and less than or equal to 780 nm. Here, "not having absorption" indicates that the compound has light absorption properties in which light absorbance of a dichloromethane solution containing 0.01 mass % of the compound (a liquid temperature of 20° C. to 25° C.) in a wavelength range of greater than or equal to 280 nm and less than or equal to 780 nm is greater than or equal to 0 abs and less than 1.0 abs.

In one embodiment, an equivalence U of the compound which is obtained as a value obtained by dividing the molecular weight of the compound by the number of structural units contained in one molecule (U=[(Molecular Weight)/(Number of Structural Units Included in One Molecule)]) is less than or equal to 515.

In one embodiment, the structural unit is denoted by —NH—(C=O)— and the structural unit is included in a structural unit denoted by —NH—(C=O)—O—.

In one embodiment, the structural unit is included in a non-cyclic structural portion.

In one embodiment, the compound has two or more structural units, and has a cyclic structure between at least two of the structural units.

In one embodiment, the cyclic structure is selected from the group consisting of an aromatic ring and an aliphatic carbon ring.

In one embodiment, the compound has a terminal substituent selected from the group consisting of an alkyl group, a cyano group, and an aromatic group.

In one embodiment, the terminal substituent is an alkyl group having 1 to 6 carbon atoms.

In one embodiment, the structural unit is included in a non-cyclic structural portion.

In one embodiment, the compound is a compound which is denoted by a general formula selected from the group consisting of General Formulas (I), (A-100), (III) to (V), and (VII) described below.

Another embodiment of the present invention relates to a polarizing plate, comprising: the cellulose ester film described above; and a polarizer.

Still another embodiment of the present invention relates to a liquid crystal display device, comprising: the polarizing plate described above.

In one embodiment, the liquid crystal device includes the polarizing plate described above on at least a visible side.

According to the present invention, it is possible to provide a cellulose ester film having excellent scratch resistance, and more specifically, it is possible to provide a cellulose ester film having high pencil hardness. By using such a cellulose ester film as a protective film of a polarizer, it is possible to provide a polarizing plate having excellent durability, and a liquid crystal display device including the polarizing plate.

BRIEF DESCRIPTION OF THE DRAWINGS

FIG. 1 is an example of a positional relationship between a polarizing plate and a liquid crystal display device according to one embodiment of the present invention.

DESCRIPTION OF THE PREFERRED EMBODIMENTS

Hereinafter, the present invention will be described in more detail. Furthermore, in the present invention and herein, a numerical range denoted by using "to" indicates a range including the numerical values before and after "to" as the lower limit value and the upper limit value. In the present invention and herein, a "group" such as an alkyl group may or may not have a substituent unless otherwise particularly specified. Further, the number of carbon atoms of a group of which the number of carbon atoms is limited indicates the number of carbon atoms including the carbon atoms of the substituent.

In addition, examples of the substituent described above include a substituent selected from the group T of substituents described below. In addition, unless otherwise particularly specified, the substituent of the present invention is a substituent selected from the group T of the substituents described below.

The Group T of the Substituents:

An alkyl group (preferably an alkyl group having 1 to 20 carbon atoms, more preferably an alkyl group having 1 to 12 carbon atoms, and particularly preferably an alkyl group having 1 to 8 carbon atoms, and examples of the alkyl group include a methyl group, an ethyl group, an isopropyl group, uteri-butyl group, an n-octyl group, an n-decyl group, an n-hexadecyl group, a cyclopropyl group, cyclopentyl group, a cyclohexyl group, and the like), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and examples of the alkenyl group include a vinyl group, an allyl group, a 2-butenyl group, a 3-pentenyl group, and the like), an alkynyl group (preferably an alkynyl group having 2 to 20 carbon atoms, more preferably an alkynyl group having 2 to 12 carbon atoms, and particularly preferably an alkynyl group having 2 to 8 carbon atoms, and examples of the alkynyl group include a propargyl group, a 3-pentynyl group, and the like), an aryl group (preferably an aryl group having 6 to 30 carbon atoms, more preferably an aryl group having 6 to 20 carbon atoms, and particularly preferably an aryl group having 6 to 12 carbon atoms, and examples of the aryl group include a phenyl group, a biphenyl group, a naphthyl group, and the like), an amino group (preferably an amino group having 0 to 20 carbon atoms, more preferably an amino group having 0 to 10 carbon atoms, and particularly preferably an amino group having 0 to 6 carbon atoms, and examples of the amino group include an amino group, a methyl amino group, a dimethyl amino group, a diethyl amino group, a dibenzyl amino group, and the like), an alkoxy group (preferably an alkoxy group having 1 to 20 carbon atoms, more preferably an alkoxy group having 1 to 12 carbon atoms, and particularly preferably an alkoxy group having 1 to 8 carbon atoms, and examples of the alkoxy group include a methoxy group, an ethoxy group, a butoxy group, and the like), an aryl oxy group (preferably an aryl oxy group having 6 to 20 carbon atoms, more preferably an aryl oxy group having 6 to 16 carbon atoms, and particularly preferably an aryl oxy group having 6 to 12 carbon atoms, and examples of the aryl oxy group include a phenyl oxy group, a 2-naphthyl oxy group, and the like), an acyl group (preferably an acyl group having 1 to 20 carbon atoms, more preferably an acyl group having 1 to 16 carbon atoms, and particularly preferably an acyl group having 1 to 12 carbon atoms, and examples of the acyl group include an acetyl group, a benzoyl group, a formyl group, a pivaloyl group, and the like), an alkoxy carbonyl group (preferably an alkoxy carbonyl group having 2 to 20 carbon atoms, more preferably an alkoxy carbonyl group having 2 to 16 carbon atoms, and particularly preferably an alkoxy carbonyl group having 2 to 12 carbon atoms, and examples of the alkoxy carbonyl group include a methoxy carbonyl group, an ethoxy carbonyl group, and the like), an aryl oxy carbonyl group (preferably an aryl oxy carbonyl group having 7 to 20 carbon atoms, more preferably an aryl oxy carbonyl group having 7 to 16 carbon atoms, and particularly preferably an aryl oxy carbonyl group having 7 to 10 carbon atoms, and examples of the aryl oxy carbonyl group include a phenyl oxy carbonyl group, and the like), an acyl oxy group (preferably an acyl oxy group having 2 to 20 carbon atoms, more preferably an acyl oxy group having 2 to 16 carbon atoms, and particularly preferably an acyl oxy group having 2 to 10 carbon atoms, and examples of the acyl oxy group include an acetoxy group, a benzoyl oxy group, and the like), an acyl amino group (preferably an acyl amino group having 2 to 20 carbon atoms, more preferably an acyl amino group having 2 to 16 carbon atoms, and particularly preferably an acyl amino group having 2 to 10 carbon atoms, and examples of the acyl amino group include an acetyl amino group, a benzoyl amino group, and the like), an alkoxy carbonyl amino group (preferably an alkoxy carbonyl amino group having 2 to 20 carbon atoms, more preferably an alkoxy carbonyl amino group having 2 to 16 carbon atoms, and particularly preferably an alkoxy carbonyl amino group having 2 to 12 carbon atoms, and examples of the alkoxy carbonyl amino group include a methoxy carbonyl amino group, and the like), an aryl oxy carbonyl amino group (preferably an aryl oxy carbonyl amino group having 7 to 20 carbon atoms, more preferably an aryl oxy carbonyl amino group having 7 to 16 carbon atoms, and particularly preferably an aryl oxy carbonyl amino group having 7 to 12 carbon atoms, and examples of the aryl oxy carbonyl amino group include a phenyl oxy carbonyl amino group, and the like), a sulfonyl amino group (preferably a sulfonyl amino group having 1 to 20 carbon atoms, more preferably a sulfonyl amino group having 1 to 16 carbon atoms, and particularly preferably a sulfonyl amino group having 1 to 12 carbon atoms, and examples of the sulfonyl amino group include a methane sulfonyl amino group, a benzene sulfonyl amino group, and the like), a sulfamoyl group (preferably a sulfamoyl group having 0 to 20 carbon atoms, more preferably a sulfamoyl group having 0 to 16 carbon atoms, and particularly preferably a sulfamoyl group having 0 to 12 carbon atoms, and examples of the sulfamoyl group include a sulfamoyl group, a methyl sulfamoyl group, a dimethyl sulfamoyl group, a phenyl sulfamoyl group, and the like), a carbamoyl group (preferably a carbamoyl group having 1 to 20 carbon atoms, more preferably a carbamoyl group having 1 to 16 carbon atoms, and particularly preferably a carbamoyl group having 1 to 12 carbon atoms, and examples of the carbamoyl group include a carbamoyl group, a methyl carbamoyl group, a diethyl carbamoyl group, a phenyl carbamoyl group, and the like), an alkyl thio group (preferably an alkyl thio group having 1 to 20 carbon atoms, more preferably an alkyl thio group having 1 to 16 carbon atoms, and particularly preferably an alkyl thio group having 1 to 12 carbon atoms, and examples of the alkyl thio group include a methyl thio group, an ethyl thio group, and the like), an aryl thio group (preferably an aryl thio group having 6 to 20 carbon atoms, more preferably an aryl thio group having 6 to 16 carbon atoms, and particularly preferably an aryl thio group having 6 to 12 carbon atoms, and examples of the aryl thio group include a phenyl thio group, and the like), a sulfonyl group (preferably a sulfonyl group having 1 to 20 carbon atoms, more preferably a sulfonyl group having 1 to 16 carbon atoms, and particularly preferably a sulfonyl group having 1 to 12 carbon atoms, and examples of the sulfonyl group include a mesyl group, a tosyl group, and the like), a sulfinyl group (preferably a sulfinyl group having 1 to 20 carbon atoms, more preferably a sulfinyl group having 1 to 16 carbon atoms, and particularly preferably a sulfinyl group having 1 to 12 carbon atoms, and examples of the sulfinyl group include a methane sulfinyl group, a benzene sulfinyl group, and the like), a urethane group, a ureido group (preferably a ureido group having 1 to 20 carbon atoms, more preferably a ureido group having 1 to 16 carbon atoms, and particularly preferably a ureido group having 1 to 12 carbon atoms, and examples of the ureido group include a ureido group, a methyl ureido group, a phenyl ureido group, and the like), a phosphoric amido group (preferably a phosphoric amido group having 1 to 20 carbon atoms, more preferably a phosphoric amido group having 1 to 16 carbon atoms, and particularly preferably a phosphoric amido group having 1 to 12 carbon atoms, and examples of the phosphoric amido group include a diethyl phosphoric amide, a phenyl phosphoric amide, and the like), a hydroxyl group, a mercapto group, a halogen atom (for example, a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group (preferably a heterocyclic group having 1 to 30 carbon atoms, and more preferably a heterocyclic group having 1 to 12 carbon atoms, and examples of a hetero atom include a nitrogen atom, an oxygen atom, a sulfur atom, and specifically, examples of the heterocyclic group include an imidazolyl group, a pyridyl group, a quinolyl group, a furyl group, a piperidyl group a morpholino group, a benzoxazolyl group, a benzimidazolyl group, a benzthiazolyl group, and the like), and a silyl group (preferably a silyl group having 3 to 40 carbon atoms, more preferably a silyl group having 3 to 30 carbon atoms, and particularly preferably a silyl group having 3 to 24 carbon atoms, and examples of the silyl group include a trimethyl silyl group, a triphenyl silyl group, and the like).

The substituents may be further substituted. In addition, in a case where two or more substituents are used, the substituents may be identical to or different from each other. In addition, if possible, the substituents may form a ring by being linked to each other.

[Cellulose Ester Film]

A cellulose ester film according to one embodiment of the present invention contains a compound having a structural unit denoted by —NR—(C=O)— in which R represents a hydrogen atom or a substituent (a compound having an NRCO structure), a surface having knoop hardness of greater than or equal to 210 N/mm$^2$ is provided, and loss tangent tan δ at 25° C. is greater than or equal to 0.03.

As described above, as a result of intensive studies of the present inventors, the compound having an NRCO structure is adopted from various compounds as an additive for improving the scratch resistance of a cellulose ester film. In addition, it is possible to increase both of the knoop hardness and the loss tangent tan δ at 25° C. by variously controlling the structure of the compound having an NRCO structure, and thus, it is possible to obtain a cellulose ester film which is able to have excellent scratch resistance, and more specifically, high pencil hardness.

Hereinafter, the cellulose ester film described above will be described in more detail.

In the compound having an NRCO structure, the present inventors have considered that the structural unit included in the compound which is denoted by —NR—(C=O)— mutually interacts with an ester bond existing in cellulose ester, or a local portion or a molecular chain of a hydroxyl group or the like, and thus, decreases a free volume, and contributes to the improvement in the surface hardness (the knoop hardness) of the cellulose ester film. Further, as a result of intensive studies of the present inventors, it is possible to obtain a compound having an NRCO structure having both of high surface hardness and high tan δ (25° C.) by variously controlling the molecular weight of the compound, the number of structural units denoted by —NR—(C=O)— in the molecules or the ratio of the structural unit in the molecules, other structures linked to the structural unit denoted by —NR—(C=O)—, and the like. A specific embodiment of controlling the structure in order to improve the surface hardness and tan δ (25° C.) will be described below.

Surface Hardness (Knoop Hardness)

The cellulose ester film according to one embodiment of the present invention has knoop hardness of greater than or equal to 210 N/mm$^2$ in at least one surface, preferably both surfaces. The cellulose ester film having knoop hardness of greater than or equal to 210 N/mm$^2$ in at least one surface is able to have an excellent result in a pencil hardness test which is the index of film scratch resistance. It is considered that this is because an initial scratch in the pencil hardness test is able to be mainly prevented from being generated. It is preferable that the knoop hardness is greater than or equal to 220 N/mm$^2$ from the viewpoint of further improving the film scratch resistance. It is preferable that the knoop hardness is high from the viewpoint of further improving the scratch resistance, and thus, the upper limit is not particularly limited, but for example, even in a case where the knoop hardness is approximately less than or equal to 315 N/mm$^2$, or approximately less than or equal to 300 N/mm$^2$, it is possible to make the durability of a polarizing plate excellent, for example, in a case of being used as a polarizing plate protective film, insofar as the cellulose ester film has knoop hardness of greater than or equal to 210 N/mm$^2$. Furthermore, the knoop hardness in the present invention is a value obtained by the following method.

The surface of a sample fixed onto a glass substrate is measured in conditions of a loading time of 10 sec, a creeping time of 5 sec, an unloading time of 10 sec, and a maximum load of 50 mN by a knoop indenter in which the direction of a short axis of an indenter is arranged to be parallel to a transport direction (a longitudinal direction; a test direction in the pencil hardness test described below) at the time of forming the cellulose ester film using FISCHERSCOPE H100Vp type hardness meter manufactured by Fischer Instruments K.K. Hardness is calculated by a relationship between the contact area of the indenter and the sample and the maximum load obtained from an indentation depth, and the average value of five points is set to the knoop hardness.

Tan δ (25° C.)

As described above, the cellulose ester film described above includes a surface having knoop hardness of greater than or equal to 210 N/mm$^2$, but it is difficult to improve the film scratch resistance by only including such a surface, and thus, the present inventors have newly found that it is possible to first obtain a cellulose ester film having excellent scratch resistance by increasing both of the knoop hardness and tan δ (25° C.). The details are as described above. Furthermore, the reason that a value to be measured has an excellent correlation with the result of the pencil hardness test by adopting 25° C. as a measurement temperature is assumed that a measured value at 25° C. indicates the molecular mobility of the cellulose ester polymer at room temperature.

Tan δ (25° C.) is loss tangent tan δ at 25° C. which is obtained by dynamic viscoelasticity measurement. Tan δ (25° C.) in the present invention is a value obtained by measuring E" (a modulus of loss elasticity) and E' (a modulus of storage elasticity) with respect to a film sample which is subjected to humidity adjustment in advance under an atmosphere of a temperature of 25° C. and humidity of 60% Rh for 2 hours or more in the following conditions using a dynamic viscoelasticity measurement device (DVA-200 manufactured by IT KEISOKU SEIGYO KK), and by obtaining tan δ (=E"/E').

Device: DVA-200 manufactured by IT KEISOKU SEIGYO KK
Sample: 5 mm, Length of 50 mm (Gap of 20 mm)
Measurement Conditions: Tensile Mode
Measurement Temperature: −150° C. to 220° C.
Temperature Rising Conditions: 5° C./min
Frequency: 1 Hz The cellulose ester film according to one embodiment of the present invention has tan δ (25° C.) of greater than or equal to 0.03. The cellulose ester film which includes the surface having knoop hardness of greater than or equal to 210 N/mm$^2$ and has tan δ (25° C.) of greater than or equal to 0.03 is able to have excellent scratch resistance. Tan δ (25° C.) is preferably greater than or equal to 0.031, is more preferably greater than or equal to 0.033, is even more preferably greater than or equal to 0.035, and is still more preferably greater than or equal to 0.040, from the viewpoint of obtaining more excellent scratch resistance.

On the other hand, in the upper limit, it is preferable that tan δ (25° C.) is high since the film scratch resistance is high, and more specifically, a (restoring) force which resists against a force generating a scratch over time is excellent. Therefore, the upper limit value is not particularly limited, and it is possible to make the durability of the polarizing plate excellent, for example, in a case of being used as the polarizing plate protective film, insofar as the cellulose ester film has tan δ (25° C.) of greater than or equal to 0.03, for example, even in a case where tan δ (25° C.) is approximately less than 0.1.

Compound Having NRCO Structure

As a result of intensive studies of the present inventors, the knoop hardness and tan δ (25° C.) described above are able to be adjusted in a desired range by adopting the compound having an NRCO structure from various compounds as the additive of the cellulose ester film, and then, by various controlling the structure of the compound. Hereinafter, a specific embodiment of controlling the structure of the compound having an NRCO structure will be described. However, the present invention is not limited to the specific embodiment described below, and the structure is able to be variously controlled insofar as desired knoop hardness and tan δ (25° C.) are able to be realized in the cellulose ester film containing the compound having an NRCO structure.

In the structural unit —NR—(C=O)— included in the compound having an NRCO structure, R represents a hydrogen atom or a substituent. The substituents of the group T of the substituents are able to be exemplified as the substituent represented by R. In a case where the structural unit described above is included in a non-cyclic structural portion, it is preferable that R of —NR—(C=O)— is a hydrogen atom, that is, —NH—(C=O)—.

In contrast, the structural unit denoted by —NR—(C=O)— is included in a cyclic structure, it is preferable that R is both of a hydrogen atom and a substituent. Preferred examples of the substituent are able to include substituents to be described with respect to a substituent represented by $R^{51}$ and $R^{53}$ in General Formula (VI) described below, and $R^{85}$ in General Formula (VIII) described below.

It is preferable that in the structural unit —NR—(C=O)— included in the compound having an NRCO structure, the ratio of the structural unit in the molecules increases from the viewpoint of improving the knoop hardness. The ratio of the structural unit in the molecules described above is able to be denoted by an equivalence U which is obtained as U=[(Molecular Weight)/(Number of Structural Unit Included in One Molecule)], and indicates that the content ratio of the structural unit per one molecule increases as the value of the equivalence U decreases. The equivalence U is preferably less than or equal to 515, is more preferably less than or equal to 450, is even more preferably less than or equal to 420, and is still more preferably less than or equal to 300, from the viewpoint of further improving the knoop hardness. The lower limit, for example, is greater than or equal to 100, but is not particularly limited. The number of structural units in one molecule is at least one, is preferably two or more, and is more preferably 2 to 6. Furthermore, in a case where the number of structural units in one molecule is two or more, the structural units may be identical to each other, or may be different from each other.

In addition, it is preferable that compatibility with cellulose ester is high from the viewpoint of obtaining an excellent effect due to the addition of the compound, and from such a viewpoint, it is preferable that the molecular weight of the compound having an NRCO structure is less than or equal to 1,500. The molecular weight is more preferably less than or equal to 1,000, and is even move preferably less than or equal to 800. In contrast, volatilization easily occurs from the film as the molecular weight of the compound decreases, and an additive having high volatility is likely to whiten the film due to the volatilization, in particular, in a case where the film is thinned. From such a viewpoint, it is preferable that the compound which is used as the additive of the cellulose ester film has low volatility. The molecular weight of the compound having an NRCO structure is preferably greater than or equal to 250, is more preferably greater than or equal to 300, and is even more 350, from the viewpoint of low volatility. Furthermore, the molecular weight indicates a value (a number average molecular weight) obtained in terms of standard polystyrene by measuring a polymer and a copolymer using a gel permeation chromatography (GPC).

Here, it is desirable that in a cellulose ester film which is used in an environment of being continuously irradiated with light, such as a protective film of a polarizing plate, yellow tint (hereinafter, "photocoloration") is not easily generated according to continuous light irradiation. In consideration of such a viewpoint, it is preferable that the compound which is used as the additive of the cellulose ester film does not induce the photocoloration of the film. It is preferable that the compound having an NRCO structure does not have absorption with respect to light in a wavelength range of greater than or equal to 280 nm and les less than or equal to 780 nm, in which the cellulose ester film is likely to be exposed to a use environment, from the viewpoint of preventing the photocoloration described above. Furthermore, the details of not having absorption are as described above. In order to suppress the absorption in the wavelength range described above, it is desirable to reduce the number of aromatic rings which is a structure causing the absorption. From such a viewpoint, the number of aromatic rings included in the compound having an NRCO structure is preferably 0 to 5, and is more preferably 0 to 3. On the other hand, in one embodiment of the present invention, it is preferable that the aromatic ring is not introduced to the compound having an NRCO structure in a range where the photocoloration is able to be suppressed. Such a viewpoint will be described below.

In one embodiment, the structural unit —NR—(C=O)— described above is included in a urethane bond —NH—(C=O)—O—. That is, the cellulose ester film contains a compound having a urethane bond —NH—(C=O)—O—. In addition, in another embodiment, the structural unit —NR—(C=O)— described above is included in the structure denoted by —NR—(C=O)—NR—. Two R's in the structure may be identical to each other, or may be different from each other. It is preferable that the compound having an NRCO structure has a urethane bond or the structure described above is preferable from the viewpoint of improving the scratch resistance of the cellulose ester film, and in particular, from the viewpoint of improving the knoop hardness of the cellulose ester film. It is preferable that the compound having an NRCO structure has a urethane bond from the viewpoint of further improving the knoop hardness.

In one embodiment, the structural unit —NR—(C=O)— is included in the cyclic structural portion. That is, in one embodiment, the compound having an NRCO structure has a hetero ring having the structural unit described above. Examples of a preferred embodiment of such a hetero ring are able to include hetero rings included in General Formula (VI) and General Formula (VII) described below (more specifically, General Formula (VIII) described below).

In addition, in another embodiment, the structural unit —NR—(C=O)— is included in the non-cyclic structural portion of the compound having an NRCO structure. On the other hand, it is preferable that the compound having an NRCO structure has one or more cyclic structures from the viewpoint of improving the scratch resistance of the cellulose ester film, and in particular, from the viewpoint of improving the knoop hardness. From the viewpoint described above, in a case where the structural unit —NR—(C=O)— is included in the non-cyclic structural portion, it is preferable that a cyclic structure is included as a terminal substituent of the compound, or a linking group linking two structural units described above has a cyclic structure. Such a cyclic structure may be an aliphatic ring, or may be an aromatic ring. In addition, the cyclic structure may be a hetero ring containing a hetero atom in the cyclic structure.

More specifically, examples of the cyclic structure included between two structural units described above and the cyclic structure included in the terminal substituent include an aliphatic ring (a cyclohexane ring, and the like), an aromatic ring (a benzene ring, a naphthalene ring, and the like), and the like, and the cyclic structure may be a plurality of types of rings, or may be a fused ring. The cyclic structure is more preferably an aliphatic carbon ring or an aromatic ring, is even more preferably an aliphatic carbon ring or an aromatic carbon ring, and is still more preferably a cyclohexane ring or a benzene ring. Among them described above, the aromatic group is preferable as the terminal substituent.

It is more preferable that the compound having an NRCO structure has one or more, for example, 1 to 3 cyclic structures selected from the group consisting of a cyclohexane ring and a benzene ring. In addition, the cyclic structure included as the terminal substituent is bonded to a main chain portion through a divalent linking group selected from the group consisting of —O—C(=O)—, —C(=O)—, and —O— from the viewpoint of improving the scratch resistance of the cellulose ester film, and in particular, from the viewpoint of improving the knoop hardness.

Alternatively, examples of the cyclic structure which is able to be included in the compound having an NRCO structure are able to include cyclic structures corresponding to a polar group to be described with respect to General Formula (III).

As described above, in one embodiment, the compound having an NRCO structure has a cyclic group as the terminal substituent, the terminal substituent may have a non-cyclic group. Specific examples of the non-cyclic group which is preferable as the terminal substituent are able to include a cyano group, an alkyl group, an alkoxy carbonyl group, a hydroxyl group, and the like. As described above, it is preferable that the ratio of the structural unit —NR—(C=O)— in the compound having an NRCO structure is high from the viewpoint of improving the scratch resistance of the cellulose ester film, and thus, a terminal substituent having a comparatively small structure is preferable as the terminal substituent. From such a viewpoint, an alkyl group having 1 to 6 carbon atoms is preferable as the alkyl group, an alkyl group having 1 to 3 carbon atoms is more preferable, a methyl group or an ethyl group is even more preferable, and the methyl group is still more preferable. The same applies to an alkyl group R included in the alkoxy carbonyl group (RC(=O)—O—). Furthermore, the terminal substituent described above may be directly linked to the structural unit —NR—(C=O)—, or may be linked to the structural unit —NR—(C=O)— through a linking group. Examples of the linking group are able to include linking groups included in general formulas described below.

The compound having an NRCO structure described above is able to be synthesized by a known method. A synthesis method can be also referred to the description of synthesis methods of compounds denoted by general formulas described below.

Examples of a specific embodiment of the compound having an NRCO structure are able to include a compound denoted by any one of General Formulas (I) to (V), and (VII) described below. Hereinafter, each of the general formulas will be sequentially described, and the matters described with respect to a certain general formula are not limited to the general formula unless otherwise particularly specified, but are applied to the whole compound having an NRCO structure.

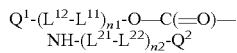
General Formula (I)

[In General Formula (I), $L^{11}$ and $L^{21}$ each independently represent an alkylene group, and the alkylene group may have a substituent. $L^{12}$ and $L^{22}$ each independently represent a single bond, any one of —O—, —NR$^1$—, —S—, and —C(=O)—, or a group formed of a combination thereof. $R^1$ represents a hydrogen atom or a substituent. n1 and n2 each independently represent an integer of 0 to 20, any one of n1 and n2 is an integer of greater than or equal to 1, and in a case where a plurality of $L^{11}$'s, $L^{12}$'s, $L^{21}$'s, and $L^{22}$'s exist, the plurality of $L^{11}$'s, $L^{12}$'s, $L^{21}$'s, and $L^{22}$'s may be identical to each other or different from each other. $Q^1$ and $Q^2$ each independently represent a substituent, and at least one of $Q^1$ or $Q^2$ has a cyclic structure.]

The alkylene group represented by $L^{11}$ and $L^{21}$ may be any one of a straight chain alkylene group, a branched alkylene group, or a cyclic alkylene group, or may be an alkylene group in which one or more cyclic alkylene groups (cycloalkylene groups) and one or more straight chain alkylene groups or branched alkylene groups are linked to each other. Specific examples of the straight chain alkylene group or branched alkylene group include a methylene group, an ethylene group, a propylene group, a butylene group, a pentylene group, a hexylene group, and the like, an alkylene group having 1 to 20 carbon atoms is preferable as the straight chain alkylene group or branched alkylene group, an alkylene group having 1 to 12 carbon atoms is more preferable, an alkylene group having 1 to 8 carbon atoms is even more preferable, an alkylene group having 1 to 3 carbon atoms is particularly preferable, a methylene group, an ethylene group, or a propylene group is most preferable. A cyclohexylene group which may have a substituent is preferable as the cyclic alkylene group. The alkylene group may have a substituent. Examples of the substituent which is able to be included in the alkylene group include the group T of the substituents described above. Among them, an alkyl group, an acyl group, an aryl group, an alkoxy group, and a carbonyl group are preferable as the substituent included in the alkylene group.

It is preferable that the straight chain alkylene group or branched alkylene group does not have a substituent. It is preferable that the cyclic alkylene group has a substituent.

$L^{12}$ and $L^{22}$ each independently represent a single bond, any one of —O—, —NR$^1$—, —S—, and —C(=O)—, or a group formed of a combination thereof, and among them, the single bond, an oxygen atom, —NR$^1$—, or —C(=O)— is preferable. $R^1$ represents a hydrogen atom or a substituent, and examples of the substituent include an alkyl group, an alkenyl group, an aryl group, and an acyl group, and among them, the hydrogen atom or an alkyl group having 1 to 8 carbon atoms, an alkenyl group having 2 to 8 carbon atoms, an alkynyl group having 2 to 8 carbon atoms, and an aryl group having 6 to 18 carbon atoms (for example, a group having a benzene ring and a naphthalene ring) are preferable, and the hydrogen atom or an alkyl group having 1 to 4 carbon atoms is more preferable.

In one embodiment, it is preferable that $L^{12}$ and $L^{22}$ represent a single bond, —O—*, —OC(O)—*, —C(=O)O—*, —NR$^1$—*, and —R$^1$N—*. Here, * represents a bonding position with respect to $Q^1$ or $Q^2$, or a bonding position with respect to the adjacent group on the $Q^1$ side or the $Q^2$ side.

On the other hand, in a case where $L^{12}$ and $L^{22}$ is —OC(=O)—* or —C(=O)O—*, a structure denoted by General Formula (2A) or (2C) described below is exemplified as a specific example of a linking group denoted by -($L^{12}$-$L^{11}$)- or -($L^{21}$-$L^{22}$)-.

In addition, in a case where $L^{12}$ and $L^{22}$ is an oxygen atom, a structure denoted by General Formula (2B) described below is exemplified as the specific example of the linking group represented by -($L^{12}$-$L^{11}$) or -($L^{21}$-$L^{22}$)-.

In addition, in a case where $L^{12}$ and $L^{22}$ is —NR$^1$—OC(=O)—* or —NR$^1$—C(=O)O—*, a structure denoted by General Formula (2D) or (2E) described below is exemplified as the specific example of the linking group denoted by -($L^{12}$-$L^{11}$)- or -($L^{21}$-$L^{22}$)-.

| | |
|---|---|
| —{R$^b_{jb}$(CR$^a$R$^c$)$_{ja}$—O—(C=O)}—* | General Formula (2A) |
| —{R$^b_{jb}$(CR$^a$R$^c$)$_{ja}$—O}—* | General Formula (2B) |
| —{R$^b_{jb}$(CR$^a$R$^c$)$_{ja}$—(C=O)O—}—* | General Formula (2C) |
| —{R$^b_{jb}$(CR$^a$R$^c$)$_{ja}$—NR$^1$(C=O)O—}—* | General Formula (2D) |
| —{R$^b_{jb}$(CR$^a$R$^c$)$_{ja}$—O—(C=O)NR$^1$}—* | General Formula (2E) |

(In General Formulas (2A) to (2E), * represents a bonding position with respect to $Q^1$ or $Q^2$, or a bonding position with respect to the adjacent group on the $Q^1$ side or the $Q^2$ side, $R^a$ and $R^c$ each independently represent a hydrogen atom or an alkyl group (for example, an alkyl group having 1 to 3 carbon atoms, and preferably a methyl group), and ja represents an integer of greater than or equal to 1, and is preferably represents an integer in a range of 1 to 3. In a case where a plurality of $R^a$'s and $R^c$'s exist, the plurality of $R^a$'s and $R^c$'s may be identical to each other, or may be different from each other. $R^b$ represents a cycloalkylene group which may be substituted with one or more alkyl groups having 1 to 3 carbon atoms, and preferably represents a cyclohexylene group which may be substituted with 1 to 3 alkyl groups having 1 to 3 carbon atoms, and jb is 0 or 1. $R^1$ represents a hydrogen atom or a substituent, and preferably represents a hydrogen atom or an alkyl group having 1 to 4 carbon atoms, and it is more preferable that the alkyl group is a methyl group. In a case where a plurality of $R^1$'s exist, a plurality of $R^1$'s may be identical to each other, or may be different from each other.)

In General Formulas (2A) to (2E), in a case where two or more structures denoted by —$(CR^aR^c)$— are included, it is preferable that both of $R^a$ and $R^c$ represent a hydrogen atom, or at least one of $R^a$ or $R^c$ represents an alkyl group.

Specific examples of a linking group denoted by General Formula (2A) include:
—C(CH$_3$)$_2$—O—(C=O)—,
—CH$_2$CH$_2$—O—(C=O)—,
—CH$_2$CH$_2$CH—O—(C=O)—,
—CH$_2$CH(CH$_3$)—O—(C=O)—,
—CH(CH$_3$)CH$_2$—O—(C=O)—,
-(Cyclohexylene group which is Substituted with 1 to 3 Alkyl Groups Having 1 to 3 Carbon Atoms)-CH$_2$—O—(C=O)—,
-(Cyclohexylene Group which is Substituted with 1 to 3 Alkyl Groups Having 1 to 3 Carbon Atoms)-CH$_2$CH$_2$—O—(C=O)—,
-(Cyclohexylene Group which is Substituted with 1 to 3 Alkyl Groups Having 1 to 3 Carbon Atoms)-CH$_2$CH$_2$CH$_2$—O—(C=O)—,
-(Cyclohexylene Group which is Substituted with 1 to 3 Alkyl Groups Having 1 to 3 Carbon Atoms)-CH$_2$CH(CH$_3$)—O—(C=O)—,
-(Cyclohexylene Group which is Substituted with 1 to 3 Alkyl Groups Having 1 to 3 Carbon Atoms)-CH(CH$_3$)CH$_2$—O—(C=O)—,
and the like.

Specific examples of a linking group denoted by General Formula (2B) include a methylene oxy group, an ethylene oxy group, a propylene oxy group, a butylene oxy group, a pentylene oxy group, a hexylene oxy group,
—C(CH$_3$)$_2$—O—,
-(Cyclohexylene Group which is Substituted with 1 to 3 Alkyl Groups Having 1 to 3 Carbon Atoms)-CH$_2$—O—,
-(Cyclohexylene Group which is Substituted with 1 to 3 Alkyl Groups Having 1 to 3 Carbon Atoms)-CH$_2$CH$_2$—O—,
-(Cyclohexylene Group which is Substituted with 1 to 3 Alkyl Groups Having 1 to 3 Carbon Atoms)-CH$_2$CH$_2$CH$_2$—O—,
-(Cyclohexylene Group which is Substituted with 1 to 3 Alkyl Groups Having 1 to 3 Carbon Atoms)-CH$_2$CH(CH$_3$)—O—,
-(Cyclohexylene Group which is Substituted with 1 to 3 Alkyl Groups Having 1 to 3 Carbon Atoms)-CH(CH$_3$)CH$_2$—O—,
and the like.

Specific examples of a linking group denoted by General Formula (2C) include:
—C(CH$_3$)$_2$—(C=O)—O—,
—CH$_2$CH$_2$—(C=O)—O—,
—CH$_2$CH$_2$CH$_2$—(C=O)—O—,
—CH$_2$CH(CH$_3$)—(C=O)—O—,
—CH(CH$_3$)CH$_2$—(C=O)—O—,
-(Cyclohexylene Group which is Substituted with 1 to 3 Alkyl Groups Having 1 to 3 Carbon Atoms)-CH$_2$—(C=O)—O—,
-(Cyclohexylene Group which is Substituted with 1 to 3 Alkyl Groups Having 1 to 3 Carbon Atoms)-CH$_2$CH$_2$—(C=O)—O—,
-(Cyclohexylene Group which is Substituted with 1 to 3 Alkyl Groups Having 1 to 3 Carbon Atoms)-CH$_2$CH$_2$CH$_2$—(C=O)—O—,
-(Cyclohexylene Group which is Substituted with 1 to 3 Alkyl Groups Having 1 to 3 Carbon Atoms)-CH$_2$CH(CH$_3$)—(C=O)—O—,
-(Cyclohexylene Group which is Substituted with 1 to 3 Alkyl Groups Having 1 to 3 Carbon Atoms)-CH(CH$_3$)CH$_2$—(C=O)—O—,
and the like.

Specific examples of a linking group denoted by General Formula (2D) include:
-(Cyclohexylene Group which is Substituted with 1 to 3 Alkyl Groups Having 1 to 3 Carbon Atoms)-CH$_2$—NR$^1$(C=O)O—CH$_2$—NR$^1$(C=O)—O—,
—CH$_2$CH$_2$—NR$^1$(C=O)—O—,
—CH$_2$CH$_2$CH$_2$—NR$^1$(C=O)—O—,
—CH$_2$CH(CH$_3$)—NR$^1$(C=O)—O—,
—CH(CH$_3$)CH$_2$—NR$^1$(C=O)—O—,
and the like.

Specific examples of a linking group denoted by General Formula (2E) include:
-(Cyclohexylene Group which is Substituted with 1 to 3 Alkyl Groups Having 1 to 3 Carbon Atoms)-CH$_2$—O—(C=O)NR$^1$—CH$_2$—NR$^1$(C=O)—O—,
—CH$_2$CH$_2$—NR$^1$(C=O)—O—,
—CH$_2$CH$_2$CH$_2$—NR$^1$(C=O)—O—,
—CH$_2$CH(CH$_3$)—NR$^1$(C=O)—O—,
—CH(CH$_3$)CH$_2$—NR$^1$(C=O)—O—,
and the like.

Examples of a preferred embodiment of the linking group denoted by ($L^{12}$-$L^{11}$) and ($L^{21}$-$L^{22}$) include an alkylene group, or a group denoted by any one of General Formulas (2A) to (2E). In one embodiment, examples of a more preferred embodiment include an alkylene group, or a group denoted by General Formula (2A) or (2B). In another embodiment, examples of the more preferred embodiment include a group denoted by General Formula (2D) or (2E). Furthermore, ($L^{12}$-$L^{11}$) and ($L^{21}$-$L^{22}$) being an alkylene group indicates that $L^{11}$ and $L^{21}$ represent an alkylene group, and $L^{12}$ and $L^{22}$ represent a single bond. In General Formula (I), in a case where n1 and n2 are an integer of greater than or equal to 1 (that is, an integer in a range of 1 to 20), a plurality of ($L^{12}$-$L^{11}$)'s and ($L^{21}$-$L^{22}$)'s are included in General Formula (I). In this case, the plurality of ($L^{12}$-$L^{11}$)'s and the plurality of ($L^{21}$-$L^{22}$)'s may have the same structure, or may have different structures. It is preferable that a combination between an alkylene group and one or more groups denoted by any one of General Formulas (2A) to (2E) is included in the plurality of ($L^{12}$-$L^{11}$)'s and the plurality of ($L^{21}$-$L^{22}$)'s.

$Q^{11}$ and $Q^{12}$ each independently represent a substituent, and at least one of $Q^{11}$ or $Q^{12}$ has a cyclic structure.

Examples of a substituent include the group T of the substituents described above, an aryl group having 6 to 30 carbon atoms (more preferably 6 to 20 carbon atoms, and even more preferably 6 to 10 carbon atoms), an alkyl group having 1 to 12 carbon atoms (more preferably 1 to 10 carbon atoms, and even more preferably 1 to 5 carbon atoms) (here, an oxygen atom may be contained in an alkyl chain), an alkenyl group having 2 to 12 carbon atoms (more preferably 2 to 10 carbon atoms, and even more preferably 2 to 5 carbon atoms), and an alkoxy group having 1 to 12 carbon atoms (more preferably 1 to 10 carbon atoms, and even more preferably 1 to 5 carbon atoms). $Q^{11}$ and $Q^{12}$ may further has a substituent, and specific examples of the substituent include the group T of the substituents described above, and an aryl group, an alkyl group, and an acyl group are preferable. Furthermore, the aryl group described above indicates an aromatic hydrocarbon group.

Examples of the cyclic structure included in one or both of $Q^{11}$ and $Q^{12}$ include an aliphatic ring (a cyclohexane ring, and the like), an aromatic ring (a benzene ring, a naphthalene ring, and the like), and the like, and the cyclic structure may be a plurality of types of rings, or may be a fused ring.

$Q^1$ and $Q^2$ each independently represent a substituent, and at least one of $Q^1$ or $Q^2$ has a cyclic structure.

Examples of the substituent include the group T of the substituents described above, and include an aryl group having 6 to 30 carbon atoms (more preferably 6 to 20 carbon atoms, and even more preferably 6 to 10 carbon atoms), an alkyl group having 1 to 12 carbon atoms (more preferably 1 to 10 carbon atoms, and even more preferably 1 to 5 carbon atoms) (here, an oxygen atom may be contained in an alkyl chain), an alkenyl group having 2 to 12 carbon atoms (more preferably 2 to 10 carbon atoms, and even more preferably 2 to 5 carbon atoms), and an alkoxy group having 1 to 12 carbon atoms (more preferably 1 to 10 carbon atoms, and even more preferably 1 to 5 carbon atoms). $Q^1$ and $Q^2$ may further have a substituent, and specific examples of the substituent include the group T of the substituents described above, and an aryl group, an alkyl group, and an acyl group are preferable. Furthermore, the aryl group described above indicates an aromatic hydrocarbon group.

Examples of the cyclic structure included in one or both of $Q^1$ and $Q^2$ include an aliphatic ring (a cyclohexane ring, and the like), an aromatic ring (a benzene ring, a naphthalene ring, and the like), and the like, and the cyclic structure may be a plurality of types of rings, or may be a fused ring. The cyclic structure included in one or both of $Q^1$ and $Q^2$ is preferably an aliphatic carbon ring or an aromatic carbon ring, is more preferably a cyclohexane ring and a benzene ring, and is even more preferably a benzene ring. A compound denoted by General Formula (I) preferably has 2 to 4 cyclohexane rings or benzene rings in one molecule, and more preferably has two or three cyclohexane rings or benzene rings in one molecule, from the viewpoint of improving the scratch resistance of the cellulose ester film, and in particular, from the viewpoint of improving the knoop hardness. In addition, it is preferable that a cyclic structure included as a molecular terminal group is bonded to a main chain portion through a divalent linking group selected from the group consisting of —O—C(=O)—, —C(=O)—, and —O—, from the viewpoint of improving the scratch resistance of the cellulose ester film. From the same viewpoint, it is preferable that a benzene ring is included in $Q^A$ or $Q^B$ as a molecular terminal group. In a case where the cyclic structure described above has a substituent, an alkyl group having 1 to 3 carbon atoms or an alkoxy group having 1 to 3 carbon atoms is preferable as the substituent.

Alternatively, it is preferable that $Q^1$ is a monovalent substituent denoted by General Formula (a) described below or a substituent in which one of more of the monovalent substituents are bonded to $L^{12}$ through a linking group.

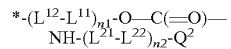   General Formula (a)

Alternatively, it is preferable that $Q^2$ is a monovalent substituent denoted by General Formula (b) described below or a substituent in which one or more of the monovalent substituents are bonded to $L^{22}$ through a linking group.

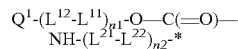   General Formula (b)

That is, it is preferable that the compound denoted by General Formula (I) has two or more structures denoted by $-(L^{12}\text{-}L^{11})_{n1}\text{-O—C}(=O)\text{—NH-}(L^{21}\text{-}L^{22})_{n2}\text{-}$ in one molecule. Furthermore, $L^{11}$ to $L^{22}$, n1, n2, and $Q^1$ and $Q^2$ in General Formulas (a) and (b) described above are identical to $L^{11}$ to $L^{22}$, n1, n2, and $Q^1$ and $Q^2$ in General Formula (I). A specific embodiment of the compound according to the preferred embodiment described above will be described below. Examples of the linking group described above are able to include the linking groups described with respect to $Z^1$ in General Formula (I-1).

The compound denoted by General Formula (I) may have one or more divalent linking groups denoted by —NH—C(=O)—O—, or may have two or more divalent linking groups denoted by —NH—C(=O)—O—. It is preferable that the number of divalent linking groups denoted by —NH—C(=O)—O— is 1 to 6. In one embodiment, it is more preferable that the number of divalent linking groups denoted by —NH—C(=O)—O— is 2 or 3. In addition, in another embodiment, it is even more preferable that the number of divalent linking groups denoted by —NH—C(=O)—O— is 2 to 4.

Alternatively, in another embodiment, the compound denoted by General Formula (I) is able to have a divalent linking group denoted by —NR$^1$—C(=O)—O— in addition to the divalent linking group denoted by —NH—C(=O)—O—. The total number of divalent linking groups denoted by —NH—C(=O)—O— and divalent linking groups denoted by —NR$^1$—C(=O)—O—, for example, can be 2 to 6, and is preferably 2 to 4.

In one embodiment, the compound denoted by General Formula (I) does not have the divalent linking group denoted by —NR$^1$—C(=O)—NR$^1$— in a portion other than the cyclic structure. The details of R$^1$ are as described above. The same applies to the compound denoted by each of the general formulas described below in detail, In one preferred embodiment of the compound denoted by General Formula (I), a group denoted by —NH—C(=O)—NR— or —NR—C(=O)—NH— is not included in the molecules. Here, R represents a hydrogen atom or a substituent. Examples of the substituent are able to include the substituents exemplified as the group T of the substituents. In addition, in the compound denoted by General Formula (I), a structure denoted by "-Aromatic Ring-NH—C(=O)—O—" may cause the added cellulose ester film to exhibit photocoloration properties in the presence of impurities, and the structure denoted by "-Aromatic Ring-NH—C(=O)—O—" may be included as the compound denoted by General Formula (I), and may be preferably used.

n1 and n2 each independently represent an integer of 0 to 20, and any one of n1 and n2 is an integer of greater than or equal to 1. n1 and n2 are preferably an integer of 0 to 10, are more preferably an integer of 0 to 5, and are even more preferably an integer of 0 to 3.

It is preferable that the compound denoted by General Formula (I) is a compound denoted by General Formula (I-1) described below.

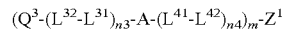   General Formula (I-1)

(In General Formula (I-1), $L^{31}$ and $L^{41}$ each independently represent an alkylene group, and the alkylene group may have a substituent. $L^{32}$ and $L^{42}$ each independently represent a single bond, any one of —O—, —$NR^1$—, —S—, and —C(=O)—, or a group formed of a combination thereof. $R^1$ represents a hydrogen atom or a substituent. n3 and n4 each independently represents an integer of 0 to 20, any one of n3 and n4 represents an integer of greater than or equal to 1, and in a case where a plurality of $L^{31}$'s, $L^{32}$'s, $L^{41}$'s, and $L^{42}$'s exist, the plurality of $L^{31}$'s, $L^{32}$'s, $L^{41}$'s, and $L^{42}$'s may be identical to each other or different from each other. $Q^3$ represents a substituent, $Z^1$ represents an m-valent linking group, and A represents *—O—C(=O)—NH— or *—NH—C(=O)—O— (* represent a bonding position with respect to $L^{41}$). m represents an integer of 2 to 6, and a plurality of Q's and A's may be identical to each other or different from each other. In addition, at least one of $Q^3$ or $Z^1$ has a cyclic structure.)

$L^{31}$ and $L^{41}$ are each independently identical to $L^{11}$ and $L^{21}$ in General Formula (I). It is preferable that at least one of $L^{31}$ or $L^{41}$ is an alkylene group as with $L^{11}$ and $L^{21}$ in General Formula (I), and it is more preferable that both of $L^{31}$ and $L^{41}$ are an alkylene group as with $L^{11}$ and $L^{21}$ in General Formula (I).

$L^{32}$ and $L^{42}$ are each independently identical to $L^{12}$ and $L^{22}$ in General Formula (I), and preferred ranges thereof are also identical to those of $L^{12}$ and $L^{22}$ in General Formula (I).

In particular, it is preferable that a linking group denoted by ($L^{41}$-$L^{42}$) is a single bond or an alkylene group, and it is preferable that a linking group denoted by ($L^{32}$-$L^{31}$) is a single bond, an alkylene group, or a group denoted by any one of General Formulas (2A) to (2E) described below. The details of General Formulas (2A) to (2E) are as described above.

—{$R^b_{jb}$($CR^aR^c$)$_{ja}$—O—(C=O)}—*  General Formula (2A)

—{$R^b_{jb}$($CR^aR^c$)$_{ja}$—O}—*  General Formula (2B)

—{$R^b_{jb}$($CR^aR^c$)$_{ja}$—(C=O)O—}—*  General Formula (2C)

—{$R^b_{jb}$($CR^aR^c$)$_{ja}$—$NR^1$(C=O)O—}—*  General Formula (2D)

—{$R^b_{jb}$($CR^aR^c$)$_{ja}$—O—(C=O)$NR^1$}—*  General Formula (2E)

(In General Formulas (2A) to (2E), * represents a bonding position with respect to $Q^3$ or $Z^1$ or a bonding position with respect to the adjacent group on the $Q^3$ side or the $Z^1$ side, and the details of $R^a$ and the like are as described above.)

n3 and n4 are identical to n1 and n2 in General Formula (I), and preferred ranges thereof are also identical to those of n1 and n2 in General Formula (I).

m represents an integer of 2 to 6, and is preferably an integer of 2 to 3.

$Q^3$ represents a substituent, and is preferably a straight chain alkyl group or branched alkyl group having 1 to 30 carbon atoms, and a cyclic group having 6 to 30 carbon atoms, and it is preferable that $Q^3$ is formed of only the cyclic group. $Q^3$ may further have a substituent, and specific examples of the substituent include the group T of the substituents described above, and an aryl group, an alkyl group, an acyl group, and an alkoxy group are preferable. However, it is preferable that $Q^3$ does not have a substituent.

The cyclic group included in $Q^3$ may have a fused ring, and it is preferable that the cyclic group has a monocyclic ring. Specifically, examples of the cyclic group include an aliphatic ring (a cyclohexane ring, and the like), an aromatic ring (a benzene ring, a naphthalene ring, and the like), and the like, and the aromatic ring is preferable, and an aromatic carbon ring is more preferable.

$Q^3$ is more preferably an aryl group having 6 to 30 carbon atoms (more preferably 6 to 20 carbon atoms), and even more preferably 6 to 10 carbon atoms) or an aryl group having 5 to 30 carbon atoms (more preferably 6 to 20 carbon atoms, and even more preferably 6 to 30 carbon atoms (more preferably 6 to 20 carbon atoms, and even more preferably 6 to 10 carbon atoms), and is particularly preferably a benzene ring.

It is preferable that any one of m $Q^3$'s has a cyclic structure, it is preferable that all of m $Q^3$'s have a cyclic structure, and it is more preferable that $Q^3$ has an aromatic group.

At least one of $Q^3$ or $Z^1$ has one or more cyclic structures, and it is more preferable that both of $Q^3$ and $Z^1$ have a cyclic structure. In addition, a cyclic structure is included in one or both of $Q^3$ and $Z^1$, and the total number of cyclic structures in one molecule is preferably 2 to 4, and is more preferably 2 or 3.

A represents *—O—C(=O)—NH— or *—NH—C(=O)—O— (* represent a bonding position with respect to $L^{41}$).

$Z^1$ represents an m-valent linking group, preferably represents divalent to hexavalent linking groups, more preferably represents divalent to trivalent linking groups, and even more preferably represents a divalent linking group. A group having at least one of a straight chain aliphatic group, a branched aliphatic group, a cyclic aliphatic group, or an aromatic group is preferable as $Z^1$, a group having at least one of a branched aliphatic group, a cyclic aliphatic group, or an aromatic group is more preferable, a group having at least one of a cyclic aliphatic group or an aromatic group is even more preferable, and a group having a cyclic aliphatic group is particularly preferable.

$Z^1$ may be formed of only at least one of a straight chain aliphatic group, a branched aliphatic group, a cyclic aliphatic group, or an aromatic group, and is preferably a combination between the groups and an oxygen atom, and a straight chain alkylene group or a branched alkylene group. It is preferable that the aliphatic group included as $Z^1$ is a saturated aliphatic group.

By setting the group having at least one of the branched aliphatic group, the cyclic aliphatic group, or the aromatic group as $Z^1$, a rigid structure is obtained, and thus, the scratch resistance of the film, and in particular, the knoop hardness tend to be further improved by containing the compound. The number of carbon atoms configuring $Z^1$ is preferably 3 to 20, and is more preferably 4 to 15.

$Z^1$ may have a substituent, and specific examples of the substituent include the group T of the substituents described above, but it is preferable that $Z^1$ does not have a substituent.

Specifically, linking groups exemplified below are preferable. Furthermore, * represents a bonding position with respect to $L^{41}$.

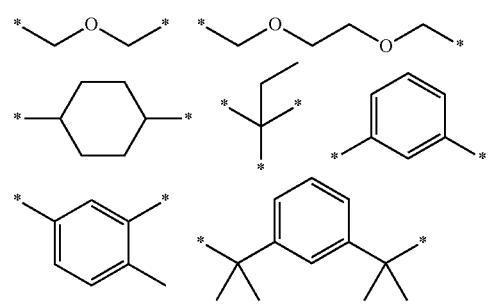

-continued

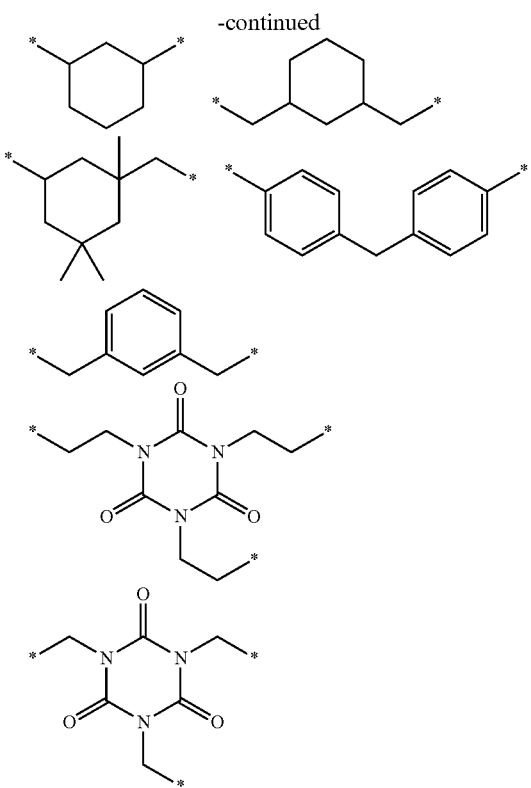

It is preferable that the compound denoted by General Formula (I-1) has an aliphatic carbon ring or an aromatic carbon ring as the cyclic structure. In addition, in the compound denoted by General Formula (I-1), all of $Q^3$'s have an aromatic group (preferably a benzene ring), and it is preferable that $Z^1$ has a cyclic aliphatic group or an aromatic group, it is more preferable that all of $Q^3$'s are formed of a non-substitutional aromatic group (preferably a non-substitutional benzene ring) or $Z^1$ has acyclic aliphatic group, it is even more preferable that all of $Q^3$ s are formed of a non-substitutional aromatic ring group (preferably a non-substitutional benzene ring) or $Z^1$ is formed of a cyclic aliphatic group, and it is particularly preferable that all of $Q^3$'s are formed of a non-substitutional aromatic group (preferably a non-substitutional benzene ring) and $Z^1$ is formed of a cyclic aliphatic group.

It is preferable that the compound denoted by General Formula (I) is a compound denoted by General Formula (I-2) described below.

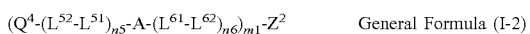  General Formula (I-2)

(In General Formula (I-2), $L^{51}$ and $L^{61}$ each independently represent an alkylene group, and the alkylene group may have a substituent. $L^{52}$ and $L^{62}$ represent a single bond, any one of —O—, —NR$^1$—, —S—, and —C(=O)—, or a group formed of a combination thereof. $R^1$ represents a hydrogen atom or a substituent. n5 and n6 each represent an integer of 0 to 20, any one of n5 and n6 is an integer of greater than or equal to 1, and in a case where a plurality of $L^{51}$'s, $L^{52}$'s, $L^{61}$'s, and $L^{62}$'s exist, the plurality of $L^{51}$'s, $L^{52}$'s, $L^{61}$'s, and $L^{62}$'s may be identical to each other or different from each other. $Q^4$ represents a substitutional or non-substitutional phenyl group, a substitutional or non-substitutional cyclohexyl group, a methyl group, an ethyl group, a propyl group, an isopropyl group, or a t-butyl group, $Z^2$ represents at least one of a straight chain aliphatic group, a branched aliphatic group, a cyclic aliphatic group, or an aromatic group, and A represents *—O—C(=O)—NH— or *—NH—C(=O)—O— (represents a bonding position with respect to $L^{61}$). m1 represents an integer of 2 or 3, and a plurality of $Q^4$'s and A's may be identical to each other or different from each other. In addition, at least one of $Z^2$ or a plurality of $Q^4$'s has a cyclic structure.)

$L^{51}$ and $L^{61}$ are each independently identical to $L^{11}$ and $L^{21}$ in General Formula (I), and preferred ranges thereof are also identical to those of $L^{11}$ and $L^{21}$ in General Formula (I).

$L^{52}$ and $L^{62}$ are each independently identical to $L^{12}$ and $L^{22}$ in General Formula (I), and preferred ranges thereof are also identical to those of $L^{12}$ and $L^{22}$ in General Formula (I).

In particular, it is preferable that a linking group denoted by ($L^{61}$-$L^{62}$) is a single bond or an alkylene group. It is preferable that a linking group denoted by ($L^{52}$-$L^{51}$) is a single bond, an alkylene group, or a group denoted by any one of General Formulas (2A) to (2E) described below. The details of General Formulas (2A) to (2E) are as described above.

—{R$^b_{jb}$(CR$^a$R$^c$)$_{ja}$—O—(C=O)}—*  General Formula (2A)

—{R$^b_{jb}$(CR$^a$R$^c$)$_{ja}$—O}—*  General Formula (2B)

—{R$^b_{jb}$(CR$^a$R$^c$)$_{ja}$—(C=O)O—}—*  General Formula (2C)

—{R$^b_{jb}$(CR$^a$R$^c$)$_{ja}$—NR$^1$(C=O)O—}—*  General Formula (2D)

—{R$^b_{jb}$(CR$^a$R$^c$)$_{ja}$—O—(C=O)NR$^1$}—*  General Formula (2E)

(In General Formulas (2A) to (2E), * represents a bonding position with respect to $Q^4$ or $Z^2$, or a bonding position with respect to the adjacent group on the $Q^4$ side or the $Z^2$ side, and the details of R$^a$ and the like are as described above.)

$Q^4$ represents a substitutional or non-substitutional phenyl group, a substitutional or non-substitutional cyclohexyl group, a methyl group, an ethyl group, a propyl group, an isopropyl group, or a t-butyl group. In General Formula (I-2), m1 represents an integer of 2 or 3, and thus, a plurality of (m) $Q^4$'s exist in the compound denoted by General Formula (1-2). At least one of the plurality of $Q^4$'s or $Z^2$ has a cyclic structure.

The phenyl group represented by $Q^4$ may have a substituent, or may be a non-substitutional group, and a non-substitutional phenyl group is preferable.

The cyclohexyl group represented by $Q^4$ may also have a substituent, or may be a non-substitutional group, and a non-substitutional cyclohexyl group is preferable.

Specific examples of a substituent which may be substituted for the phenyl group and the cyclohexyl group include the group T of the substituents described above.

The substitutional position of the group T of the substituents is not particularly limited, and the substitution may be performed in any one position of an ortho-position, a meta-position, and a para-position. The substituent is preferably a halogen atom, an alkyl group, and an alkoxy group, and is more preferably an alkyl group having 1 to 3 carbon atoms or an alkoxy group having 1 to 3 carbon atoms.

More preferred examples of $Q^4$ include a non-substitutional phenyl group, a non-substitutional cyclohexyl group, or a methyl group.

$Z^2$ is a group having at least one of a branched aliphatic group, a cyclic aliphatic group, or an aromatic group, is preferably a group having at least one of a cyclic aliphatic group or an aromatic group, and is particularly preferably a group having a cyclic aliphatic group. It is preferable that the cyclic structure included in $Z^2$ is an aliphatic carbon ring or an aromatic carbon ring.

$Z^2$ may be formed of at least one of a branched aliphatic group, a cyclic aliphatic group, or an aromatic group, and is preferably a combination between the groups and an oxygen atom, and a straight chain alkylene group or a branched alkylene group. It is preferable that the aliphatic group which is included as $Z^2$ is a saturated aliphatic group.

The number of carbon atoms configuring $Z^2$ is preferably 3 to 20, and is more preferably 4 to 15.

$Z^2$ may have a substituent, and specific examples of the substituent include the group T of the substituents described above, but it is preferable that $Z^2$ does not have a substituent.

A group having at least one of the branched aliphatic group, the cyclic aliphatic group, or the aromatic group of $Z^1$ described above is exemplified as a specific example of $Z^2$.

n5 and n6 are identical to n1 and n2 in General Formula (I), and preferred ranges thereof are also identical to those of n1 and n2 in General Formula (I).

m1 represents an integer of 2 to 3, and is preferably 2.

Examples of a preferred embodiment of the compound denoted by General Formula (I) are able to include a compound denoted by General Formula (I-3) described below.

General Formula (I-3)

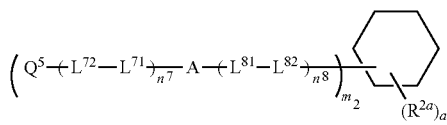

(In General Formula (I-3), $L^{71}$ and $L^{81}$ each independently represent an alkylene group, and the alkylene group may have a substituent. $L^{72}$ and $L^{82}$ each independently represent a single bond, any one of —O—, —NR$^1$—, —S—, and —C(=O)—, or a group formed of a combination thereof. $R^1$ represents a hydrogen atom or a substituent. n7 and n8 each independently represent an integer of 0 to 20, any one of n7 and n8 is an integer of greater than or equal to 1, and in a case where a plurality of $L^{71}$'s, $L^{72}$'s, $L^{81}$'s, and $L^{82}$'s exist, the plurality of $L^{71}$'s, $L^{72}$'s, $L^{81}$'s, and $L^{82}$'s may be identical to each other or different from each other. $Q^5$ represents a substitutional or non-substitutional phenyl group, a substitutional or non-substitutional cyclohexyl group, a methyl group, an ethyl group, a propyl group, an isopropyl group, or a t-butyl group. A represents *—O—C(=O)—NH— or *—NH—C(=O)—O—(* represents a bonding position with respect to $L^{81}$), and $R^{2a}$ represents an alkyl group having 1 to 3 carbon atoms. m2 represents an integer of 2 or 3, a plurality of $Q^5$'s and A's may be identical to each other or different from each other. a represents an integer of 0 to 10, and in a case where a is an integer of greater than or equal to 2, a plurality of $R^{2a}$'s may be identical to each other or different from each other.)

$L^{72}$ and $L^{81}$ are each independently identical to $L^{11}$ and $L^{21}$ in General Formula (I), and preferred ranges thereof are also identical to those of $L^{11}$ and $L^{21}$ in General Formula (I).

$L^{72}$ and $L^{82}$ are each independently identical to $L^{12}$ and $L^{22}$ in General Formula (I), and preferred ranges thereof are also identical to those of $L^{12}$ and $L^{22}$ in General Formula (I).

n7 and n8 are each independently identical to n1 and n2 in General Formula (I), and preferred ranges thereof are also identical to those of n1 and n2 in General Formula (I).

A linking group denoted by ($L^{72}$-$L^{71}$) is identical to the linking group denoted by ($L^{52}$4-$L^{51}$) in General Formula (I-2), and a preferred range thereof is also identical to that of the linking group denoted by ($L^{52}$-$L^{51}$) in General Formula (I-2).

A linking group denoted by ($L^{81}$-$L^{82}$) is identical to the linking group denoted by ($L^{61}$-$L^{62}$) in General Formula (I-2), and a preferred range thereof is also identical to that of the linking group denoted by ($L^{61}$-$L^{62}$) in General Formula (I-2).

In particular, in one embodiment, it is preferable that the linking group denoted by ($L^{72}$-$L^{71}$) and the linking group denoted by ($L^{81}$-$L^{82}$) in General Formula (I-3) are the linking group denoted by General Formula (2A) or General Formula (2B) described above. In another embodiment, it is preferable that the linking group denoted by ($L^{72}$-$L^{71}$) and the linking group denoted by ($L^{81}$-$L^{82}$) in General Formula (I-3) are the linking group denoted by General Formula (2D) or General Formula (2E) described above.

$R^{2a}$ represents an alkyl group having 1 to 3 carbon atoms, and examples of $R^{2a}$ include a methyl group, an ethyl group, a propyl group, an isopropyl group, and the like. It is preferable that $R^{2a}$ is a methyl group.

m2 represents an integer of 2 or 3, and is preferably 2. a represents an integer of 0 to 10, and it is preferable that a is 0 to 6 since the effect of the present invention is effectively exhibited.

$Q^5$ is identical to $Q^4$ in General Formula (I-2), and a preferred range thereof is also identical to that of $Q^4$ in General Formula (I-2).

Specific examples of the bonding position on two or three side chains of a cyclohexane ring in General Formula (I-3) include the followings.

* described below is a position linked to

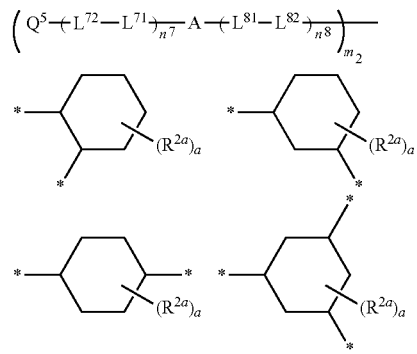

It is preferable that the cyclohexane ring described above is a structure described below.

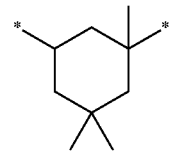 [SMILES: *C1CC(*)(C)CC(C)(C)C1]

In General Formula (I-3), in a case where $Q^5$ is a substitutional or non-substitutional phenyl group, the compound denoted by General Formula (I-3) is denoted by General Formula (I-3-1) described below.

General Formula (I-3-1)

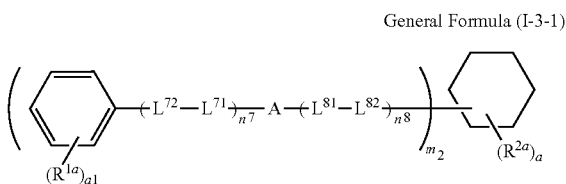

(In General Formula (I-3-1), $R^{1a}$ represents an alkyl group having 1 to 3 carbon atoms or an alkoxy group having 1 to 3 carbon atoms. a1 represents an integer of 0 to 5, and in a case where a plurality of $R^{1a}$'s exist, the plurality of $R^{1a}$'s may be identical to each other or different from each other. $L^{71}$, $L^{72}$, $L^{81}$, $L^{82}$, n7, n8, m2, $R^{2a}$, and a are each identical to $L^{71}$, $L^{72}$, $L^{81}$, $L^{82}$, n7, n8, m2, $R^{2a}$, and a in General Formula (I-3), and preferred ranges thereof are also identical to those of $L^{71}$, $L^{72}$, $L^{81}$, $L^{82}$, n7, n8, m2, $R^{2a}$, and a in General Formula (I-3).)

$R^{1a}$ represents an alkyl group having 1 to 3 carbon atoms or an alkoxy group having 1 to 3 carbon atoms, and examples of $R^{1a}$ include a methyl group, an ethyl group, a propyl group, an isopropyl group, a methoxy group, an ethoxy group, and the like, and it is preferable that $R^{1a}$ is a methyl group and a methoxy group.

a1 represents an integer of 0 to 5, is preferably 0 to 3, and is more preferably 0.

Examples of the preferred embodiment of the compound denoted by General Formula (I) are able to include a compound denoted by General Formula (I-4) described below.

General Formula (I-4)

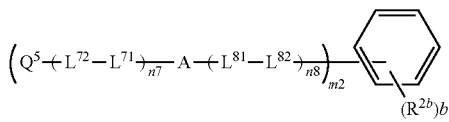

In General Formula (I-4), $Q^5$, $L^{71}$, $L^{72}$, $L^{81}$, $L^{82}$, n7, n8, and m2 are each identical to $Q^5$, $L^{71}$, $L^{72}$, $L^{81}$, $L^{82}$, n7, n8, and m2 in General Formula (I-3). $R^{2b}$ represents an alkyl group having 1 to 3 carbon atoms. b represents an integer of 0 to 5, and in a case where b is an integer of greater than or equal to 2, a plurality of $R^{2b}$'s may be identical to each other or different from each other.

In General Formula (I-4), a linking group denoted by $(L^{72}\text{-}L^{71})_{n7}$ is identical to a linking group denoted by $(L^{52}\text{-}L^{51})_{n5}$ in General Formula (I-2), and a preferred range thereof is also identical to that of the linking group denoted by $(L^{52}\text{-}L^{51})_{n5}$ in General Formula (I-2).

In General Formula (I-4), a linking group denoted by $(L^{81}\text{-}L^{82})_{n8}$ is identical to a linking group denoted by $(L^{61}\text{-}L^{62})_{n6}$ in General Formula (I-2), and a preferred range thereof is also identical to that of the linking group denoted by $(L^{61}\text{-}L^{62})_{n6}$ in General Formula (I-2).

In particular, in one embodiment, it is preferable that the linking group denoted by $(L^{72}\text{-}L^{71})$ and the linking group denoted by $(L^{81}\text{-}L^{82})$ in General Formula (I-4) are the linking group denoted by General Formula (2A) or General Formula (2B) described above. In another embodiment, it is preferable that the linking group denoted by $(L^{72}\text{-}L^{71})$ and the linking group denoted by $(L^{81}\text{-}L^{82})$ in General Formula (I-4) are the linking group denoted by General Formula (2D) or General Formula (2E) described above.

In General Formula (I-4), preferred ranges of $Q^5$, A, and m2 are each identical to those of $Q^5$, A, and m2 in General Formula (I-3).

$R^{2b}$ represents an alkyl group having 1 to 3 carbon atoms, and examples of $R^{2b}$ include a methyl group, an ethyl group, a propyl group, an isopropyl group, and the like. It is preferable that $R^{2b}$ is a methyl group.

b represents an integer of 0 to 5, is preferably 0 to 2, and is more preferably 0 from the viewpoint of suppressing photocoloration.

Specific examples of the bonding position on two or three side chains of the benzene ring in General Formula (I-4) include the followings.

* described below is a position linked to

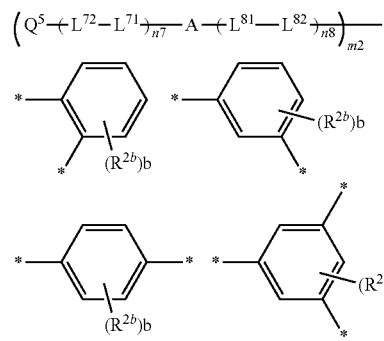

In General Formula (I-4), in a case where $Q^5$ is a substitutional or non-substitutional phenyl group, the compound denoted by General Formula (I-4) is denoted by General Formula (I-4-1) described below.

General Formula (I-4-1)

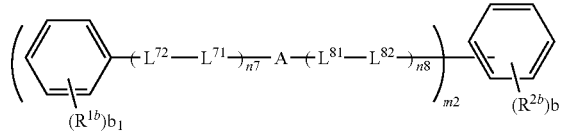

(In General Formula (I-4-1), $R^{1b}$ represents an alkyl group having 1 to 3 carbon atoms or an alkoxy group having 1 to 3 carbon atoms. b1 represents an integer of 0 to 5, and in a case a plurality of $R^{1b}$'s exist, the plurality of $R^{1b}$'s may be identical to each other or different from each other. $L^{71}$, $L^{72}$, $L^{81}$, $L^{82}$, n7, n8, m2, $R^{2b}$, and b are each identical to $L^{71}$, $L^{72}$, $L^{81}$, $L^{82}$, n7, n8, m2, $R^{2b}$, and b in General Formula (I-4), and preferred ranges thereof are also identical to those of $L^{71}$, $L^{72}$, $L^{81}$, $L^{82}$, n7, n8, m2, $R^{2b}$, and b in General Formula (I-4).)

$R^{1b}$ represents an alkyl group having 1 to 3 carbon atoms or an alkoxy group having 1 to 3 carbon atoms, and examples of $R^{1b}$ include a methyl group, an ethyl group, a propyl group, an isopropyl group, a methoxy group, an ethoxy group, and the like, and it is preferable that $R^{1b}$ is a methyl group and a methoxy group.

b1 represents an integer of 0 to 5, is preferably 0 to 3, and is more preferably 0.

Examples of the preferred embodiment of the compound denoted by General Formula (I) are able to include a compound denoted by General Formula (I-5) described below.

General Formula (I-5)

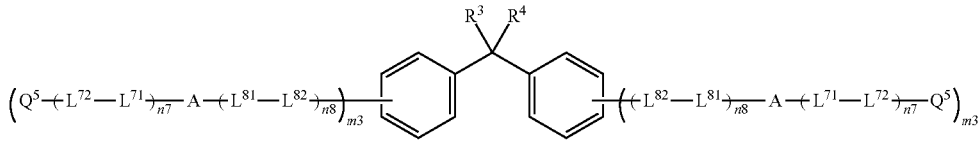

$Q^5$, $L^{71}$, $L^{72}$, $L^{81}$, $L^{82}$, A, n7, and n8 in General Formula (I-5) are each identical to $Q^5$, $L^{71}$, $L^{72}$, $L^{81}$, $L^{82}$, A, n7, and n8 in General Formula (I-3).

In General Formula (I-5), a linking group denoted by $(L^{72}\text{-}L^{71})_{n7}$ is identical to the linking group denoted by $(L^{52}\text{-}L^{51})_{n5}$ in General Formula (I-2), and a preferred range thereof is also identical to that of the linking group denoted by $(L^{52}\text{-}L^{51})_{n5}$ in General Formula (I-2).

In General Formula (I-5), a linking group denoted by $(L^{81}\text{-}L^{82})_{n8}$ is identical to the linking group denoted by $(L^{61}\text{-}L^{62})_{n6}$ in General Formula (I-2), and a preferred range thereof is also identical to that of the linking group denoted by $(L^{61}\text{-}L^{62})_{n6}$ in General Formula (I-2).

Preferred ranges of $Q^5$ and A in General Formula (I-5) are each identical to those of $Q^5$ and A in General Formula (I-3).

In General Formula (I-5), m3 represents 1 or 2, and is preferably 1.

In General Formula (I-5), $R^3$ and $R^4$ each independently represent a hydrogen atom or a methyl group, and it is preferable that $R^3$ and R are a hydrogen atom, or $R^3$ and $R^4$ are a methyl group.

In General Formula (I-5), a plurality of $Q^5$'s, $L^{71}$'s, $L^{72}$'s, $L^{81}$'s, $L^{82}$'s, A's, n7's, n8's, and m3's may be identical to or different from each other.

Examples of the preferred embodiment of the compound denoted by General Formula (I-5) are able to include a compound denoted by General Formula (I-5-1) described below.

General Formula (II-1)

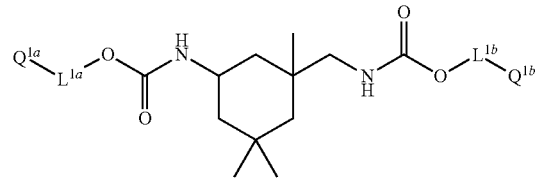

General Formula (III-1)

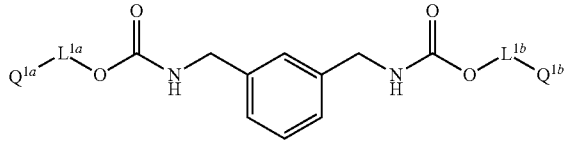

(In General Formulas (II-1) and (III-1), $L^{1a}$ and $L^{1b}$ each independently represent a single bond, an alkylene group, one of groups denoted by any one of General Formulas (2A) to (2E) described above, or a group formed of a combination between two or three groups denoted by any one of General Formulas (2A) to (2E) and two or three alkylene groups, $Q^{1a}$ and $Q^{1b}$ each independently represent a substituent, and here, at least one of $Q^{1a}$ or $Q^{1b}$ represents a phenyl group General Formula (I-5-1)

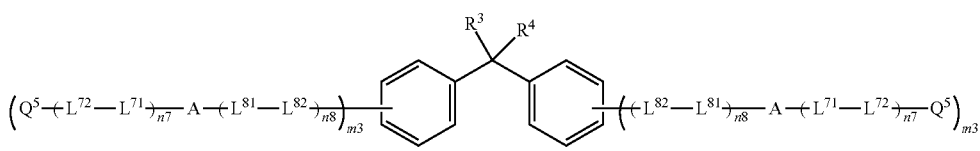

$Q^5$, $L^{71}$, $L^{72}$, $L^{81}$, $L^{82}$, A, n7, n8, m3, $R^3$, and $R^4$ in General Formula (I-5-1) are each identical to $Q^5$, $L^{71}$, $L^{72}$, $L^{81}$, $L^{82}$, A, n7, n8, m3, $R^3$, and $R^4$ in General Formula (I-5), and preferred ranges thereof are also identical to those of $Q^5$, $L^{71}$, $L^{72}$, $L^{81}$, $L^{82}$, A, n7, n8, m3, $R^3$, and $R^4$ in General Formula (I-5).

In the compound denoted by General Formula (I-3), (I-4), or (I-5), the compound denoted by General Formula (I-3) or (I-4) is able to be used as a preferred embodiment, from the viewpoint of suppressing photocoloration.

Examples of the preferred embodiment of the compound denoted by General Formula (I) are able to include a compound denoted by General Formula (II-1) described below and a compound denoted by General Formula (III-1) described below. The compounds are useful as an additive for a cellulose acylate film.

which may be substituted with an alkyl group having 1 to 3 carbon atoms or an alkoxy group having 1 to 3 carbon atoms.)

In one embodiment, in General Formulas (II-1) and (III-1), $L^{1a}$ and $L^{1b}$ each independently represent a single bond, an alkylene group, one of groups denoted by any one of General Formulas (2A-1) to (2E-1) described below, or a group formed of a combination between one or more groups denoted by any one of General Formulas (2A-1) to (2E-1) described below and one or more alkylene groups, for example, a combination between two or three groups denoted by any one of General Formulas (2A-1) to (2E-1) described below and two or three alkylene groups.

—{(CR$^a$R$^c$)$_{ja}$—O—(C=O)}—*   General Formula (2A-1)

—{(CR$^a$R$^c$)$_{ja}$—O}—*   General Formula (2B-1)

—{(CR$^a$R$^c$)$_{ja}$—(C=O)O—}—*   General Formula (2C-1)

—{(CR$^a$R$^c$)$_{ja}$—NR$^1$(C=O)O—}—*    General Formula (2D-1)

—{(CR$^a$R$^c$)$_{ja}$—O—(C=O)NR$^1$}—*    General Formula (2E-1)

(In General Formulas (2A-1) to (2E-1), * represents a bonding position with respect to Q$^{1a}$ or Q$^{1b}$ or a bonding position with respect to the adjacent group on the Q$^{1a}$ side or the Q$^{1b}$ side, R$^a$ and R$^c$ each independently represent a hydrogen atom or an alkyl group having 1 to 3 carbon atoms, ja represents an integer of greater than or equal to 1, and in a case where a plurality of R$^a$'s and R$^c$'s exist, the plurality of R$^a$'s and R$^c$'s may be identical to each other, or may be different from each other. R$^1$ represents a hydrogen atom or an alkyl group having 1 to 4 carbon atoms, and in a case where a plurality of R$^1$'s exist, the plurality of R$^1$'s may be identical to or different from each other.)

L$^{1a}$ and L$^{1b}$ each independently represent a single bond, an alkylene group, one of groups denoted by any one of General Formulas (2A-1) to (2E-1) described below, or a group formed of a combination between two or more groups denoted by any one of General Formulas (2A-1) to (2E-1) described below and two or more alkylene groups, for example, a combination between two or three groups denoted by any one of General Formulas (2A-1) to (2E-1) described below and two or three alkylene groups. Ra, R$^c$, R$^1$, and ja in General Formulas (2A-1) to (2E-1) are identical to Ra, R$^c$, R$^1$, and ja in General Formulas (2A) to (2E).

Examples of the alkylene group described above are able to include a methylene group, an ethylene group, and the like.

It is preferable that L$^{1a}$ and L$^{1b}$ are one of groups denoted by any one of General Formulas (2A-1) to (2E-1), a group formed of a combination of two or more groups denoted by any one of General Formulas (2A-1) to (2E-1), or a group formed of a combination between one or more groups denoted by any one of General Formulas (2A-1) to (2E-1) described below and one or more alkylene groups. The combination described above, for example, is a combination of two or three groups described above.

Q$^{1a}$ and Q$^{1b}$ each independently represent a substituent, and examples of the substituent include the group T of the substituents described above. Here, at least one of Q$^{1a}$ or Q$^{1b}$ represents a phenyl group which may be substituted with an alkyl group having 1 to 3 carbon atoms or an alkoxy group having 1 to 3 carbon atoms, and it is preferable that both of Q$^{1a}$ and Q$^{1b}$ represent a phenyl group which may be substituted with an alkyl group having 1 to 3 carbon atoms or an alkoxy group having 1 to 3 carbon atoms. It is more preferable that both of Q$^{1a}$ and Q$^{1b}$ are a non-substitutional phenyl group.

The details of the alkyl group having 1 to 3 carbon atoms and the alkoxy group having 1 to 3 carbon atoms which are substituted for the phenyl group described above are as described with respect to R$^{1a}$ in General Formula (I-3-1).

In the group denoted by any one of General Formulas (2A-1) to (2C-1) included in General Formula (II-1), ja preferably represents an integer of greater than or equal to 2, more preferably represents an integer in a range of 2 to 5, and even more preferably represents an integer in a range of 2 or 3. jc preferably represents an integer of 1 to 3, and more preferably represents an integer of 1 or 2.

Examples of the preferred embodiment of the compound denoted by General Formula (II-1) are able to include a compound denoted by General Formula (II-1-1) described below.

General Formula (II-1-1)

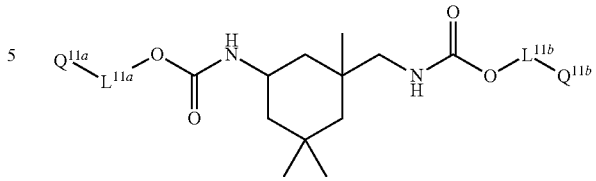

(In General Formula (II-1-1), L$^{11a}$ and L$^{11b}$ each independently represent a single bond, an alkylene group, one of groups denoted by any one of General Formulas (2A-1) to (2E-1) described below, a group formed of a combination of two or more groups denoted by any one of General Formulas (2A-1) to (2E-1) described below, or a group formed of a combination between one or more groups denoted by any one of General Formulas (2A-1) to (2E-1) described below and one or more alkylene groups, Q$^{11a}$ and Q$^{11b}$ each independently represent a substituent, and here, at least one of Q$^{11a}$ or Q$^{11b}$ represents a phenyl group which may be substituted with an alkyl group having 1 to 3 carbon atoms or an alkoxy group having 1 to 3 carbon atoms.

—{(CR$^a$R$^c$)$_{ja}$—O—(C=O)}—*    General Formula (2A-1)

—{(CR$^a$R$^c$)$_{ja}$—O}—*    General Formula (2B-1)

—{(CR$^a$R$^c$)$_{ja}$—(C=O)O—}—*    General Formula (2C-1)

—{(CR$^a$R$^c$)$_{ja}$—NR$^1$(C=O)O—}—*    General Formula (2D-1)

—{(CR$^a$R$^c$)$_{ja}$—O—(C=O)NR$^1$}—*    General Formula (2E-1)

(In General Formulas (2A-1) to (2E-1), * represents a bonding position with respect to Q$^{11a}$ or Q$^{11b}$ or a bonding position with respect to the adjacent group on the Q$^{11a}$ side or the Q$^{11b}$ side, R$^a$ and R$^c$ each independently represent a hydrogen atom or an alkyl group having 1 to 3 carbon atoms, R$^1$ represents a hydrogen atom or an alkyl group having 1 to 4 carbon atoms, ja represents an integer of greater than or equal to 1, and in a case where a plurality of R$^a$'s, R$^c$'s, and R$^1$'s exist, the plurality of R$^a$'s, R$^c$'s, and R$^1$'s may be identical to each other, or may be different from each other.)

The details of Q$^{11a}$, Q$^{11b}$ L$^{11a}$, and L$^{11b}$ in General Formula (II-1-1) are each identical to those of Q$^{1a}$, Q$^{1b}$ L$^{1a}$, and L$^{1b}$ in General Formula (II).

In one embodiment, L$^{11a}$ and L$^{11b}$ each independently represent one of groups denoted by any one of General Formulas (2A-1) to (2E-1) described above, a group formed of a combination of two or more groups denoted by any one of General Formulas (2A-1) to (2E-1) described above, or a groups formed of a combination between one or more groups denoted by any one of General Formulas (2A-1) to (2E-1) described above and one or more alkylene groups. The combination described above, for example, is formed of a combination of two or three groups described above.

Examples of a preferred embodiment of the compound denoted by General Formula (III-1) are able to include a compound denoted by General Formula (III-1-1) described below.

General Formula (III-1-1)

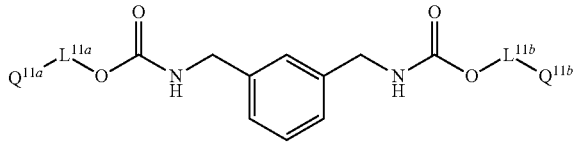

(In General Formula (III-1-1), $L^{11a}$ and $L^{11b}$ each independently represent a single bond, an alkylene group, one of groups denoted by any one of General Formulas (2A-1) or (2C-1) to (2E-1) described below, a group formed of a combination of two or more groups denoted by any one of General Formulas (2A-1) or (2C-1) to (2E-1) described below, or a group formed of a combination between one or more groups denoted by any one of General Formulas (2A-1) or (2C-1) to (2E-1) described below and one or more alkylene groups, $Q^{11a}$ and $Q^{11b}$ each independently represent a substituent, and here, at least one of $Q^{11a}$ or $Q^{11b}$ represents a phenyl group which may be substituted with an alkyl group having 1 to 3 carbon atoms or an alkoxy group having 1 to 3 carbon atoms.

—{$(CHR^a)_{ja}$—O—$(C=O)$}$_{jc}$—*  General Formula (2A-1)

—{$(CHR^a)_{ja}$—$(C=O)$O—}$_{jc}$—*  General Formula (2C-1)

—{$(CR^aR^c)_{ja}$—$NR^1(C=O)$O—}—*  General Formula (2D-1)

—{$(CR^aR^c)_{ja}$—O—$(C=O)NR^1$}—*  General Formula (2E-1)

In General Formulas (2A-1) or (2C-1) to (2E-1), * represents a bonding position with respect to $Q^{11a}$ or $Q^{11b}$ or a bonding position with respect to the adjacent group on the $Q^{11a}$ side or the $Q^{11b}$ side, $R^a$ and $R^c$ represent a hydrogen atom or an alkyl group having 1 to 3 carbon atoms, ja represents an integer of greater than or equal to 1, $R^1$ represents a hydrogen atom or an alkyl group having 1 to 4 carbon atoms, and in a case where a plurality of $R^a$'s, $R^c$'s, and $R^1$'s exist, the plurality of $R^a$'s, $R^c$'s, and $R^1$'s may be identical to each other, or may be different from each other.)

The details of $Q^{11a}$, $Q^{11b}$, $L^{11a}$, and $L^{11b}$ in General Formula (III-1-1) are each identical to those of $Q^{1a}$, $Q^{1b}$, $L^{1a}$, and $L^{1b}$ in General Formula (III-1).

In one embodiment. $L^{11a}$ and $L^{11b}$ each independently represent one of groups denoted by any one of General Formulas (2A-1) to (2E-1) described above, a groups formed of a combination of two or more groups denoted by any one of General Formulas (2A-1) to (2E-1) described above, or a group formed of a combination between one or more groups denoted by any one of General Formulas (2A-1) to (2E-1) described above and one or more alkylene groups. The combination described above, for example, is formed of a combination of two or three groups described above.

Hereinafter, the compound denoted by General Formula (I) which is preferably used in the present invention will be exemplified, but the present invention is not limited thereto.

Here, "k" of (1-1-k) is the same number as that of k in the compound. For example, when k is 2, the compound number is (1-1-2), and k=2 indicates that k of —$(CH)_k$— in the compound is 2. The same applies to the following compounds.

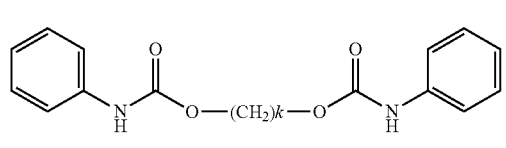

(1-1-k)

k = Integer of 2 to 12

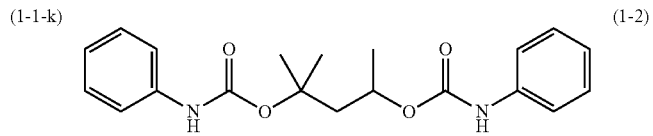

(1-2)

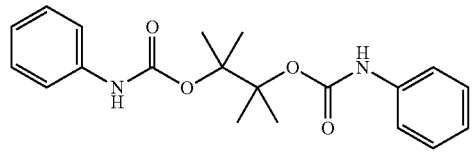

(1-3)

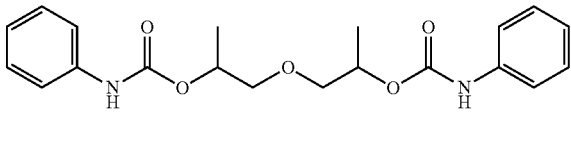

(1-4)

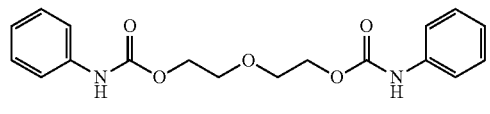

(1-5)

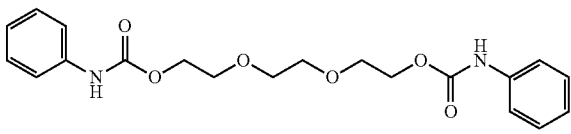

(1-6)

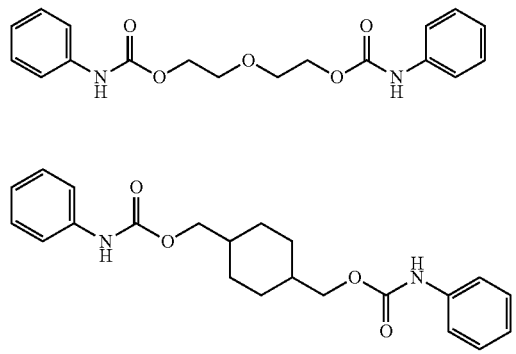

(1-7)

(1-8)

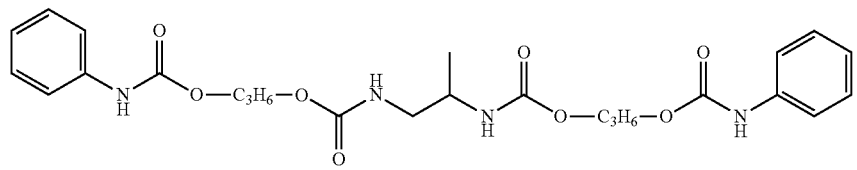

(1-9)

(1-10)
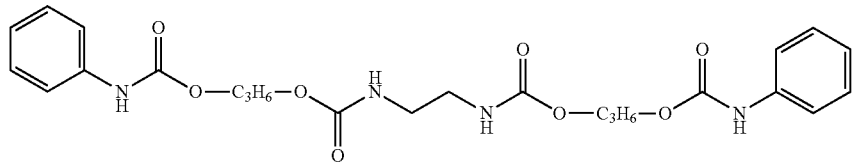
(1-11)
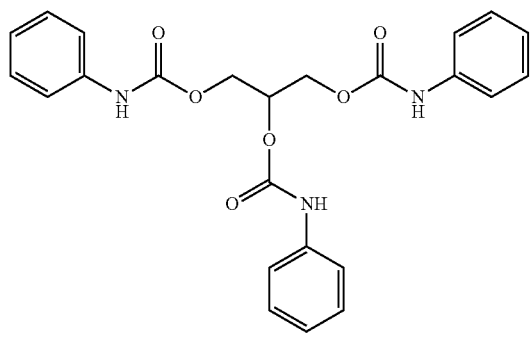
(1-12)
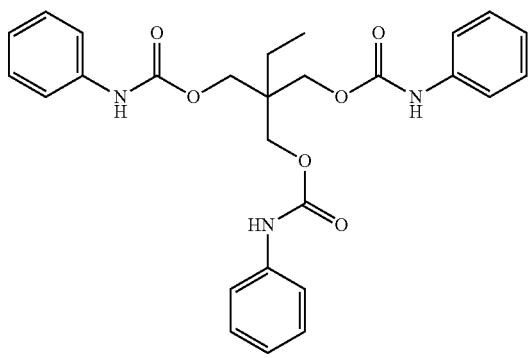
(1-13)
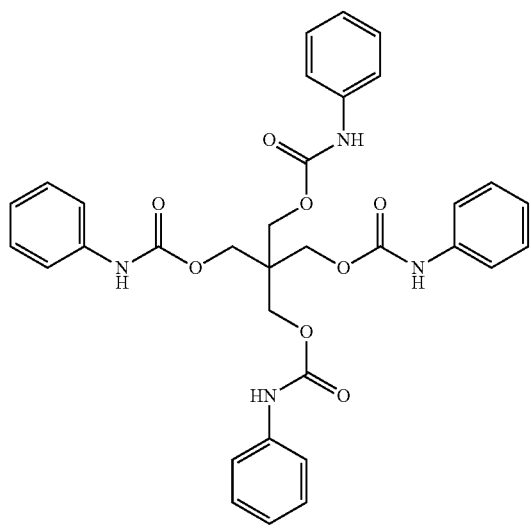
(1-14)
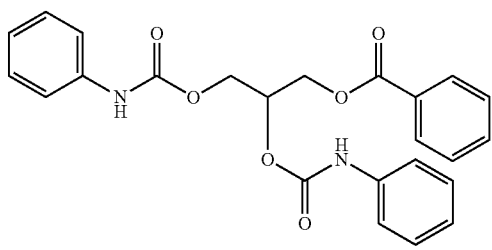
(1-15)
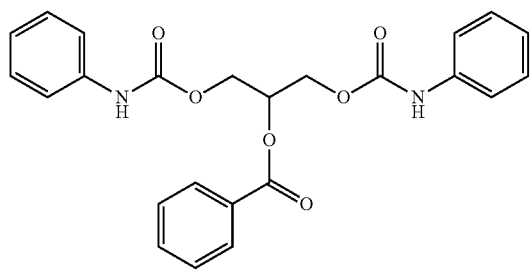
(1-16)
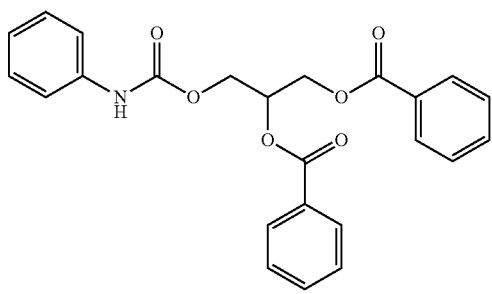

(1-17)
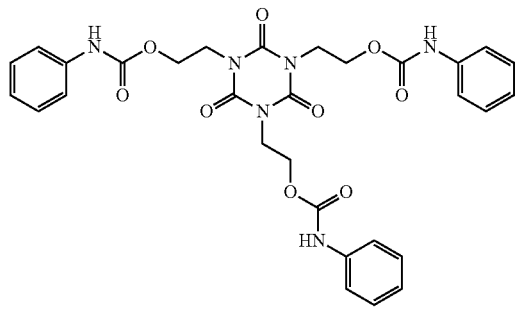
(1-21-k)
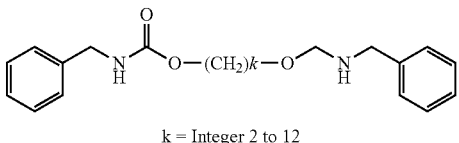
k = Integer 2 to 12
(1-22)
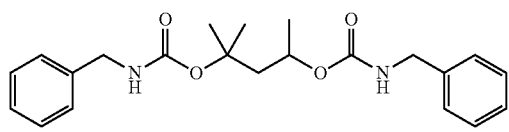
(1-23)
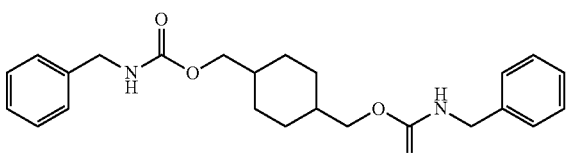
(1-24-k)
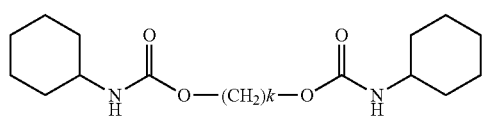
k = Integer 2 to 12
(1-25)
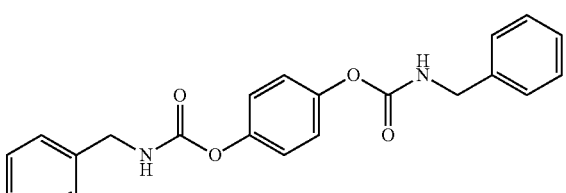
(1-26)
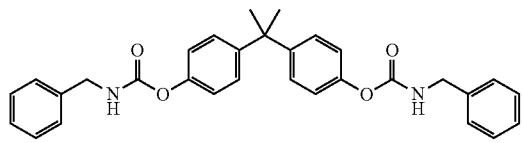
(1-28)
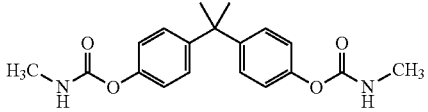
(2-1-1)
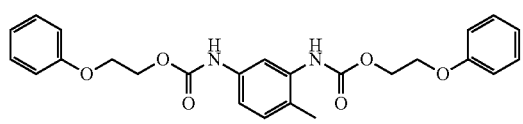
(2-1-2)
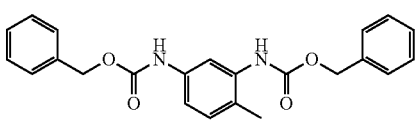
(2-2-1)
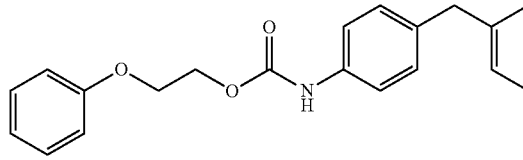
(2-2-2)
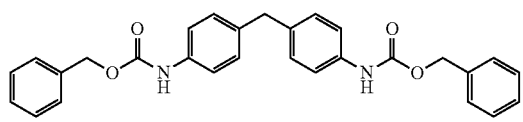
(2-2-3)
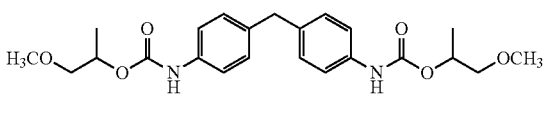
(2-2-4)
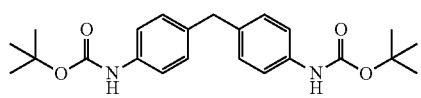
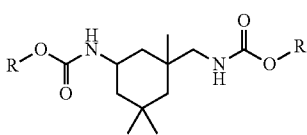
R = CH$_2$C$_6$H$_5$ (2-3-1)
= CH$_2$CH$_2$C$_6$H$_5$ (2-3-2)
= CH$_2$CH$_2$OC$_6$H$_5$ (2-3-3)

-continued
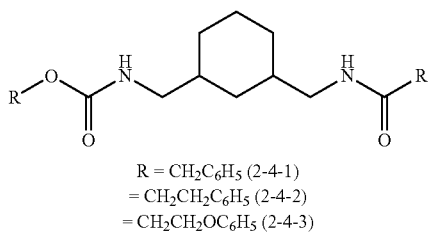
R = CH₂C₆H₅ (2-4-1)
= CH₂CH₂C₆H₅ (2-4-2)
= CH₂CH₂OC₆H₅ (2-4-3)
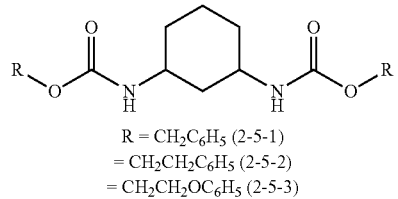
R = CH₂C₆H₅ (2-5-1)
= CH₂CH₂C₆H₅ (2-5-2)
= CH₂CH₂OC₆H₅ (2-5-3)
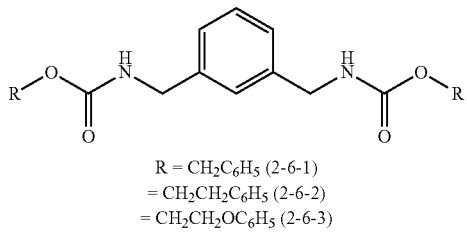
R = CH₂C₆H₅ (2-6-1)
= CH₂CH₂C₆H₅ (2-6-2)
= CH₂CH₂OC₆H₅ (2-6-3)
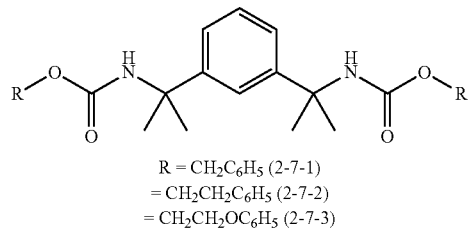
R = CH₂C₆H₅ (2-7-1)
= CH₂CH₂C₆H₅ (2-7-2)
= CH₂CH₂OC₆H₅ (2-7-3)
(2-9-1)
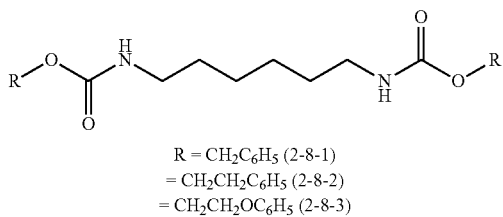
R = CH₂C₆H₅ (2-8-1)
= CH₂CH₂C₆H₅ (2-8-2)
= CH₂CH₂OC₆H₅ (2-8-3)
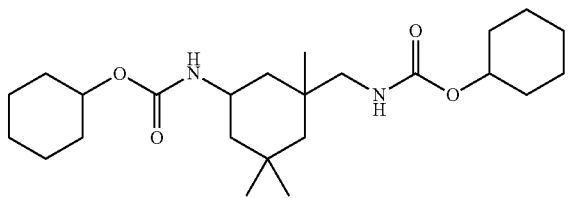
(2-9-2)
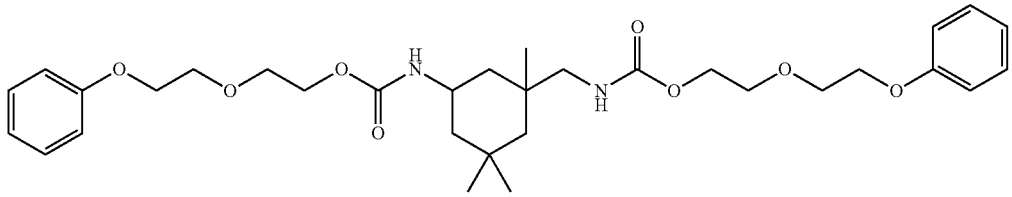
(2-9-3)  (2-9-4)
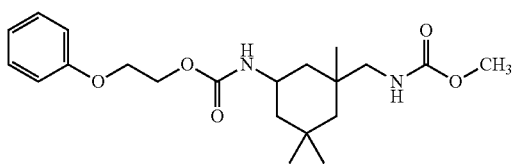   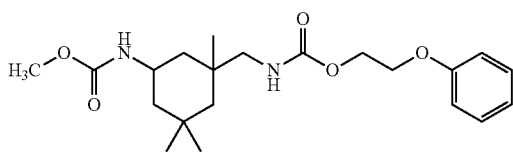
(2-10)
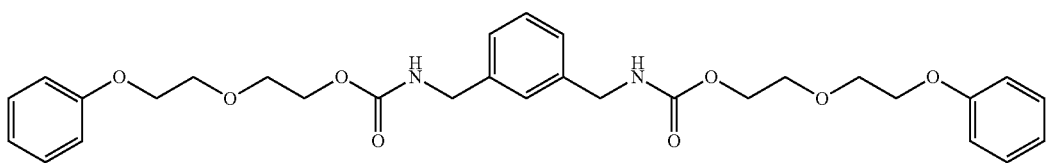
(2-11)  (2-12)
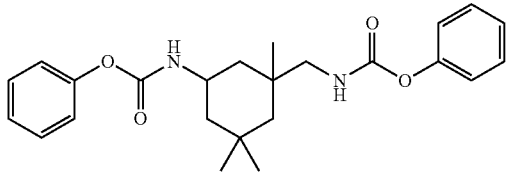   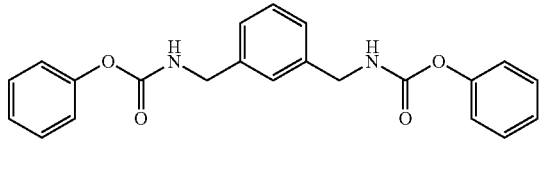

-continued
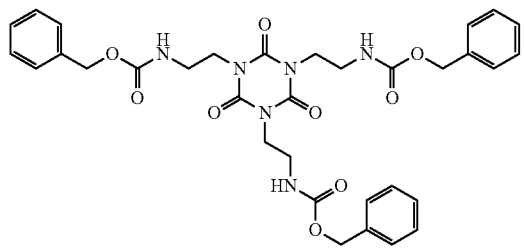 (2-13)
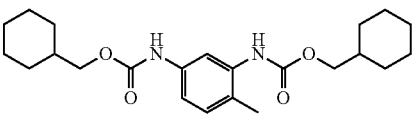 (2-15)
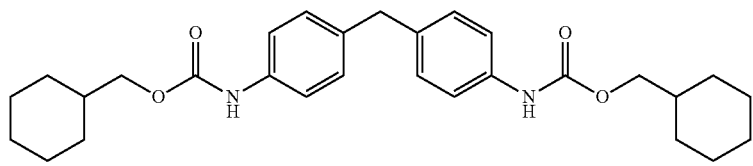 (2-16)
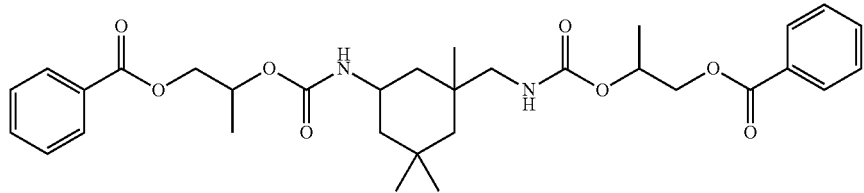 (3-1)
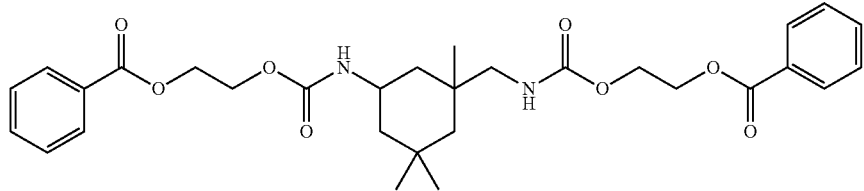 (3-2)
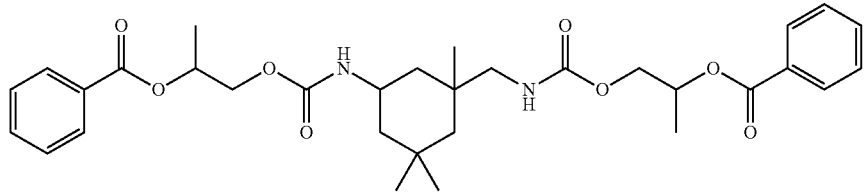 (3-3)
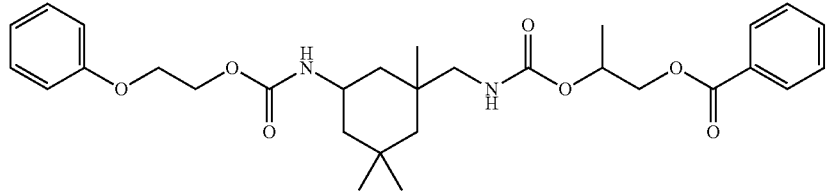 (3-4)
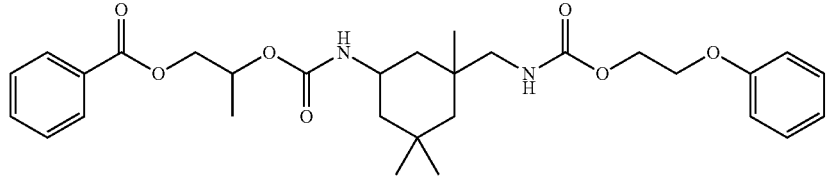 (3-5)

-continued
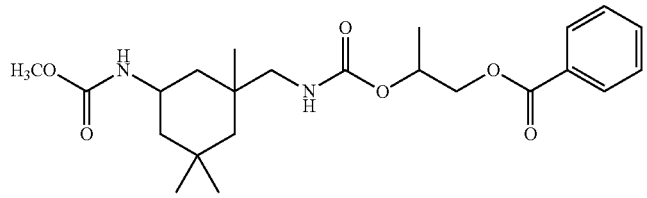
(3-6)
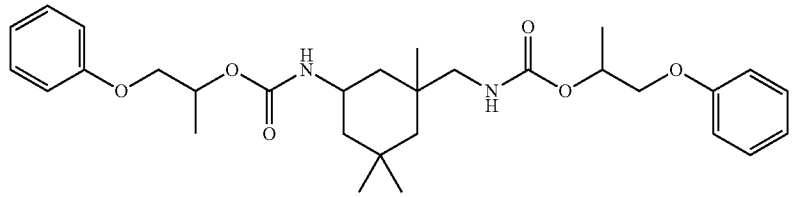
(3-7)
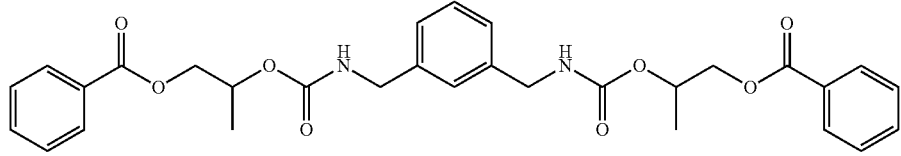
(3-8)
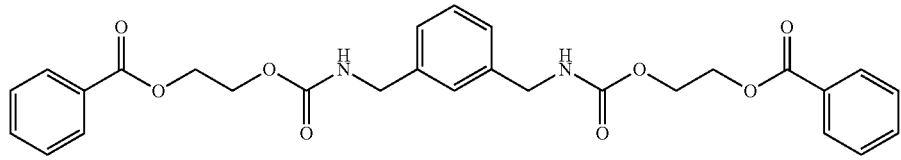
(3-9)
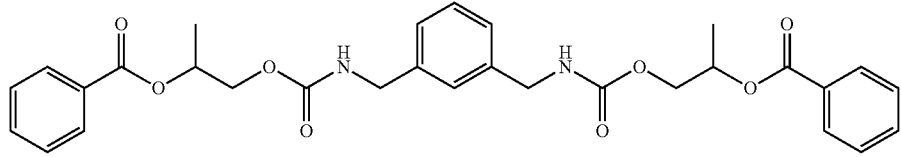
(3-10)
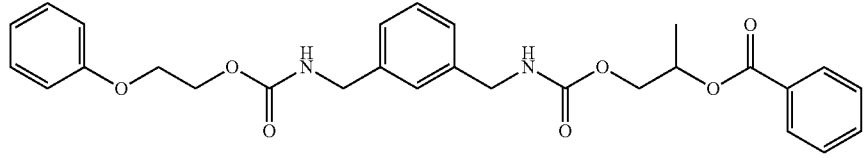
(3-11)
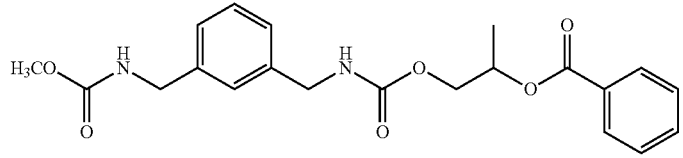
(3-12)
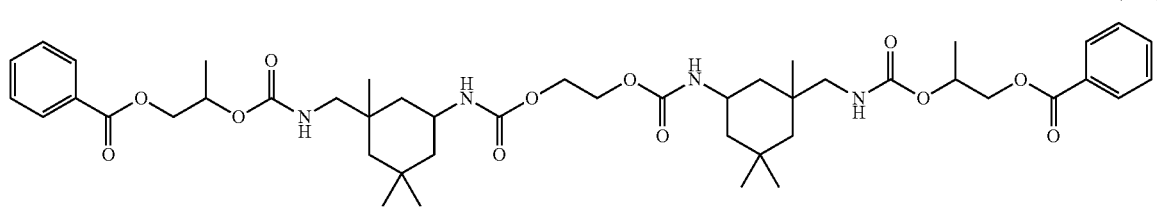
(3-13)

-continued
3-14
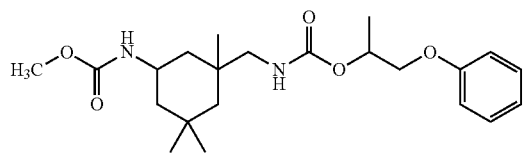
3-15
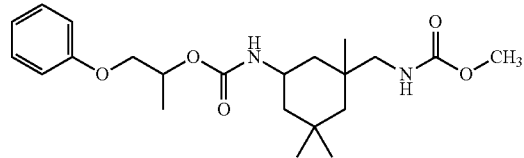
3-16
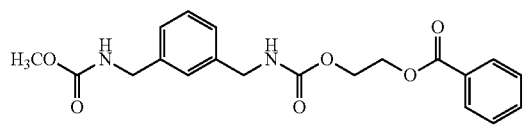
3-17
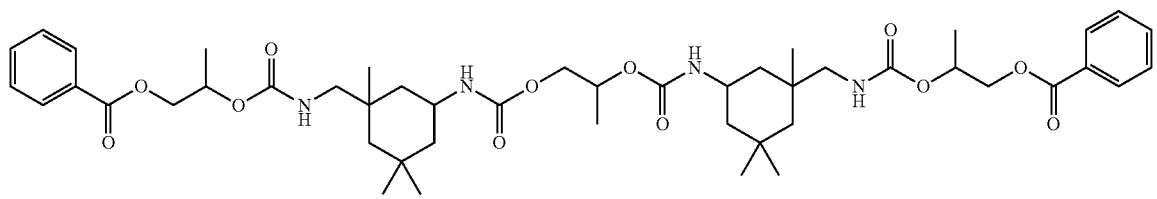
3-18
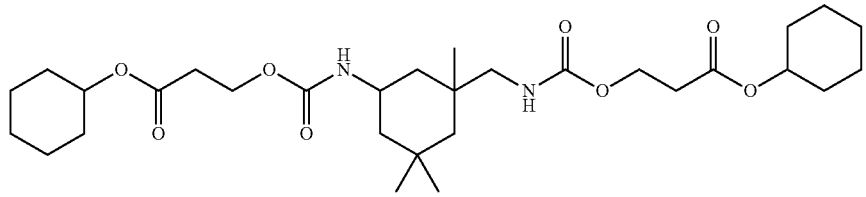
3-19
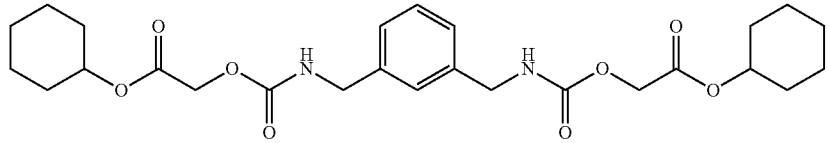
3-20
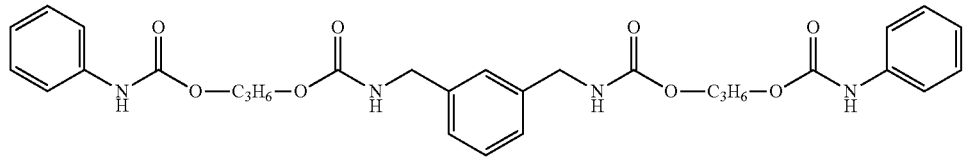
3-21
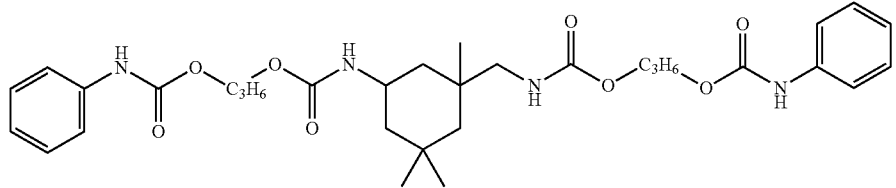
3-22
4-1
4-2
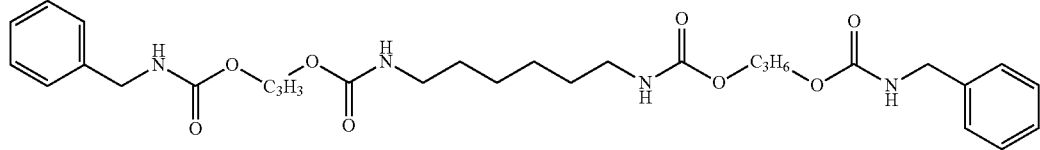

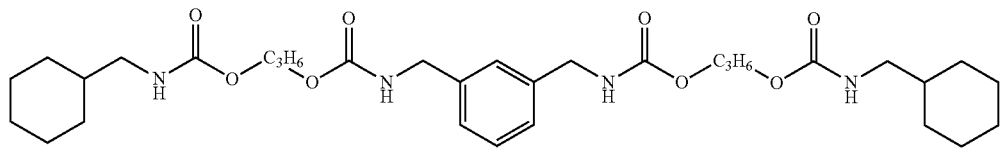
4-3
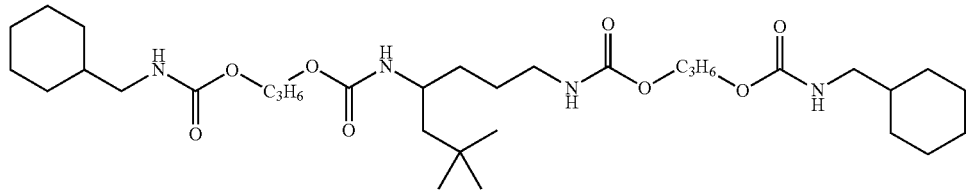
4-4
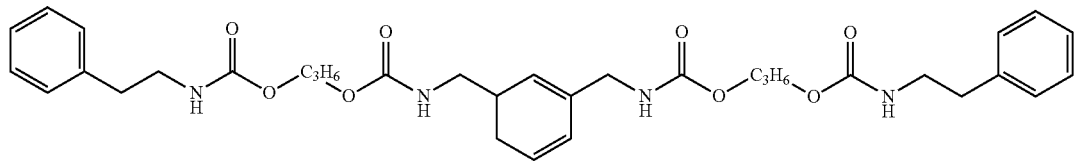
4-5
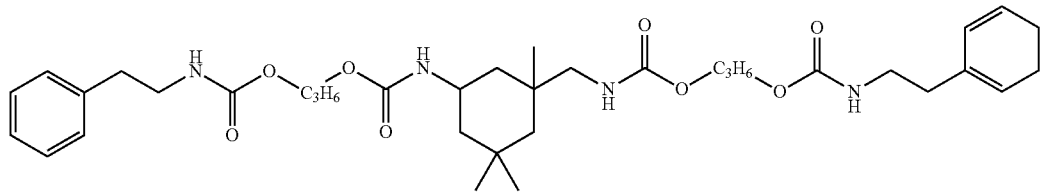
4-6
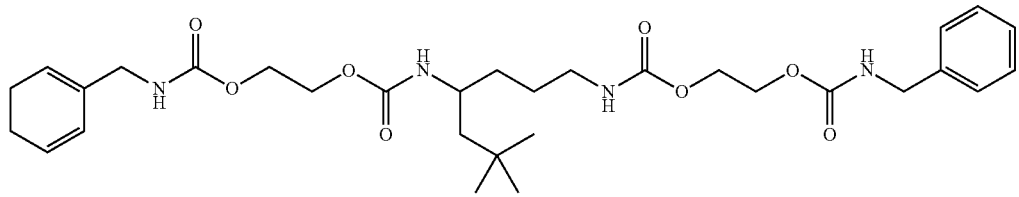
4-7
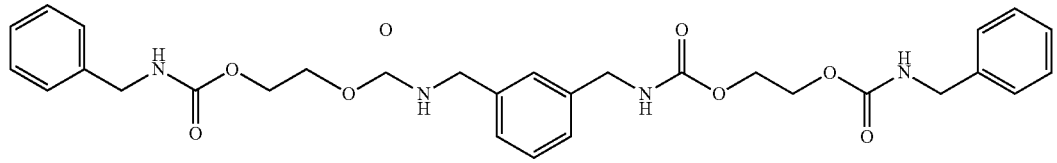
4-8
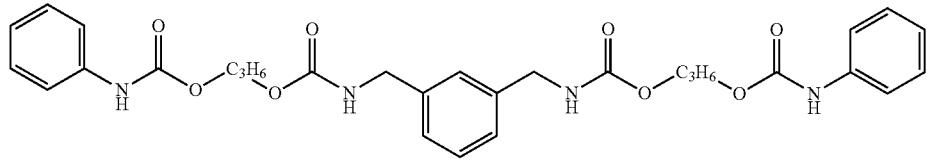
4-9
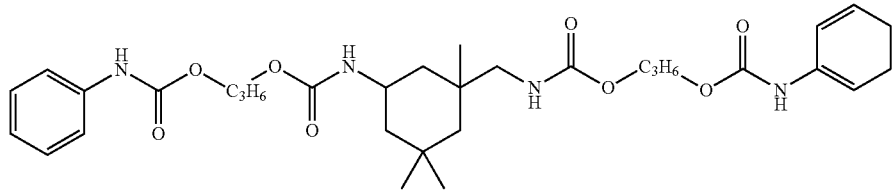
4-10

4-11
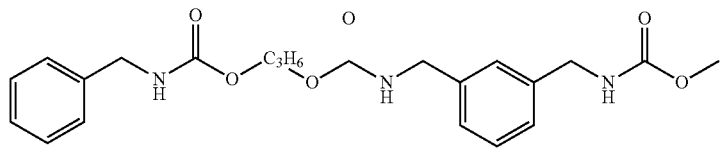
4-12
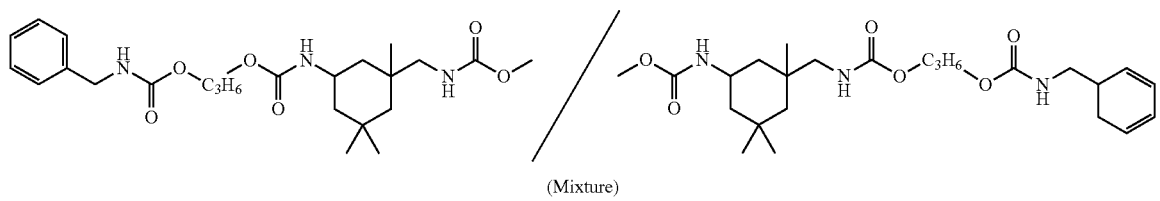
(Mixture)
4-13
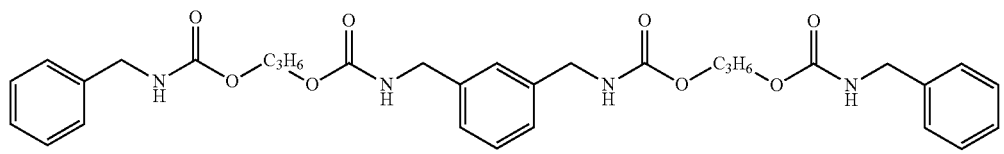
4-14
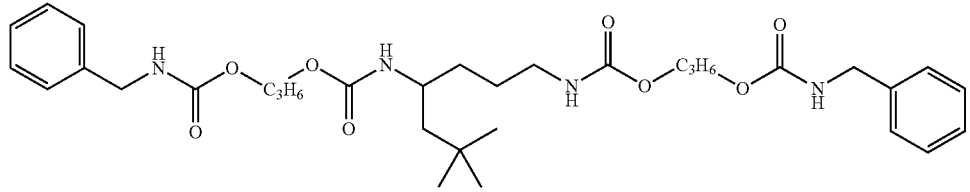
4-15
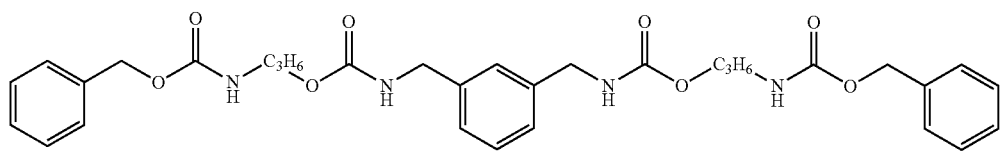
4-16
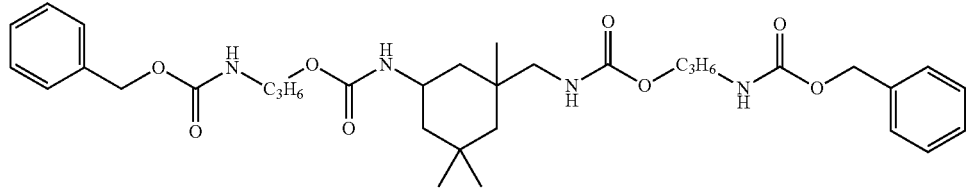
4-17
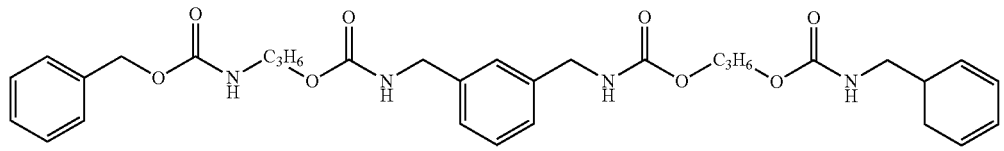
4-18
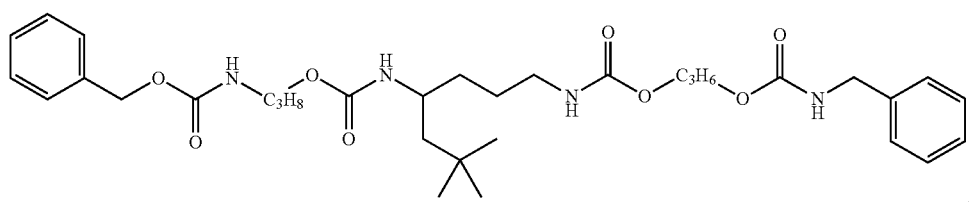

-continued
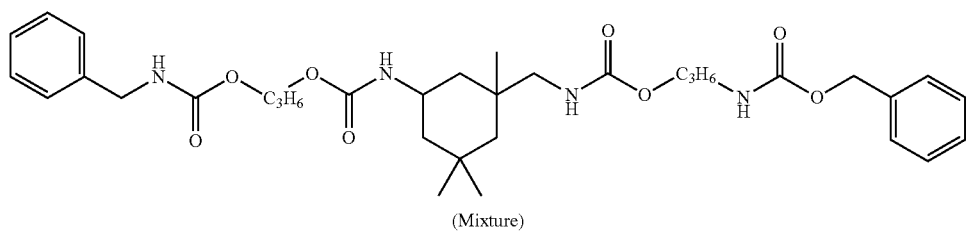
(Mixture)
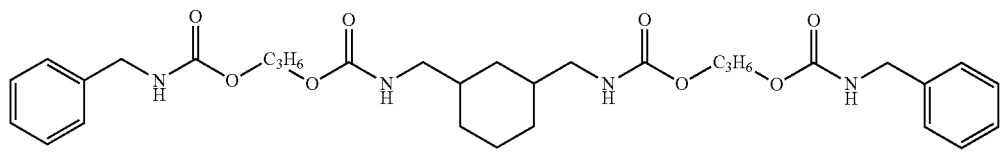
4-19
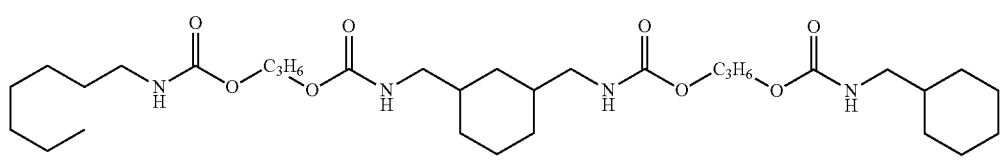
4-20
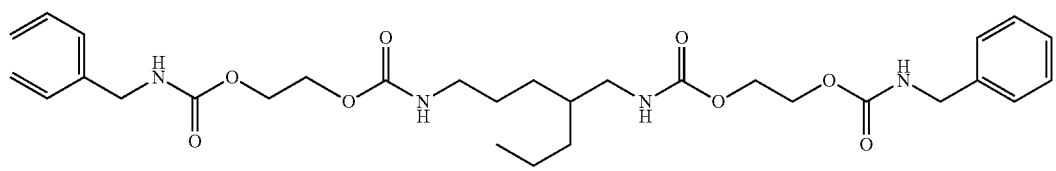
4-21
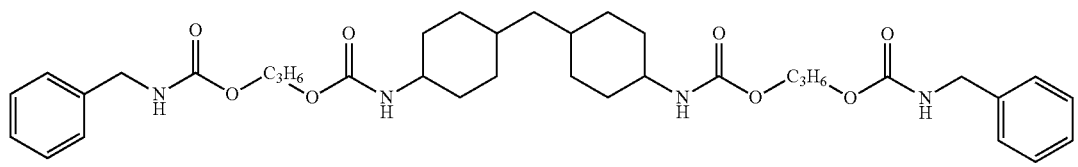
4-22
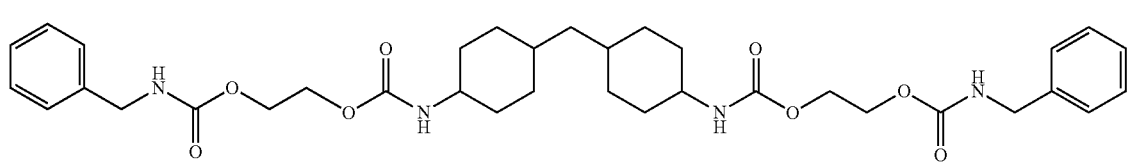
4-23
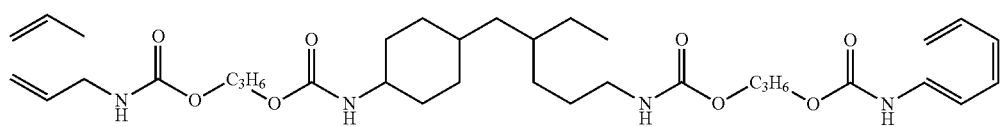
4-24
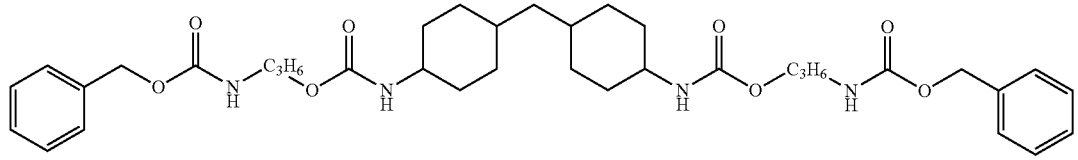
4-25
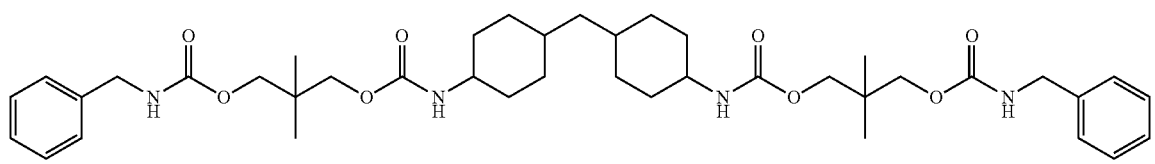
4-26

4-27
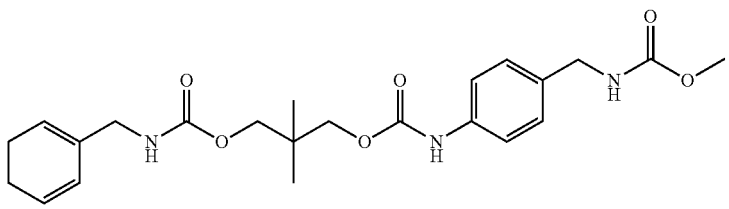
4-28
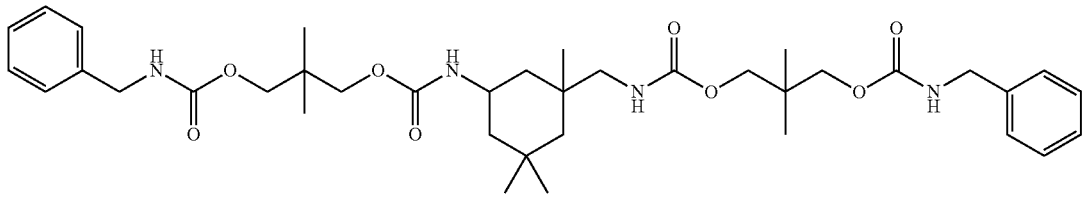
4-29
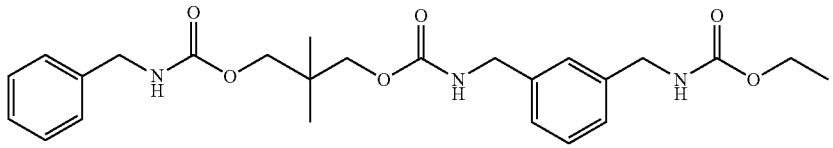
4-30
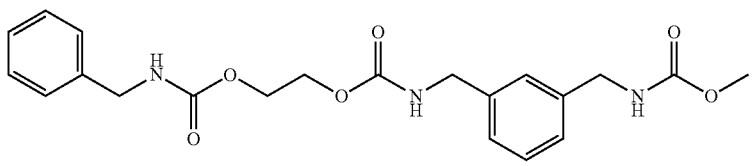
4-31
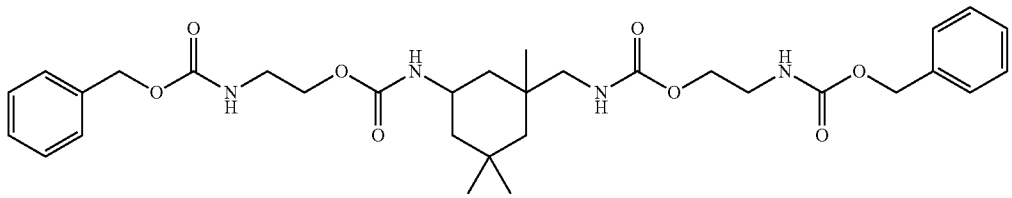
4-32
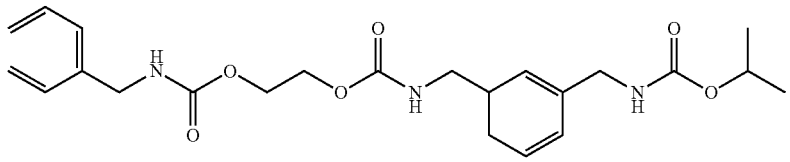
4-33
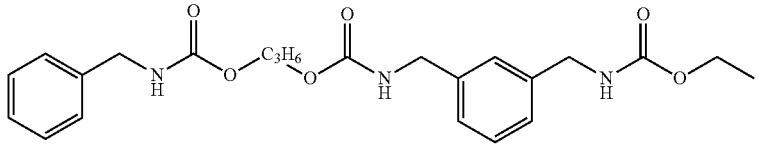
4-34
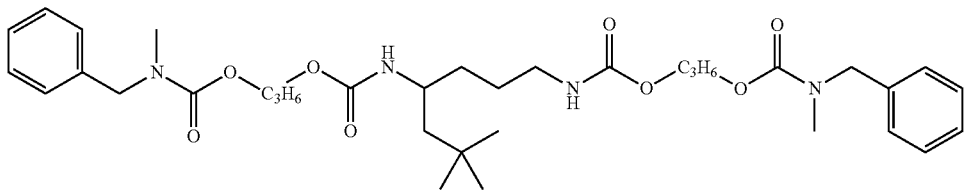

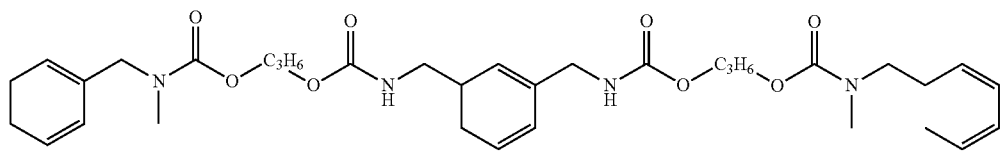
4-35
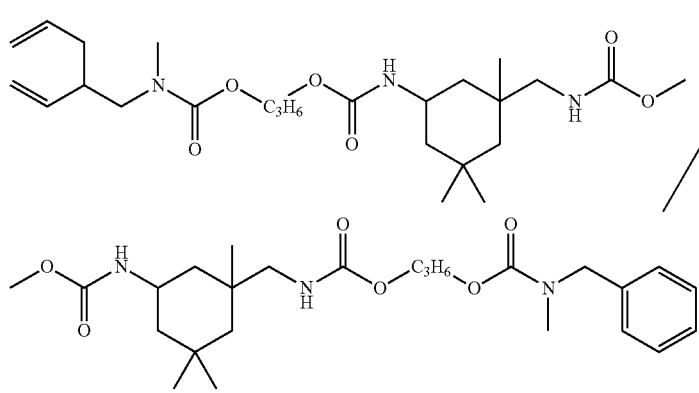
(Mixture)
4-36
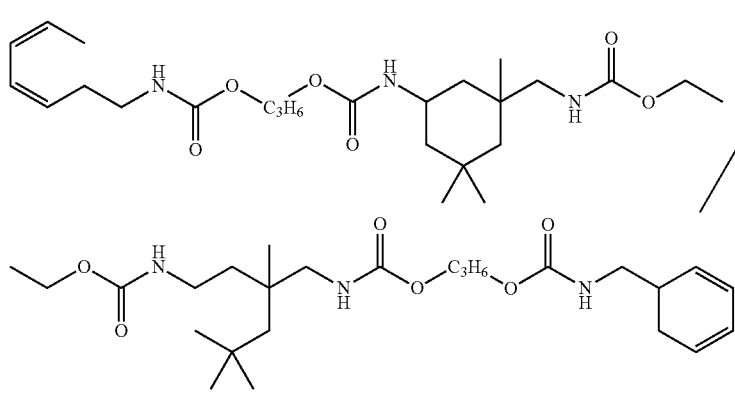
(Mixture)
4-37
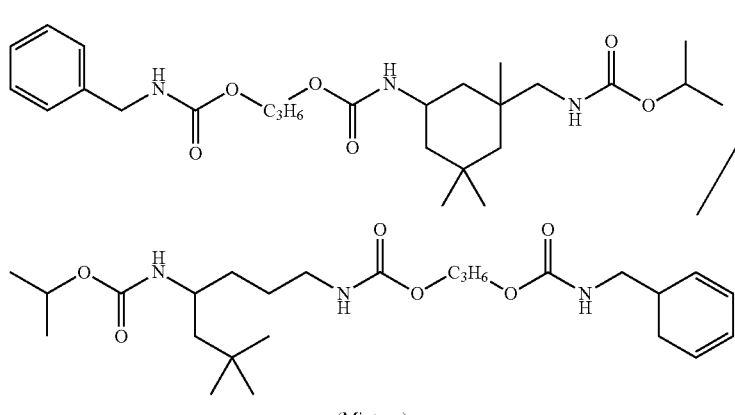
(Mixture)
4-38
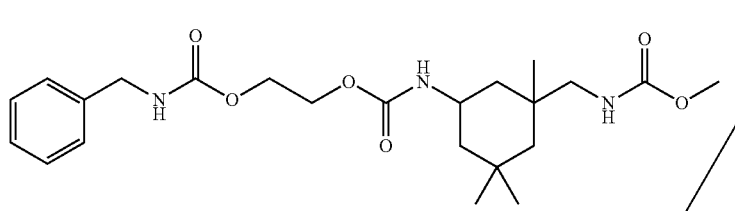
4-39

-continued

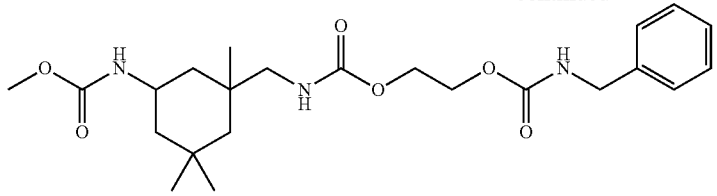

(Mixture)

4-40

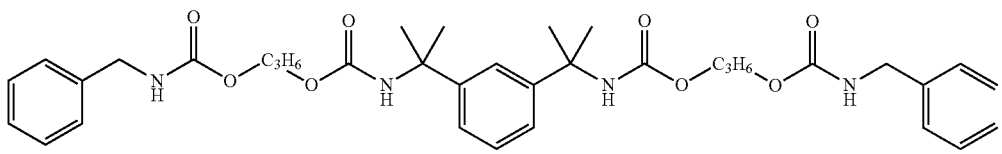

4-41

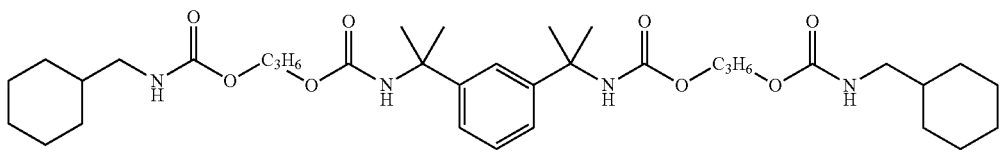

4-42

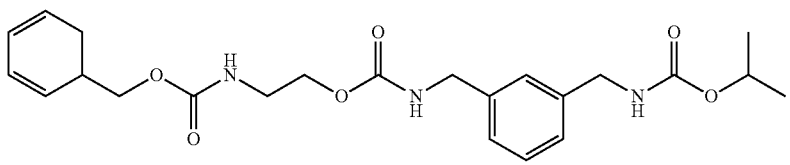

4-43

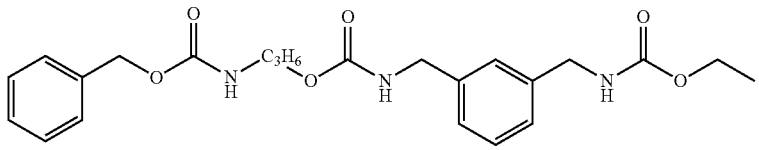

4-44

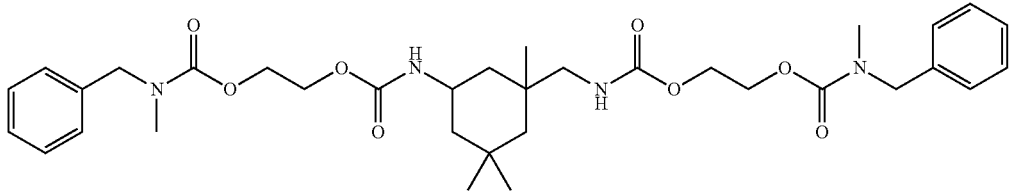

4-45

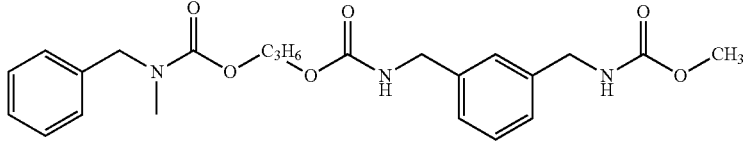

The compound denoted by General Formula (I) is able to be manufactured by a known method.

For example, the compound denoted by General Formula (I) is able to be obtained by an addition reaction of alcohol to alkyl or aryl isocyanate, a condensation reaction between amine and carbonate, and the like.

When the addition reaction of alcohol to alkyl or aryl isocyanate is performed, it is preferable that a catalyst is used, and a known urethanized catalyst of the related art such as amines, a metal organic acid salt or a metal chelate compound of zinc, tin, and the like, and an organic metal compound of zinc, tin, bismuth, and the like are able to be used as the catalyst. For example, dibutyl tin dilaurate, dibutyl tin diacetate, and the like are preferably used as the urethanized catalyst.

In order to synthesize the compound described above, both of a combination between polyvalent isocyanate (diisocyanate, triisocyanate, and the like) and monohydric alcohol and a combination between polyhydric alcohol and monovalent isocyanate are able to be preferably used.

Examples of a polyvalent isocyanate component include aliphatic diisocyanate such as ethylene diisocyanate, trimethylene diisocyanate, tetramethylene diisocyanate, hexamethylene diisocyanate, and isophorone diisocyanate, aromatic diisocyanate such as p-phenylene diisocyanate, tolylene diisocyanate, p-p'-diphenyl methane diisocyanate, and 1,5-naphthylene diisocyanate, m-xylylene diisocyanate, and the like, but are not limited thereto. Among them, the aliphatic diisocyanate, and the n-xylylene diisocyanate in which a conjugated system is cut are preferable from the viewpoint of suppressing photocoloration.

Examples of a monovalent isocyanate component include phenyl isocyanate, benzyl isocyanate, butyl isocyanate, and the like, but are not limited thereto.

Examples of the polyhydric alcohol are able to include ethylene glycol, diethylene glycol, triethylene glycol, tetraethylene glycol, 1,2-propanediol, 1,3-propanediol, dipropylene glycol, tripropylene glycol, 1,3-butanediol, 1,4-butanediol, 1,4-butanediol, 1,5-pentanediol, 1,6-hexanediol, trimethylol propane, trimethylol ethane, glycerin, and the like.

Examples of the monohydric alcohol include substitutional or non-substitutional alcohol. It is preferable to have an aromatic ring as an alcohol component, and examples of the alcohol component include benzyl alcohol, phenethyl alcohol, phenoxy ethanol, and the like.

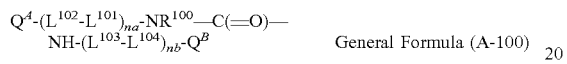

General Formula (A-100)

[In General Formula (A-100), $R^{100}$ represents a hydrogen atom or a substituent; $L^{101}$ and $L^{103}$ each independently represent an alkylene group, and the alkylene group may have a substituent. $L^{102}$ and $L^{104}$ each independently represent a single bond, any one of —O—, —$NR^{100a}$—, —S—, and —C(=O)—, or a group formed of a combination thereof. $R^{100a}$ represents a hydrogen atom or a substituent. na and nb each independently represent an integer of 0 to 20, and in a case where a plurality of $L^{101}$'s, $L^{102}$'s, $L^{103}$'s, and $L^{104}$'s exist, the plurality of $L^{101}$'s, $L^{102}$'s, $L^{103}$'s, and $L^{104}$'s may be identical to each other or different from each other. $Q^A$ and $Q^B$ each independently represent a substituent, and at least one of $Q^A$ or $Q^B$ has a cyclic structure. In a case where na represents zero, and $Q^A$ has a cyclic structure, the cyclic structure included in $Q^A$ may be a cyclic structure formed along with $R^{100}$ of —$NR^{100}$—.]

An alkylene group having 1 to 20 carbon atoms is preferable as the alkylene group represented by $L^{101}$ and $L^{103}$, an alkylene group having 1 to 12 carbon atoms is more preferable, an alkylene group having 1 to 8 carbon atoms is even more preferable, an alkylene group having 1 to 3 carbon atoms is particularly preferable, and a methylene group, an ethylene group, or a propylene group is most preferable. The alkylene group may be a straight chain alkylene group, a branched alkylene group, or a cyclic alkylene group, and the straight chain alkylene group and the branched alkylene group are preferable. Specific examples of the alkylene group include a methylene group, an ethylene group, a propylene group, a butylene group, a pentylene group, a hexylene group, and the like. The alkylene group may have a substituent. Examples of the substituent that the alkylene group may have include the group T of the substituents described below. Among them, an alkyl group, an acyl group, an aryl group, an alkoxy group, and a carbonyl group are preferable as the substituent that the alkylene group may have.

$L^{102}$ and $L^{104}$ each independently represent a single bond, any one of —O—, —$NR^{100a}$—, —S—, and —C(=O)—, or a group formed of a combination thereof and among them, the single bond or an oxygen atom are preferable. $R^{100a}$ represents a hydrogen atom or a substituent, and examples of the substituent include an alkyl group, an alkenyl group, an aryl group, and an acyl group, and among them, the hydrogen atom, an alkyl group having 1 to 8 carbon atoms, an alkenyl group having 2 to 8 carbon atoms, an alkynyl group having 2 to 8 carbon atoms, or an aryl group having 6 to 18 carbon atoms (for example, a group having a benzene ring and a naphthalene ring) is preferable, and the hydrogen atom or an alkyl group having 1 to 4 carbon atoms is more preferable.

In one embodiment, it is preferable that $L^{102}$ and $L^{104}$ are a single bond, —O—*, —OC(=O)—*, and —C(=O)O—*. Here, * represents a bonding position with respect to $Q^A$ or $Q^B$ or a bonding position with respect to the adjacent group on the $Q^A$ side or the $Q^B$ side.

On the other hand, a structure denoted by General Formula (2F) described below is exemplified as a specific example of a linking group denoted by ($L^{102}$-$L^{101}$) or ($L^{103}$-$L^{104}$) in addition to the structures denoted by General Formulas (2A) to (2E) described below.

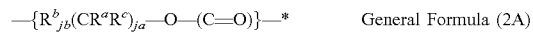 General Formula (2A)

 General Formula (2B)

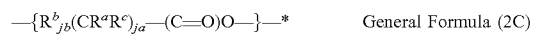 General Formula (2C)

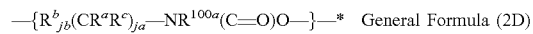 General Formula (2D)

 General Formula (2E)

 General Formula (2F)

(In General Formulas (2A) to (2F), * represents a bonding position with respect to $Q^A$ or $Q^B$ or a bonding position with respect to the adjacent group on the $Q^A$ side or the $Q^B$ side, $R^a$ and $R^c$ each independently represent a hydrogen atom or an alkyl group having 1 to 3 carbon atoms (for example, an alkyl group having 1 to 3 carbon atoms, and preferably, a methyl group), and ja represents an integer of greater than or equal to 1, and is preferably an integer in a range of 1 to 3. In a case where a plurality of $R^a$'s and $R^c$'s exist, the plurality of $R^a$'s and $R^c$'s may be identical to each other, or may be different from each other. $R^b$ represents a cycloalkylene group which may be substituted with one or more alkyl groups having 1 to 3 carbon atoms, and jb is 0 or 1. $R^{100a}$ represents a hydrogen atom or an alkyl group having 1 to 4 carbon atoms, and in a case where a plurality of $R^{100a}$'s exist, the plurality of $R^{100a}$'s may be identical to each other, or may be different from each other.)

The details of General Formulas (2A) to (2E) are as described above with respect to General Formula (I). Here, the substituent represented by $R^1$ in General Formulas (2D) and (2E) with respect to General Formula (I) is represented by $R^{100a}$ in General Formulas (2D) and (2E) with respect to General Formula (A-100).

Specific examples of a linking group denoted by General Formula (2F) include:

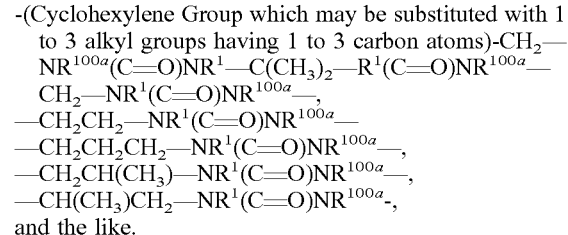

and the like.

Examples of a preferred embodiment of the linking groups denoted by ($L^{102}$-$L^{101}$) and ($L^{103}$-$L^{104}$) include an alkylene group or a group denoted by any one of General Formulas (2A) to (2E). In one embodiment, examples of a more preferred embodiment include an alkylene group or a group denoted by General Formula (2A) or (2B). In another embodiment, examples of more preferred embodiment include groups denoted by General Formulas (2D) to (2F). Furthermore, ($L^{102}$-$L^{101}$) and ($L^{103}$-$L^{104}$) being an alkylene group indicates that $L^{102}$ and $L^{104}$ represent a single bond, and $L^{101}$ and $L^{103}$ represent an alkylene group.

$Q^A$ and $Q^B$ each independently represent a substituent, and at least one of $Q^A$ or $Q^B$ has a cyclic structure.

Examples of the substituent include the group T of the substituents described above, and include an aryl group having 6 to 30 carbon atoms (more preferably 6 to 20 carbon atoms, and even more preferably 6 to 10 carbon atoms), an alkyl group having 1 to 12 carbon atoms (more preferably 1 to 10 carbon atoms, and even more preferably 1 to 6 carbon atom s) (here, an oxygen atom may be contained in an alkyl chain, or the alkyl group may be a cycloalkyl group), an alkenyl group having 2 to 12 carbon atoms (more preferably 2 to 10 carbon atoms, and even more preferably 2 to 5 carbon atoms), an alkoxy group having 1 to 12 carbon atoms (more preferably 1 to 10 carbon atoms, and even more preferably 1 to 5 carbon atoms), or a heterocyclic group having 1 to 30 carbon atoms (more preferably 1 to 12 carbon atoms, and even more preferably 1 to 5 carbon atoms) (examples of a hetero atom include a nitrogen atom, an oxygen atom, and a sulfur atom, and specifically, examples of the heterocyclic group include a piperidyl group and a morpholino group). It is particularly preferable that one or both of $Q^A$ and $Q^B$ represent an aryl group having 6 to 10 carbon atoms and an alkyl group having 1 to 10 carbon atoms. $Q^A$ and $Q^B$ may further have a substituent, and specific examples of the substituent include the group T of the substituents described above, and an aryl group, an alkyl group, and an acyl group are preferable.

Examples of the cyclic structure included in one or both of $Q^A$ and $Q^B$ include an aliphatic ring (a cyclohexane ring, and the like), an aromatic ring (a benzene ring, a naphthalene ring, and the like), a hetero ring (a piperidine ring, a morpholine ring, and the like), and the like, and the cyclic structure may be a plurality of types of rings, or may be a fused ring. In one embodiment, it is preferable that the cyclic structure described above is not a cyclic imido group. In addition, in another embodiment, it is preferable that at least one of $Q^A$ or $Q^B$, and desirably both of $Q^A$ and $Q^B$ are not a polar group. Here, the polar group indicates a substituent having a C log P value of less than or equal to 0.85. The C log P value will be described below. Herein, the C log P value of $Q^A$ and $Q^B$ is obtained as the C log P value of compounds $Q^A$-H and $Q^B$-H in which a substituent is linked to hydrogen. In a compound having a structure which does not actually exist, the c log P value is able to be obtained as a value estimated by a calculating chemical method or an empirical method. Specific examples of the substituent having a C log P value of less than or equal to 0.85 include a cyano group and an imido group.

The cyclic structure included in one or both of $Q^A$ and $Q^B$ is preferably an aliphatic carbon ring, an aromatic carbon ring, and a hetero ring (more preferably a 6-membered nitrogen-containing hetero ring), and is more preferably a cyclohexane ring, a benzene ring, and a morpholine ring. Furthermore, in General Formula (A-100), in a case where na represents zero, and $Q^A$ has a cyclic structure, the cyclic structure included in $Q^A$ may be a cyclic structure (a nitrogen-containing hetero ring) formed along with R of —NR—. A 6-membered nitrogen-containing hetero ring is preferable as the cyclic structure formed as described above, and a morpholine ring is more preferable. The nitrogen-containing hetero ring described above may have a substituent, or may be a non-substitutional nitrogen-containing hetero ring. The non-substitutional nitrogen-containing hetero ring is preferable. Examples of the substituent which is substituted for the nitrogen-containing hetero ring include the substituents exemplified in the group T of the substituents described above. A compound denoted by General Formula (A-100) preferably has two to four cyclic structures in one molecule, and more preferably has two or three cyclic structures in one molecule, from the viewpoint of improving the surface hardness of the cellulose acylate film.

As described above, in General Formula (A-100), in a case where na represents zero, and $Q^A$ has a cyclic structure, the cyclic structure included in $Q^A$ is able to be a cyclic structure formed along with $R^{100}$ of —$NR^{100}$—. An embodiment which is the compound denoted by General Formula (A-100) and has the cyclic structure described above is denoted by General Formula (A-100-1) described below.

General Formula (A-100-1)

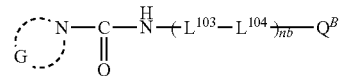

(In General Formula (A-100-1). G represents an atom group forming a cyclic structure along with a linking nitrogen atom, and $L^{103}$, $L^{104}$, nb, and $Q^B$ are each identical to $L^{103}$, $L^{104}$, nb, and $Q^B$ in General Formula (A-100).)

A cyclic structure (a nitrogen-containing hetero ring) formed by G is a substitutional or non-substitutional nitrogen-containing hetero ring, is preferably a substitutional or non-substitutional 6-membered nitrogen-containing hetero ring, and is more preferably a substitutional or non-substitutional morpholino group. As described above, it is preferable that the nitrogen-containing hetero ring described above is a non-substitutional nitrogen-containing hetero ring. An embodiment which is the compound denoted by General Formula (A-100) and has the non-substitutional morpholino group is denoted by General Formula (A-100-2) described below.

General Formula (A-100-2)

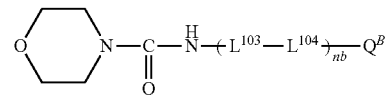

(In General Formula (A-100-2), $L^{103}$, $L^{104}$, nb, and $Q^B$ are each identical to $L^{103}$, $L^{104}$, nb, and $Q^B$ in General Formula (A-100).)

Alternatively, it is preferable that $Q^A$ is a monovalent substituent denoted by General Formula (a) described below, or a substituent in which one or more monovalent substituents are bonded to $L^{102}$ through a linking group.

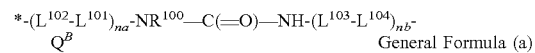

General Formula (a)

Alternatively, it is also preferable that $Q^B$ is a monovalent substituent denoted by General Formula (b) described below, or a substituent in which one or more monovalent substituents are bonded to $L^{104}$ through a linking group.

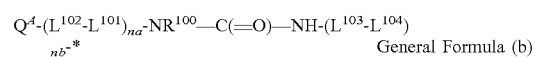

General Formula (b)

That is, it is preferable that the compound denoted by General Formula (A-100) has two or more structures denoted by $(L^{102}$-$L^{101})_{na}$-$NR^{100}$—C(=O)—NH-$(L^{103}$-$L^{104})_{nb}$- in one molecule. Furthermore, in General Formulas (a) and (b) described above, $L^{101}$ to $L^{104}$, na, nb, and $Q^A$ and $Q^B$ are identical to $L^{101}$ to $L^{104}$, na, nb, and $Q^A$ and $Q^B$ in General Formula (A-100). A specific embodiment of the compound according to the preferred embodiment described above will be described below. Examples of the linking group described above are able to include the linking groups described with respect to $Z^{101}$ in General Formula (A-101).

The compound denoted by General Formula (A-100) may have one or more divalent linking groups denoted by —NR$^{100}$—C(=O)—NH—, and is able to have two or more divalent linking groups denoted by —NR$^{100}$—C(=O)—NH—. Here, R$^{100}$ represents a hydrogen atom or a substituent. The substituent represented by R$^{100}$ is able to include the substituents described above as the group T of the substituents. The substituent is preferably an alkyl group, is more preferably an alkyl group having 1 to 3 carbon atoms, and is even more preferably a methyl group. The alkyl group described above may have a substituent, and examples of a preferred substituent are able to include an aryl group, for example, a phenyl group.

In the compound denoted by General Formula (A-100), it is preferable that the number of divalent linking groups denoted by —NH—(C=O)—NH— in one molecule is 0 or 1 from the viewpoint of compatibility with cellulose ester.

In addition, the compound denoted by General Formula (A-100) is also able to have a divalent linking group denoted by —NH—C(=O)—O— along with the divalent linking group described above. A divalent linking group denoted by —NR$^{100}$—C(=O)—O— and a divalent linking group denoted by —NH—C(=O)—O— are a group which is able to mutually interact with cellulose acylate. The present inventors have considered that the compound described above in which the linking group mutually interacts with an ester bond of cellulose ester, or a local portion or a molecular chain of a hydroxyl group or the like, and thus, a free volume decreases contributes to the improvement in the scratch resistance of the cellulose ester film, and in particular, the improvement in the knoop hardness.

In one preferred embodiment, the compound denoted by General Formula (A-100) has two or more divalent linking groups denoted by —NH—(C=O)—NR$^{100}$— in one molecule, and more preferably has two divalent linking groups denoted by —NH—(C=O)—NR$^{100}$— in one molecule. In addition, in another preferred embodiment, the compound denoted by General Formula (A-100) has two to four divalent linking groups denoted by —NH—(C=O)—NR$^{100}$— in one molecule. In addition, in another preferred embodiment, the compound denoted by General Formula (A-100) has one or more divalent linking groups denoted by —NH—(C=O)—NR$^{100}$— and one or more divalent linking groups denoted by —NH—C(=O)—O— in one molecule, and preferably has one divalent linking group denoted by —NH—(C=O)—NR$^{100}$— and one divalent linking group denoted by —NH—C(=O)—O— in one molecule.

In another preferred embodiment, in the compound denoted by General Formula (A-100), the divalent linking group denoted by —NH—(C=O)—NR$^{100}$— is not directly bonded to an aromatic ring by a nitrogen atom. In addition, in another preferred embodiment, in the compound denoted by General Formula (A-100), the divalent linking group denoted by —NH—C(=O)—O— is not directly bonded to an aromatic ring by a nitrogen atom or an oxygen atom. According to the preferred embodiments described above, it is possible to more effectively suppress photocoloration properties. In addition, it is more preferable that two or more divalent linking groups described above are not directly bonded to the same aromatic ring. That is, it is preferable that the compound denoted by General Formula (A-100) does not have a structure denoted by Aromatic Ring-NH—(C=O)—NR$^{100}$—, —NH—(C=O)—NR$^{100}$-Aromatic Ring, Aromatic Ring-NH—C(=O)—O—, and —NH—C(=O)—O-Aromatic Ring.

na and nb each independently represent an integer of 0 to 20. Both of na and nb may be zero, or any one of na and nb may be an integer of greater than or equal to 1. na and nb are preferably an integer of 0 to 10, are more preferably an integer of 0 to 5, and are even more preferably an integer of 0 to 3.

It is preferable that the compound denoted by General Formula (A-100) is a compound denoted by General Formula (A-101) described below.

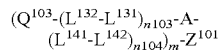    General Formula (A-101)

(In General Formula (A-101), $L^{131}$ and $L^{141}$ each independently represent an alkylene group, and the alkylene group may have a substituent. $L^{132}$ and $L^{142}$ each independently represent a single bond, any one of —O—, —NR$^{100a}$—, —S—, and —C(=O)—, or a group formed of a combination thereof. R$^{100a}$ represents a hydrogen atom or a substituent. n103 and n104 each independently represent an integer of 0 to 20, and in a case where a plurality of $L^{131}$'s, $L^{132}$'s, $L^{141}$'s, and $L^{142}$'s exist, the plurality of $L^{131}$'s, $L^{132}$'s, $L^{141}$'s, and $L^{142}$'s may be identical to each other or different from each other. $Q^{103}$ represents a substituent, $Z^{101}$ represents an m-valent linking group, A represents *—NR$^{100}$—C(=O)—NH—, *—NH—C(=O)—NR$^{100}$—, *—O—C(=O)—NH—, or *—NH—C(=O)—O—, R$^{100}$ represents a hydrogen atom or a substituent, and * represents a bonding position with respect to $L^{141}$ or $Z^{101}$. m represents an integer of 2 to 6, and a plurality of $Q^{103}$'s and A's may be identical to each other or different from each other. Here, at least one A represents *—NR$^{100}$—C(=O)—NH— or *—NH—C(=O)—NR$^{100}$—. In addition, at least one of $Q^{103}$ or $Z^{101}$ has a cyclic structure. In a case where at least one n103 represents zero, $Q^{103}$ has a cyclic structure, and A represents *—NH—C(=O)—NR$^{100}$—, the cyclic structure included in $Q^{103}$ may be a cyclic structure formed along with R$^{100}$ of —NR$^{100}$ included in A. Here, the number of divalent linking groups denoted by —NH—(C=O)—NH— in one molecule is 0 or 1.)

$L^{131}$ and $L^{141}$ are each independently identical to $L^{101}$ and $L^{103}$ in General Formula (A-100). It is preferable that at least one of $L^{131}$ or $L^{141}$ is the same alkylene group as that of $L^{101}$ and $L^{103}$ in General Formula (A-100), and it is more preferable that both of $L^{131}$ and $L^{141}$ are the same alkylene group as that of $L^{101}$ and $L^{103}$ in General Formula (A-100).

$L^{132}$ and $L^{142}$ are each independently identical to $L^{102}$ and $L^{104}$ in General Formula (A-100), and preferred ranges thereof are also identical to those of $L^{102}$ and $L^{104}$ in General Formula (A-100).

In particular, it is preferable that a linking group denoted by ($L^{141}$-$L^{142}$) is a single bond or an alkylene group, and it is preferable that the linking group denoted by ($L^{32}$-$L^{31}$) is a single bond, an alkylene group, or a group denoted by any one of General Formulas (2A) to (2F) described below. The details of General Formulas (2A) to (2F) are as described above.

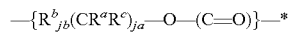    General Formula (2A)

    General Formula (2B)

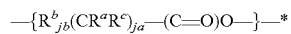    General Formula (2C)

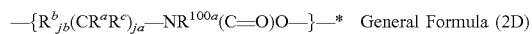    General Formula (2D)

—{R$^b_{jb}$(CR$^a$R$^c$)$_{ja}$—O—(C=O)NR$^{100a}$}—* General Formula (2E)

—{R$^b_{jb}$(CR$^a$R$^c$)$_{ja}$—NR$^{100a}$
(C=O)NR$^{100a}$}—* General Formula (2F)

(In General Formulas (2A) to (2F), * represents a bonding position with respect to Q$^{103}$ or a bonding position with respect to the adjacent group on the Q$^{103}$ side, and R$^a$, R$^c$, R$^b$, ja, and jb are as described above.

n103 and n104 are identical to na and nb in General Formula (A-100), and preferred ranges thereof are also identical to those of na and nb in General Formula (A-100).

m represents an integer of 2 to 6, and is preferably an integer of 2 to 3.

Q$^{103}$ represents a substituent, and is preferably a straight chain alkyl group having 1 to 30 carbon atoms or a branched alkyl group having 1 to 30 carbon atoms, and a cyclic group having 6 to 30 carbon atoms. Q$^{103}$ may further have a substituent, and specific examples of the substituent include the group T of the substituents described above, and an aryl group, an alkyl group, an acyl group, and an alkoxy group are preferable. However, it is preferable that Q$^{103}$ does not have a substituent.

The cyclic group included in Q$^{103}$ may be a fused ring, and it is preferable that the cyclic group included in Q$^{103}$ is a monocyclic ring. Specifically, examples of the cyclic group included in Q$^{103}$ include an aliphatic ring (a cyclohexane ring, and the like), an aromatic ring (a benzene ring, a naphthalene ring, and the like), a hetero ring (a morpholine ring, a piperidine ring, a piperazine ring, a pyridine ring, a pyrimidine ring, a triazine ring, a furan ring, and the like), and the like.

In General Formula (A-101), m is an integer in a range of 2 to 6, and thus, the compound denoted by General Formula (A-101) has a plurality of (m) Q$^{103}$'s. T plurality of Q$^{103}$'s may be identical to or different from each other. All of the plurality of Q$^{103}$'s may be a cyclic structure, or may be a combination between a cyclic structure and a non-cyclic structure such as an alkyl group. It is preferable that the cyclic structure includes an aliphatic ring group, an aromatic group, or a 6-membered nitrogen-containing hetero ring. A cycloalkyl group having 6 to 30 carbon atoms (more preferably 6 to 20 carbon atoms, and even more preferably 6 to 10 carbon atoms), an aryl group having 6 to 30 carbon atoms (more preferably 6 to 20 carbon atoms, and even more preferably 6 to 10 carbon atoms), or a 6-membered nitrogen-containing heterocyclic group is preferable as the cyclic group represented by Q$^{103}$, and a cyclohexyl group, a phenyl group, or a morpholino group is more preferable.

On the other hand, the non-cyclic structure is preferably a straight chain alkyl group having 1 to 30 carbon atoms or a branched alkyl group having 1 to 30 carbon atoms, more preferably an alkyl group having 1 to 3 carbon atoms, and is even more preferably a methyl group or an ethyl group.

At least one of Q$^{103}$ or Z$^{101}$ has one or more cyclic structures, and it is more preferable that all of one or more of the plurality of Q$^{103}$'s and Z$^{101}$ have a cyclic structure. In addition, the total number of cyclic structures included Q$^{103}$ and Z$^{101}$ is preferably 2 to 4, and is more preferably 2 or 3.

A represents *—NR$^{100}$—C(=O)—NH—, *—NH—C(=O)—NR$^{100}$—, *—O—C(=O)—NH—, or *—NH—C(=O)—O—, and * represents a bonding position with respect to L$^{141}$ or Z$^{101}$. As described above, m represents an integer of 2 to 6, and thus, a plurality of (in) A's exist in the compound denoted by General Formula (A-101). The plurality of A's may be identical to each other or different from each other. Here, at least one A represents *—NR$^{100}$—C(=O)—NH— or *—NH—C(=O)—NR$^{100}$—. The details of R$^{100}$ are as described above.

Z$^{101}$ represents an m-valent linking group. m is an integer in a range of 2 to 6, and thus, Z$^{101}$ is divalent to hexavalent linking groups. Z$^{101}$ is preferably divalent to trivalent linking groups, and is more preferably a divalent linking group. A group having at least one of a straight chain aliphatic group, a branched aliphatic group, a cyclic aliphatic group, or an aromatic group is preferable as Z$^{101}$, and a group having at least one of a branched aliphatic group, a cyclic aliphatic group, or an aromatic group is more preferable.

Z$^{101}$ may be formed of at least one of a straight chain aliphatic group, a branched aliphatic group, a cyclic aliphatic group, or an aromatic group, and it is preferable that Z$^{101}$ is a combination between the groups described above and an oxygen atom, and straight chain alkylene group or a branched alkylene group. It is preferable that the aliphatic group included as Z$^{101}$ is a saturated aliphatic group.

According to the group having at least one of the branched aliphatic group, the cyclic aliphatic group, or the aromatic group, a rigid structure is obtained, and the scratch resistance of the film tends to be improved. The number of carbon atoms configuring Z$^{101}$ is preferably 3 to 20, and is more preferably 4 to 15.

Z$^{101}$ may have a substituent, and specific examples of the substituent include the group T of the substituents described above, but it is preferable that Z$^{101}$ does not have a substituent.

Specifically, linking groups exemplified below are preferable. Furthermore, * represents a bonding position with respect to L$^{142}$ (in a case where L$^{141}$ does not exist, a direct bonding position with respect to A).

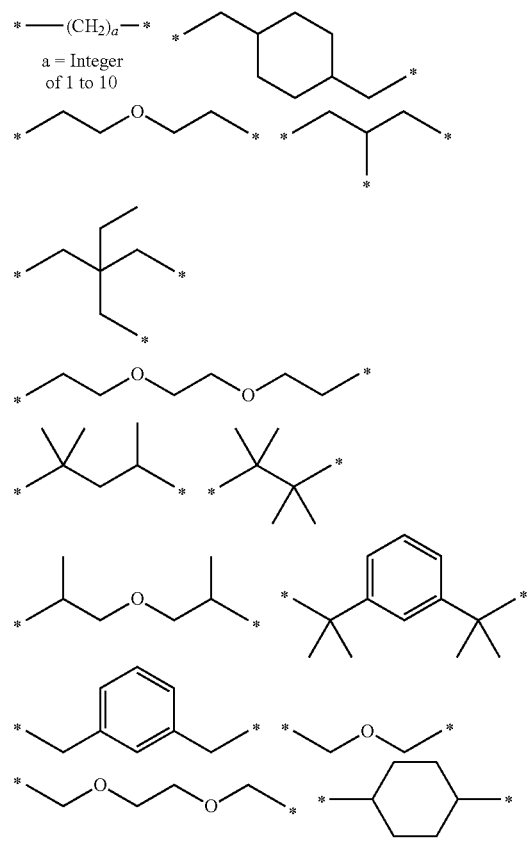

*—(CH$_2$)$_a$—* a = Integer of 1 to 10

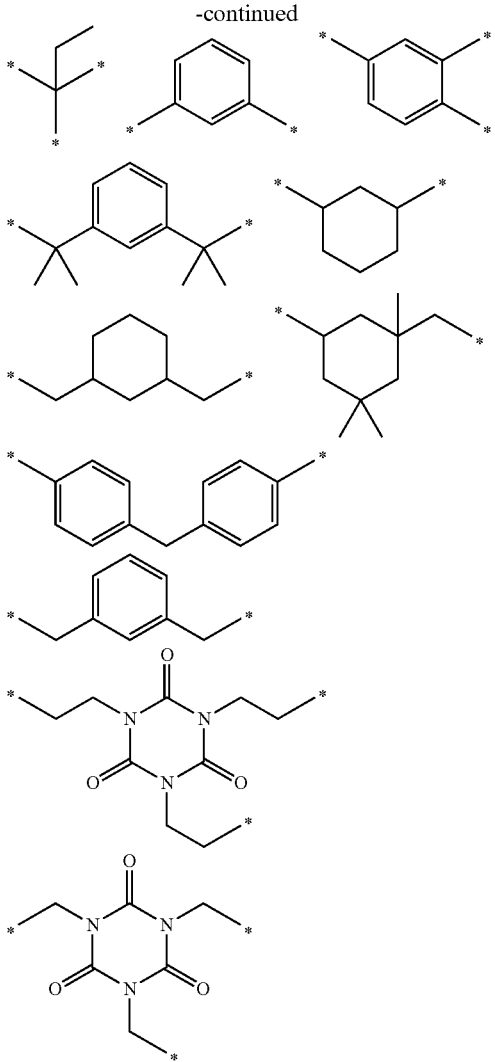

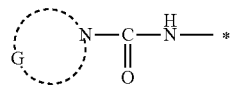

In the above description. G represents an atom group forming a cyclic structure (a nitrogen-containing hetero ring) along with a linking nitrogen atom, and * represents a bonding position with respect to other structures configuring the compound denoted by General Formula (A-101). The nitrogen-containing hetero ring formed by G is a substitutional or non-substitutional nitrogen-containing hetero ring, is preferably a substitutional or non-substitutional 6-membered nitrogen-containing hetero ring, and is more preferably a substitutional or non-substitutional morpholino group. It is preferable that the nitrogen-containing hetero ring described above is a non-substitutional nitrogen-containing hetero ring. An embodiment which is the compound denoted by General Formula (A-101) and has a non-substitutional morpholino group is able to have a partial structure described below. In the partial structure described below, * represents a bonding position with respect to other structures configuring the compound denoted by General Formula (A-101).

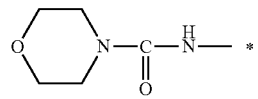

It is preferable that the compound denoted by General Formula (A-101) is a compound denoted by General Formula (A-102) described below.

General Formula (A-102)

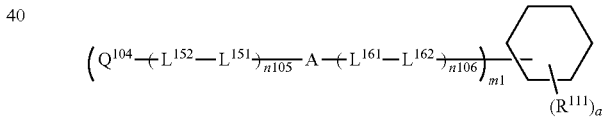

It is preferable that the compound denoted by General Formula (A-101) has a cyclic structure selected from the group consisting of an aliphatic carbon ring, an aromatic carbon ring, and a hetero ring. In addition, in the compound denoted by General Formula (A-101), it is preferable that all of $Q^{103}$'s have a cyclic group selected from the group consisting of a cycloalkyl group (preferably a cyclohexyl group), an aromatic group (preferably a phenyl group), and a nitrogen-containing heterocyclic group (preferably a 6-membered nitrogen-containing hetero ring, and more preferably a morpholino group), and preferably represent the cyclic groups, or $Z^{101}$ has a cyclic aliphatic group or an aromatic group. A non-substitutional cycloalkyl group is preferable as the cycloalkyl group described above, and a non-substitutional cyclohexyl group is more preferable. A non-substitutional aromatic group is preferable as the aromatic group described above, and a non-substitutional phenyl group is more preferable. It is more preferable that $Z^{101}$ has a cyclic aliphatic group, and it is even more preferable that $Z^{101}$ is formed of a cyclic aliphatic group.

In the compound denoted by General Formula (A-101), an embodiment having the nitrogen-containing hetero ring described above is able to have a partial structure described below.

(In General Formula (A-102), $L^{151}$ and $L^{161}$ each independently represent an alkylene group, and the alkylene group may have a substituent. $L^{152}$ and $L^{162}$ each independently represents a single bond, any one of —O—, —NR$^{100a}$—, —S—, and —C(=O)—, or a group formed of a combination thereof. $R^{100a}$ represents a hydrogen atom or a substituent. n105 and n106 each independently represent an integer of 0 to 20, and in a case where a plurality of $L^{151}$'s, $L^{152}$'s, $L^{161}$'s, and $L^{162}$'s exist, the plurality of $L^{151}$'s, $L^{152}$'s, $L^{161}$'s, and $L^{162}$'s may be identical to each other or different from each other. $Q^{104}$ represents a substituent, A represents *—NR$^{100}$—C(=O)—NH—, *—NH—C(=O)—NR$^{100}$, *—O—C(=O)—NH—, or *—NH—C(=O)—O—, R$^{100}$ represents a hydrogen atom or a substituent, and * represents a bonding portion with respect to a cyclohexane ring which may be substituted with $L^{161}$ or (R$^{111}$)a. R$^{111}$ represents an alkyl group having 1 to 3 carbon atoms. m1 represents 2 or 3, and a plurality of $Q^{104}$'s and A's may be identical to each other or different from each other. Here, at least one A represents *—NR$^{100}$—C(=O)—NH— or *—NH—C(=O)—NR—. In addition, in a case where at least one n105 represents zero, $Q^{104}$ has a cyclic structure, and A represents *—NH—C(=O)—NR$^{100}$—, the cyclic structure included in Q$^{104}$ may be a cyclic structure formed along with R$^{100}$ of —NR$^{100}$— included in A. Here, the number of divalent linking groups denoted by —NH—(C=O)—NH— in one molecule is 0 or 1. a represents an integer in a range of 0 to 10, and in a case where a is an integer of greater than or equal to 2, a plurality of R$^{111}$'s may be identical to each other or different from each other.)

Q$^{104}$ represents a substituent, and is identical to Q$^A$ in General Formula (A-100), and a preferred range thereof is also identical to that of Q$^A$ in General Formula (A-100).

L$^{151}$ and L$^{161}$ are each independently identical to L$^{101}$ and L$^{103}$ in General Formula (A-100), and preferred ranges thereof are also identical to those of L$^{101}$ and L$^{103}$ in General Formula (A-100).

L$^{152}$ and L$^{162}$ are each independently identical to L$^{102}$ and L$^{104}$ in General Formula (A-100), and preferred ranges thereof are also identical to those of L$^{102}$ and L$^{104}$ in General Formula (A-100).

n105 and n106 are each independently identical to na and nb in General Formula (A-100), and preferred ranges thereof are also identical to those of na and nb in General Formula (A-100).

A linking group denoted by (L$^{152}$-L$^{51}$) is identical to a linking group denoted by (L$^{132}$-L$^{131}$) in General Formula (A-101), and a preferred range thereof is also identical to that of linking group denoted by (L$^{132}$-L$^{131}$) in General Formula (A-101).

A linking group denoted by (L$^{161}$-L$^{162}$) is identical to the linking group denoted by (L$^{141}$-L$^{142}$) in General Formula (A-101), and a preferred range thereof is also identical to that of the linking group denoted by (L$^{141}$-L$^{142}$) in General Formula (A-101).

R$^{111}$ represents an alkyl group having 1 to 3 carbon atoms, and examples of R$^{11}$ include a methyl group, an ethyl group, a propyl group, an isopropyl group, and the like. It is preferable that R$^{11}$ is a methyl group.

m1 represents 2 or 3, and is preferably 2. a represents an integer of 0 to 10, is preferably 0 to 5, is more preferably 0 to 3, and is even more preferably 1 to 3.

Specific examples of the bonding position on two or three side chains of a cyclohexane ring in General Formula (A-102) include the followings.

* described below is a position linked to

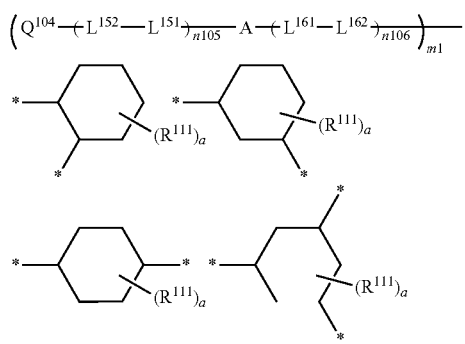

It is preferable that the cyclohexane ring described above is a structure described below.

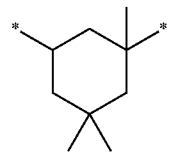 [SMILES: *C1CC(*)(C)CC(C)(C)C1]

Examples of a preferred embodiment of the compound denoted by General Formula (A-101) are able to include a compound denoted by General Formula (A-103) described below.

General Formula (A-103)

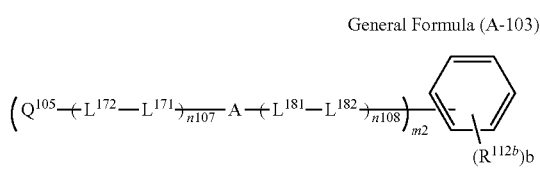

(In General Formula (A-103), L$^{171}$ and L$^{181}$ each independently represent an alkylene group, and the alkylene group may have a substituent. L$^{172}$ and L$^{182}$ each independently represent a single bond, any one of —O—, —NR$^{100a}$—, —S—, and —C(=O)—, or a group formed of a combination thereof. R$^{100a}$ represents a hydrogen atom or a substituent. n107 and n108 each independently represent an integer of 0 to 20, and in a case where a plurality of L$^{171}$'s, L$^{172}$'s, L$^{181}$'s, and L$^{182}$'s exist, the plurality of L$^{171}$'s, L$^{172}$'s, L$^{181}$'s, and L$^{182}$'s may be identical to each other or different from each other. Q$^{105}$ represents a substituent, A represents *—NR$^{100}$—C(=O)—NH—, *—NH—C(=O)—NR$^{100}$—, *—O—C(=O)—NH—, or *—NH—C(=O)—O—, R$^{100}$ represents a hydrogen atom or a substituent, and * represents a bonding portion with respect to a cyclohexane ring which may be substituted with L$^{181}$ or (R$^{112}$)b. R$^{112}$ represents an alkyl group having 1 to 3 carbon atoms. m2 represents 2 or 3, and a plurality of Q$^{105}$'s and A's may be identical to each other or different from each other. Here, at least one A represents *—NR$^{100}$—C(=O)—NH— or *—NH—C(=O)—NR$^{100}$—. In addition, in a case where at least one n107 represents zero, Q$^{105}$ has a cyclic structure, and A represents *—NH—C(=O)—NR—, the cyclic structure included in Q$^{105}$ may be a cyclic structure formed along with R$^{100}$ of —NR$^{100}$— included in A. Here, the number of divalent linking groups denoted by —NH—(C=O)—NH— in one molecule is 0 or 1. b represents an integer in a range of 0 to 5, and in a case where b is an integer of greater than or equal to 1, a plurality of R$^{112}$'s may be identical to each other or different from each other.)

Q$^{105}$ represents a substituent, and is identical to Q$^A$ in General Formula (A-100), and a preferred range thereof is also identical to that of Q$^A$ in General Formula (A-100).

L$^{171}$ and L$^{181}$ are each independently identical to L$^{101}$ and L$^{103}$ in General Formula (A-100), and preferred ranges thereof are also identical to those of L$^{101}$ and L$^{103}$ in General Formula (A-100).

L$^{172}$ and L$^{182}$ are each independently identical to L$^{102}$ and L$^{104}$ in General Formula (A-100), and preferred ranges thereof are also identical to those of L$^{102}$ and L$^{104}$ in General Formula (A-100).

n107 and n108 are each independently identical to na and nb in General Formula (A-100), and preferred ranges thereof are also identical to those of na and nb in General Formula (A-100).

A linking group denoted by ($L^{172}$-$L^{171}$) is identical to the linking group denoted by ($L^{132}$-$L^{131}$) in General Formula (A-101), and a preferred range thereof is also identical to that of the linking group denoted by ($L^{132}$-$L^{131}$ 1) in General Formula (A-101).

A linking group denoted by ($L^{181}$-$L^{182}$)$_{n8}$ is identical to the linking group denoted by ($L^{141}$-$L^{142}$) in General Formula (A-101), and a preferred range thereof is also identical to that of the linking group denoted by ($L^{141}$-$L^{142}$) in General Formula (A-101).

$R^{112}$ represents an alkyl group having 1 to 3 carbon atoms, and examples of $R^{112}$ include a methyl group, an ethyl group, a propyl group, an isopropyl group, and the like. It is preferable that $R^{112}$ is a methyl group.

m2 represents 2 or 3, and is preferably 2.

b represents an integer of 0 to 5, is preferably 0 to 3, and is particularly preferably 0.

Specific examples of the bonding position on two or three side chains of a benzene ring in General Formula (A-103) include the followings.

* described below is a position linked to

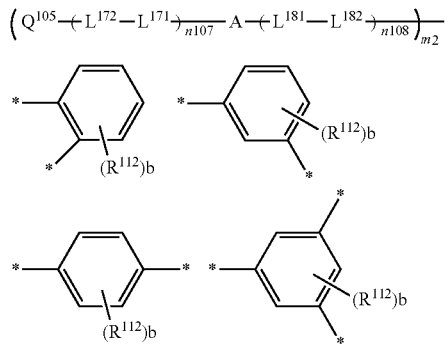

It is preferable that the compound denoted by General Formula (A-103) described above has a partial structure described below.

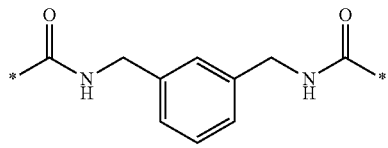

(In the above description, * represents a bonding position with respect to other structures configuring the compound denoted by General Formula (A-103).)

In addition, it is preferable that the compound denoted by General Formula (A-102) and the compound denoted by General Formula (A-103) have a partial structure having the nitrogen-containing hetero ring described above.

Examples of the preferred embodiment of the compound denoted by General Formula (A-100) are able to include a compound denoted by General Formula (A-104-A) described below, a compound denoted by General Formula (A-104-B) described below, and a compound denoted by General Formula (A-105) described below.

General Formula (A-104-A)

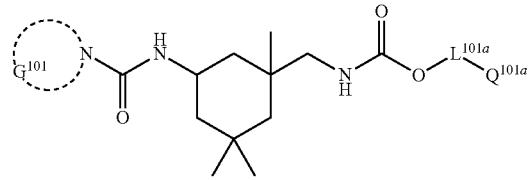

General Formula (A-104-B)

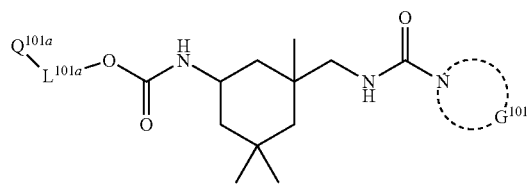

In General Formulas (A-104-A) and (A-104-B), $L^{101a}$ represents a single bond, an alkylene group, one of groups denoted by any one of General Formulas (2A) to (2F) described below, or a group formed of a combination between two or three alkylene groups and two or three groups denoted by any one of General Formulas (2A) to (2F) described below. The details of General Formulas (2A) to (2F) are as described above.

—{$R^b_{jb}(CR^aR^c)_{ja}$—O—(C=O)}—*  General Formula (2A)

—{$R^b_{jb}(CR^aR^c)_{ja}$—O}—*  General Formula (2B)

—{$R^b_{jb}(CR^aR^c)_{ja}$—(C=O)O—}—*  General Formula (2C)

—{$R^b_{jb}(CR^aR^c)_{ja}$—NR$^{100a}$(C=O)O—}—*  General Formula (2D)

—{$R^b_{jb}(CR^aR^c)_{ja}$—O—(C=O)NR$^{100a}$}—*  General Formula (2E)

—{$R^b_{jb}(CR^aR^c)_{ja}$—NR$^{100a}$(C=O)NR$^{100a}$}—*  General Formula (2F)

(In General Formulas (2A) to (2F), * represents a bonding position with respect to $Q^{101a}$ or a bonding position with respect to the adjacent group on the $Q^{101a}$ side, $R^a$ and $R^c$ each independently represent a hydrogen atom or an alkyl group having 1 to 3 carbon atoms, ja represents an integer of greater than or equal to 1, and in a case where a plurality of $R^a$'s and $R^c$'s exist, the plurality of $R^a$'s and $R^c$'s may be identical to each other, or may be different from each other. $R^b$ represents a cycloalkylene group which may be substituted with one or more alkylene groups having 1 to 3 carbon atoms, and jb represents 0 or 1; $R^{100a}$ represents a hydrogen atom or an alkyl group having 1 to 4 carbon atoms, and in a case where a plurality of $R^{100a}$'s exist, the plurality of $R^{100a}$'s may be identical to each other, or may be different from each other. Here, the number of divalent linking groups denoted by —NH—(C=O)—NH— in one molecule is 0 or 1.)

It is preferable that $L^{101a}$ is a single bond, a methylene group, an ethylene group, one of groups denoted by any one of General Formulas (2A) to (2F), or a group formed of a combination between two or three alkylene groups and two or three groups denoted by any one of General Formulas (2A) to (2F).

$Q^{101a}$ represents a substituent. The details of $Q^{101a}$ are as described with respect to $Q^A$ in General Formula (A-100).

$G^{101}$ represents an atom group forming a cyclic structure along with a linking nitrogen atom. The details of $G^{101}$ are as described with respect to G in a partial structure which is able to be obtained by General Formula (A-100-1), In one embodiment, in General Formulas (A-104-A) and (A-104-B), $L^{101a}$ represents a single bond, an alkylene group, one of groups denoted by any one of General Formulas (2A-1) to (2F-1) described below, a group formed of a combination of two or more groups denoted by any one of General Formulas (2A-1) to (2F-1) described below, or a group formed of a combination between one or more groups denoted by any one of General Formulas (2A-1) to (2F-1) described below and one or more alkylene groups. The combination described above, for example, is a combination formed of two or three groups described above.

—{(CR$^a$R$^c$)$_{ja}$—O—(C=O)}—*  General Formula (2A-1)

—{(CR$^a$R$^c$)$_{ja}$—O}—*  General Formula (2B-1)

—{(CR$^a$R$^c$)$_{ja}$—(C=O)O—}—*  General Formula (2C-1)

—{(CR$^a$R$^c$)$_{ja}$—NR$^{100a}$(C=O)O—}—*  General Formula (2D-1)

—{(CR$^a$R$^c$)$_{ja}$—O—(C=O)NR$^{100a}$}—*  General Formula (2E-1)

—{(CR$^a$R$^c$)$_{ja}$—NR$^1$(C=O)NR$^{100a}$}—*  General Formula (2F-1)

(In General Formulas (2A-1) to (2F-1), * represents a bonding position with respect to $Q^{1a}$ or $Q^{1b}$ or a bonding position with respect to the adjacent group on the $Q^{1a}$ side or the $Q^{1b}$ side, $R^a$ and $R^c$ each independently represent a hydrogen atom or an alkyl group having 1 to 3 carbon atoms, ja's each independently represent an integer of greater than or equal to, and in a case where a plurality of $R^a$'s and $R^c$'s exist, the plurality of $R^a$'s and $R^c$'s may be identical to each other, or may be different from each other. $R^{100a}$ represents a hydrogen atom or an alkyl group having 1 to 4 carbon atoms, and in a case where a plurality of $R^{100a}$'s exist, the plurality of $R^{100a}$'s may be identical to or different from each other.)

$L^{101a}$ is preferably a single bond, an alkylene group, or a group formed of a combination of two groups denoted by any one of General Formulas (2A-1) to (2F-1), and is more preferably a single bond, an alkylene group, or a group denoted by any one of General Formulas (2A-1) to (2C-1).

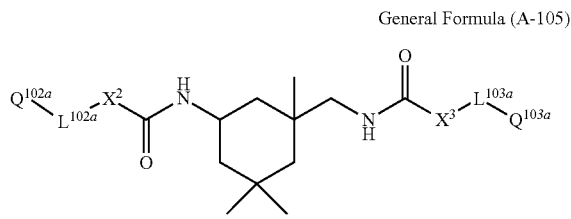

General Formula (A-105)

In General Formula (A-105), $L^{102a}$ and $L^{103a}$ each independently represent a single bond, an alkylene group, a group formed of a combination of two or more groups denoted by any one of General Formulas (2A) to (2F) described below, or a group formed of a combination between one or more groups denoted by any one of General Formulas (2A) to (2F) described below and one or more alkylene groups. The combination described above, for example, is a combination formed of two or three groups described above. The details of General Formulas (2A) to (2F) are as described above.

—{R$^b_{jb}$(CR$^a$R$^c$)$_{ja}$—O—(C=O)}—*  General Formula (2A)

—{R$^b_{jb}$(CR$^a$R$^c$)$_{ja}$—O}—*  General Formula (2B)

—{R$^b_{jb}$(CR$^a$R$^c$)$_{ja}$—(C=O)O—}—*  General Formula (2C)

—{R$^b_{jb}$(CR$^a$R$^c$)$_{ja}$—NR$^{100a}$(C=O)O—}—*  General Formula (2D)

—{R$^b_{jb}$(CR$^a$R$^c$)$_{ja}$—O—(C=O)NR$^{100a}$}—*  General Formula (2E)

—{R$^b_{jb}$(CR$^a$R$^c$)$_{ja}$—NR$^{100a}$(C=O)NR$^{100a}$}—*  General Formula (2F)

(In General Formulas (2A) to (2F), * represents a bonding position with respect to $Q^{102a}$ and $Q^{103a}$ or a bonding position with respect to the adjacent group on the $Q^{102a}$ side and the $Q^{103a}$ side, $R^a$ and $R^c$ each independently represent a hydrogen atom or an alkyl group having 1 to 3 carbon atoms, ja represents an integer of greater than or equal to 1, and in a case where a plurality of $R^a$'s and $R^c$'s exist, the plurality of $R^a$'s and $R^c$'s may be identical to each other, or may be different from each other; $R^b$ represents a cycloalkylene group which may be substituted with one or more alkyl groups having 1 to 3 carbon atoms, and j b is 0 or 1; $R^{100a}$ represents a hydrogen atom or an alkyl group having 1 to 4 carbon atoms, and in a case a plurality of $R^{100a}$'s exist, the plurality of $R^{100a}$'s may be identical to each other, or may be different from each other. Here, the number of divalent linking groups denoted by —NH—(C=O)—NH— in one molecule is 0 or 1.)

$L^{102a}$ and $L^{103a}$ each independently represent a single bond, a methylene group, an ethylene group, one of groups denoted by any one of General Formulas (2A) to (2F), or a group formed of a combination between two or three alkylene groups and two or three groups denoted by any one of General Formulas (2A) to (2F).

$Q^{102a}$ and $Q^{103a}$ each independently represent a substituent. The details of $Q^{102a}$ and $Q^{103a}$ are as described with respect to $Q^d$ in General Formula (A-100).

$X^2$ and $X^3$ each independently represent —NR$^{100}$— or —O—. In one embodiment, both of $X^2$ and $X^3$ represent —NR$^{100}$—. In another embodiment, one of $X^2$ and $X^3$ represents —NR$^{100}$—, and the other represents —O—. In addition, in another embodiment, both of $X^2$ and $X^3$ represent —O—. $R^{100}$ represents a hydrogen atom or a substituent. The details of $R^{100}$ are as described with respect to $R^{100}$ in General Formula (A-100). Here, in a case where both of $X^2$ and $X^3$ represent —O—, one or both of $L^{102a}$ and $L^{103a}$ include a divalent linking group denoted by —NR$^{100a}$—C(=O)—NH—. $R^{100a}$ represents a hydrogen atom or an alkyl group having 1 to 4 carbon atoms. In addition, as described above, the number of divalent linking groups denoted by —NH—(C=O)—NH— in one molecule is 0 or 1.

In one embodiment, in General Formula (A-105). $L^{102a}$ and $L^{103a}$ each independently represent a single bond, an alkylene group, one of groups denoted by any one of General Formulas (2A-1) to (2F-1) described below, a group formed of a combination of two or more groups denoted by any one of General Formulas (2A-1) to (2F-1) described below, or a group formed of a combination between one or more groups denoted by any one of General Formulas (2A-1) to (2F-1) described below and one or more alkylene groups. The combination described above, for example, is a combination formed of two or three groups described above.

—{(CR$^a$R$^c$)$_{ja}$—O—(C=O)}—*  General Formula (2A-1)

—{(CR$^a$R$^c$)$_{ja}$—O}—*  General Formula (2B-1)

—{(CR$^a$R$^c$)$_{ja}$—(C=O)O—}—*  General Formula (2C-1)

—{(CR$^a$R$^c$)$_{ja}$—NR$^{100a}$(C=O)O—}—*  General Formula (2D-1)

—{(CR$^a$R$^c$)$_{ja}$—O—(C=O)NR$^{100a}$}—*    General Formula (2E-1)

—{(CR$^a$R$^c$)$_{ja}$—NR$^1$(C=O)NR$^{100a}$}—*    General Formula (2F-1)

(In General Formulas (2A-1) to (2F-1), * represents a bonding position with respect to Q$^{102a}$ or Q$^{103a}$ or a bonding position with respect to the adjacent group on the Q$^{102a}$ side or the Q$^{103a}$ side, R$^a$ and R$^c$ each independently represent a hydrogen atom or an alkyl group having 1 to 3 carbon atoms, ja represents an integer of greater than or equal to 1, and in a case where a plurality of R$^a$'s and R$^c$'s exist, the plurality of R$^a$'s and R$^c$'s may be identical to each other, or may be different from each other; R$^{100a}$ represents a hydrogen atom or an alkyl group having 1 to 4 carbon atoms, and in a case where a plurality of R$^{100a}$'s exist, the plurality of R$^{100a}$'s may be identical to each other, or may be different from each other.)

It is preferable that L$^{102a}$ and L$^{103a}$ each independently represent a single bond, an alkylene group, or a group formed of a combination of two divalent linking groups denoted by any one of General Formulas (2A-1) to (2F-1).

In one embodiment, L$^{102a}$ and L$^{103a}$ each independently represent one of groups denoted by any one of General Formulas (2A-1) to (2F-1) described below, a group formed of a combination of two or more groups denoted by any one of General Formulas (2A-1) to (2F-1) described below, or a group formed of a combination between one or more groups denoted by any one of General Formulas (2A-1) to (2F-1) described below and one or more alkylene groups. The combination described above, for example, is a combination of two or three groups described above.

Hereinafter, the compound denoted by General Formula (A-100) will be exemplified, but the present invention is not limited thereto

TABLE 1

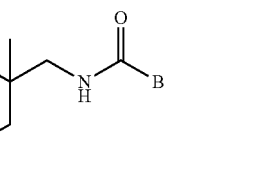

| Compound Number | A | B |
|---|---|---|
| 101-1-A | *—NHC$_2$H$_5$ | *—OCH$_2$CH$_2$OPh |
| 101-2-A | *—N(C$_2$H$_5$)$_2$ | *—OCH$_2$CH$_2$OPh |
| 101-3-A | *—NHCH$_2$Ph | *—OCH$_2$CH$_2$OPh |
| 101-4-A | *—NH-cHex | *—OCH$_2$CH$_2$OPh |
| 101-5-A | *—N(CH$_3$)CH$_2$Ph | *—OCH$_2$CH$_2$OPh |

TABLE 1-continued

| Compound Number | A | B |
|---|---|---|
| 101-6-A | *—N(CH$_3$)$_2$ | *—OCH$_2$CH$_2$OPh |
| 101-7-A | *—N(C$_3$H$_7$)$_2$ | *—OCH$_2$CH$_2$OPh |
| 101-8-A | *—NHPh | *—OCH$_2$CH$_2$OPh |
| 101-9-A | *—N⟨morpholine⟩ | *—OCH$_2$CH$_2$OPh |
| 101-10-A | *—NHCH$_2$Ph | *—OCH(CH$_3$)CH$_2$OCOPh |
| 101-11-A | *—NHCH$_2$Ph | *—OCH$_2$CH$_2$OCOPh |
| 101-12-A | *—NHCH$_2$Ph | *—N(C$_2$H$_5$)$_2$ |
| 101-13-A | *—NHCH$_2$Ph | *—NH-cHex |
| | *—N⟨morpholine⟩ | |
| 1-1-B | *—OCH$_2$CH$_2$OPh | *—NHC$_2$H$_5$ |
| 1-2-B | *—OCH$_2$CH$_2$OPh | *—N(C$_2$H$_5$)$_2$ |
| 1-3-B | *—OCH$_2$CH$_2$OPh | *—NHCH$_2$Ph |
| 1-4-B | *—OCH$_2$CH$_2$OPh | *—NH-cHex |
| 1-5-B | *—OCH$_2$CH$_2$OPh | *—N(CH$_3$)CH$_2$Ph |
| 1-6-B | *—OCH$_2$CH$_2$OPh | *—N(CH$_3$)$_2$ |
| 1-7-B | *—OCH$_2$CH$_2$OPh | *—N(C$_3$H$_7$)$_2$ |
| 1-8-B | *—OCH$_2$CH$_2$OPh | *—NHPh |
| 1-9-B | *—OCH$_2$CH$_2$OPh | *—N⟨morpholine⟩ |
| 1-10-B | *—OCH(CH$_3$)CH$_2$OCOPh | *—NHCH$_2$Ph |
| 1-11-B | *—OCH$_2$CH$_2$OCOPh | *—NHCH$_2$Ph |
| 1-12-B | *—N(C$_2$H$_5$)$_2$ | *—NHCH$_2$Ph |
| 1-13-B | *—NH-cHex | *—N⟨morpholine⟩ |

(In Table, Ph: Phenyl Group, cHex: Cyclohexyl Group, and *: Bonding Position)

101-20

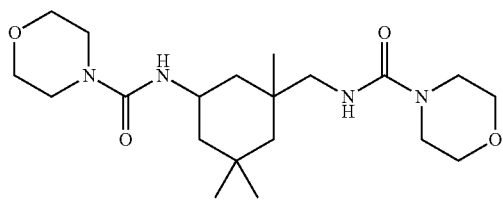

101-21

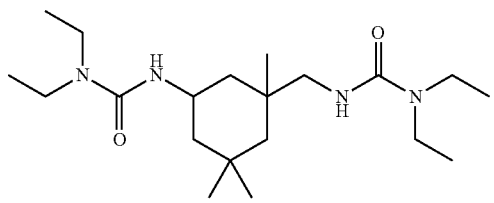

-continued
101-22
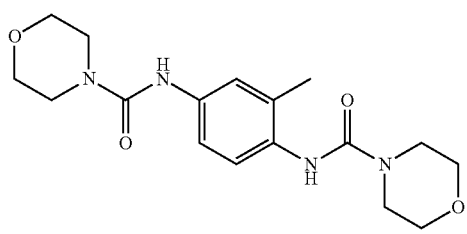
101-23
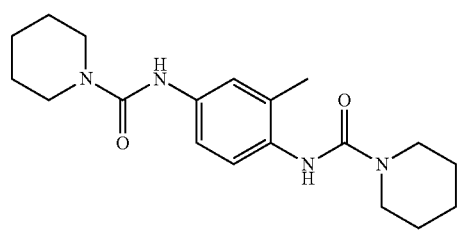
101-24
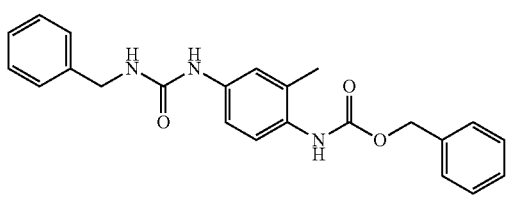
101-25
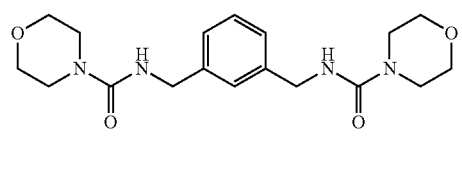
101-26
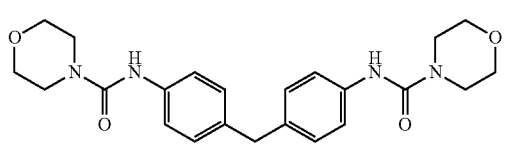
101-27
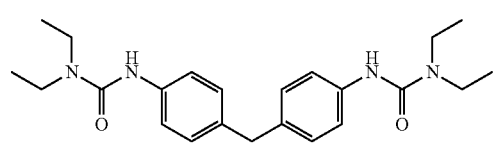
101-28
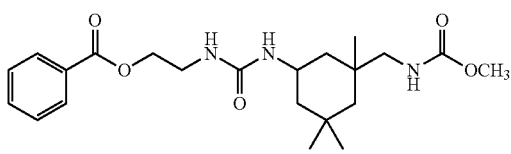
101-29
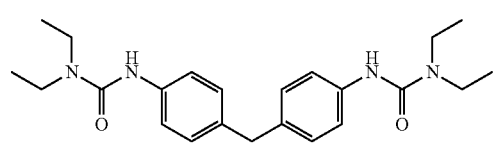
101-30
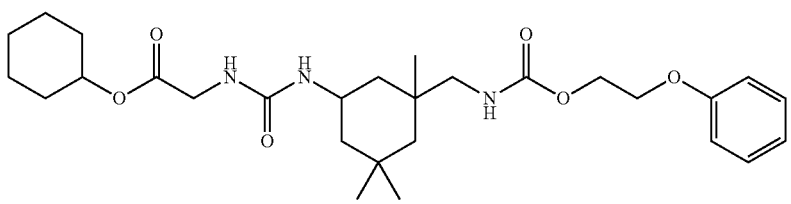
102-1
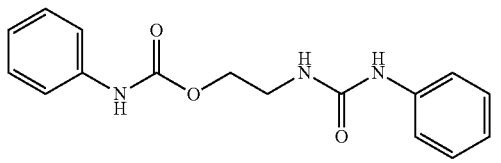
102-2
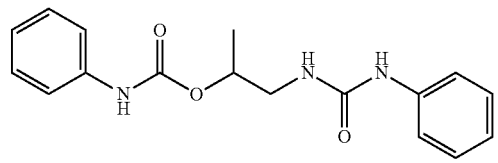
102-3
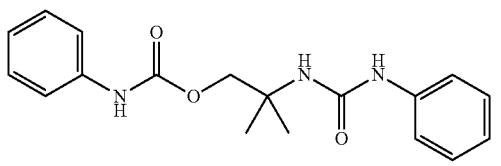
102-4
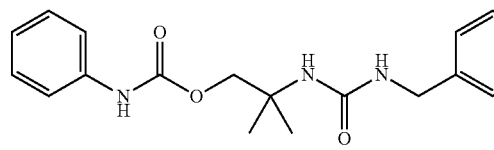
102-5
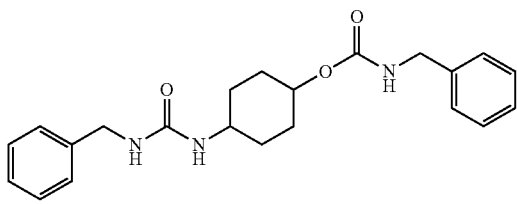
102-6
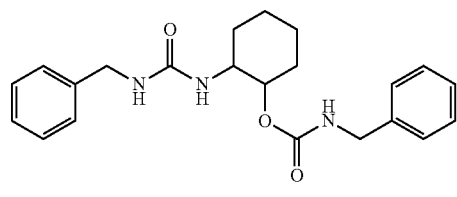

-continued
102-7
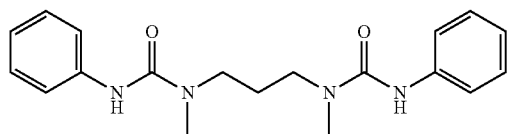
103-1
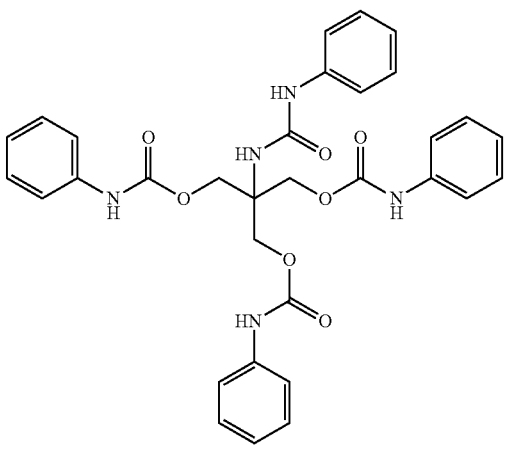
103-2
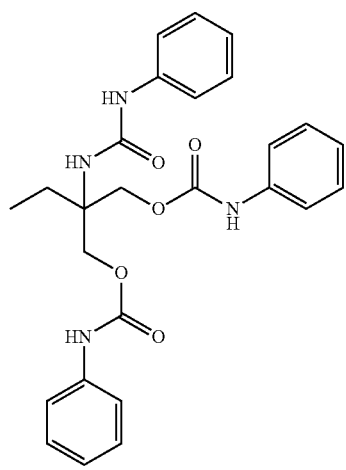
103-3
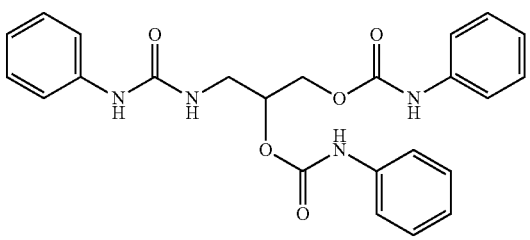
104-1
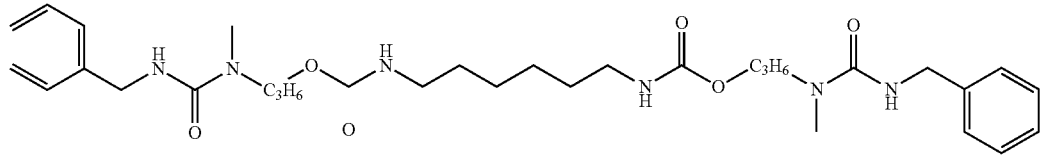
104-2
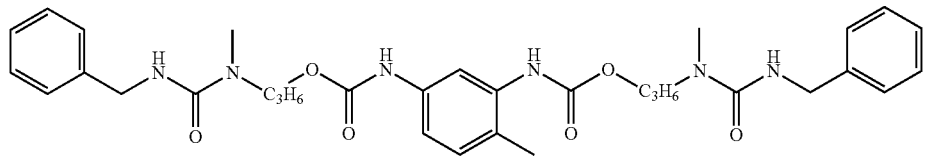
104-3
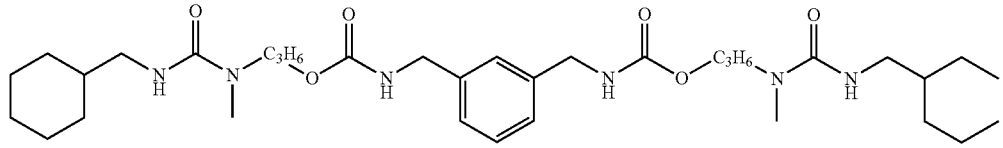
104-4
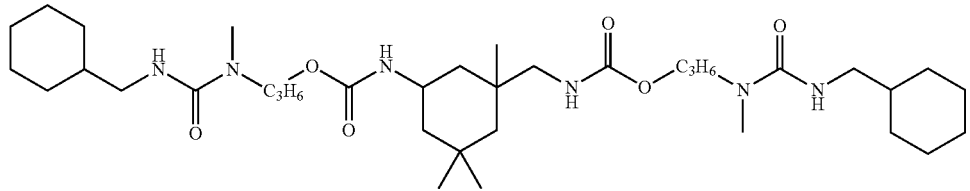

104-5
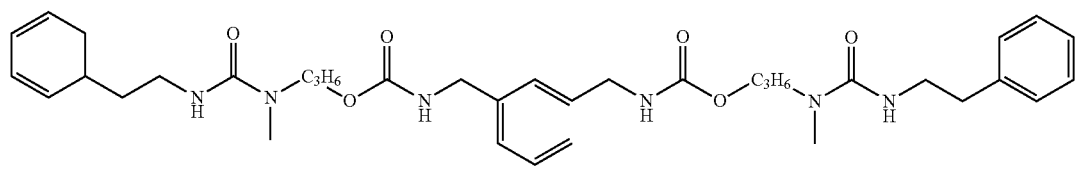
104-6
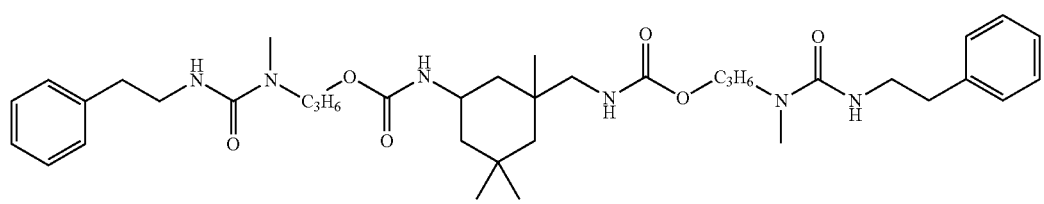
104-7
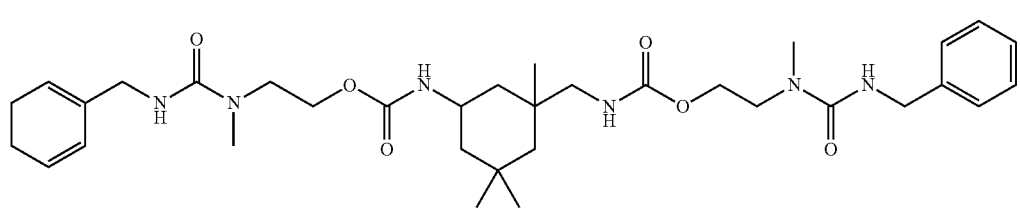
104-8
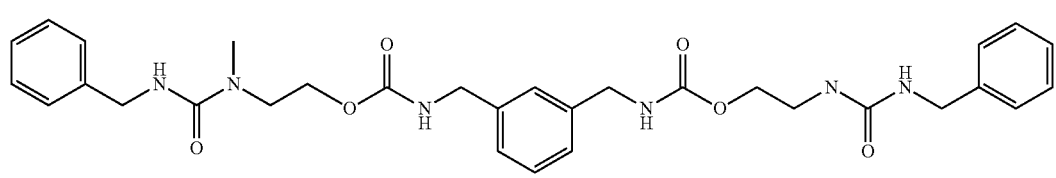
104-9
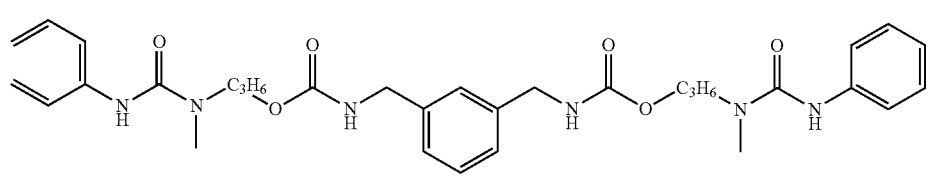
104-10
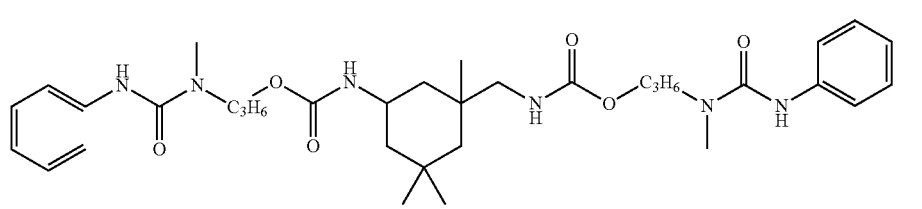
104-11
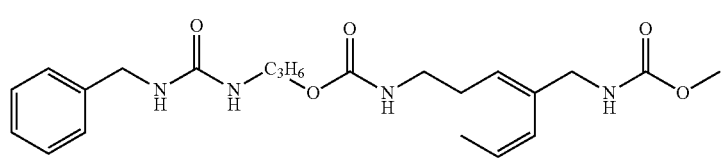
104-12
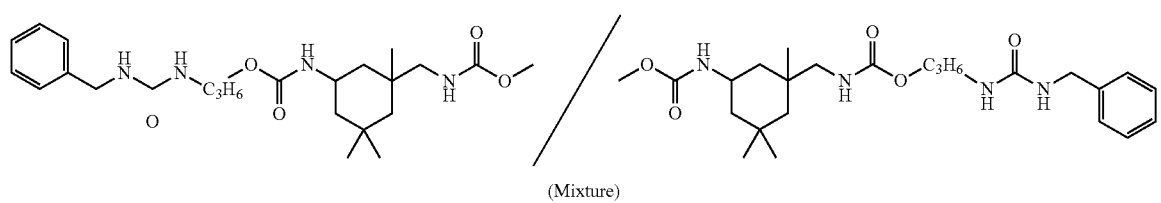
(Mixture)

-continued
104-13
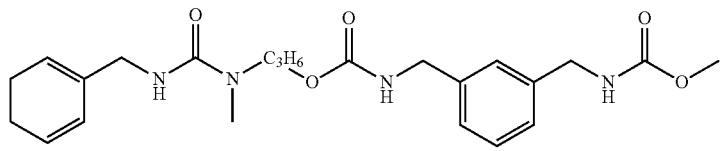
104-14
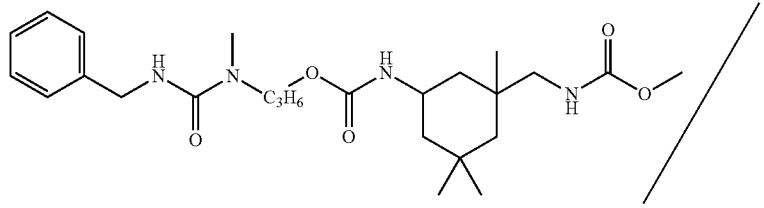
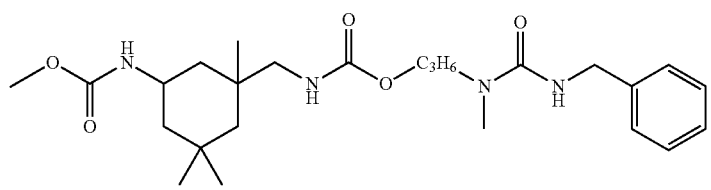
(Mixture)
104-15
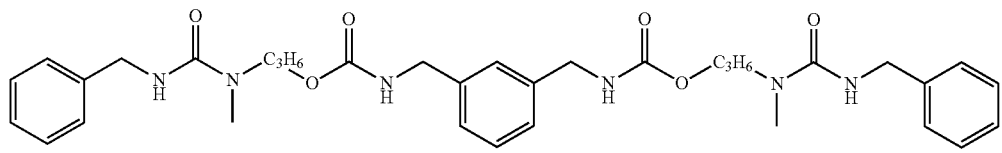
104-16
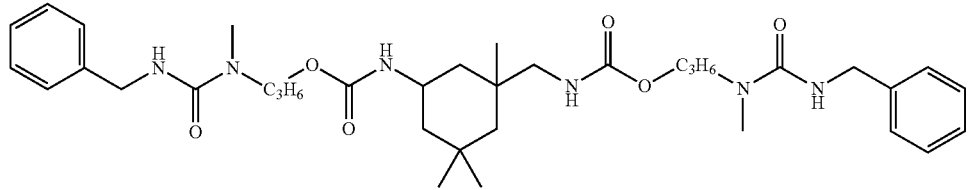
104-17
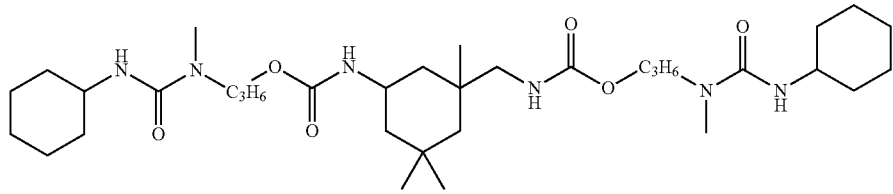
104-18
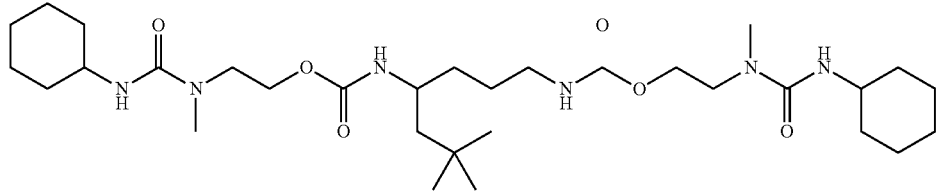
104-19
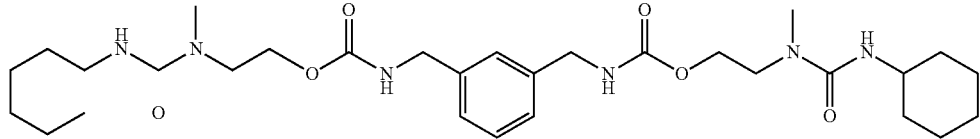

-continued
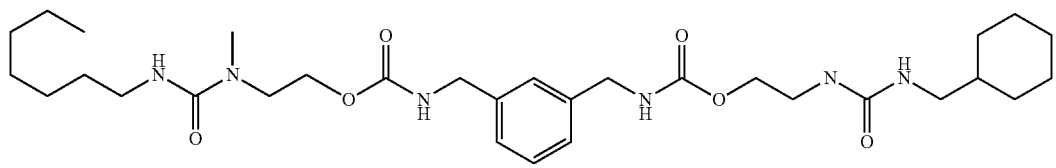
104-20
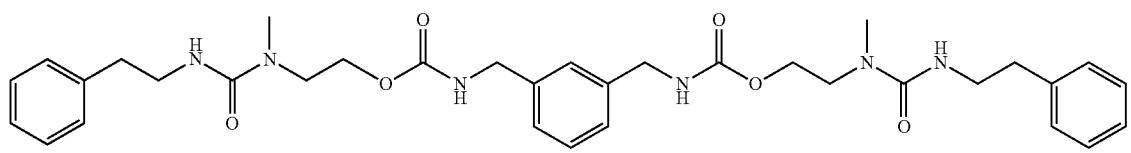
104-21
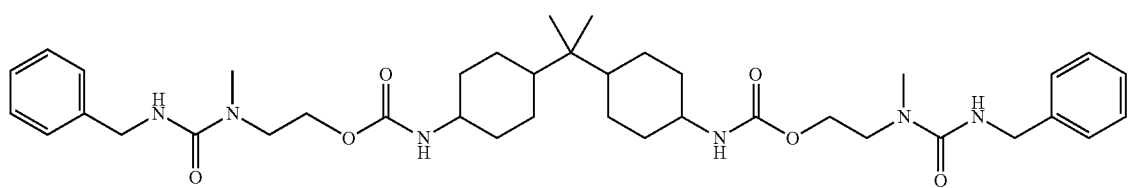
104-22
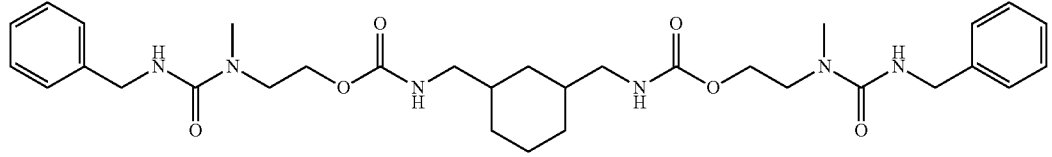
104-23
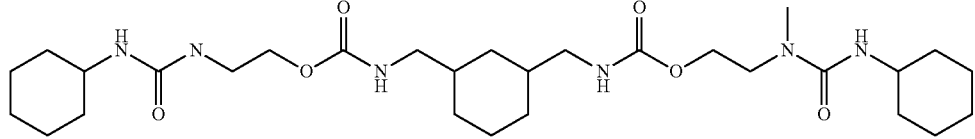
104-24
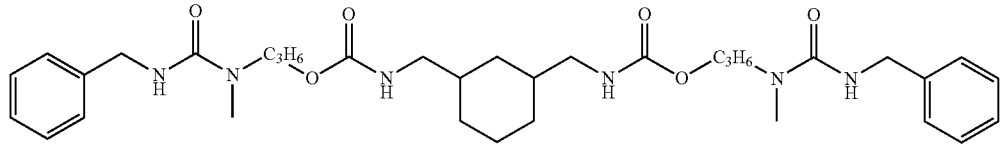
104-25
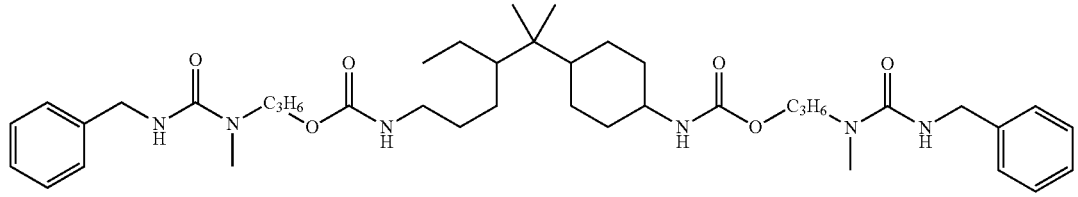
104-26
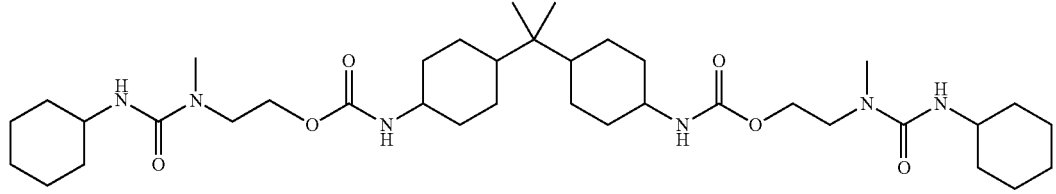
104-27
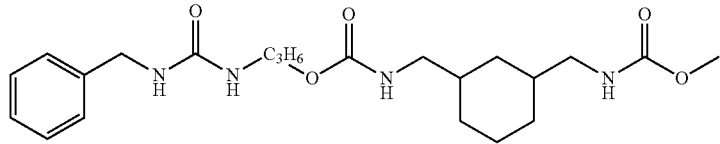
104-28

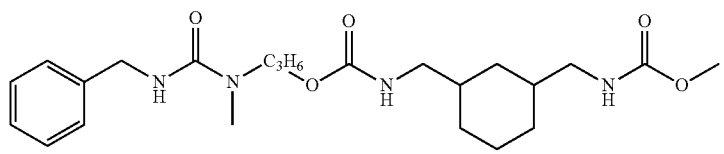
104-29
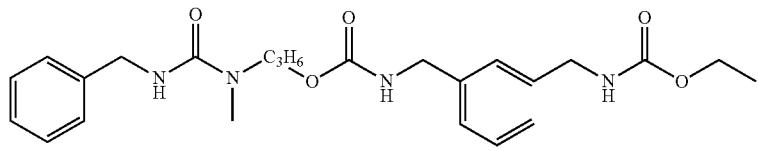
104-30
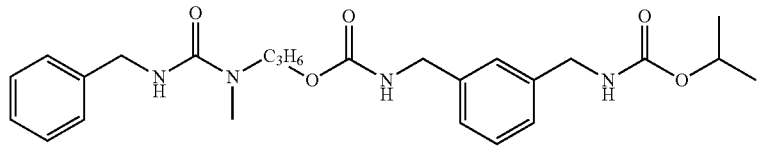
104-31
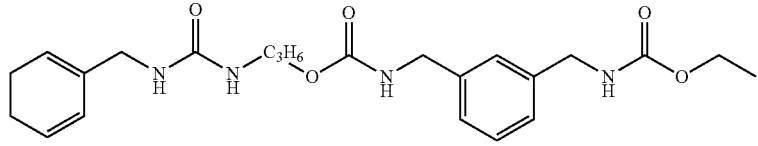
104-32
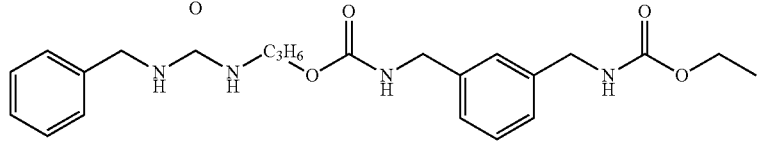
104-33
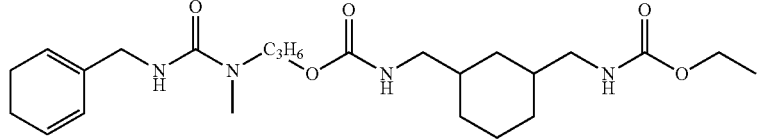
104-34
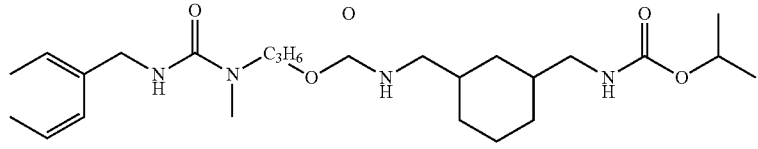
104-35
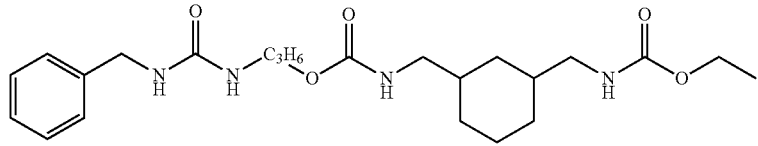
104-36
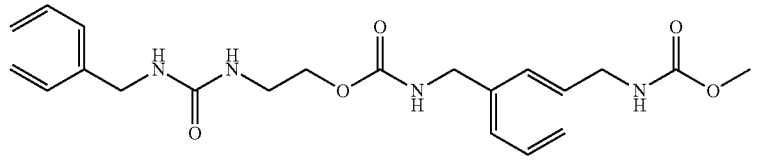
104-37
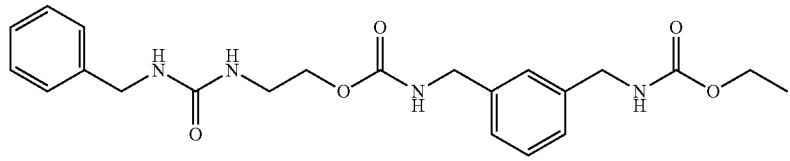
104-38

104-39
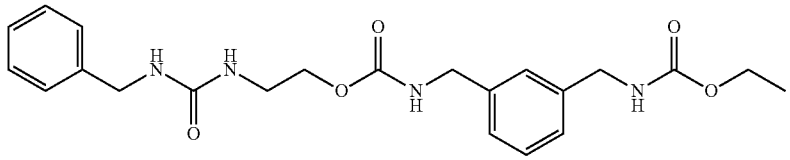
104-40
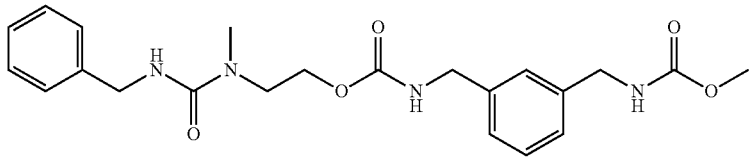
104-41
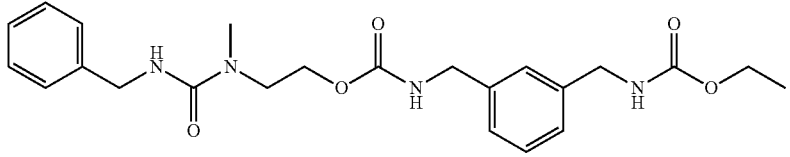
104-42
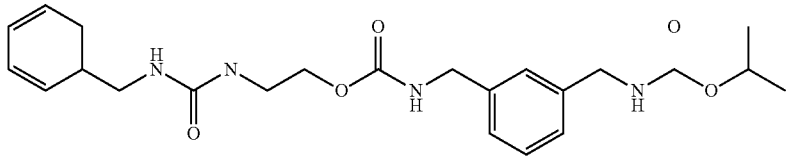
104-43
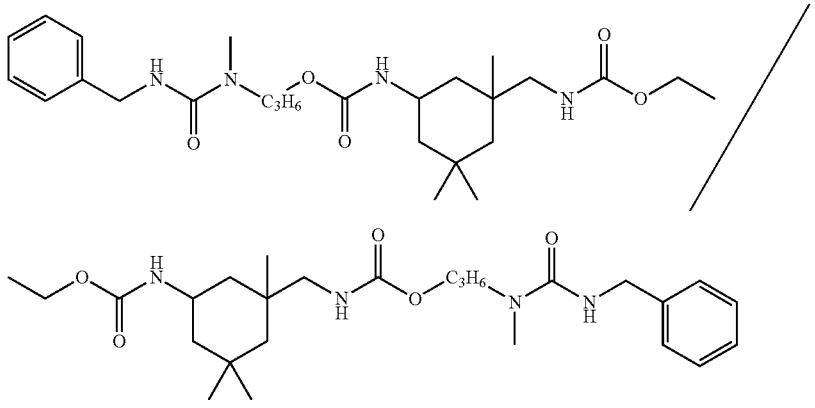
(Mixture)
104-44
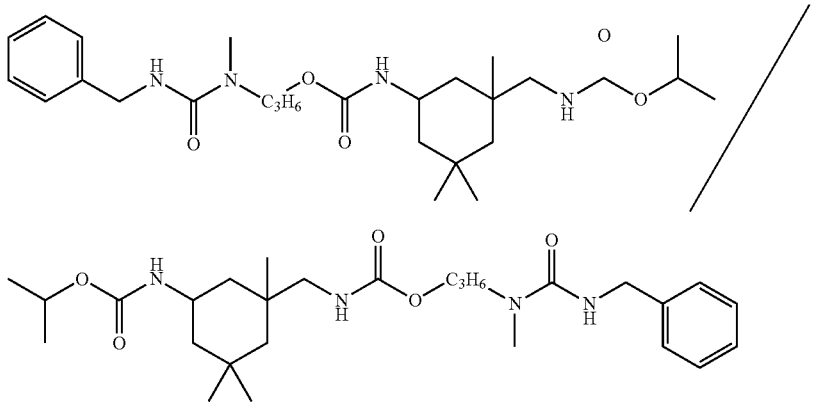
(Mixture)

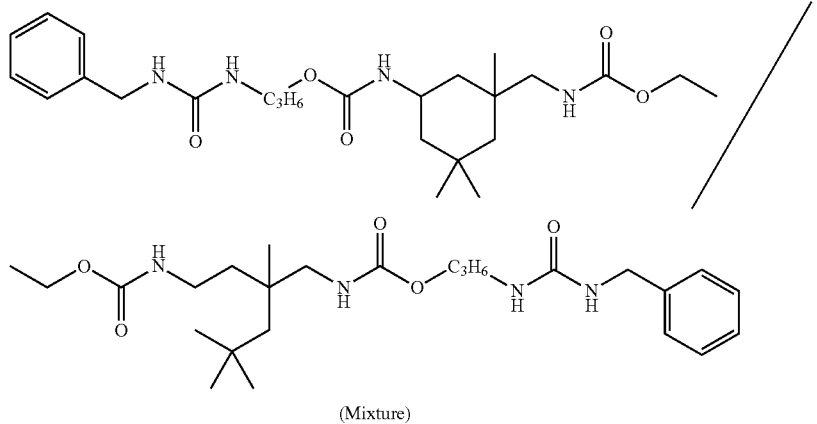
104-45
(Mixture)
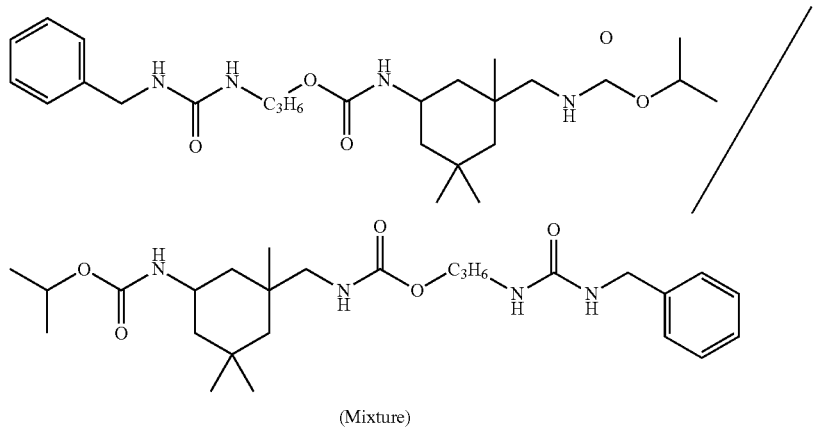
104-46
(Mixture)
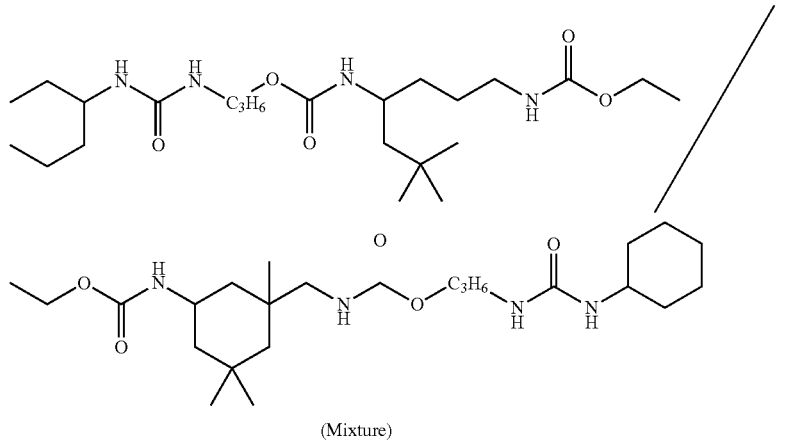
104-47
(Mixture)
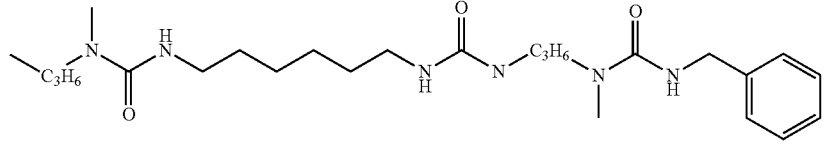
105-1
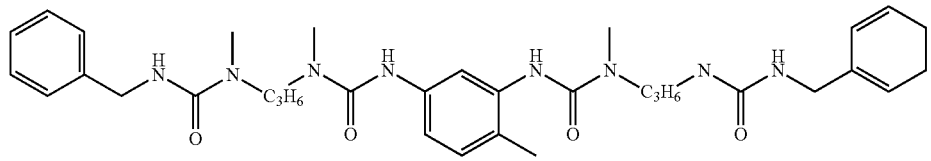
105-2

105-3
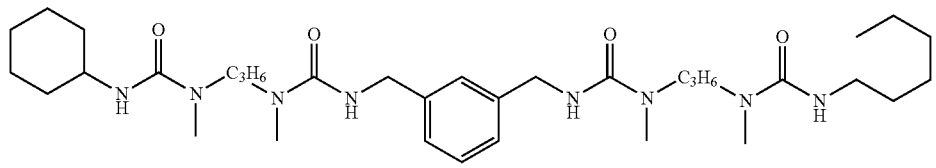
105-4
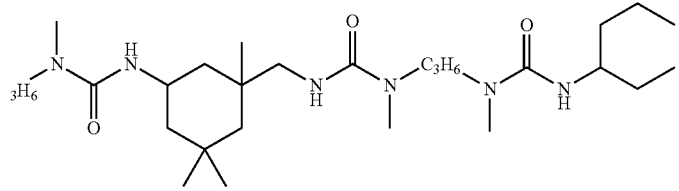
105-5
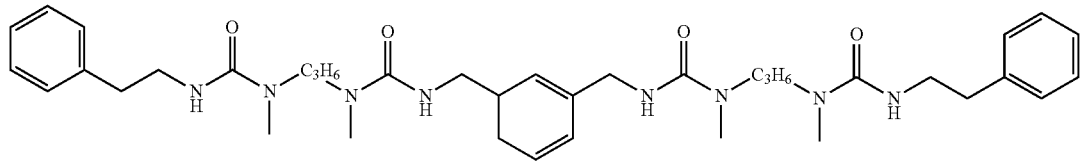
105-6
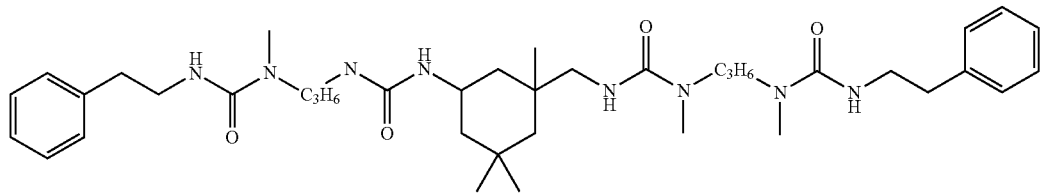
105-7
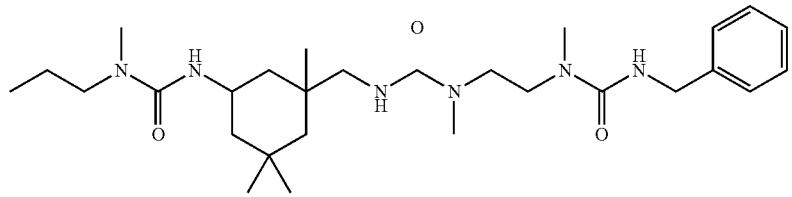
105-8
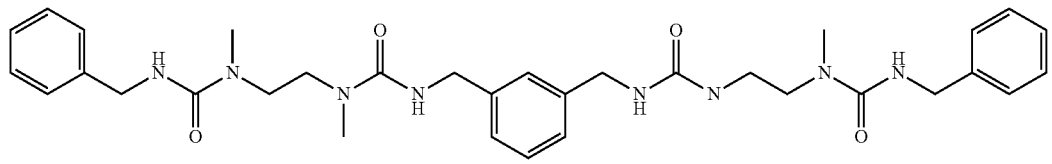
105-9
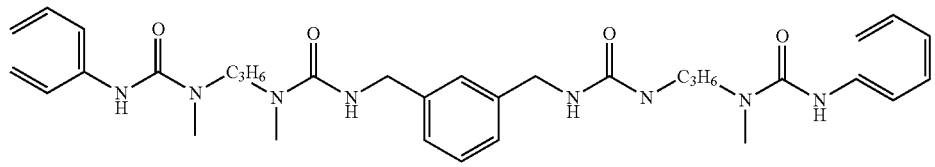
105-10
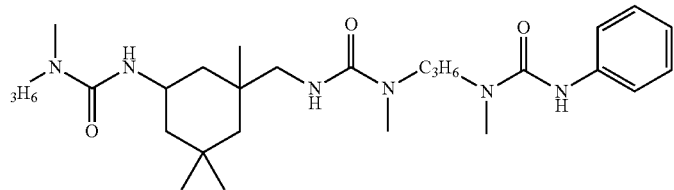

105-11
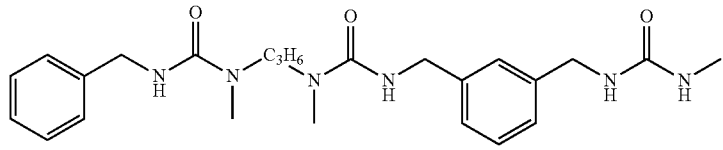
105-12
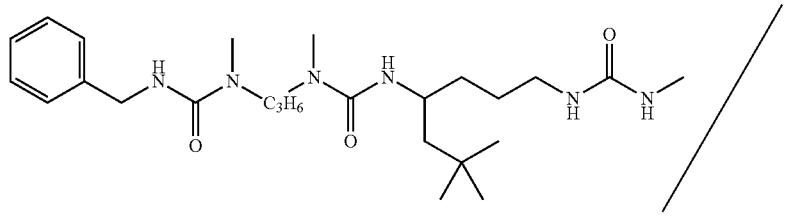
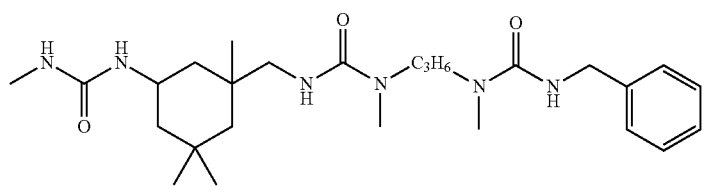
(Mixture)
105-13
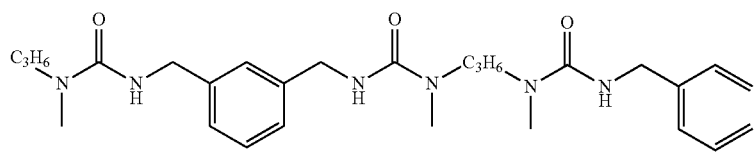
105-14
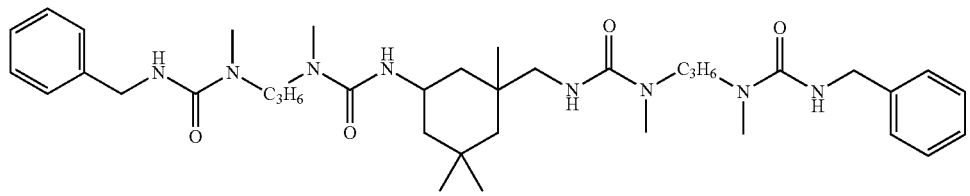
105-15
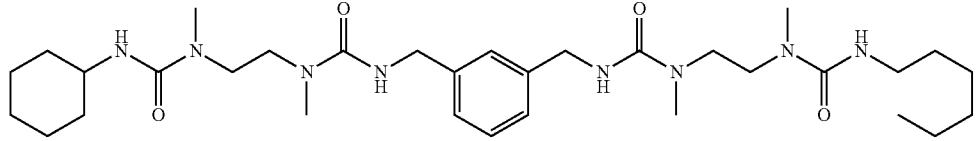
105-16
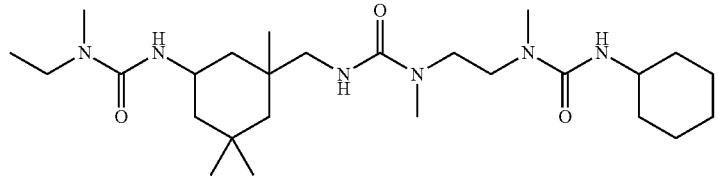
105-17
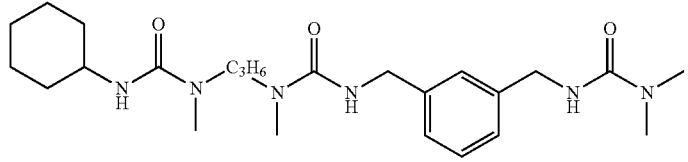

105-18
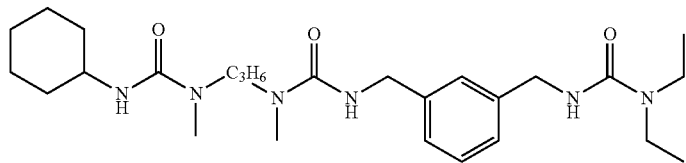
105-19
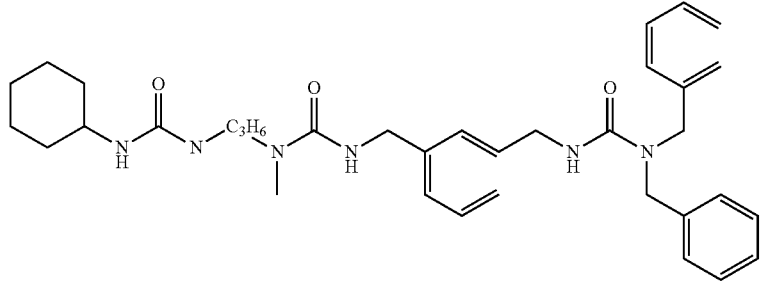
105-20
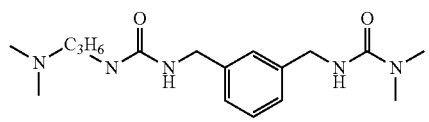
105-21
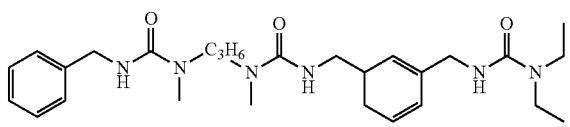
105-22
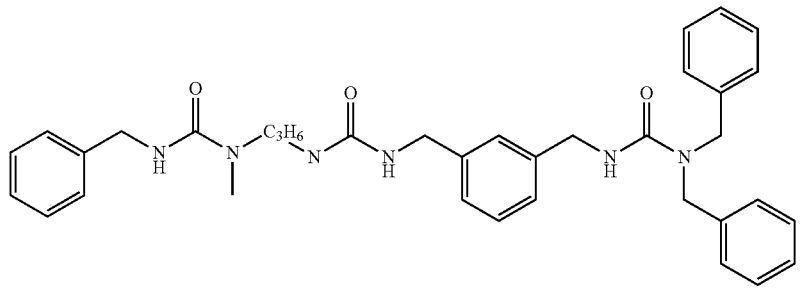
105-23
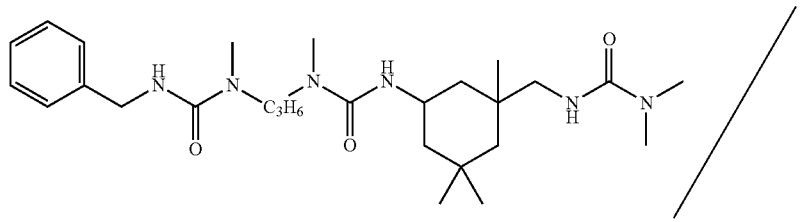
(Mixture)
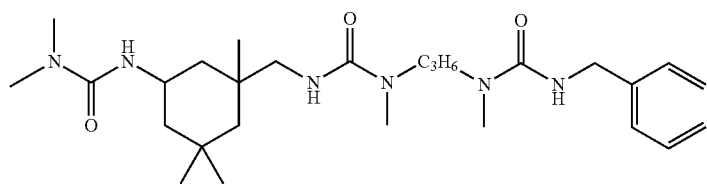
105-24
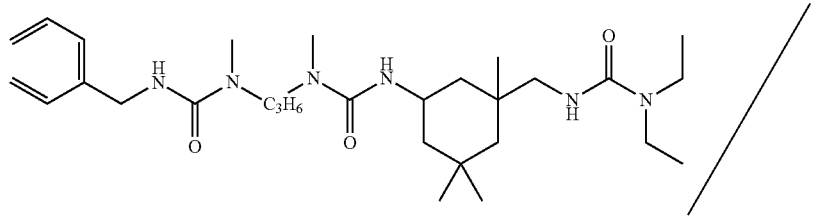

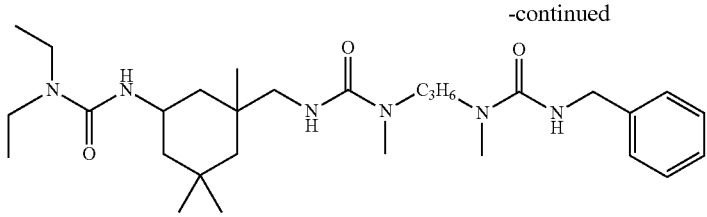

(Mixture)

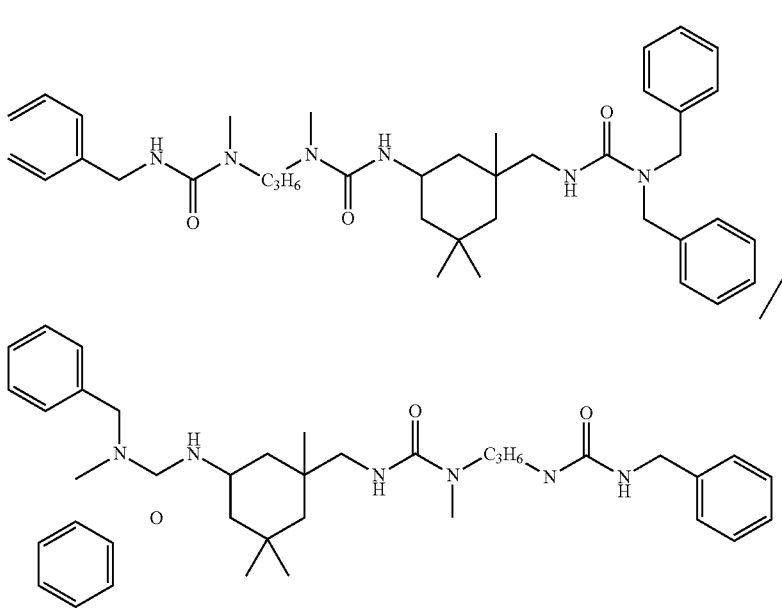

105-25

(Mixture)

The compound denoted by General Formula (A-100) is able to be manufactured by a known method. For example, the compound denoted by General Formula (A-100) is able to be manufactured by an addition reaction of amine to alkyl or aryl isocyanate, and the like.

When the addition reaction of amine to alkyl or aryl isocyanate is performed, it is preferable that a catalyst is used, and a known urethanized catalyst of the related art such as amines, a metal organic acid salt or a metal chelate compound of zinc, tin, and the like, and an organic metal compound of zinc, tin, bismuth, and the like are able to be used as the catalyst. For example, dibutyl tin dilaurate, dibutyl tin diacetate, and the like are preferably used as the urethanized catalyst.

Furthermore, in a case where a component for introducing a divalent linking group denoted by —NH—(C=O)—O— and a component for introducing a divalent linking group denoted by —NH—(C=O)—NR$^{100}$— are used together at the time of synthesizing the compound described above, it is possible to obtain a compound which has a structure only having one or more divalent linking groups denoted by —NH—(C=O)—NR$^{100}$— among two types of linking groups described above and a compound which has a structure having one or more divalent linking groups denoted by —NH—(C=O)—O— and one or more divalent linking groups denoted by —NH—(C=O)—NR$^{100}$—. In addition, a mixture of compounds having different numbers of linking groups described above may be obtained. In the present invention, various compounds described above are able to be used in a state of being mixed in order to manufacture a cellulose acylate film. Alternatively, a compound having a desired structure is refined from a mixture by a known method, and is able to be used as a single product.

Both of a combination between polyvalent isocyanate (diisocyanate, triisocyanate, and the like) and monovalent amine and a combination between polyvalent amine and monovalent isocyanate are able to be preferably used as the compound denoted by General Formula (A-100).

Examples of a polyvalent isocyanate component and examples of a monovalent isocyanate component are as described above with respect to the compound denoted by General Formula (I).

Examples of the polyvalent amine are able to include ethylene diamine, xylylene diamine, 4,4'-diaminodiphenyl methane, and the like.

Examples of the monovalent amine include substitutional or non-substitutional amine, and are able to include methyl amine, dimethyl amine, diethyl amine, aniline, benzyl amine, cyclohexyl amine, morpholine, piperidine, and the like.

In addition, aminoalcohol is able to be used, and examples of the aminoalcohol are able to include 2-aminoethanol, 1-amino-2-propanol, and the like.

$$Q^{31}\text{-}L^{31}\text{-}X^3\text{—}C(=O)\text{—}NH\text{-}L^{32}\text{-}Q^{32} \quad \text{General Formula (III)}$$

[In General Formula (III), $X^3$ represents —O— or —NR—, and R represents a hydrogen atom or a substituent. $L^{31}$ and $L^{32}$ each independently represent a single bond, an alkylene group, any one of —O—, —NR$^1$—, —S—, and —C(=O)—, or a group formed of two or more combinations thereof. $R^1$ represents a hydrogen atom or a substituent. $Q^{31}$ and $Q^{32}$ each independently represent a substituent, and at least one of $Q^{31}$ or $Q^{32}$ represents a polar group which is a residue of a compound having a C log P value of less than or equal to 0.85. In a case where $X^3$ represents —$NR^1$—, $L^{31}$ represents a single bond, and $Q^{31}$ has a cyclic structure, the cyclic structure included in $Q^{31}$ may be a cyclic structure formed along with $R^1$ of —$NR^1$—.]

In General Formula (III), $X^3$ represents —O— or —NR—. R represents a hydrogen atom or a substituent, and examples of the substituent are able to include substituents selected from the group T of the substituents described above. Among them, an alkyl group and an aryl group, which may be substituted, are preferable as the substituent, and an alkyl group substituted with a cyano group which is a polar group is more preferable. In General Formula (III), one or more linking groups selected from the group described above, or one or more divalent linking groups denoted by —NH—C(=O)—O—, —O—C(=O)—NH—, —NH—C(=O)—NR—, or —NR—C(=O)—NH— may be included. The number of linking groups selected from the group described above is as described above. In addition, the linking groups which are selected from the group described above and exist in the compound may be identical to each other or different from each other.

$Q^{31}$ and $Q^{32}$ each independently represent a substituent, and at least one of $Q^{31}$ or $Q^{32}$ represents the polar group described above.

The polar group described above is a residue of a compound having a C log P value of less than or equal to 0.85. Here, P of C log P indicates a distribution coefficient in an n-octanol-water system, and is able to be measured by using n-octanol and water, and an estimated value is able to be obtained as the distribution coefficient by using a C log P value estimation program (a C LOG P program incorporated in PC Models manufactured by Daylight Chemical Information Systems Inc.). The C log P value is calculated as a compound. In order to perform such calculation, a portion of the compound is input not as radicals or ions but as complete molecules. For example, residues $B^1$ and $B^2$ are determined as a $B^1$—H portion and a $B^2$—H portion along with a hydrogen atom. Even in a case of a compound having a structure which does not actually exist, the C log P value is able to be obtained as a value which is estimated by a calculating chemical method or an empirical method.

A compound denoted by General Formula (III) has the polar group which is the residue of the compound having a C log P value of less than or equal to 0.85 in at least one of $Q^{31}$ or $Q^{32}$. It is considered that a mutual interaction between the compound and cellulose ester becomes strong by including such a polar group, and thus, it is considered that the scratch resistance of the cellulose ester film is able to be improved. In consideration of the compatibility with cellulose ester, the number of described above polar groups included in one molecule is preferably 1 to 3, and is more preferably 2 or 3. The polar group may be included in the substituent of the group represented by R of —NR—C(=O) NH—. In a case where a cyano group is included in R, it is preferable that the cyano group is bonded to a nitrogen atom configuring —NR— through an alkylene group (for example, an alkylene group having 1 to 3 carbon atoms).

The C log P value described above is preferably less than or equal to 0.50, and is more preferably less than or equal to 0. In addition, it is more preferable that the C log P value of the polar group is greater than or equal to −5.0 from the viewpoint of the compatibility with cellulose ester. Specifically, examples of the polar group have a cyano group, a cyclic imido group, or a chain imido group (for example, a phthalimido group, a succinimido group, a hexahydrophthalimido group, and the like), a nitro group, a hydroxyl group, a sulfone amido group, a carbon amido group, a carboxyl group, an alkoxy carbonyl group (—(C=O)OR, here, R represents a substituent), and an amino group. Among them, the cyano group, the imido group, the alkoxy carbonyl group, and the hydroxyl group are preferable, the cyano group, the imido group, the alkoxy carbonyl group, and the hydroxyl group are more preferable, the cyano group, the cyclic imido group, the alkoxy carbonyl group, and the hydroxyl group are even more preferable, the cyano group and the cyclic imido group still more preferable, and the cyano group still even more preferable. In addition, an alkoxy carbonyl group in which R is an alkyl group having 1 to 3 carbon atoms is preferable as the alkoxy carbonyl group, and a methoxy carbonyl group in which R is a methyl group is more preferable.

In addition, it is preferable that the compound denoted by General Formula (III) has at least one cyclic structure, from the viewpoint of improving the scratch resistance of a cellulose ester film to be obtained. Furthermore, in a case where a polar group is included as one terminal substituent, it is also preferable that a cyclic structure is included in the other terminal substituent. Alternatively, it is preferable that the polar group described above has a cyclic structure. As described above, a cyclic imido group is preferable as the polar group having a cyclic structure. It is preferable that a cyclic polar group exists as a terminal substituent.

On the other hand, examples of a cyclic group which does not correspond to the polar group described above are able to preferably include a cyclic aliphatic group having 6 to 30 carbon atoms or an aromatic group. A terminal cyclic group which does not correspond to the polar group described above may have a fused ring, and it is preferable that the terminal cyclic group has a monocyclic ring. Specifically, examples of the terminal cyclic group include an aliphatic ring (a cyclohexane ring, and the like), an aromatic ring (a benzene ring, a naphthalene ring, and the like), a hetero ring (a morpholine ring, a piperidine ring, a piperazine ring, a pyridine ring, a pyrimidine ring, a triazine ring, a furan ring, and the like), and the like, and the aromatic ring is preferable. Specifically, an aryl group having 6 to 30 carbon atoms (more preferably 6 to 20 carbon atoms, and even more preferably 6 to 10 carbon atoms) or a hetero aryl group having 5 to 30 carbon atoms (more preferably 6 to 20 carbon atoms, and even more preferably 6 to 10 carbon atoms) is preferable, an aryl group having 6 to 30 carbon atoms (more preferably 6 to 20 carbon atoms, and even more preferably 6 to 10 carbon atoms) is more preferable, and the benzene ring is particularly preferable. That is, it is preferable that the terminal cyclic group which does not correspond to the polar group described above is a phenyl group. The phenyl group described above may be a substitutional phenyl group, or may be a non-substitutional phenyl group, and the non-substitutional phenyl group is preferable.

Furthermore, examples of the cyclic group which does not correspond to the polar group described above are able to include a cyclic group (a nitrogen-containing heterocyclic group) formed of a substituent which is represented by R of the divalent linking group denoted by —NH—(=O)—NR—. A 6-membered nitrogen-containing heterocyclic group is preferable as the nitrogen-containing heterocyclic group formed as described above, and a morpholino group is more preferable. The nitrogen-containing heterocyclic group described above may have a substituent, and may be a non-substitutional nitrogen-containing heterocyclic group.

The non-substitutional nitrogen-containing heterocyclic group is preferable. Examples of the substituent substituted for the nitrogen-containing heterocyclic group are able to include the substituents exemplified in the group T of the substituents described above.

On the other hand, the details of the cyclic structure included in the linking group are as described with respect to $Z^1$ included in General Formula (I-1).

In one embodiment, in a case where either $Q^{31}$ or $Q^{32}$ represents the polar group described above, it is preferable that the other is a substituent having a cyclic structure. The details thereof are as described above.

$L^{31}$ and $L^{32}$ each independently represent a single bond, an alkylene group, any one of —O—, —NR$^1$—, —S—, —C(=O)—, or a group formed of a combination of two or more thereof. An alkylene group having 1 to 20 carbon atoms is preferable as the alkylene group which is represented by $L^{31}$ and $L^{32}$ or is included in $L^{31}$ and $L^{32}$, an alkylene group having 1 to 12 carbon atoms is more preferable, an alkylene group having 1 to 8 carbon atoms is even more preferable, an alkylene group having 1 to 3 carbon atoms is particularly preferable, and a methylene group, an ethylene group, or a propylene group is most preferable. The alkylene group may be any one of a straight chain alkylene group, a branched alkylene group, or a cyclic alkylene group. Specific examples of the alkylene group include a methylene group, an ethylene group, a propylene group, a butylene group, a pentylene group, a hexylene group, and the like. The alkylene group may have a substituent. Examples of a substituent that the alkylene group may have include the group T of the substituents described below. Among them, an alkyl group, an acyl group, an aryl group, an alkoxy group, and a carbonyl group are preferable as the substituent which is included in the alkylene group.

In a case where $L^{31}$ and $L^{32}$ represent an alkylene group, any one of —O—, —NR$^1$—, —S—, and —C(=O)—, or a group formed of a combination of two or more thereof, the alkylene group, any one of —O— and —C(=O)—, or a group formed of a combination of two or more thereof is preferable. In addition, in a group represented by $L^{31}$ and $L^{32}$, the number of carbon atoms in a main chain portion is preferably in a range of 1 to 10, and is more preferably in a range of 1 to 5.

Specific and preferred examples of the group represented by $L^{31}$ and $L^{32}$ include the structures denoted by General Formulas (2A) to (2C) described above.

$R^1$ of —NR$^1$— represents a hydrogen atom or a substituent. The details thereof are as described with respect to $R^1$ in General Formula (I).

In addition, it is preferable that $Q^{31}$ is a monovalent substituent denoted by General Formula (a) described below or a substituent in which one or more monovalent substituents described above are bonded to $L^{31}$ through a linking group.

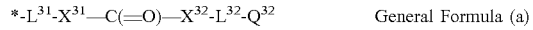
*-L$^{31}$-X$^{31}$—C(=O)—X$^{32}$-L$^{32}$-Q$^{32}$   General Formula (a)

Alternatively, it is preferable that $Q^{32}$ is a monovalent substituent denoted by General Formula (b) described below or a substituent in which one or more monovalent substituents are bonded to $L^{32}$ through a linking group.

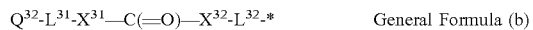
Q$^{32}$-L$^{31}$-X$^{31}$—C(=O)—X$^{32}$-L$^{32}$-*   General Formula (b)

In General Formulas (a) and (b) described above, * is a linking portion with respect to other structures configuring the compound denoted by General Formula (III), $Q^{31}$, $Q^{32}$, $L^{31}$, and $L^{32}$ are each identical to $Q^{31}$, $Q^{32}$, $L^{31}$, and $L^{32}$ in General Formula (III), one of $X^{31}$ and $X^{32}$ represents —NH— and the other represents —O— or —NR$^1$—, and $R^1$ is identical to $R^1$ in General Formula (III). Examples of the linking group described above are able to include the linking groups described with respect to $Z^1$ in General Formula (A-1).

That is, it is preferable that the compound denoted by General Formula (III) has two or more structures denoted by *-L$^{31}$-X$^3$—C(=O)—NH-L$^{32}$-* in one molecule. In the above description, * is a linking portion with respect to other structures configuring the compound denoted by General Formula (III), and $X^3$, $L^{31}$, and $L^{32}$ are each identical to $X^3$, $L^{31}$, and $L^{32}$ in General Formula (III).

As described above, in General Formula (III), in a case where X represents —NR—, $L^{31}$ represents a single bond, and $Q^{31}$ has a cyclic structure, the cyclic structure included in $Q^{31}$ is able to be a cyclic structure formed along with R of —NR—. An embodiment which is the compound denoted by General Formula (III) and has the cyclic structure described above is denoted by General Formula (III-i) described below.

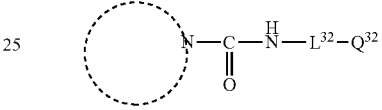

General Formula (III-i)

(In General Formula (III-1), $L^{32}$ and $Q^{32}$ are each identical to $L^{32}$ and $Q^{32}$ in General Formula (III).)

An embodiment which is the compound denoted by General Formula (III) and has a non-substitutional morpholino group is denoted by General Formula (III-ii)' described below.

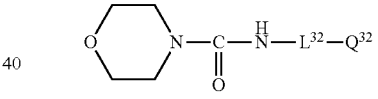

General Formula (III-ii)'

(In General Formula (III-ii)', $L^{32}$ and $Q^{32}$ are each identical to $L^{32}$ and $Q^{32}$ in General Formula (III).)

Examples of the preferred embodiment of the compound denoted by General Formula (III) described above are able to include a compound denoted by General Formula (III-1) described below.

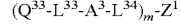
(Q$^{33}$-L$^{33}$-A$^3$-L$^{34}$)$_m$-Z$^1$   General Formula (III-1)

(In General Formula (III-1), $L^{33}$ and $L^{34}$ each independently represent a single bond, an alkylene group, any one of —O—, —NR$^1$—, —S— and —C(=O)—, or a group formed of a combination of two or more thereof. $R^1$ represents a hydrogen atom or a substituent. $Q^{31}$ represents a substituent, $Z^1$ represents an m-valent linking group, $A^3$ represents *—X$^3$—C(=O)—NH— or *—NH—C(=O)—X$^3$—, * represents a bonding position with respect to $L^{33}$, $X^3$ represents —O— or —NR—, and R represents a hydrogen atom or a substituent. m represents an integer of 2 to 6, and a plurality of $Q^{33}$'s, $A^3$'s, $L^{33}$'s, and $L^{34}$'s may be identical to each other or different from each other. In addition, at least one $Q^{33}$ represents the polar group described above. In a case where $A^3$ represents *—NH—C(=O)—X$^3$—, $X^3$ represents —NR—, $L^3$ represents a single bond, and $Q^{33}$ has a cyclic structure, the cyclic structure included in $Q^{33}$ may be a cyclic structure formed along with R of —NR—.)

$L^{33}$ and $L^{34}$ are each independently identical to $L^{31}$ and $L^{32}$ in General Formula (III), and the details of preferred embodiments and the like are identical to those of $L^{31}$ and $L^{32}$ in General Formula (III).

$Q^{33}$ represents a substituent, and preferably represents the polar group described above. Examples of a preferred polar group are able to include a cyano group, a cyclic imido group, an alkoxy carbonyl group, and a hydroxyl group. Among them, the cyano group and the cyclic imido group are more preferable, and the cyano group is even more preferable. In addition, a succinimido group, a phthalimido group, and a hexahydrophthalimido group are preferable as the cyclic imido group. An alkoxy carbonyl group in which is an alkyl group having 1 to 3 carbon atoms is preferable as the alkoxy carbonyl group (—C(=O)OR, here, R represents a substituent), and a methoxy carbonyl group in which R is a methyl group is more preferable.

In addition, it is preferable that all of m $Q^{33}$'s represent the polar group described above, and in one embodiment, it is preferable that all of $Q^{33}$'s represent the polar group described above, and it is more preferable that all of $Q^{33}$'s represent the polar group described above which is exemplified as the preferred polar group. In addition, in another embodiment, it is preferable that any one of m $Q^{33}$'s represents the polar group described above, and the other $Q^{33}$'s represent a substituent having a cyclic structure, and it is more preferable that the polar group is the polar group described above which is exemplified as the preferred polar group. The details of the substituent having a cyclic structure described above are as described above.

It is preferable that the compound denoted by General Formula (III-1) has a cyclic structure in at least one of $Q^{33}$ or $Z^1$, and it is preferable that the compound denoted by General Formula (III-1) has a cyclic structure in at least $Z^1$. The cyclic structure which is able to be included in $Z^1$ will be described below. The cyclic structure which is able to be included in $Q^{33}$ is as described above.

$A^3$ represents *—$X^3$—C(=O)—NH— or *—NH—C(=O)—$X^3$—. $X^3$ is identical to $X^3$ in General Formula (III). That is, $A^3$ represents a linking group selected from the group described above. Furthermore, in General Formula (III-1), m represents an integer in a range of 2 to 6, and thus, a plurality of (m) constitutional units denoted by denoted by ($Q^{33}$-$L^{33}$-$A^3$-$L^{34}$) exist in the compound denoted by General Formula (III-1). In at least one of the plurality of constitutional units denoted by ($Q^{33}$-$L^{33}$-$A^3$-$L^{34}$), in a case where $L^{34}$ is a single bond, the linking group represented by $A^3$ is directly bonded to $Z^1$. In this case, it is preferable that $A^3$ represents *—NH—C(=O)—$X^3$—, and is bonded to $Z^1$ in the bonding portion *. The details of the linking group selected from the group described above are as described above.

$Z^1$ represents an m-valent linking group. The details thereof are as described above with respect to $Z^1$ in General Formula (I-1). It is more preferable that $Z^1$ in General Formula (III-1) has a cyclic structure, and it is even more preferable that $Z^1$ in General Formula (III-1) has at least one of a cyclic aliphatic group or an aromatic group. A cyclohexane ring and a benzene ring, or a group in which the cyclohexane ring and the benzene ring are bonded to each other through a linking group (preferably an alkylene group having 1 to 3 carbon atoms) are preferable as the cyclic structure included in $Z^1$. A cyclohexylene group which may have a substituent or a phenylene group which may have a substituent is more preferable, a cyclohexylene group having a substituent or a non-substitutional phenyl group is even more preferable, and a cyclohexylene group having a substituent is still more preferable.

Examples of the preferred embodiment of the compound denoted by General Formula (III-1) are able to include a compound denoted by General Formula (III-2) described below.

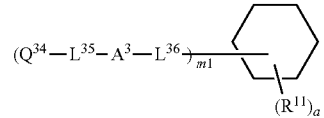

General Formula (III-2)

(In General Formula (III-2), $Q^{34}$ represents a substituent, and $L^{35}$ and $L^{36}$ each independently represent a single bond, an alkylene group, any one of —O—, —$NR^1$—, —S—, and —C(=O)—, or a group formed of combination of two or more thereof. $R^1$ represents a hydrogen atom or a substituent. $A^3$ represents *—$X^3$—C(=O)—NH— or *—NH—C(=O)—$X^3$—, * represents a bonding portion with respect to $L^{36}$. $R^{11}$ represents an alkyl group having 1 to 3 carbon atoms. a represents an integer in a range of 0 to 10, and in a case where a is greater than or equal to 2, a plurality of $R^{11}$'s may be identical to or different from each other, m1 represents 2 or 3, and a plurality of $Q^{34}$'s, $L^{35}$'s, $L^{36}$'s, and $A^3$'s may be identical to each other or different from each other. Here, at least one of the plurality of $Q^{34}$'s represents the polar group described above. In a case where $A^3$ represents *—NH—C(=O)—$X^3$—, $X^3$ represents —NR—, $L^{35}$ represents a single bond, and $Q^{34}$ has a cyclic structure, the cyclic structure included in $Q^{34}$ may be a cyclic structure formed along with R of —NR—.)

$Q^{34}$ represents a substituent, and at least one of the plurality of $Q^{34}$'s represents the polar group described above. $Q^{34}$ is identical to $Q^{33}$ in General Formula (III-1), and a preferred range thereof is also identical to that of $Q^{33}$ in General Formula (III-1).

$L^{35}$ and $L^{36}$ are each independently identical to $L^{33}$ and $L^{34}$ in General Formula (III-1), and preferred ranges thereof are also identical to those of $L^{33}$ and $L^{34}$ in General Formula (II-1).

$R^{11}$ represents an alkyl group having 1 to 3 carbon atoms, and examples of $R^{11}$ include a methyl group, an ethyl group, a propyl group, an isopropyl group, and the like. It is preferable that $R^{11}$ is a methyl group.

m1 represents 2 or 3, and is preferably 2. a represents an integer of 0 to 10, is preferably 0 to 5, is more preferably 0 to 3, and is even more preferably 1 to 3.

Specific examples of the linking position on two or three side chains of a cyclohexane ring in General Formula (III-2) include the followings.

* described below is a position linked to

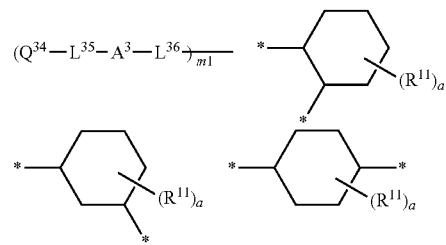

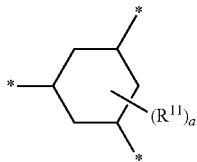

Examples of the preferred embodiment of the compound denoted by General Formula (III-1) are able to include a compound General Formula (III-3) described below.

General Formula (III-3)

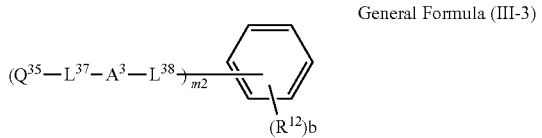

(In General Formula (III-3), $Q^{35}$ represents a substituent, and $L^{37}$ and $L^{38}$ each independently represent a single bond, an alkylene group, any one of —O—, —$NR^1$—, —S—, and —C(=O)—, or a group formed of a combination of two or more thereof. $R^1$ represents a hydrogen atom or a substituent. $A^3$ represents *—$X^3$—C(=O)—NH— or *—NH—C(=O)—$X^3$—, * represents a bonding portion with respect to $L^{38}$. $R^{12}$ represents an alkyl group having 1 to 3 carbon atoms, and b represents integer in a range of 0 to 5. In a case where b is greater than or equal to 2, a plurality of $R^{12}$'s may be identical to each other or different from each other. m2 represents 2 or 3, and a plurality of $Q^{35}$'s, $L^{37}$'s, $L^{38}$'s, and $A^3$'s may be identical to each other or different from each other. Here, at least one of the plurality of $Q^{35}$'s represents the polar group described above.)

$Q^{35}$ represents a substituent, and at least one of the plurality of $Q^{35}$'s has the polar group described above. $Q^{35}$ is identical to $Q^{33}$ in General Formula (III-1), and a preferred range thereof is also identical to that of $Q^{33}$ in General Formula (III-1).

$L^{37}$ and $L^{38}$ are each independently identical to $L^{33}$ and $L^{34}$ in General Formula (III-1), and preferred ranges thereof are also identical to those of $L^{33}$ and $L^{34}$ in General Formula (III-1).

$R^{12}$ represents an alkyl group having 1 to 3 carbon atoms, and examples of $R^{12}$ include a methyl group, an ethyl group, a propyl group, an isopropyl group, and the like. It is preferable that $R^{12}$ is a methyl group.

m2 represents 2 or 3, and is preferably 2. b represents an integer of 0 to 5, is more preferably 0 to 3, and is particularly preferably 0.

Specific examples of the linking position on two or three side chains of a benzene ring in General Formula (III-3) include the followings.

* described below is a position linked to

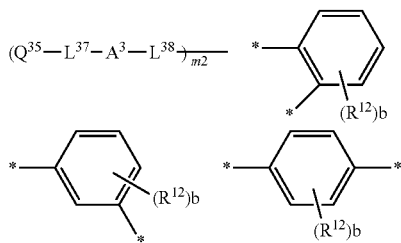

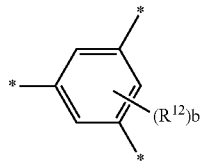

Examples of a preferred embodiment of the compound denoted by General Formula (III-2) are able to include a compound denoted by General Formula (III-4) described below, and examples of a preferred embodiment of a compound denoted by General Formula (III-3) are able to include a compound denoted by General Formula (III-5) described below.

General Formula (III-4)

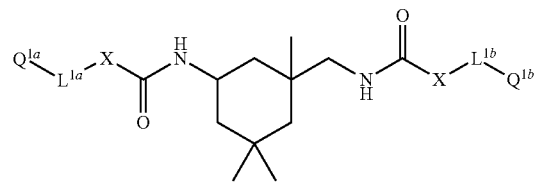

General Formula (III-5)

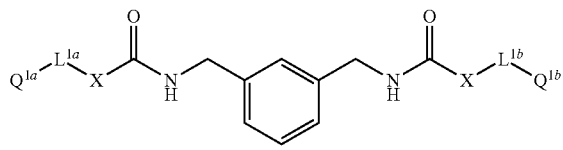

(In General Formulas (III-4) and (III-5), $L^{1a}$ and $L^{1b}$ each independently represent a single bond, an alkylene group, any one of —O— and —C(=O)—, or a group formed of a combination of two or more thereof. X represents —O— or —NR—, and R represents a hydrogen atom or a substituent. A plurality of X's may be identical to or different from each other. $Q^{1a}$ and $Q^{1b}$ each independently represent a polar group selected from the group consisting of a cyano group, a hydroxyl group, a succinimido group, a hexahydrophthalimido group, and a methoxy carbonyl group or a phenyl group, or represent a morpholino group formed along with R of —NR— in a case where the adjacent $L^{1a}$ or $L^{1b}$ represents a single bond, and X represents —NR—. Here, at least one of $Q^{1a}$ or $Q^{1b}$ represents a polar group selected from the group described above.)

$L^{1a}$ and $L^{1b}$ each independently represent a single bond, an alkylene group, any one of —O— and —C(=O)—, or a group formed of a combination of two or more thereof. The alkylene group is as described above with respect to the alkylene group included in $L^{31}$ and $L^{32}$ in General Formula (III). In addition, in the group represented by $L^{1a}$ and $L^{1b}$, the number of carbon atoms in a main chain portion is preferably in a range of 1 to 10, and is more preferably in a range of 1 to 5.

$Q^{1a}$ and $Q^{1b}$ each independently represent a polar group selected from the group consisting of a cyano group, a hydroxyl group, a succinimido group, a hexahydrophthalimido group, and a methoxy carbonyl group, or represent the morpholino group described above. Here, at least one of $Q^{1a}$ or $Q^{1b}$ represents a polar group selected from the group described above. Examples of a preferred combination of the polar group, the phenyl group, and the morpholino group included in $Q^{1a}$ and $Q^{1b}$ are able to include the following combinations.

(Combination 1) Cyano Group•Cyano Group
(Combination 2) Succinimido Group•Succinimido Group
(Combination 3) Hexahydrophthalimido Group•Hexahydrophthalimido Group
(Combination 4) Cyano Group•Phenyl Group
(Combination 5) Methoxy Carbonyl Group•Phenyl Group
(Combination 6) Hydroxyl Group•Hydroxyl Group
(Combination 7) Morpholino Group•Cyano Group X is identical to $X^3$ in General Formula (III), and a preferred range thereof is also id1entical to that of X in General Formula (III).

One of examples of a preferred embodiment of the compound denoted by General Formula (III-4) is able to include a compound denoted by General Formula (III-6) described below, and one of examples of a preferred embodiment of the compound denoted by General Formula (III-5) is able to include a compound denoted by General Formula (III-7) described below.

General Formula (III-6)

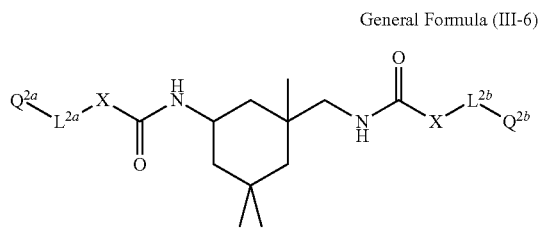

(In General Formula (III-6), $Q^{2a}$ and $Q^{2b}$ each independently represent a cyano group or a phenyl group, and at least one of $Q^{2a}$ or $Q^{2b}$ represents a cyano group. It is preferable that both of $Q^{2a}$ and $Q^{2b}$ represent a cyano group. $L^{2a}$ and $L^{2b}$ each independently represent a single bond, an alkylene group, any one of —O— and —C(=O)—, or a group formed of a combination of two or more thereof. X represents —O— or —NR—, and R represents a hydrogen atom or a substituent. A plurality of X's may be identical to or different from each other.)

General Formula (III-7)

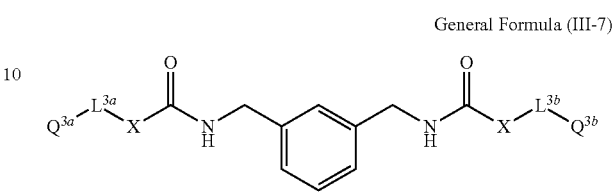

(In General Formula (III-7), one of $Q^{3a}$ and $Q^{3b}$ represents a cyano group, a succinimido group, or a hexahydrophthalimido group, and the other represents a phenyl group. It is preferable that one of $Q^{3a}$ and $Q^{3b}$ represents a cyano group, and the other represents a phenyl group. $L^{3a}$ and $L^{3b}$ each independently represent a single bond, an alkylene group, any one of —O— and —C(=O)—, or a group formed of a combination of two or more thereof. X represents —O— or —NR—, and R represents a hydrogen atom or a substituent. A plurality of X's may be identical to or different from each other.)

$L^{2a}$, $L^{2b}$, $Q^{3a}$, and $Q^{3b}$ in General Formulas (III-6) and (II-7) are each identical to $L^{1a}$ and $L^{1b}$ in General Formulas (III-4) and (III-5), and preferred ranges thereof are also identical to those of $L^{1a}$ and $L^{1b}$ in General Formulas (III-4) and (III-5).

X in General Formulas (III-6) and (III-7) is identical to $X^3$ in General Formula (III-1) and a preferred range thereof is also identical to $X^3$ in General Formula (III-1).

Hereinafter, specific examples of the compound denoted by General Formula (III) will be exemplified, but the present invention is not limited thereto.

1-1

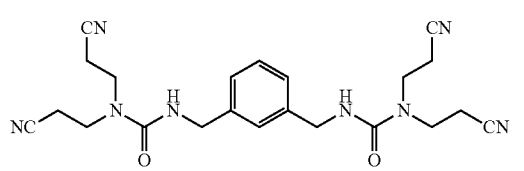

1-2

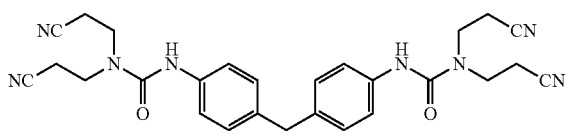

1-3

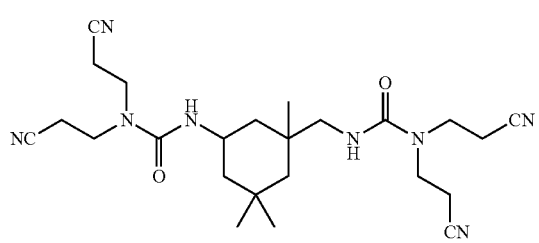

1-4

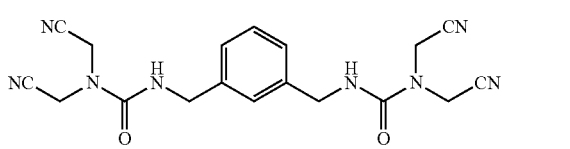

1-5

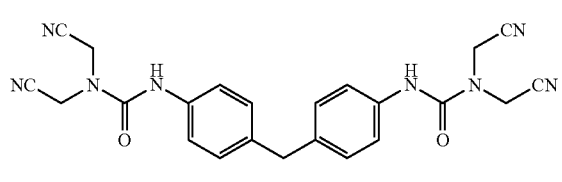

1-6

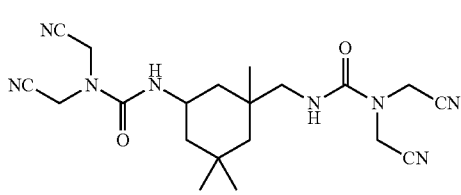

-continued
1-7
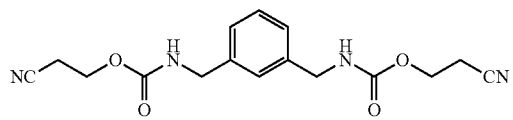
1-8
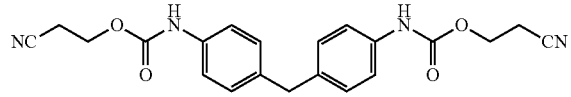
1-9
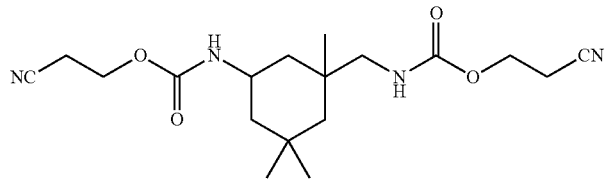
1-10
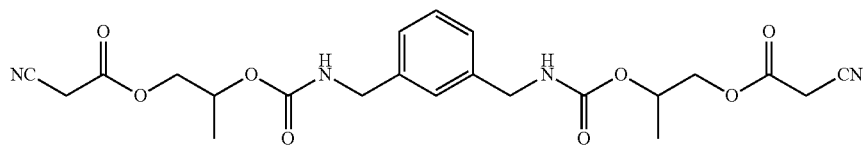
1-11
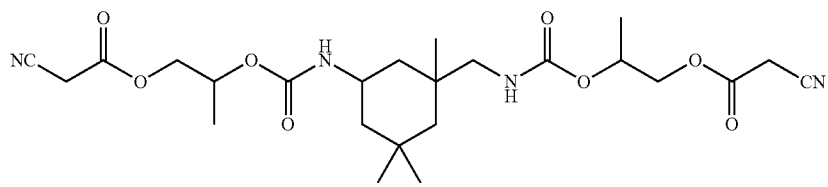
1-12
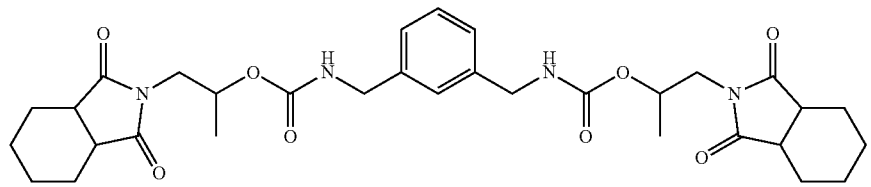
1-13
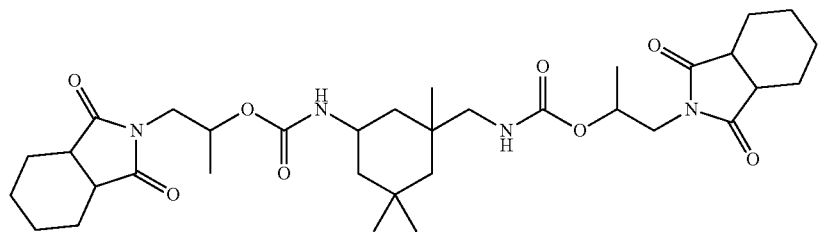
1-14
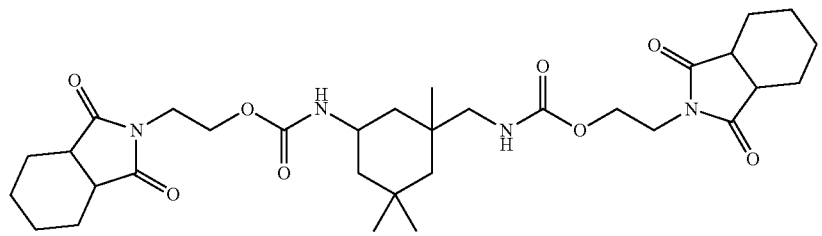
1-15
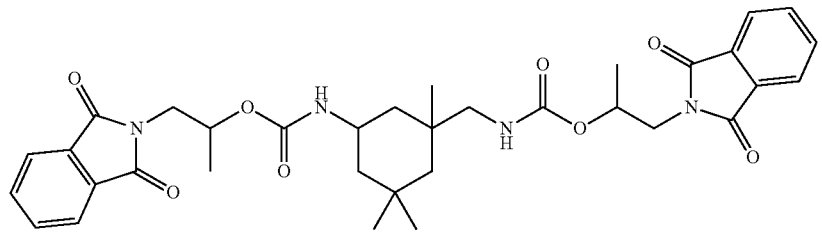

-continued

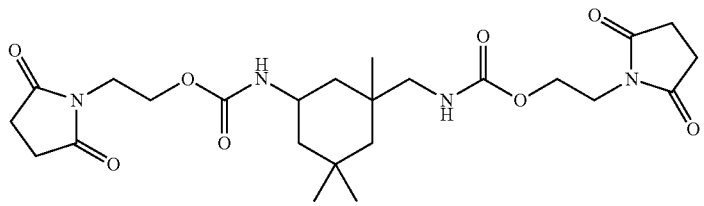

1-16

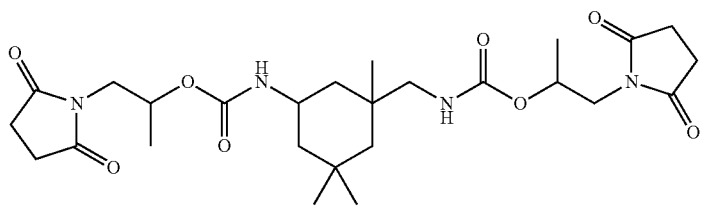

1-17

TABLE 2

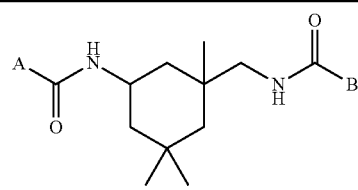

| Compound Number | A | B |
|---|---|---|
| 2-1-A | *—OCH$_2$CH$_2$OPh | *—N(CH$_3$)CH$_2$COOCH$_3$ |
| 2-2-A | *—OCH$_2$CH$_2$OPh | *—N(CH$_2$CH$_2$CN)$_2$ |
| 2-3-A | *—OCH$_2$CH$_2$OPh | *—N(CH$_2$CN)$_2$ |
| 2-4-A | *—OCH$_2$CH$_2$CN | *—N(CH$_2$CH$_2$CN)$_2$ |
| 2-5-A | *—OCH$_2$CH$_2$CN | *—N(CH$_2$CN)$_2$ |
| 2-6-A | *—OCH$_2$CH$_2$OPh | *—OCH$_2$CH$_2$CN |
| 2-1-B | *—N(CH$_3$)CH$_2$COOCH$_3$ | *—OCH$_2$CH$_2$OPh |

TABLE 2-continued

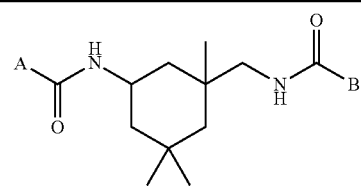

| Compound Number | A | B |
|---|---|---|
| 2-2-B | *—N(CH$_2$CH$_2$CN)$_2$ | *—OCH$_2$CH$_2$OPh |
| 2-3-B | *—N(CH$_2$CN)$_2$ | *—OCH$_2$CH$_2$OPh |
| 2-4-B | *—N(CH$_2$CH$_2$CN)$_2$ | *—OCH$_2$CH$_2$CN |
| 2-5-B | *—N(CH$_2$CN)$_2$ | *—OCH$_2$CH$_2$CN |
| 2-6-B | *—OCH$_2$CH$_2$CN | *—OCH$_2$CH$_2$OPh |

(In Table, Ph: Phenyl Group, and *: Bonding Position)

3-1

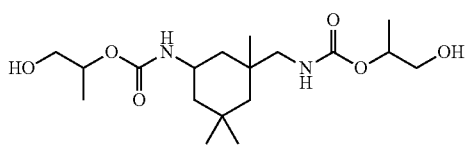

3-2

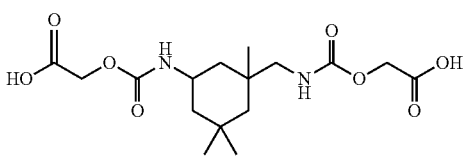

3-3

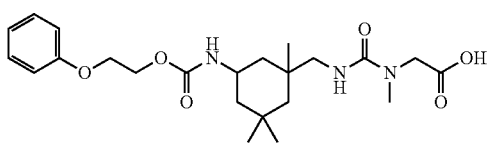

3-4

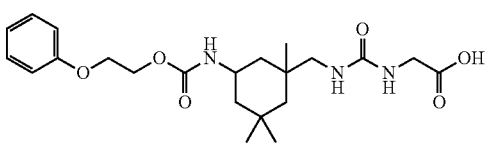

3-5

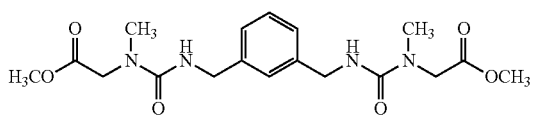

3-6

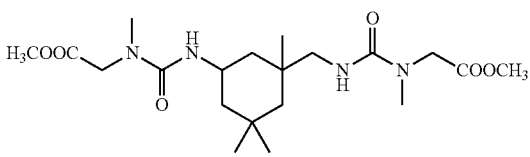

3-7
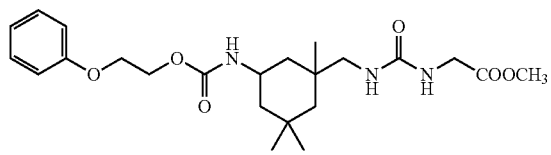
3-8
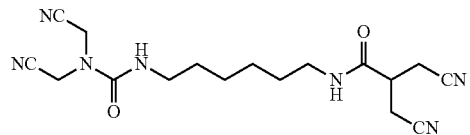
3-9
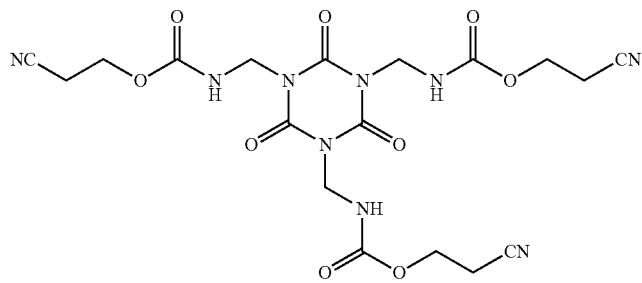
3-10
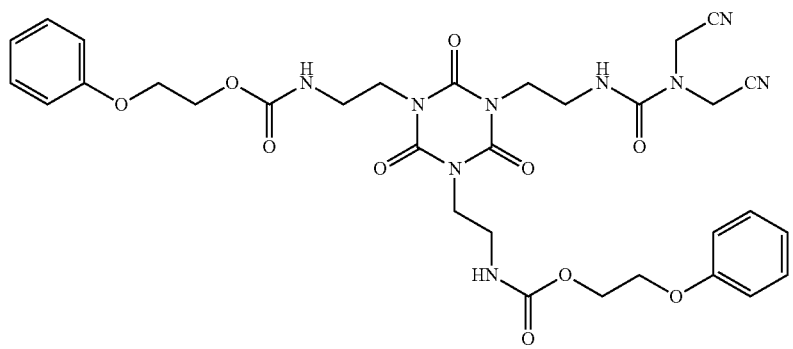
3-11
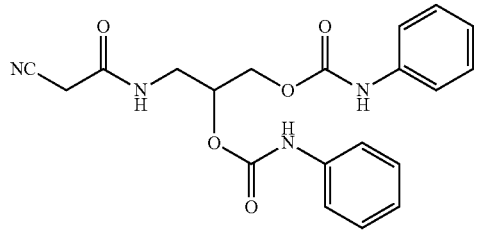
3-12
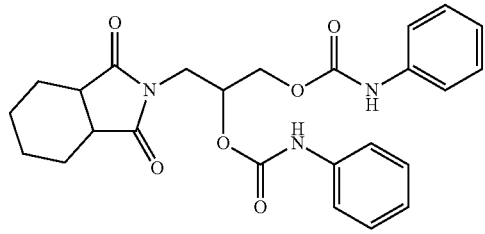
3-13
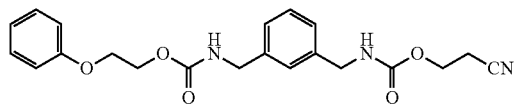
3-14
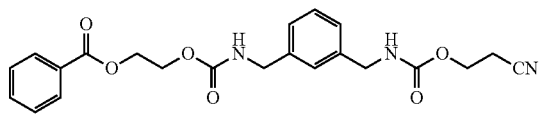
3-15
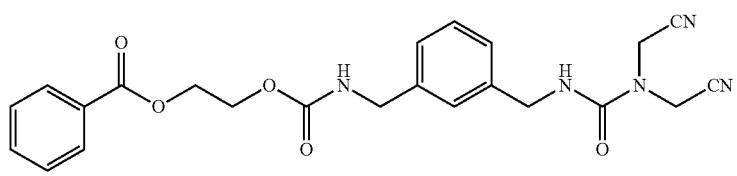
3-16
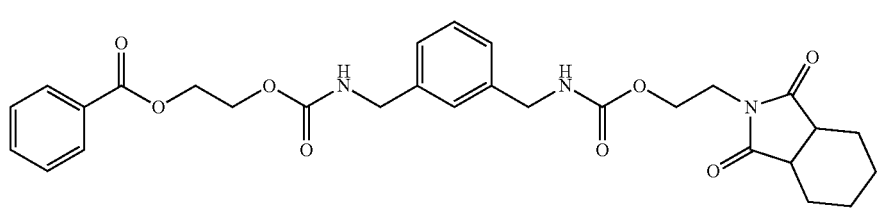

3-17
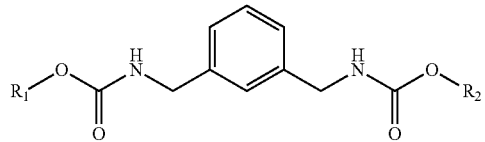
Mixture of
R₁, R₂ = —CH₂CH₂OPh,
—CH₂CH₂CN
3-18
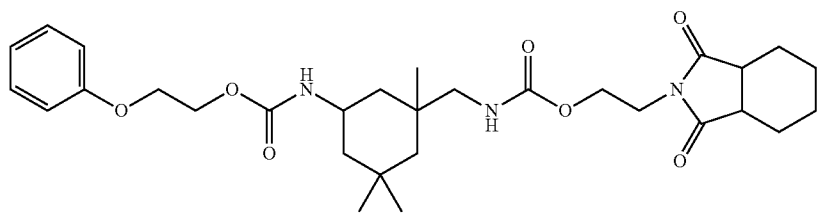
3-19
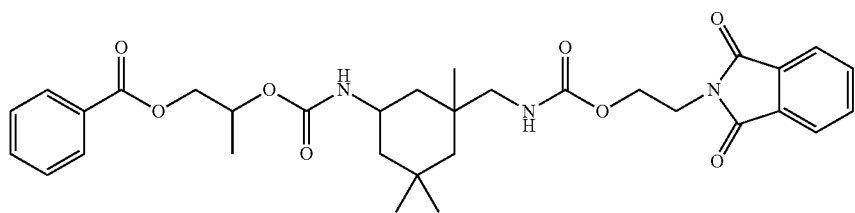
3-20
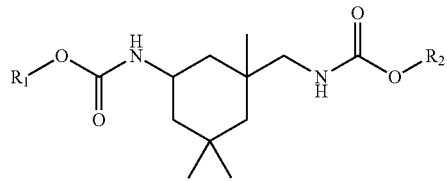
Mixture of
R₁, R₂ = —CH₂CH₂OPh,
—CH₂CH₂CN
3-21
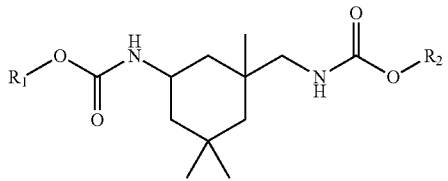
Mixture of
R₁, R₂ = —CH₂CH₂OPh,
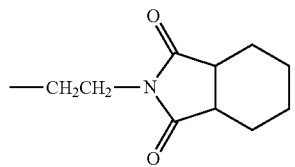
3-22
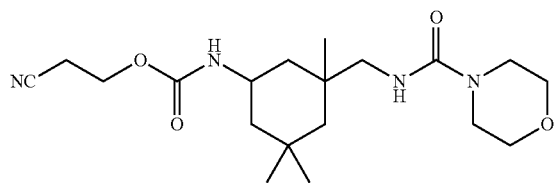

The compound denoted by General Formula (III) is able to be manufactured by a known method. The details thereof can be referred to the description with respect to the compounds denoted by General Formulas (I) and (A-100).

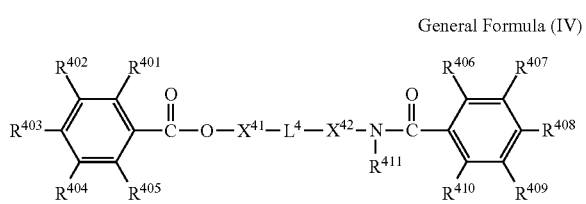

General Formula (IV)

[In General Formula (IV), $R^{401}$ to $R^{411}$ each independently represent a hydrogen atom or a substituent, $X^{41}$ and $X^{42}$ each independently represent a single bond or a divalent linking group, $L^4$ represents a single bond, —N($R^{412}$)—, or —C($R^{413}$)($R^{414}$)—, and $R^{412}$ to $R^{414}$ each independently represent a hydrogen atom or a substituent.]

$R^{401}$ to $R^{411}$ each independently represent a hydrogen atom or a substituent, preferably represent a hydrogen atom or a non-conjugated substituent, more preferably represent a hydrogen atom, a halogen atom, an alkyl group, an alkoxy group, an alkyl group substituted with a hydrogen atom, a fluorine atom, a chlorine atom, a fluorine atom, and/or a chlorine atom, a non-substitutional alkyl group, or an alkoxy group, even more preferably represent an alkyl group having 1 to 3 carbon atoms which is substituted with a hydrogen atom, a fluorine atom, a chlorine atom, a fluorine atom, and/or a chlorine atom, a non-substitutional alkyl group having 1 to 5 carbon atoms, or an alkoxy group having 1 to 3 carbon atoms, and particularly preferably represent a hydrogen atom, a methyl group, an ethyl group, a methoxy group, or an ethoxy group.

The non-conjugated substituent indicates a substituent which does not have a conjugative group. Examples of the conjugative group include a carbonyl group, an imino group, a vinyl group, a cyano group, a nitro group, an aromatic group, and the like. A hydrogen atom, a halogen atom, an alkyl group, and an alkoxy group is preferable as $R^8$, an alkyl group substituted with a hydrogen atom, a fluorine atom, a chlorine atom, a fluorine atom, and/or a chlorine atom, a non-substitutional alkyl group, and an alkoxy group are more preferable, an alkyl group having 1 to 3 carbon atoms which is substituted with a hydrogen atom, a fluorine atom, a chlorine atom, a fluorine atom, and/or a chlorine atom, a non-substitutional alkyl group having 1 to 5 carbon atoms, and an alkoxy group having 1 to 3 carbon atoms are even more preferable, and a hydrogen atom, a methyl group, an ethyl group, a methoxy group, and an ethoxy group are particularly preferable.

$X^{41}$ and $X^{42}$ each independently represent a single bond or a divalent linking group. It is preferable that the linking group is an aliphatic linking group. The aliphatic linking group indicates a non-aromatic group which essentially has a carbon atom. Specifically, an aliphatic hydrocarbon group (for example, an alkylene group, an alkynylene group, or an alkenylene group), or a group formed of a combination between an aliphatic hydrocarbon group and other groups is exemplified, and an aliphatic hydrocarbon group, or a group formed of a combination between an aliphatic hydrocarbon group and at least one of —O—, —C(=O)—, or —S— is exemplified. An alkylene group, or a group formed of a combination between an alkylene group and —O— is more preferable, the alkylene group is even more preferable, and a non-substitutional alkylene group is particularly preferable. It is preferable that the number of carbon atoms included in the aliphatic linking group is 1 to 3.

$L^4$ represents a single bond, —N($R^{412}$)—, or —C($R^{413}$)($R^{414}$)—, and $R^{412}$ to $R^{414}$ each represent a hydrogen atom or a substituent.

It is preferable that $R^{412}$ is a hydrogen atom or a non-conjugated substituent. $R^{412}$ as the substituent preferably represents a hydrogen atom, an alcohol group, an alkyl group, and a group denoted by General Formula (IV-iv) described below, more preferably represents a hydrogen atom a primary alcohol group having 1 to 3 carbon atoms, an alkyl group having 1 to 5 carbon atoms, and a group denoted by General Formula (IV-iv) described below, even more preferably represents a group denoted by General Formula (IV-iv) described below, and particularly preferably represents a hydrogen atom.

It is preferable that $R^{413}$ and $R^{414}$ each independently represent a hydrogen atom or a non-conjugated substituent.

$R^{413}$ and $R^{414}$ as the substituent each more preferably represent a hydrogen atom an alcohol group, an alkyl group, a hydroxyl group, a group denoted by General Formula (IV-ii) described below, and a group denoted by General Formula (IV-iii) described below, and even more preferably represent a hydrogen atom, a primary alcohol group having 1 to 3 carbon atoms, an alkyl group having 1 to 5 carbon atoms, a hydroxyl group, a group denoted by General Formula (IV-ii) described below, and a group denoted by General Formula (IV-iii) described below.

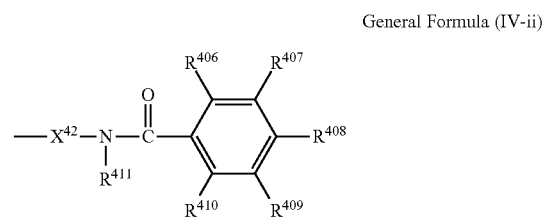

General Formula (IV-ii)

(In General Formula (IV-ii), $R^{406}$ to $R^{411}$, and $X^{42}$ are each identical to $R^{406}$ to $R^{411}$, and $X^{42}$ in General Formula (IV).)

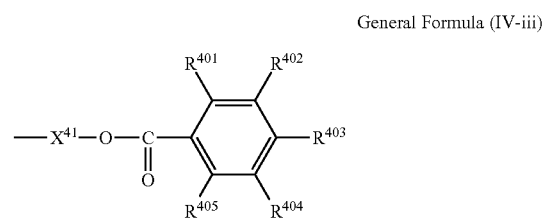

General Formula (IV-iii)

(In General Formula (IV-iii), $R^{401}$ to $R^{405}$, and $X^{41}$ are each identical to $R^{401}$ to $R^{405}$, and $X^{41}$ in General Formula (IV).)

General Formula (IV-iv)
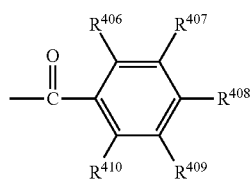
(In General Formula (IV-iv), $R^{406}$ to $R^{411}$ are each identical to $R^{406}$ to $R^{411}$ in General Formula (IV).)
Hereinafter, specific examples of a compound denoted by General Formula (IV) will be exemplified, but the present invention is not limited thereto.
1
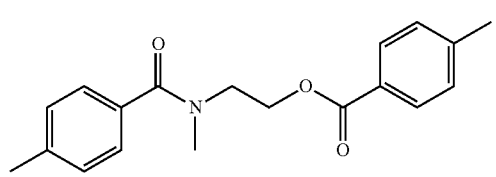
2
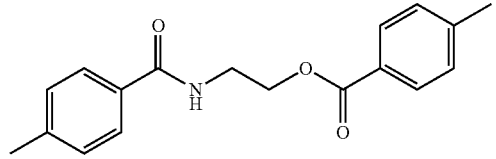
3
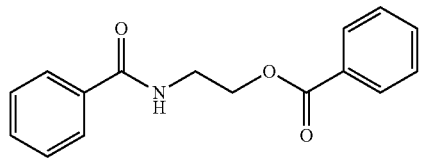
4
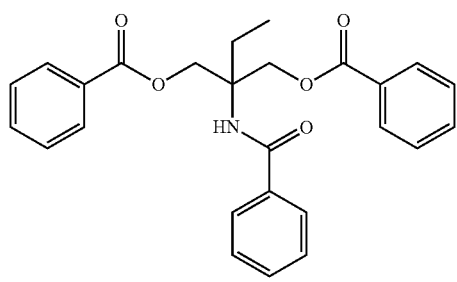
5
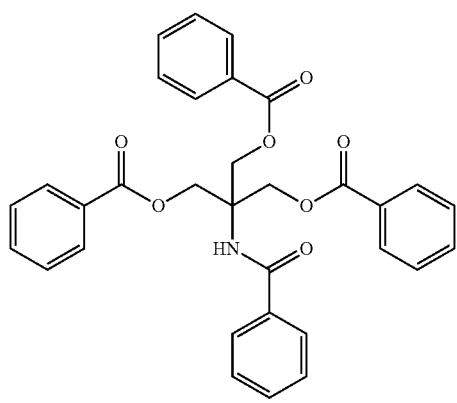
6
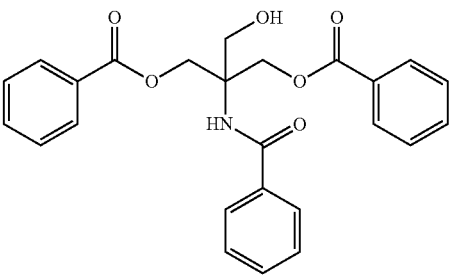
7
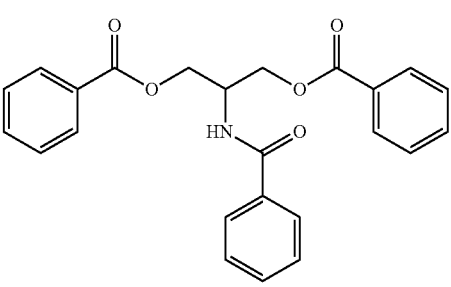
8
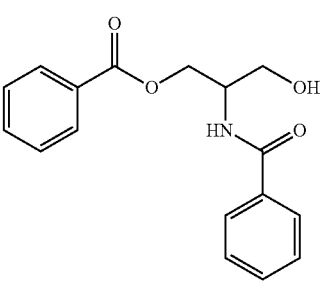
9
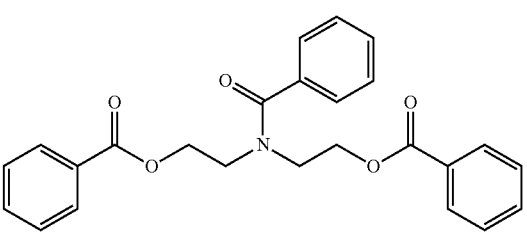
10
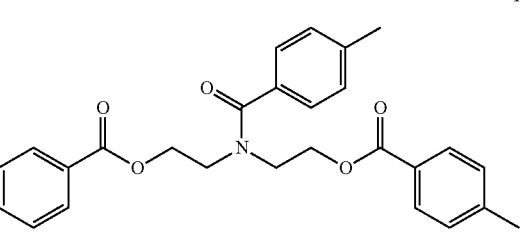
11
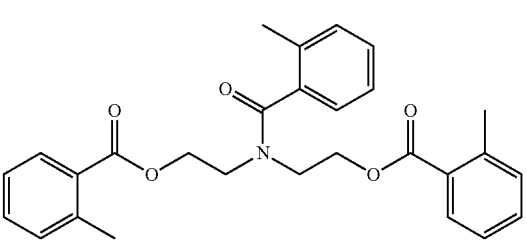

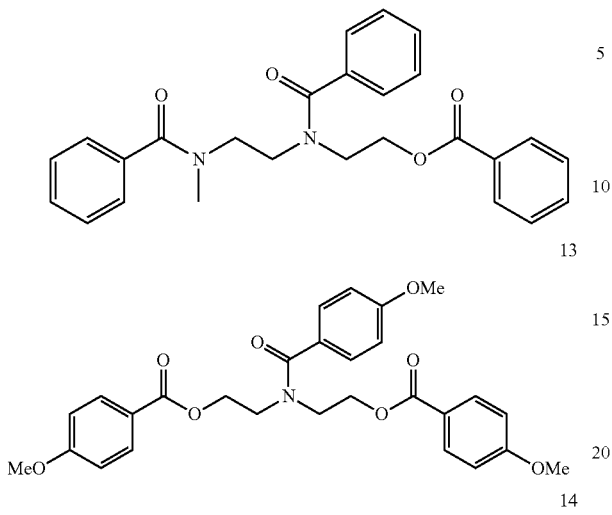
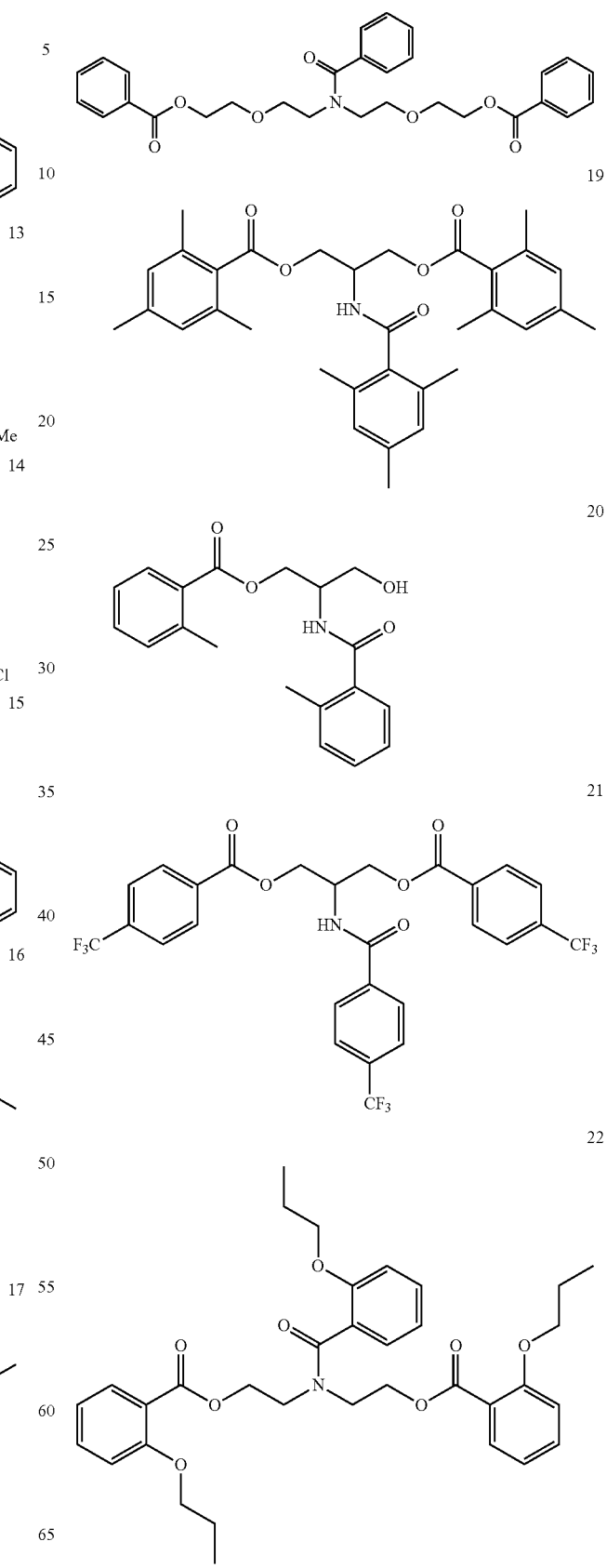

-continued
23
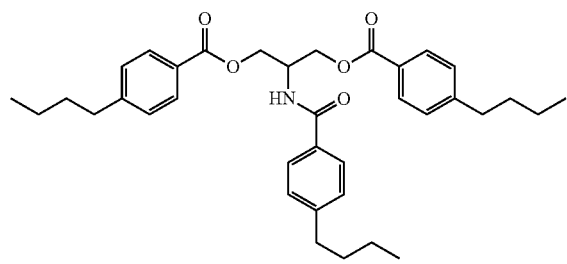
24
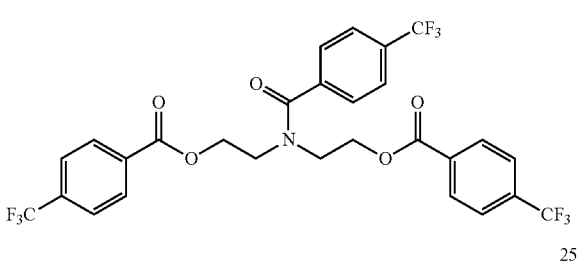
25
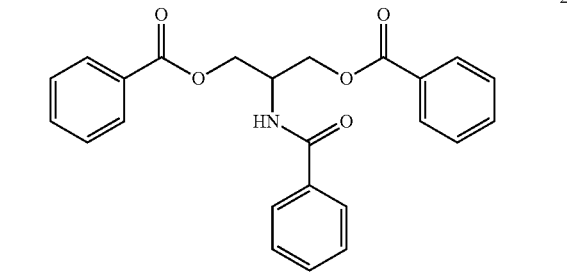
26
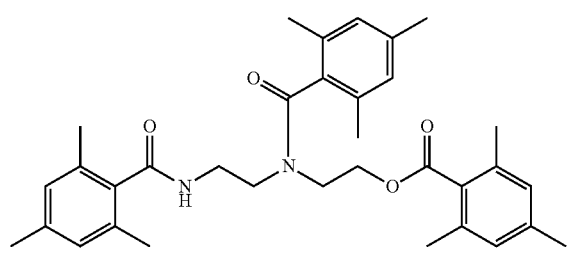
27
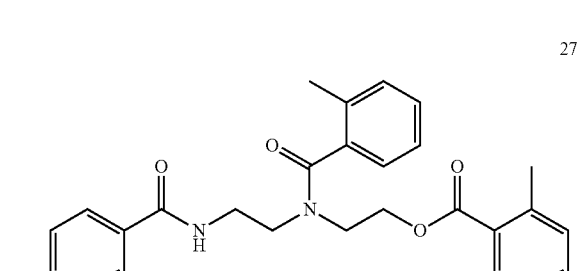
28
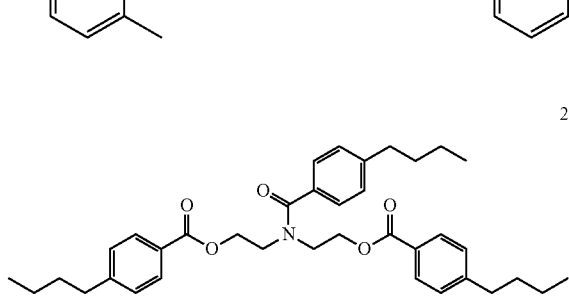
-continued
29
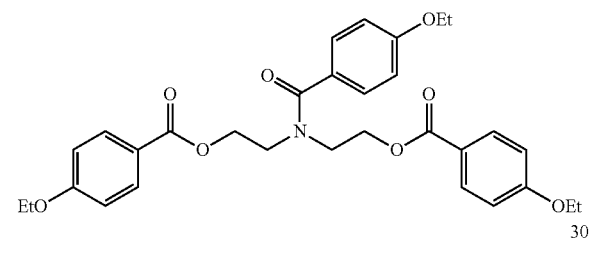

-continued

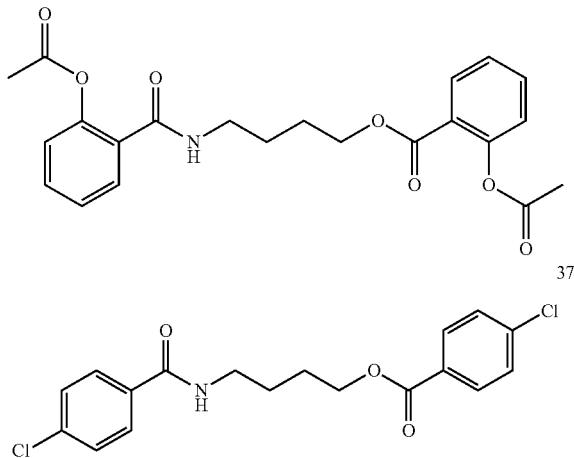

36

37

The compound denoted by General Formula (IV) is able to be easily manufactured by a known method.

General Formula (V)

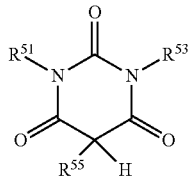

[In General Formula (V) $R^{51}$ and $R^{53}$ each independently represent a hydrogen atom, an alkyl group having 1 to 20 carbon atoms, a cycloalkyl group having 3 to 20 carbon atoms, an alkenyl group having 2 to 20 carbon atoms, or an aromatic group having 6 to 20 carbon atoms, $R^{55}$ represents a hydrogen atom, a non-substitutional alkyl group having 1 to 20 carbon atoms, a cycloalkyl group having 3 to 20 carbon atoms, an alkenyl group having 2 to 20 carbon atoms, or a aralkyl group denoted by General Formula (VI) described below, and the total number of cyclic structures existing in $R^{51}$, $R^{53}$, and $R^{55}$ is 1 or 2.]

*-$L^{55}$-$Ar^{55}$    General Formula (VI):

[In General Formula (VI), $L^{55}$ represents an alkylene group having 1 to 20 carbon atoms, $Ar^{55}$ represents an aromatic group having 6 to 20 carbon atom s, and * represents a position linked to the cyclic structure of General Formula (V).]

A compound denoted by General Formula (V) is a compound having a barbituric acid structure, and has an NRCO structure in at least a barbituric acid structure.

The number of carbon atoms of the alkyl group represented by $R^{51}$ and $R^{53}$ in General Formula (V) is preferably in a range of 1 to 10, is more preferably in a range of 1 to 5, and is even more preferably in a range of 1 to 3, and a methyl group or an ethyl group is particularly preferable as the alkyl group represented by $R^{51}$ and $R^{53}$ in General Formula (V).

The number of carbon atoms of the cycloalkyl group represented by $R^{51}$ and $R^{53}$ is preferably in a range of 3 to 10, and is more preferably 5 or 6. Examples of the cycloalkyl group include a cyclopropyl group, a cyclopentyl group, and a cyclohexyl group, and the cyclohexyl group is particularly preferable.

The number of carbon atoms of the alkenyl group represented by $R^{51}$ and $R^{53}$ is preferably in a range of 2 to 10, and is more preferably in a range of 2 to 5.

The number of carbon atoms of the aromatic group represented by $R^{51}$ and $R^{53}$ is preferably in a range of 6 to 12, and is more preferably in a range of 6 to 10.

The aromatic group represented by $R^{51}$ and $R^{53}$ may be an aromatic hydrocarbon group, or may be an aromatic heterocyclic group, and the aromatic hydrocarbon group is preferable. A phenyl group and a naphthyl group are preferable as the aromatic hydrocarbon group, and the phenyl group is more preferable.

It is more preferable that $R^{51}$ and $R^{53}$ are each independently a hydrogen atom, an alkyl group having 1 to 20 carbon atoms, a cycloalkyl group, or an aromatic group having 6 to 20 carbon atoms, it is even more preferable that any one of $R^{51}$ and $R^{53}$ is an alkyl group having 1 to 20 carbon atoms, a cycloalkyl group, or an aromatic hydrocarbon group having 6 to 20 carbon atoms, and it is still more preferable that any one of $R^{51}$ and $R^{53}$ is an aromatic hydrocarbon group having 6 to 20 carbon atoms.

Here, each group of $R^{51}$ and $R^{53}$ may have a substituent. Examples of the substituent are able to include the substituents exemplified in the group T of the substituents described above. In addition, the substituent that $R^{51}$ and $R^{53}$ are able to have may further have the same substituent or different substituents. Examples of such a substituent are able to include the substituents exemplified in the group T of the substituents described above. An alkyl group, an aryl group, an alkoxy group, an acyl group, and a halogen atom are preferable as the substituent that $R^{51}$ and $R^{53}$ are able to have, and the alkyl group, the aryl group, the alkoxy group, and the acyl group are more preferable.

The cycloalkyl group and the alkenyl group represented by $R^{55}$ are identical to the cycloalkyl group and the alkenyl group represented by $R^{51}$ and $R^{53}$, and preferred ranges thereof are also identical to those of the cycloalkyl group and the alkenyl group represented by $R^{51}$ and $R^{53}$.

The non-substitutional alkyl group represented by $R^{55}$ is identical to the alkyl group represented by $R^{51}$ and $R^{53}$ except that the non-substitutional alkyl group represented by $R^{55}$ does not have a substituent, and the number of carbon atoms of the non-substitutional alkyl group represented by $R^{55}$ is preferably in a range of 1 to 10, is more preferably in a range of 1 to 5, and is even more preferably in a range of 1 to 4.

$R^{55}$ is able to be the aralkyl group denoted by General Formula (VI) described above. The total number of carbon atoms of the aralkyl group denoted by General Formula (VI) is preferably less than or equal to 21, and is preferably in a range of 7 to 20.

In General Formula (VI), the number of carbon atoms of the alkylene group of $L^{55}$ is preferably in a range of 1 to 10, is more preferably in a range of 1 to 6, is even more preferably 1 or 2, and is particularly preferably 1.

Here, $L^{55}$ may have a substituent. Examples of the substituent include the group T of the substituents described above. An alkyl group, a cycloalkyl group, an alkenyl group, or an aromatic group is preferable as the substituent which may be substituted for the alkylene group represented by $L^{55}$. Furthermore, the substituent which may be substituted for the alkylene group of $L^{55}$, for example, may have the group T of the substituents. Examples of such a substituent include an alkyl group substituted with one or more alkyl carbonyl groups (for example, included in compounds (18) and (19) exemplified below), and an alkyl group substituted with a benzoyl group, and specifically, a phenacyl group (a benzoyl methyl group).

$L^{55}$ is able to be preferably denoted by Formula (I) described below.

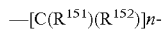
—[C($R^{151}$)($R^{152}$)]$n$-   Formula (I):

In Formula (I), $R^{151}$ and $R^{152}$ each independently represent a hydrogen atom, an alkyl group having 1 to 19 carbon atoms, a cycloalkyl group having 3 to 19 carbon atoms, an alkenyl group having 2 to 19 carbon atoms, or an aromatic group having 6 to 19 carbon atoms. n represents an integer of 1 to 20.

The alkyl group, the cycloalkyl group, the alkenyl group, and the aromatic group represented by $R^{151}$ and $R^{152}$ are each identical to the alkyl group, the cycloalkyl group, the alkenyl group, and the aromatic group represented by $R^{51}$ and $R^{53}$, and preferred ranges thereof are also identical to those of the alkyl group, the cycloalkyl group, the alkenyl group, and the aromatic group represented by $R^{51}$ and $R^{53}$. It is preferable that $R^{151}$ and $R^{152}$ are each independently a hydrogen atom, an alkyl group having 1 to 19 carbon atoms, and an aromatic group having 6 to 19 carbon atoms, and it is more preferable that at least one of $R^{151}$ or $R^{152}$ is a hydrogen atom. Specifically, it is even more preferable that $R^{151}$ is a hydrogen atom, $R^{152}$ is a hydrogen atom, an alkyl group having 1 to 19 carbon atoms, and an aromatic group having 6 to 19 carbon atoms, $R^{151}$ is a hydrogen atom, and $R^{152}$ is a hydrogen atom or an aromatic group having 6 to 19 carbon atoms, and it is particularly preferable that both of $R^{151}$ and $R^{152}$ are a hydrogen atom.

In Formula (I), in a case where n is an integer of 2 to 20, n $R^{151}$'s and n $R^{152}$'s included in $L^{55}$ denoted by Formula (I) may be identical to or different from each other, and it is preferable that at least one of $R^{151}$ or $R^{152}$ is a hydrogen atom.

$L^{55}$ may be a branched alkylene group or a straight chain alkylene group in which at least one of $R^{151}$ or $R^{152}$ is an alkyl group having 1 to 19 carbon atoms, and the straight chain alkylene group is preferable. Examples of a suitable straight chain alkylene group include an alkylene group in which both of $R^{151}$ and $R^{152}$ in Formula (I) described above are a hydrogen atom. In a case where $L^{55}$ is the straight chain alkylene group, $Ar^{55}$ is bonded to the terminal of the alkylene group of $L^{55}$.

n is preferably an integer in a range of 1 to 10, is more preferably an integer in a range of 1 to 5, is even more preferably an integer in a range of 1 to 3, and is particularly preferably 1 or 2. It is preferable that the alkylene group of $L^{55}$ denoted by Formula (I) having particularly preferred n is an alkylene group linking through one or two carbon atoms, that is, a methylene group or an ethylene group, and $Ar^{55}$ is linked to the cyclic structure of General Formula (V) through the methylene group or the ethylene group.

In General Formula (VI), the aromatic group having 6 to 20 carbon atoms represented by $Ar^{55}$ is identical to the aromatic group of $R^{51}$ and $R^{53}$, and a preferred range thereof is also identical to that of the aromatic group of $R^{51}$ and $R^{53}$.

The aromatic group of $Ar^{55}$ may have a substituent, and examples of the substituent include the substituents exemplified in the group T of the substituents described above.

Among the substituents that the aromatic group of $Ar^{55}$ may have, a substituent having a negative Hammett's substituent constant σp is preferable from the viewpoint of enabling all of $R^{55}$'s to satisfy Hammett's conditions described below.

Among the substituents that the aromatic group may have, examples of a preferred substituent include an alkyl group having 1 to 4 carbon atoms which may have a substituent, a cycloalkyl group having 3 to 6 carbon atoms, an alkoxy group having 1 to 6 carbon atoms, an amino group, and the like. More specifically, examples of a preferred substituent include a methyl group (σp: −0.17, and σm: −0.07), an ethyl group (σp: −0.15, and σm: −0.07), an n-propyl group (σp: −0.13, and σm: −0.06), an n-butyl group (σp: −0.16, and σm: −0.08), a cyclohexyl group (σp: −0.15, and σm: −0.05), a benzyl group (σp: −0.09, and σm: −0.08), a phenethyl group (σp: −0.12, and σm: −0.07), a phenyl group (σp: −0.01, and σm: 0.06), a methoxy group (σp: −0.27, and σm: 0.12), an ethoxy group (σp: −0.24, and σm: 0.10), a phenoxy group (σp: −0.03, and σm: 0.25), a dimethyl amino group (σp: −0.83, and σm: −0.16), a methyl amino group (σp: −0.70, and σm: −0.21), a methoxy carbonyl amino group (σp: −0.17, and σm: −0.02), a hydroxy group (σp: −0.37, and σm: 0.12), a styryl group (σp: −0.07, and σm: 0.03), and the like. Among them, a substituent which does not have a cyclic structure is preferable as the substituent that the aromatic group may have.

Furthermore, in the above description, the Hammett's substituent constants σp and σm indicate a value disclosed in Chemical Review, Vol. 91, pp. 165 to 195 (1991).

Hammett's rule is empirical rule proposed by L. P. Hammett in 1935 in order to quantitatively discuss the influence of a substituent on a reaction or equilibrium of a benzene derivative, and currently, the validity thereof has been widely accepted. The substituent constant which is required for the Hammett's rule includes a σp value and a σm value, and the values are able to be found in plenty of general documents, and for example, are described in "Lange's Handbook of Chemistry" edited by J. A. Dean, The 12-th Edition, 1979 (McGraw-Hill) or "Range of Chemistry", Extra Edition, No. 122, pp. 96 to 103, 1979 (Nankodo Co., Ltd.). Furthermore, in the above description, the Hammett's substituent constant σp of each substituent is described, and the Hammett's substituent constant σp is not limited to a substituent having a known literature value which is able to be found in the documents described above, but includes a substituent in the range of a value which is obtained in a case of being measured on the basis of the Hammett's rule even in a case where the value is not the known literature value.

Examples suitable as the aralkyl group denoted by General Formula (VI) include a benzyl group or a phenethyl group in which at least one hydrogen atom of $L^{55}$ may be substituted with the substituent exemplified in the group T of the substituents and/or at least one hydrogen atom of $Ar^{55}$ may be substituted with the substituent described above having a negative substituent constant σp, and a non-substitutional benzyl group or a non-substitutional phenethyl group is more preferable, and the non-substitutional benzyl group is particularly preferable.

In particular, it is preferable that $R^{55}$ in General Formula (V) is a group in which both of the Hammett's substituent constants σp and σm are negative. Examples of the group in which both of the Hammett's substituent constants σp and σm are negative include the substituents described as the substituent substituted for the aromatic group of $Ar^{55}$.

Examples of such $R^{55}$ include a non-substitutional alkyl group having 1 to 4 carbon atoms, a non-substitutional cycloalkyl group having 4 to 6 carbon atoms, a aralkyl group having 7 to 14 carbon atoms, and the like. Specifically, a methyl group, an ethyl group, an n-propyl group, an n-butyl group, a cyclohexyl group, a benzyl group, a phenethyl group, a t-butyl group (σp: −0.20, and σm: −0.10), an iso-propyl group (σp: −0.15, and σm: −0.04), and the like, and the methyl group, the ethyl group, the n-propyl group, the n-butyl group, the cyclohexyl group, the benzyl group, and the phenethyl group are preferable. Furthermore, the aralkyl group having 7 to 14 carbon atoms may have a substituent insofar as the substituent is a substituent in which $R^{55}$ is able to maintain negative substituent constants σp and σm.

The compound denoted by General Formula (V) has a cyclic structure in which the total number of $R^{51}$, $R^{53}$, and $R^{55}$ is 1 or 2, and preferably has a cyclic structure in which the total number of $R^{51}$'s, $R^{53}$'S, and $R^{55}$'s is 2. In addition, the compound denoted by General Formula (V) may have a cyclic structure in which the number of only $R^{55}$'s is 1 or 2, or may have a cyclic structure in which the number of any one of $R^{51}$'s and $R^{53}$'s is 1 in addition to one $R^{55}$. The compound denoted by General Formula (V) has an aromatic ring structure in which the number of $R^{53}$'s and $R^{55}$'s are each one from the viewpoint of the dissolution stability at the time of forming a film.

In General Formula (V), "having a cyclic structure in which the total number of $R^{51}$'s, $R^{53}$'s, and $R^{55}$'s is 1 or 2" includes a case where the basic skeleton itself of the substituent of $R^{51}$, $R^{53}$, or $R^{55}$ has a cyclic structure, and a case where a substituent included in $R^{51}$, $R^{53}$, or $R^{55}$ has a cyclic structure.

A saturated cyclic hydrocarbon structure or an aromatic ring structure (an aromatic hydrocarbon structure or an aromatic heterocyclic structure) is preferable as the cyclic structure described above, and it is preferable at least one thereof is an aromatic ring structure. In addition, the cyclic structure described above may be a condensed ring structure.

In a case where the cyclic structure described above is a cyclic saturated hydrocarbon structure, it is preferable that the cyclic saturated hydrocarbon structure exists as an cycloalkyl group having 3 to 20 carbon atoms. More specifically, it is more preferable that the cyclic saturated hydrocarbon structure exists as a cyclopropyl group, a cyclopentyl group, or a cyclohexyl group, and it is particularly preferable that the cyclic saturated hydrocarbon structure exists as a cyclohexyl group.

In addition, in a case where the cyclic structure described above is an aromatic ring structure, it is preferable that the aromatic ring structure is an aromatic hydrocarbon structure. It is preferable that the aromatic hydrocarbon structure described above exists as an aryl group having 6 to 20 carbon atoms. More specifically, it is more preferable that the aromatic hydrocarbon structure described above exists as a phenyl group and a naphthyl group, and it is particularly preferable that the aromatic hydrocarbon structure described above exists as a phenyl group.

In the compound denoted by General Formula (V), examples of a preferred compound are as follows.

(1) A compound in which $R^{55}$ is the aralkyl group denoted by General Formula (VI) or a cycloalkyl group, at least one of $R^{51}$ or $R^{53}$ is a group having a cycloalkyl group or an aromatic group, and the group having a cycloalkyl group or an aromatic group is preferably a cycloalkyl group or an aromatic group.

(2) A compound in which $R^{55}$ is a non-substitutional alkyl group, both of $R^{51}$ and $R^{53}$ are a group having a cycloalkyl group or an aromatic group, and the group having a cycloalkyl group or an aromatic group is preferably a cycloalkyl group or an aromatic group.

Hereinafter, specific examples of the compound denoted by General Formula (V) will be described, but the present invention is not limited thereto.

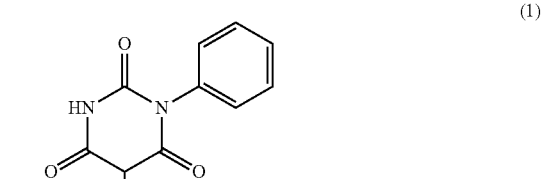

(1)

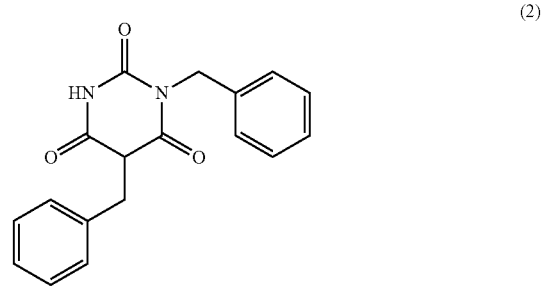

(2)

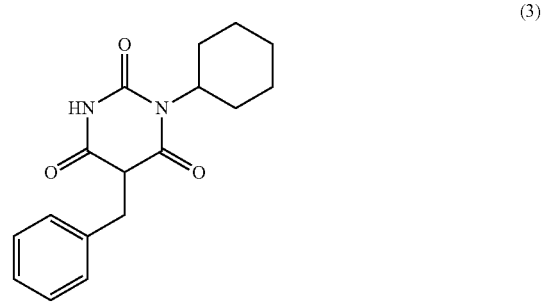

(3)

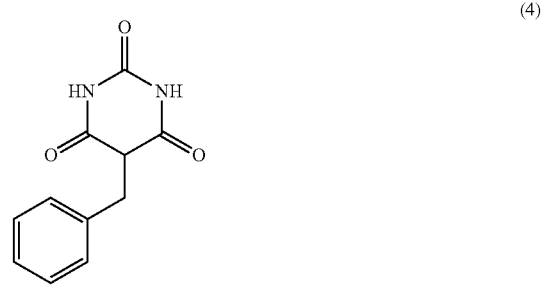

(4)

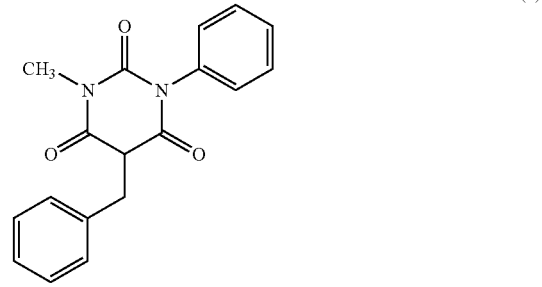

(5)

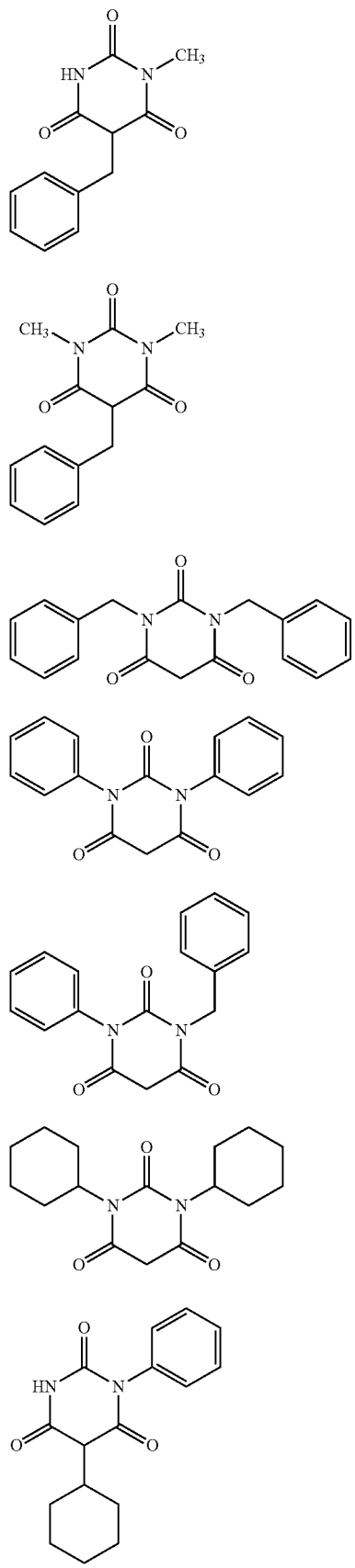
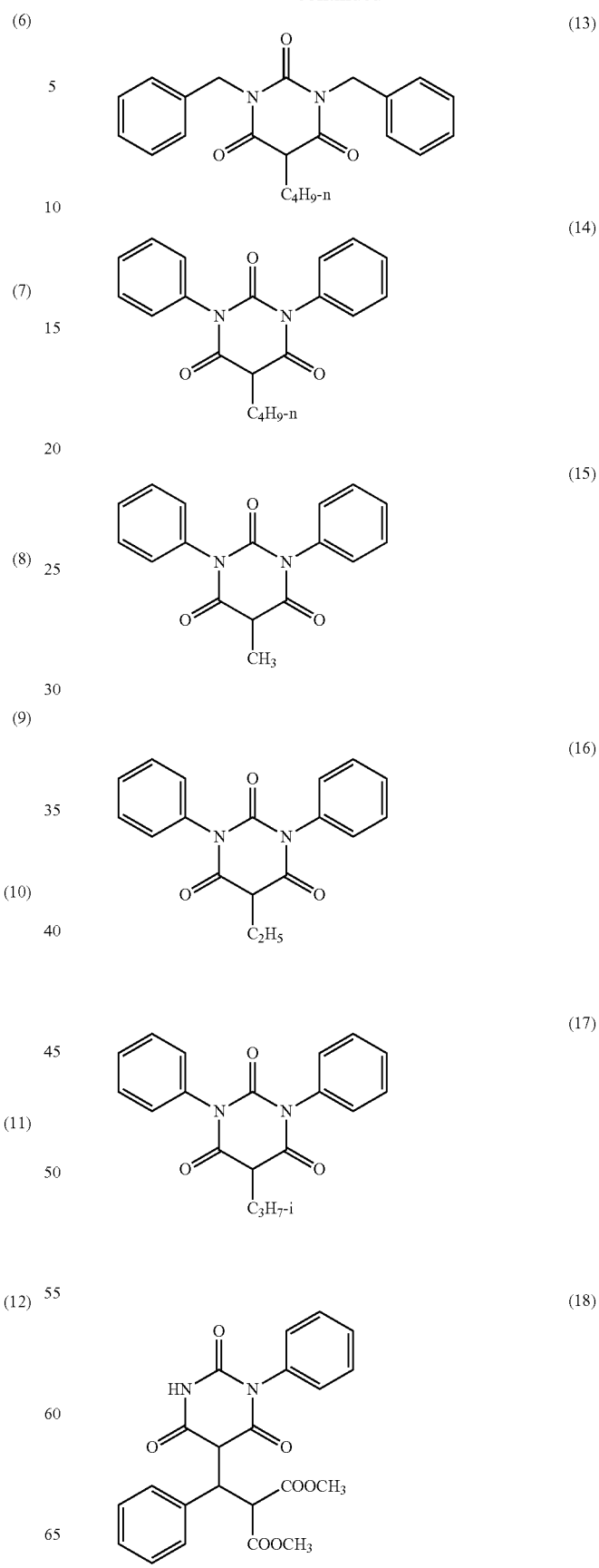

(19)
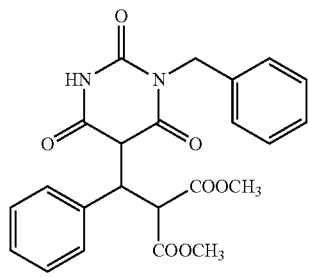
(20)
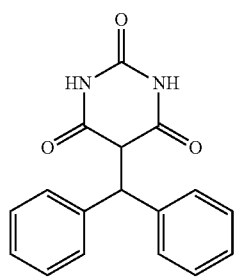
(21)
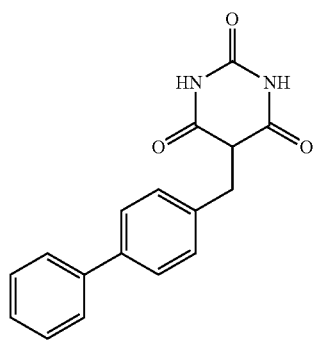
(22)
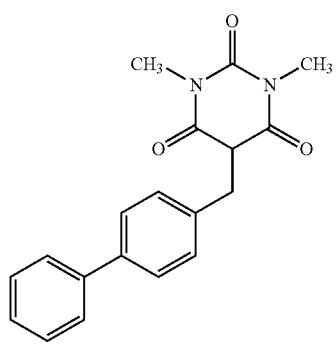
(23)
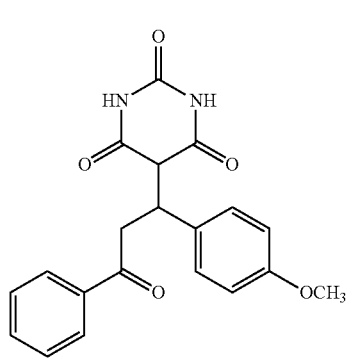
(24)
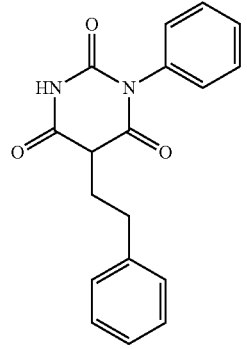
(25)
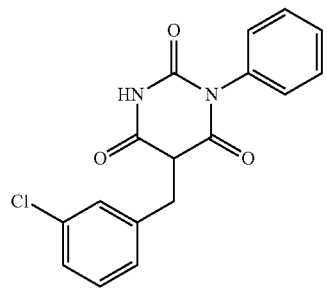
(26)
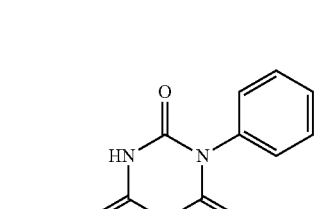
(27)
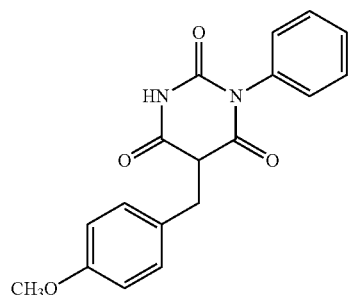
(28)
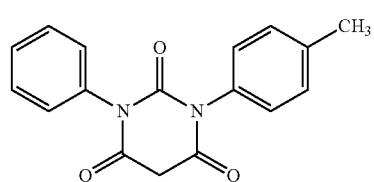

(29) 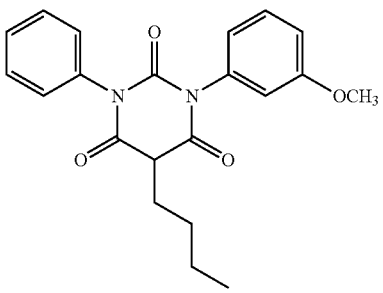

(30) 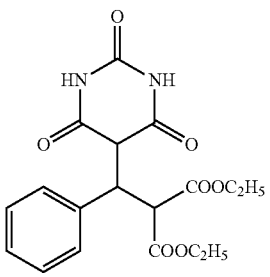

(31) 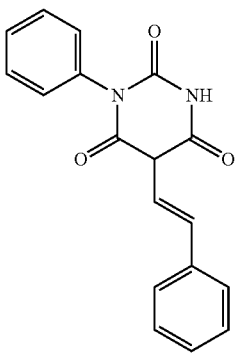

(32) 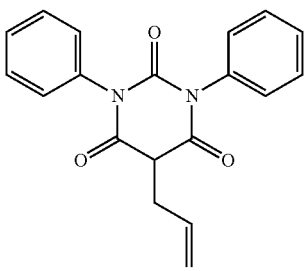

(33) 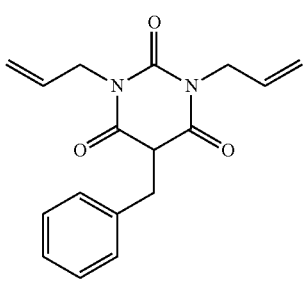

(34) 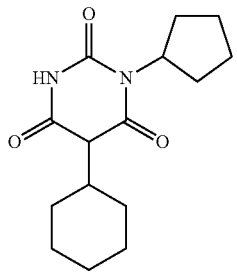

(35) 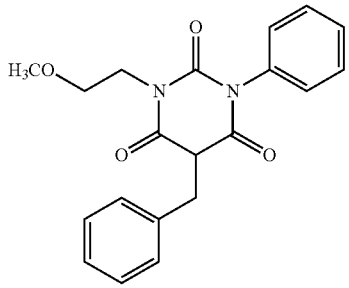

The compound denoted by General Formula (V), for example, is able to be synthesized by using a synthesis method of a barbituric acid in which a urea derivative and a malonic acid derivative are condensed. The barbituric acid having two substituents on a nitrogen atom is able to be obtained by heating N,N'-disubstitutional urea and malonic acid chloride, or by mixing and heating a malonic acid and an activating agent such as an acetic anhydride. For example, methods disclosed in Journal of the American Chemical Society, Vol. 61, p. 1015 (1939), Journal of Medicinal Chemistry, Vol. 54, p. 2409 (2011), Tetrahedron Letters, Vol. 40, p. 8029 (1999), the pamphlet of WO2007/150011A, and the like are able to be preferably used as the synthesis method.

Here, the malonic acid to be used in the condensation may be a non-substitutional malonic acid, or may have a substituent, and insofar as a malonic acid having a substituent corresponding to $R^{55}$ is used, the compound denoted by General Formula (V) is able to be synthesized by forming a barbituric acid structure. In addition, in a case where a non-substitutional malonic acid and an urea derivative are condensed, a barbituric acid structure in which a 5-position is non substituted is able to be obtained, and thus, the compound denoted by General Formula (V) is able to be synthesized by modifying the barbituric acid structure.

Here, the synthesis method of the compound denoted by General Formula (V) is not limited to the methods described above, but a known method is able to be used without any limitation.

$(A^{71})_{nb}\text{-}L^7\text{-}(A^{72})_{nc}$  General Formula (VII)

[In General Formula (VII), $L^7$ represents an (nb+nc)-valent linking group in which the number of atoms linking $A^{71}$-$A^{72}$ is less than or equal to 8. Here, nb+nc represents an integer of greater than or equal to 2, nb represents an integer of greater than or equal to 1, and nc represents an integer of greater than or equal to 0. $A^{71}$ represents a group denoted by General Formula (VIII) described below, and $A^{72}$ represents a group denoted by General Formula (VIII) described below or a group denoted by General Formula (IX) described below.]

In General Formula (VII), $L^7$ represents an (nb+nc)-valent linking group in which the number of atoms linking $A^{71}$-$A^{72}$ is less than or equal to 8. The present inventors have assumed that a molecular structure becomes relatively smaller by setting the number of atoms linking $A^{71}$-$A^{72}$ to be less than or equal to 8, and thus, the molecular structure mutually interacts with an ester bond of cellulose ester, or a local portion or a molecular chain of a hydroxyl group or the like in the cellulose ester, and is able to reduce the free volume existing in the cellulose ester, and as a result thereof, the scratch resistance hardness of the film is able to be improved. An (nb+nc)-valent linking group in which the number of atoms linking $A^{71}$-$A^{72}$ is less than or equal to 5 is preferable as $L^7$, and (nb+nc)-valent linking group in which the number of atoms linking $A^{71}$-$A^{72}$ is greater than or equal to 2 and less than or equal to 5 is more preferable.

Here, the number of atoms linking $A^{71}$-$A^{72}$ indicates the number of shortest atoms linking $A^{71}$-$A^{72}$, and in a case where a plurality of $L^7$'s exist in the same molecule, the number of atoms linking $A^{71}$-$A^{72}$ is obtained by counting the number of atoms in the longest linking group. For example, in the following compound, the number of atoms linking $A^{71}$-$A^{72}$ is 2.

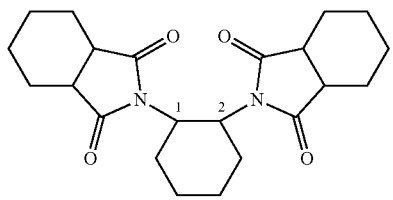 [SMILES: O=C1C2CCCCC2C(=O)N1C1CCCCC1N1C(=O)C2CCCCC2C1=O]

It is preferable that $L^7$ has at least one of tertiary carbon or quaternary carbon. According to such a configuration, a mutual interaction with respect to cellulose ester further increases, and thus, the scratch resistance of the film tends to be further improved.

It is preferable that $L^7$ is a group having at least one of a straight chain aliphatic group, a branched aliphatic group, a cyclic aliphatic group, or an aromatic group, and it is more preferable that $L^7$ is a group having a branched aliphatic group or a cyclic aliphatic group. $L^7$ may be formed of at least one of a straight chain aliphatic group, a branched aliphatic group, a cyclic aliphatic group, or an aromatic group, and is preferably a combination between the group and an oxygen atom, a nitrogen atom, a carbonyl group, a straight chain alkylene group or a branched alkylene group, and a straight chain arylene group or a branched arylene group.

The aliphatic group included in $L^7$ may be any one of a saturated aliphatic group and an unsaturated aliphatic group, and the saturated aliphatic group is preferable.

Examples of the group having a branched aliphatic group or a cyclic aliphatic group included in $L^7$ include an 1-methyl ethylene group, an 1,3-cyclohexylene group, an 1,2-cyclohexylene group, and the like.

Specifically, linking groups exemplified below are preferable as the linking group represented by $L^7$. * represents a bonding position with respect to $A^{71}$ or $A^{72}$. R represents a hydrogen atom, a methyl group, or an ethyl group.

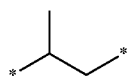
L-1

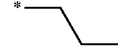
L-2

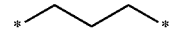
L-3

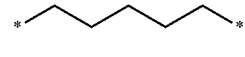
L-4

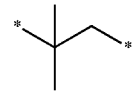
L-5

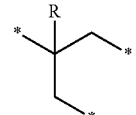
L-7

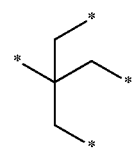
L-8

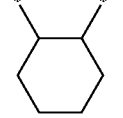
L-9

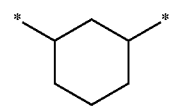
L-10

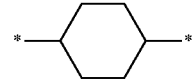
L-11

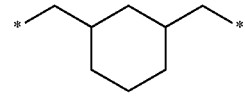
L-12

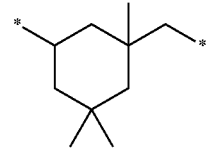
L-13

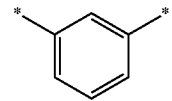
L-14

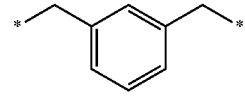
L-15

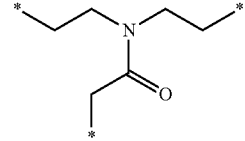
L-16

-continued

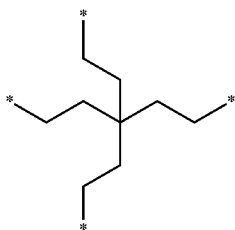

L-17

Among the linking groups represented by $L^7$, linking groups exemplified in L-1, L-2, L-5, and L-7 to L-15 are more preferable. In the above description, linking groups exemplified in L-1, L-2, L-5, L-8 to L-10, and L-12 to L-15 are more preferable.

The linking group represented by $L^7$ may further have a substituent, and examples of the substituent include the group T of the substituents described above. It is preferable that the linking group represented by L does not have a substituent.

nb+nc represents an integer of greater than or equal to 2, nb represents an integer of greater than or equal to 1, and nc represents an integer of greater than or equal to 0. nb+nc is preferably an integer in a range of 2 to 5, and is more preferably an integer in a range of 2 to 4. nb is preferably an integer in a range of 1 to 5, and is more preferably an integer in a range of 1 to 3. nc is preferably an integer in a range of 0 to 4, and is more preferably an integer in a range of 0 to 3.

In the compound denoted by General Formula (VII), in a case where nb represents an integer in a range of 2 to 5, it is preferable that nc represents an integer in a range of 0 to 2, and it is more preferable that nc represents 0. In a case where nb represents an integer in a range of 2 to 3, it is more preferable that nc represents 0. It is particularly preferable that nb represents 2, and nc represents 0.

In addition, in the compound denoted by General Formula (VII), in a case where nb represents 1, it is preferable that nc represents an integer in a range of 1 to 5, and it is more preferable that nc represents an integer in a range of 2 to 3.

General Formula (VIII)

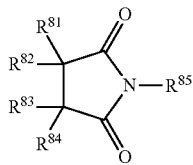

[In General Formula (VIII), any one of $R^{81}$ to $R^{85}$ represents a single bond or a divalent linking group which is linked to $L^7$ in General Formula (VII), ones of $R^{81}$ to $R^{85}$, which are not linked to $L^7$, each independently represent hydrogen atom, a substitutional or non-substitutional alkyl group, a substitutional or non-substitutional acyl group, a substitutional or non-substitutional alkoxy carbonyl group, a substitutional or non-substitutional alkoxy group, a substitutional or non-substitutional aryl oxy group, a substitutional or non-substitutional alkyl thio group, a substitutional or non-substitutional aryl thio group, a substitutional or non-substitutional carbamoyl group, a carboxyl group, a cyano group, or a hydroxyl group, $R^{81}$ and $R^{82}$ may form a non-aromatic ring by being bonded to each other, and $R^{83}$ and $R^{84}$ may form a non-aromatic ring by being bonded to each other.]

An alkyl group having 1 to 15 carbon atoms is preferable as the substitutional or non-substitutional alkyl group, an alkyl group having 1 to 10 carbon atoms is more preferable, and an alkyl group having 1 to 6 carbon atoms is even more preferable.

An acyl group having 1 to 15 carbon atoms is preferable as the substitutional or non-substitutional acyl group, an acyl group having 1 to 10 carbon atoms is more preferable, and an acyl group having 1 to 6 carbon atoms is even more preferable.

An alkoxy carbonyl group having 1 to 15 carbon atoms is preferable as the substitutional or non-substitutional alkoxy carbonyl group, an alkoxy carbonyl group having 1 to 10 carbon atoms is more preferable, and an alkoxy carbonyl group having 1 to 6 carbon atoms is even more preferable.

An alkoxy group having 1 to 15 carbon atoms is preferable as the substitutional or non-substitutional alkoxy group, an alkoxy group having 1 to 10 carbon atoms is more preferable, and an alkoxy group having 1 to 6 carbon atoms is even more preferable.

An aryl oxy group having 6 to 20 carbon atoms is preferable as the substitutional or non-substitutional aryl oxy group, an aryl oxy group having 6 to 15 carbon atoms is more preferable, and an aryl oxy group having 6 to 12 carbon atoms is even more preferable.

An alkyl thio group having 1 to 15 carbon atoms is preferable as the substitutional or non-substitutional alkyl thio group, an alkyl thio group having 1 to 10 carbon atoms is more preferable, and alkyl thio group having 1 to 6 carbon atoms is even more preferable.

An aryl thio group having 6 to 20 carbon atoms is preferable as the substitutional or non-substitutional aryl thio group, aryl thio group having 6 to 15 carbon atoms is more preferable, and aryl thio group having 6 to 12 carbon atoms is even more preferable.

An alkyl group having 1 to 15 carbon atoms is preferable as the substitutional or non-substitutional carbamoyl group, an alkyl group having 1 to 10 carbon atoms is more preferable, and an alkyl group having 1 to 6 carbon atoms is even more preferable.

The group may be a straight chain group, a branched group, or a cyclic group, and examples of a substituent that an alkyl group, an acyl group, an alkoxy carbonyl group, an alkoxy group, an aryl oxy group, an alkyl thio group, a carbamoyl group, and an aryl thio group may have include the group T of the substituents described above. Among them, an alkyl group, an alkenyl group, an aryl group, an alkoxy group, an aryl oxy group, an acyl group, an alkoxy carbonyl group, an acyl oxy group, an acyl amino group, an alkoxy carbonyl amino group, a carbamoyl group, an alkyl thio group, a ureido group, a hydroxy group, a cyano group, a carboxyl group, or a silyl group is preferable.

$R^1$ or $R^2$ and $R^3$ or $R^4$ may form a non-aromatic ring by being bonded to each other. The non-aromatic ring indicates a ring other than an aromatic ring, and may be a monocyclic ring, or may form a bicyclic or more polycylic ring. A monocyclic aliphatic ring or polycyclic aliphatic ring having a 5-membered ring or a 6-membered ring is preferable as the non-aromatic ring, an aliphatic ring having a 5-membered ring or a 6-membered ring is more preferable, and a cyclohexane ring and a cyclohexene ring are even more preferable.

In a case where $R^{85}$ is not linked to $L^7$ in General Formula (VII), it is preferable that $R^{85}$ represents a hydrogen atom or a substitutional or non-substitutional alkyl group. An alkyl group having 1 to 20 carbon atoms is preferable as the substitutional or non-substitutional alkyl group, an alkyl group having 1 to 10 carbon atoms is more preferable, and an alkyl group having 1 to 6 carbon atoms is even more preferable.

Any one of $R^{81}$ to $R^{85}$ represents a single bond or a divalent linking group which is linked to $L^7$ in General Formula (VII).

It is preferable that General Formula (VIII) is denoted by General Formula (VIII-1) described below.

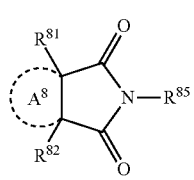

General Formula (VIII-1)

(In General Formula (VIII-1), a ring $A^8$ represents a non-aromatic ring, $R^{81}$, $R^{82}$, or $R^{85}$ represents a single bond or a divalent linking group which is linked to $L^7$ in General Formula (VII), and in a case where $R^{81}$ and $R^{82}$ are not linked to $L^7$, $R^{81}$ and $R^{82}$ each independently represent a hydrogen atom, a substitutional or non-substitutional alkyl group, a substitutional or non-substitutional alkoxy group, a substitutional or non-substitutional aryl oxy group, a substitutional or non-substitutional alkyl thio group, or a substitutional or non-substitutional aryl thio group. In a case where $R^{85}$ is not linked to $L^7$, $R^{85}$ represents a hydrogen atom or a substitutional or non-substitutional alkyl group.)

The ring $A^8$ represents a non-aromatic ring, and may be a monocyclic ring, may form a bicyclic or more polycyclic ring, or may be a ring formed through an oxygen atom. In addition, the structure denoted by General Formula (VIII-1) may be linked through the cyclic structure of the same ring $A^8$. A monocyclic ring aliphatic ring or a polycyclic aliphatic ring having a 5-membered ring or a 6-membered ring is preferable as the non-aromatic ring, an aliphatic ring having 5-membered ring or a 6-membered ring is more preferable, and a cyclohexane ring and a cyclohexene ring are even more preferable. $R^{81}$ and $R^{82}$ each independently represent a hydrogen atom, a substitutional or non-substitutional alkyl group, a substitutional or non-substitutional alkoxy group, a substitutional or non-substitutional aryl oxy group, a substitutional or non-substitutional alkyl thio group, or a substitutional or non-substitutional aryl thio group. An alkyl group having 1 to 15 carbon atoms is preferable as the substitutional or non-substitutional alkyl group, an alkyl group having 1 to 10 carbon atoms is more preferable, an alkyl group having 1 to 6 carbon atoms is even more preferable, and an alkyl group having 1 to 3 carbon atoms is particularly preferable.

An alkoxy group having 1 to 15 carbon atoms is preferable as the substitutional or non-substitutional alkoxy group, an alkoxy group having 1 to 10 carbon atoms is more preferable, an alkoxy group having 1 to 6 carbon atoms is even more preferable, and an alkoxy group having 1 to 3 carbon atoms is particularly preferable.

An aryl oxy group having 6 to 20 carbon atoms is preferable as the substitutional or non-substitutional aryl oxy group, an aryl oxy group having 6 to 15 carbon atoms is more preferable, an aryl oxy group having 6 to 12 carbon atoms is even more preferable, and an aryl oxy group having 6 to 10 carbon atoms is particularly preferable.

An alkyl thio group having 1 to 15 carbon atoms is preferable as the substitutional or non-substitutional alkyl thio group, an alkyl thio group having 1 to 10 carbon atoms is more preferable, an alkyl thio group having 1 to 6 carbon atoms is even more preferable, and an alkyl thio group having 1 to 3 carbon atoms is particularly preferable.

An aryl thio group having 6 to 20 carbon atoms is preferable as the substitutional or non-substitutional aryl thio group, an aryl thio group having 6 to 15 carbon atoms is preferable, an aryl thio group having 6 to 12 carbon atoms is preferable, and an aryl thio group having 6 to 10 carbon atoms is particularly preferable.

Examples of a substituent that the alkyl group may have include the group T of the substituents described above, and an alkyl group, an alkenyl group, an aryl group, an alkoxy group, an aryl oxy group, an acyl group, an alkoxy carbonyl group, an acyl oxy group, an acyl amino group, an alkoxy carbonyl amino group, a carbamoyl group, an alkyl thio group, a ureido group, a hydroxyl group, a cyano group, a carboxyl group, or a silyl group is preferable.

$R^{85}$ in General Formula (VIII-1) is identical to preferred embodiment of $R^{85}$ in General Formula (VIII).

In General Formula (VIII-1), it is preferable that a bonding portion with respect to $L^7$ is $R^{85}$.

Specifically, it is preferable that the group denoted by General Formula (VIII) is a group exemplified below.

* represents a bonding position with respect to L, ** represents a bonding position with respect to a substituent $R^a$ or $R^b$ ($R^a$ represents an alkyl group, and $R^b$ represents an alkyl group, a cyclic alkyl group, or an aryl group). A geometric isomer or an enantiomer which is generated due to a bonding embodiment with respect to $L^7$ may be mixed into the group denoted by General Formula (VIII). Here, the substitutional position of substituents denoted by $A^1$-27, $A^1$-32, and $A^1$-33 is not particularly limited, and the substituent may be substituted at any position on a 6-membered cyclic structure.

An alkyl group having 1 to 10 carbon atoms is preferable as the alkyl group represented by $R^a$ or $R^b$, an alkyl group having 1 to 5 carbon atoms is more preferable, and an alkyl group having 1 to 3 carbon atoms is even more preferable.

A cyclic alkyl group having 6 to 12 carbon atoms is preferable as the cyclic alkyl group represented by $R^b$, and a cyclic alkyl group having 6 to 8 carbon atoms is more preferable.

An aryl group having 6 to 12 carbon atoms is preferable as the aryl group represented by $R^b$, an aryl group having 6 to 10 carbon atoms is more preferable, and an aryl group having 6 to 8 carbon atoms is even more preferable.

The groups may be a straight chain group, a branched group, or a cyclic group, and examples of a substituent that the alkyl group, the cyclic alkyl group, and the aryl group may have include the group T of the substituents described above. Among them, an alkyl group, an alkenyl group, an aryl group, an alkoxy group, an aryl oxy group, an acyl group, an alkoxy carbonyl group, an acyl oxy group, an acyl amino group, an alkoxy carbonyl amino group, a carbamoyl group, a alkyl thio group, a ureido group, a hydroxy group, a cyano group, a carboxyl group, or a silyl group is preferable.

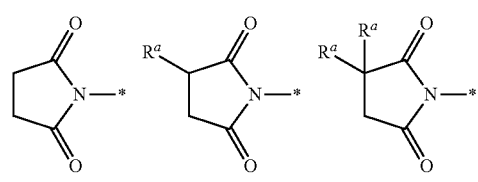
A¹-1    A¹-2    A¹-3
       (Rᵃ = CH₃—)  (Rᵃ = CH₃—)
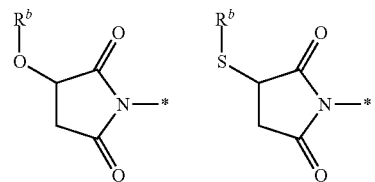
A¹-5    A¹-6
(Rᵇ = CH₃—)  (Rᵇ = CH₃—)
A¹-11
(Rᵇ = NC—CH₂CH₂—**)
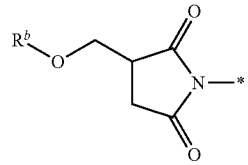
A¹-7 (Rᵇ = CH₃)
A¹-8 (Rᵇ = C₂H₅)
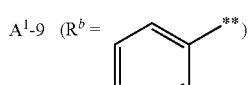
A¹-9 (Rᵇ = )
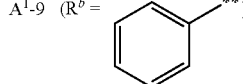
A¹-10 (Rᵇ = )
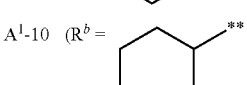
A¹-12 (Rᵇ = )
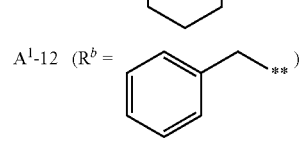
A¹-13 (Rᵃ = H(CH₂)₃—)   A¹-14 (Rᵃ = CH₃—)
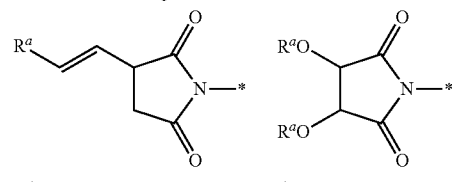
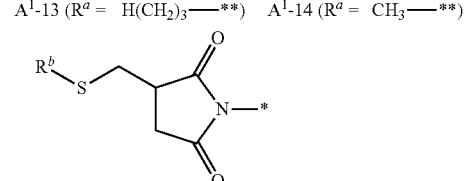
A¹-15 (Rᵇ = )
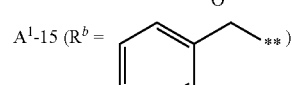
A¹-16 (Rᵇ = )
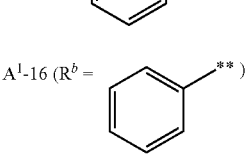
-continued
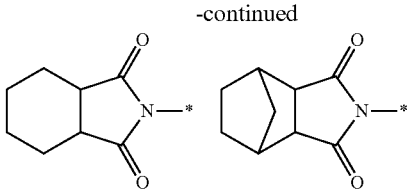
A¹-21    A¹-22
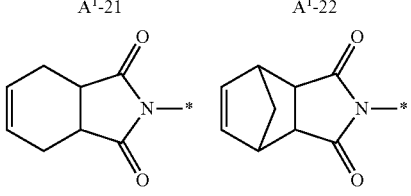
A¹-23    A¹-24
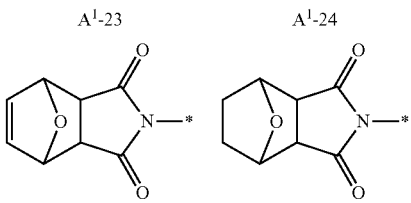
A¹-25    A¹-26
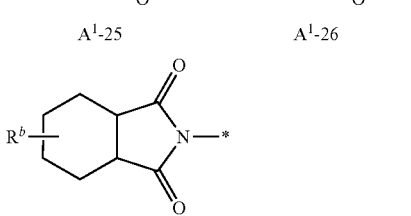
A¹-27 (Rᵇ = CH₃—**)
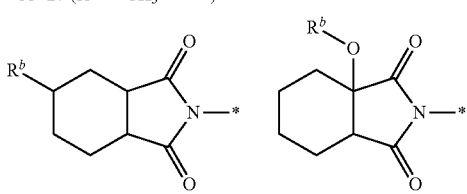
A¹-28 (Rᵇ = CH₃—)    A¹-29 (Rᵇ = CH₃—)
A¹-35 (Rᵇ = )
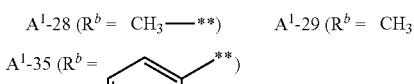
A¹-36 (Rᵇ = )
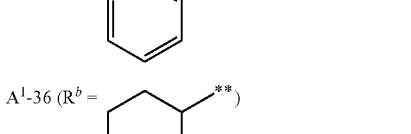
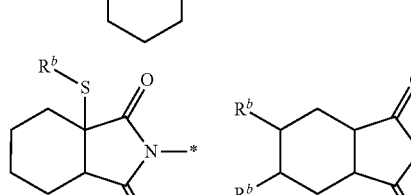
A¹-30 (Rᵇ = CH₃—)    A¹-31 (Rᵇ = CH₃—)
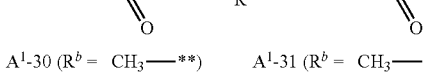
A¹-32

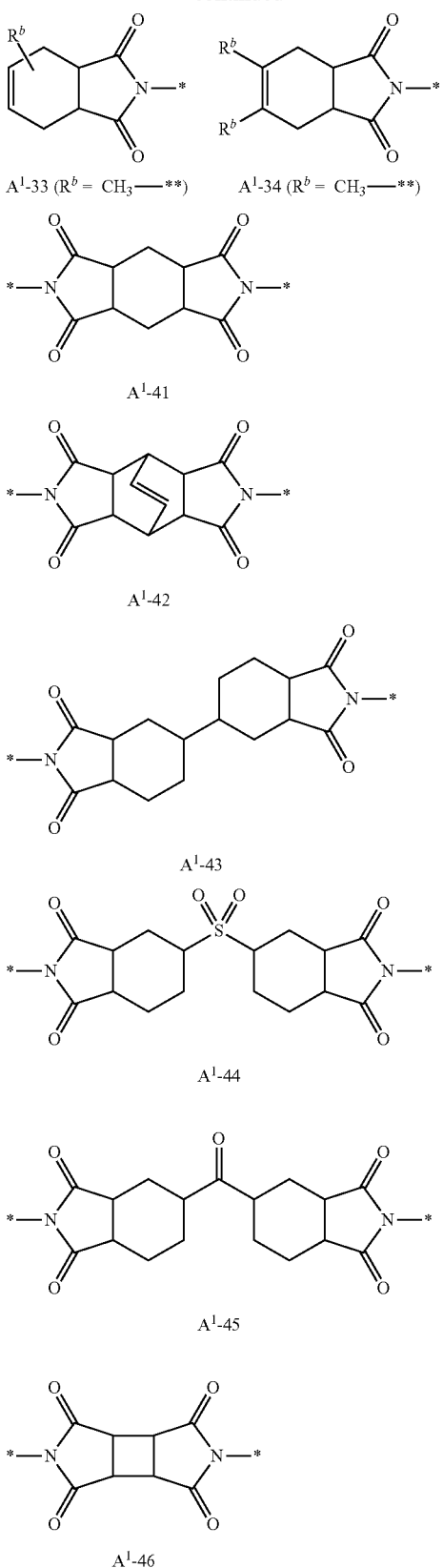

Among them, $A^1$-21 to $A^1$-28, $A^1$-31, and $A^1$-33 to $A^1$-34 are more preferable.

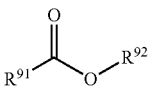

General Formula (IX)

[In General Formula (IX), at least one of $R^{91}$ or $R^{92}$ represents a single bond or a divalent linking group which is linked to $L^7$ in General Formula (VII), and one of $R^{91}$ and $R^{92}$ which is not linked to $L^7$ represents a substitutional or non-substitutional phenyl group or a substitutional or non-substitutional alkyl group.]

In a case where $R^{91}$ and $R^{92}$ are not linked to $L^7$ in General Formula (VII), $R^{91}$ and $R^{92}$ each independently represent a substitutional or non-substitutional phenyl group or a substitutional or non-substitutional alkyl group. An alkyl group having 1 to 15 carbon atoms is preferable as the substitutional or non-substitutional alkyl group, an alkyl group having 1 to 10 carbon atoms is more preferable, and an alkyl group having 1 to 6 carbon atoms is even more preferable.

Examples of a substituent that the phenyl group and the alkyl group may have include the group T of the substituents described above.

An alkyl group (preferably, a methyl group), an alkoxy carbonyl group, an acyl group, an acyl oxy group, and an alkoxy group are preferable as the substituent of the phenyl group, and a non-substitutional phenyl group is more preferable.

An alkoxy carbonyl group, an acyl group, an acyl oxy group, an alkoxy group, a hydroxyl group, or a cyano group is preferable as the substituent of the alkyl group, and the cyano group or a non-substitutional alkyl group is more preferable.

In a case where a plurality of groups denoted by General Formula (IX) are included, the plurality of groups denoted by General Formula (IX) may form a ring by being bonded to each other. For example, an embodiment is exemplified in which two $R^{91}$'s form a benzene ring or a cyclohexane ring by being bonded to each other (for example, $A^2$-20, $A^2$-21, $A^2$-22, $A^2$-23, $A^2$-24, $A^2$-25, and the like described below). The present inventors have assumed that a carbonyl group of an ester bond included in the group denoted by General Formula (IX) is also mutually interacts with cellulose ester in addition to a carbonyl group of an imide bond included in the group denoted by General Formula (VIII), and is able to reduce the free volume existing in the cellulose ester, and thus, is able to contribute to the improvement in the scratch resistance of the film.

A geometric isomer or an enantiomer may be mixed into the group denoted by General Formula (IX).

At least one of $R^{91}$ or $R^{92}$, preferably any one of $R^{91}$ and $R^{92}$, and more preferably $R^{92}$ represents a single bond or a divalent linking group which is linked to $L^7$ in General Formula (VII).

Specifically, it is preferable that the group denoted by General Formula (IX) is a group exemplified below.

represents a bonding position with respect to $L^7$, and * represents a bonding position with respect to a substituent $R^a$ or $R^b$ ($R^a$ represents an alkyl group, and $R^b$ represents an alkyl group, a cyclic alkyl group, or an aryl group).

An alkyl group having 1 to 10 carbon atoms is preferable as the alkyl group represented by $R^a$ or $R^b$, an alkyl group having 1 to 5 carbon atoms is more preferable, and an alkyl group having 1 to 3 carbon atoms is even more preferable.

A cyclic alkyl group having 6 to 12 carbon atoms is preferable as the cyclic alkyl group represented by $R^b$, and a cyclic alkyl group having 6 to 8 carbon atoms is more preferable.

An aryl group having 6 to 12 carbon atoms is preferable as the aryl group represented by $R^b$, an aryl group having 6 to 10 carbon atoms is more preferable, and an aryl group having 6 to 8 carbon atoms is even more preferable.

The groups may be a straight chain group, a branched group, or a cyclic group, and examples of a substituent that the alkyl group, the cyclic alkyl group, and the aryl group may have include the group T of the substituents described above. Among them, an alkyl group, an alkenyl group, an aryl group, an alkoxy group, an aryl oxy group, an acyl group, an alkoxy carbonyl group, an acyl oxy group, an acyl amino group, an alkoxy carbonyl amino group, a carbamoyl group, an alkyl thio group, a ureido group, a hydroxy group, a cyano group, a carboxyl group, or a silyl group is preferable.)

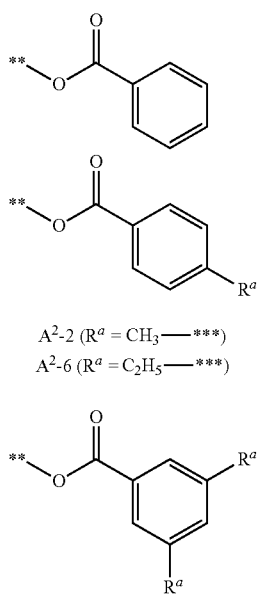

A²-1

A²-2 ($R^a$ = CH₃——***)
A²-6 ($R^a$ = C₂H₅——***)

A²-3

A²-4

A²-5

($R^a$ = CH₃——***)

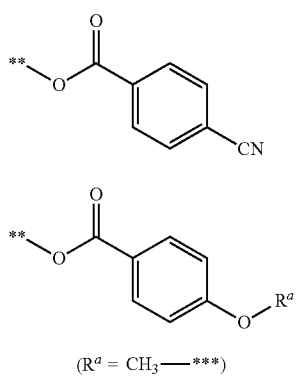

A²-7

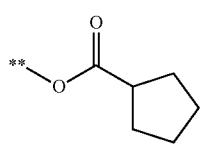

-continued

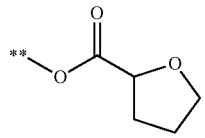

A²-8

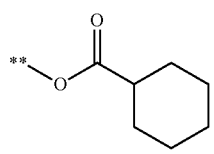

A²-9

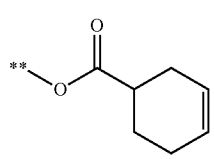

A²-10

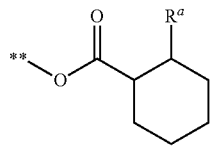

A²-11

($R^a$ = CH₃——***)

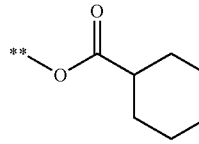

A²-12

($R^a$ = CH₃——***)

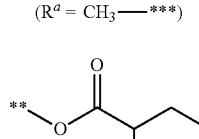

A²-13

($R^a$ = CH₃——***)

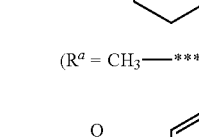

A²-14

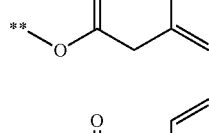

A²-15

($R^a$ = CH₃——***)

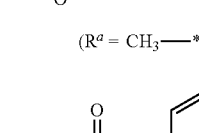

A²-16

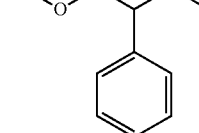

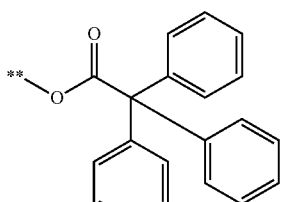

A²-17

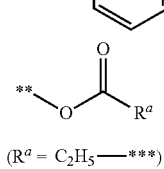

(Rᵃ = C₂H₅—***)

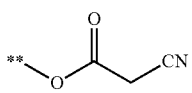

A²-19

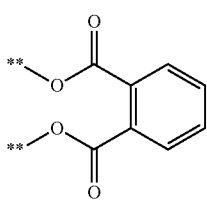

A²-20

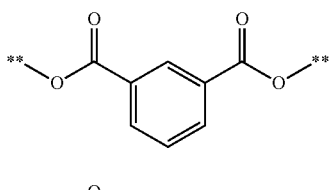

A²-21

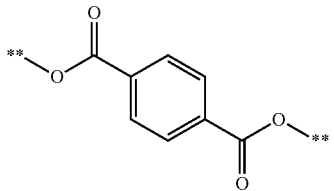

A²-22

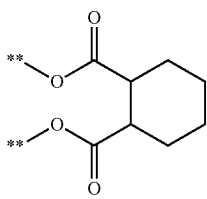

A²-23

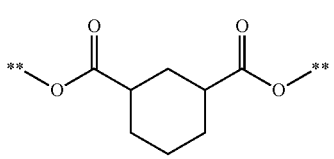

A²-24

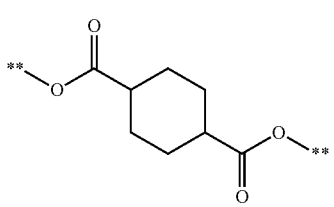

A²-25

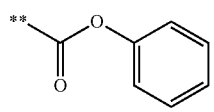

A²-26

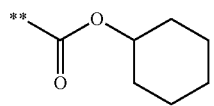

A²-27

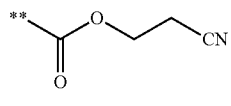

A²-28

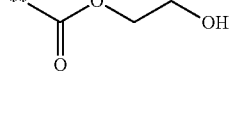

A²-29

Among them, A²-1 to 3, A²-6, A²-7, A²-9, A²-11 to 16, A²-19, A²-20 to 25, and A²-27 to 29 are more preferable.

It is preferable that the compound denoted by General Formula (VII) described above is a compound denoted by General Formula (VII-1) described below.

General Formula (VII-1)

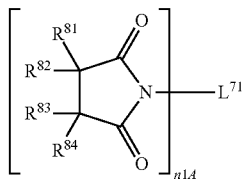

(In General Formula (VII-1), $L^{71}$ represents an (n1A)-valent linking group in which the number of atoms is less than or equal to 8. n1A represents an integer in a range of 2 to 4. $R^{81}$ to $R^{84}$ each independently represent a hydrogen atom, a substitutional or non-substitutional alkyl group, a substitutional or non-substitutional acyl group, a substitutional or non-substitutional alkoxy carbonyl group, a substitutional or non-substitutional alkoxy group, a substitutional or non-substitutional aryl oxy group, a substitutional or non-substitutional alkyl thio group, a substitutional or non-substitutional aryl thio group, a substitutional or non-substitutional carbamoyl group, a carboxyl group, a cyano group, or a hydroxyl group, and $R^{81}$ and $R^{82}$ and $R^{83}$ and $R^{84}$ may form a non-aromatic ring by being bonded to each other.)

The compound denoted by General Formula (VII-1) is an embodiment in which nb in General Formula (VII) is an integer of 2 to 4, and nc in General Formula (VII) is 0.

$L^{71}$ in General Formula (VII-1) can be referred to the description corresponding to a divalent to tetravalent group in the description with respect to $L^7$ in General Formula (VII), and a preferred range thereof is also identical to that of the divalent to tetravalent group.

$R^{81}$ to $R^{84}$ in General Formula (VII-1) are each identical to $R^{81}$ to $R^{84}$ in General Formula (VIII), and preferred ranges thereof are also identical to those of $R^{81}$ to $R^{84}$ in General Formula (VIII).

n1A represents an integer in a range of 2 to 4, is preferably 2 or 3, and is more preferably 2.

It is more preferable that the compound denoted by General Formula (VII) is a compound denoted by General Formula (VII-2) described below.

General Formula (VII-2)

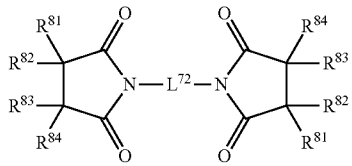

(In General Formula (VII-2), $L^{72}$ represents a divalent linking group in which the number of atoms linking nitrogen atom-nitrogen atom is less than or equal to 8. $R^{81}$ to $R^{84}$ each independently represent a hydrogen atom, a substitutional or non-substitutional alkyl group, a substitutional or non-substitutional acyl group, a substitutional or non-substitutional alkoxy carbonyl group, a substitutional or non-substitutional alkoxy group, a substitutional or non-substitutional aryl oxy group, a substitutional or non-substitutional alkyl thio group, a substitutional or non-substitutional aryl thio group, a substitutional or non-substitutional carbamoyl group, a carboxyl group, a cyano group, or a hydroxyl group, and $R^{81}$ and $R^{82}$ and $R^{83}$ and $R^{84}$ may form a non-aromatic ring by being bonded to each other.)

The compound denoted by General Formula (VII-2) is an embodiment in which nb in General Formula (VII) is 2, and nc in General Formula (VII) is 0.

$L^{72}$ in General Formula (VII-2) can be referred to the description corresponding to a divalent group in the description with respect to $L^7$ in General Formula (VII), and a preferred range thereof is also identical to that of the divalent group.

$R^{81}$ to $R^{84}$ in General Formula (VII-2) are each identical to $R^{81}$ to $R^{84}$ in General Formula (VIII), and preferred ranges thereof are also identical to those of $R^{81}$ to $R^{84}$ in General Formula (VIII).

It is more preferable that the compound denoted by General Formula (VII) is a compound denoted by General Formula (VII-3) described below.

General Formula (VII-3)

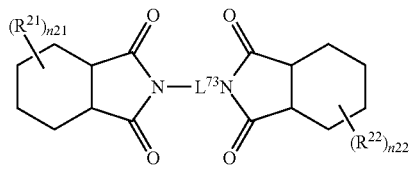

(In General Formula (VII-3), $L^{73}$ represents a divalent linking group having at least one of tertiary carbon or quaternary carbon, in which the number of atoms linking nitrogen atom-nitrogen atom is less than or equal to 8. $R^{21}$ and $R^{22}$ represent a methyl group. n21 and n22 each represent an integer of 0 or 1.)

$L^{73}$ represents a divalent linking group having at least one of tertiary carbon or quaternary carbon, in which the number of carbon atoms linking nitrogen atom-nitrogen atom is less than or equal to 8. $L^{73}$ is formed of at least one of a straight chain aliphatic group, a branched aliphatic group, a cyclic aliphatic group, or an aromatic group, and examples of a group having a branched aliphatic group or a cyclic aliphatic group include an 1-methyl ethylene group, an 1,3-cyclohexylene group, an 1,2-cyclohexylene group, and the like.

Specifically, it is preferable that $L^{73}$ has the following structure. * represents a bonding portion with respect to a nitrogen atom.

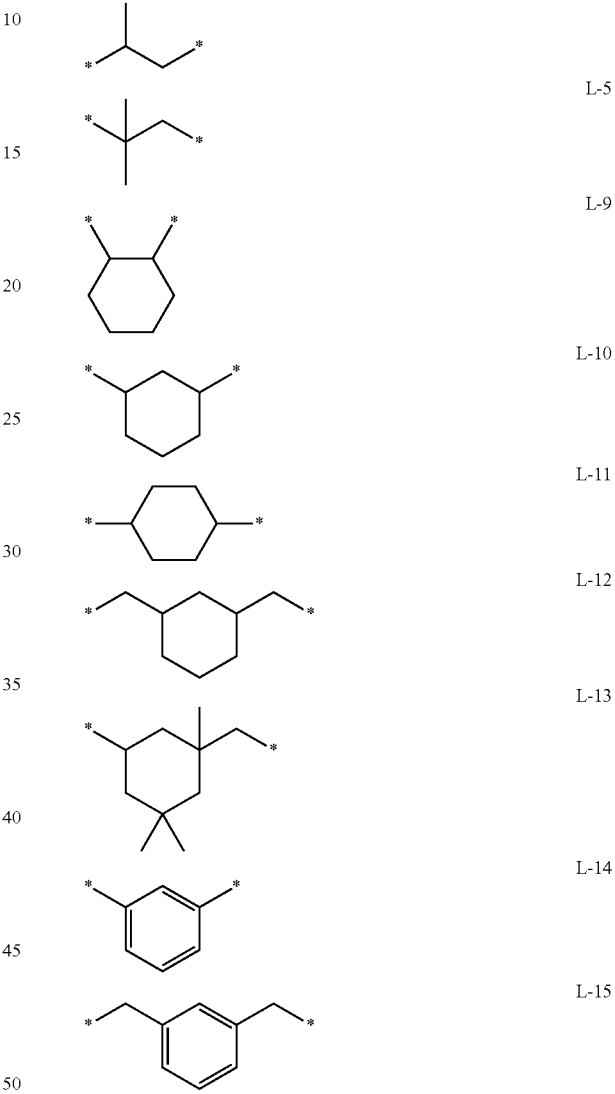

It is preferable that n21 and n22 are 0.

It is more preferable that the compound denoted by General Formula (VII) is a compound denoted by General Formula (VII-4) described below.

General Formula (VII-4)

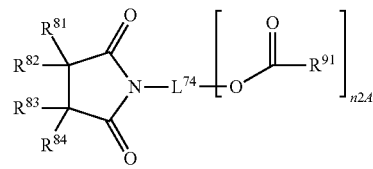

(In General Formula (VII-4). $L^{74}$ represents an (n2A+1)-valent linking group in which the number of atoms linking nitrogen atom-oxygen atom is less than or equal to 8. n2A represents an integer in a range of 1 to 4. $R^{81}$ to $R^{84}$ each independently represent a hydrogen atom, a substitutional or non-substitutional alkyl group, a substitutional or non-substitutional acyl group, a substitutional or non-substitutional alkoxy carbonyl group, a substitutional or non-substitutional alkoxy group, a substitutional or non-substitutional aryl oxy group, a substitutional or non-substitutional alkyl thio group, a substitutional or non-substitutional aryl thio group, a substitutional or non-substitutional carbamoyl group, a carboxyl group, a cyano group, or a hydroxyl group, and $R^{81}$ and $R^{82}$ and $R^{83}$ and $R^{84}$ may form a non-aromatic ring by being bonded to each other. $R^{91}$ represents a substitutional or non-substitutional phenyl group or a substitutional or non-substitutional alkyl group.)

$L^{74}$ in General Formula (VII-4) can be referred to the description corresponding to a divalent to tetravalent group in the description with respect to $L^7$ in General Formula (VII), and a preferred range thereof is also identical to that of the divalent to tetravalent group.

$R^{81}$ to $R^{84}$ in General Formula (VII-4) are each identical to $R^{81}$ to $R^{84}$ in General Formula (VIII), and preferred ranges thereof are also identical to those of $R^{81}$ to $R^{84}$ in General Formula (VIII).

$R^{91}$ in General Formula (VII-4) is identical to $R^{91}$ in General Formula (IX), and a preferred range thereof is also identical to that of $R^{91}$ in General Formula (IX).

n2A represents an integer in a range of 1 to 4, and is preferably an integer in a range of 1 to 3.

It is more preferable that the compound denoted by General Formula (VII) is a compound denoted by General Formula (VII-5) described below.

General Formula (VII-5)

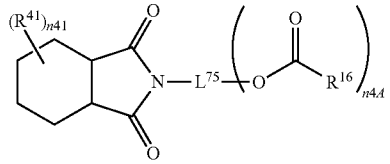

(In General Formula (VII-5), $L^{75}$ represents a linking group selected from the group A of linking groups described below, $R^{41}$ represents a methyl group, and n41 represents an integer of 0 or 1. $R^{16}$ represents a substituent selected from the group B of substituents described below, and a plurality of substituents described above may be identical to each other or different from each other. n4A represents an integer in a range of 1 to 3.)

Group A of Linking Groups:

$L^A$-1

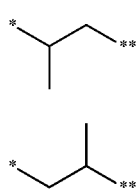

$L^A$-2

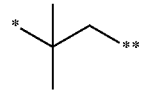

$L^A$-3

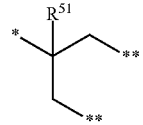

$L^A$-4

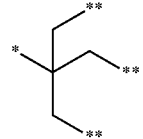

$L^A$-5

$L^A$-6

(* represents a bonding portion with respect to a nitrogen atom, and ** represents a bonding portion with respect to an oxygen atom. $R^{51}$ represents a hydrogen atom, a methyl group, or an ethyl group.)

Group B of Substituents:

$R^B$-1

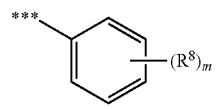

$R^B$-2

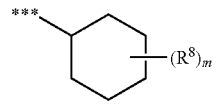

$R^B$-3

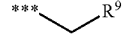

(*** represents a bonding portion with respect to a carbonyl group, $R^8$ represents an alkyl group, an alkoxy carbonyl group, an acyl group, or an alkoxy group, and $R^9$ represents a carbonyl group, an alkoxy carbonyl group, a carbonyl oxy group, a cyano group, or a hydroxyl group. m represents an integer of 0 to 3.)

$L^{75}$ represents a linking group selected from the group A of the linking groups described above, and among the group A of the linking groups, $L^A$-1 to $L^A$-5 are more preferable.

$R^{51}$'s each independently represent a hydrogen atom, a methyl group, and an ethyl group, and the hydrogen atom is more preferable.

$R^{16}$ represents a substituent selected from the group B of the substituents described above, and among the group B of the substituents, $R^B$-1 is preferable.

$R^8$ represents an alkyl group, an alkoxy carbonyl group, an acyl group, and an alkoxy group, and the alkyl group is more preferable.

Here, the alkyl group is preferably a methyl group, an ethyl group, or a propyl group. The alkoxy carbonyl group is preferably a methoxy carbonyl group or an ethoxy carbonyl group. The acyl group is preferably an acetyl group. The alkoxy group is preferably a methoxy group or an ethoxy group.

Examples of $R^9$ include a carbonyl group, an alkoxy carbonyl group, a carbonyl oxy group, a cyano group, or a hydroxyl group, and among them, the cyano group is more preferable.

m represents an integer of 0 to 3, is more preferably an integer of 0 to 2, and is even more preferably 0.

n4A represents an integer of 1 to 3.

Hereinafter, specific examples of the compound denoted by General Formula (VII) will be exemplified, but the present invention is not limited thereto.

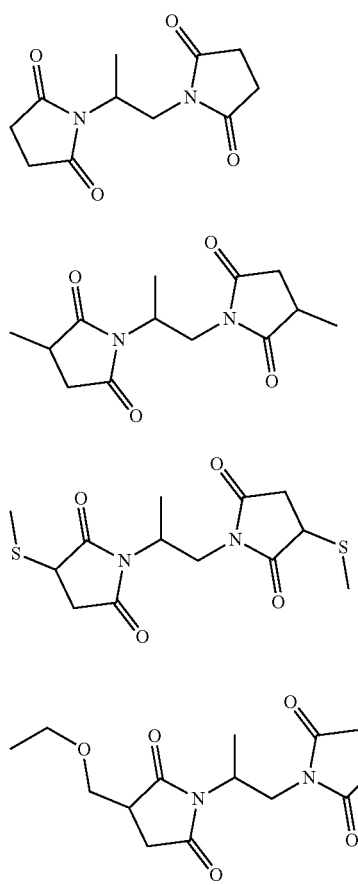

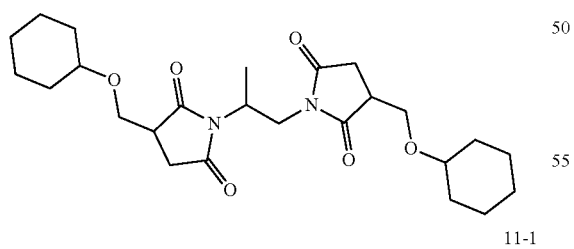

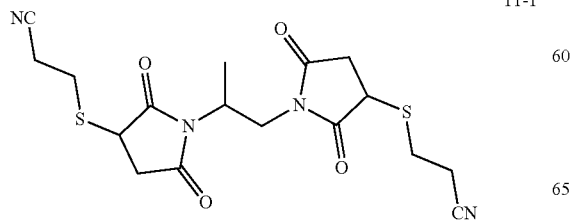

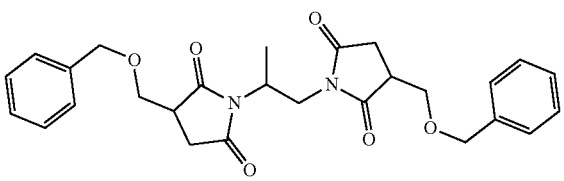

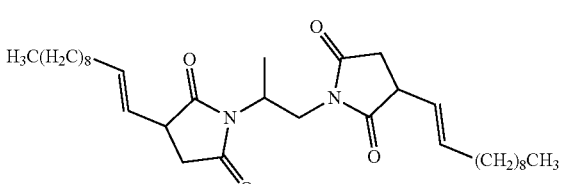

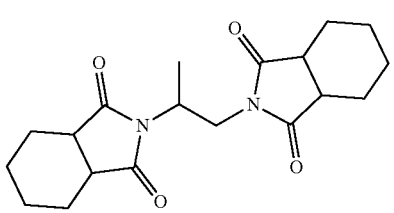

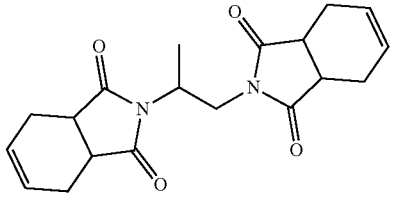

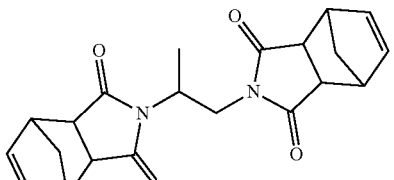

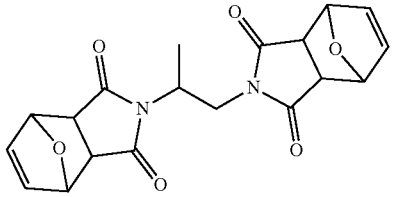

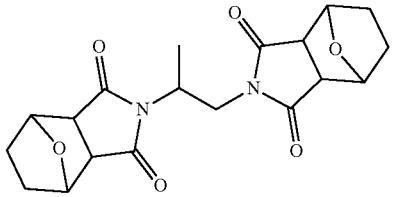

27-1
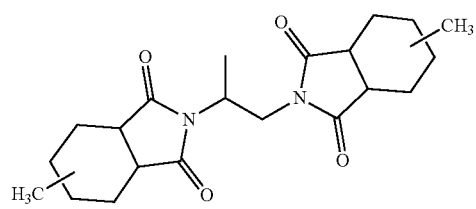
28-1
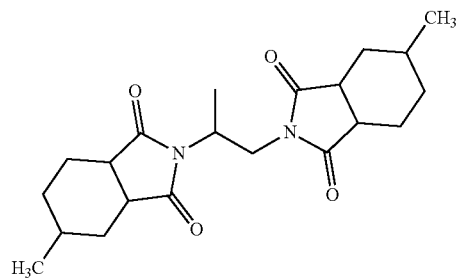
22-2
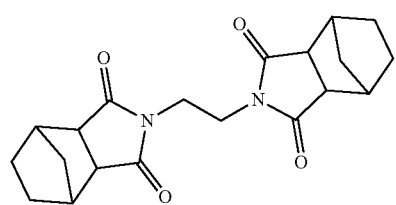
23-2
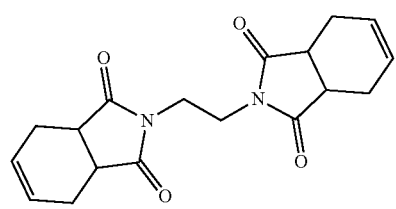
26-2
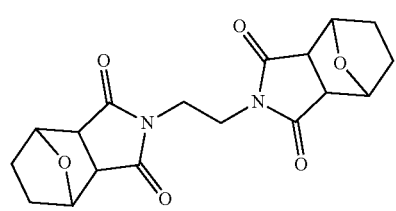
27-2
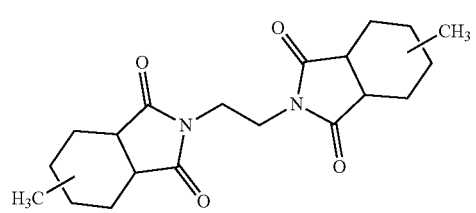
21-3
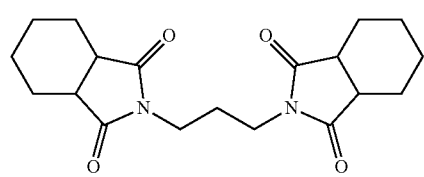
26-3
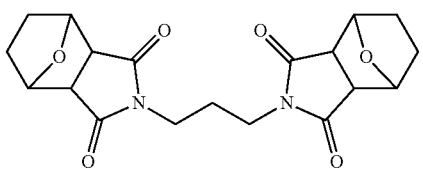
27-3
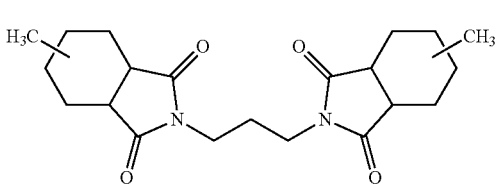
21-4
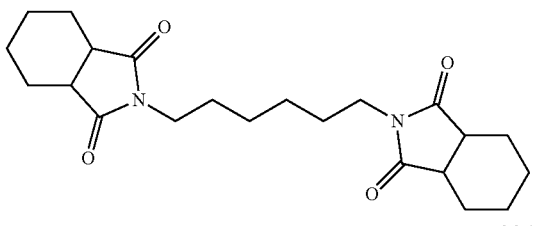
26-4
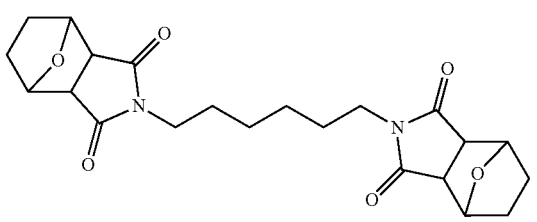
27-4
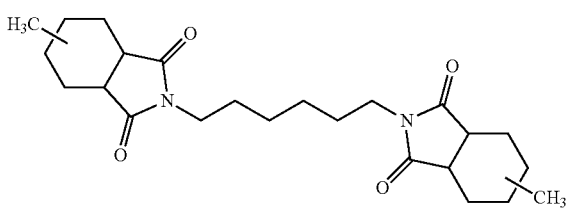
1-9
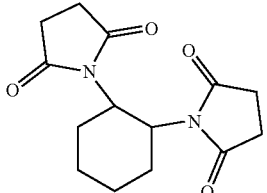
2-9
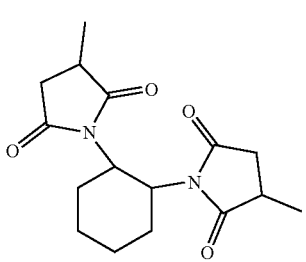

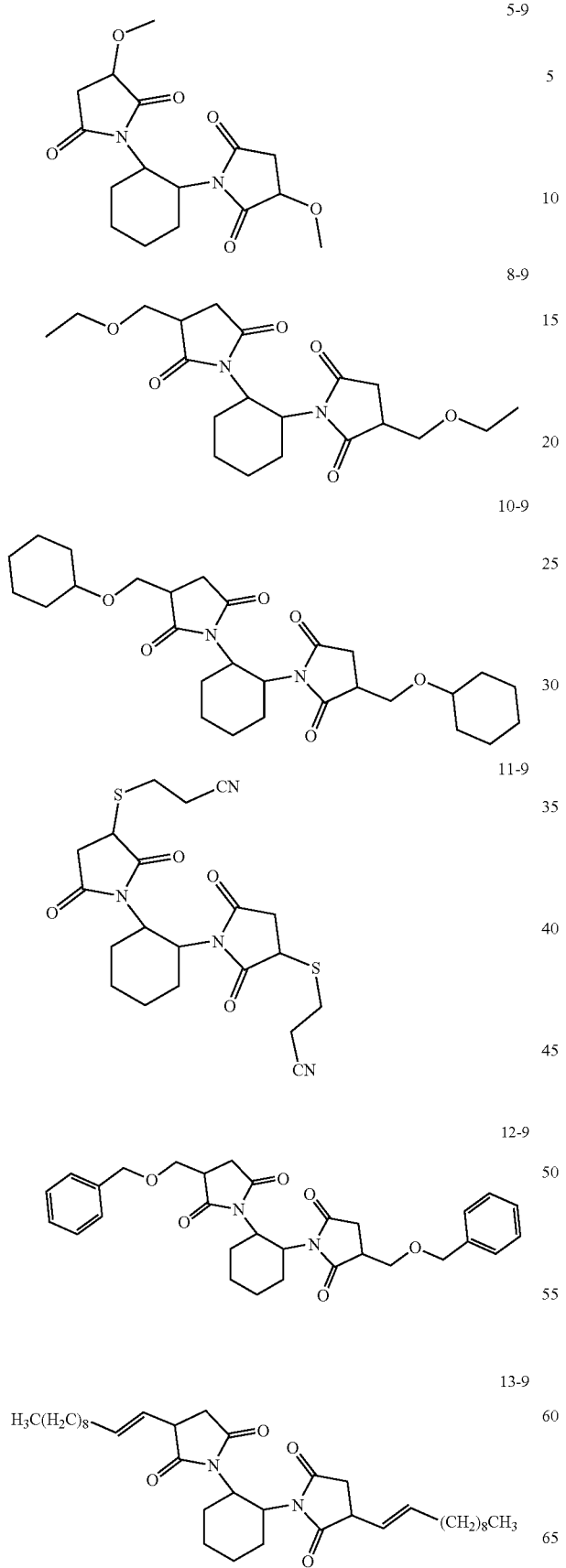
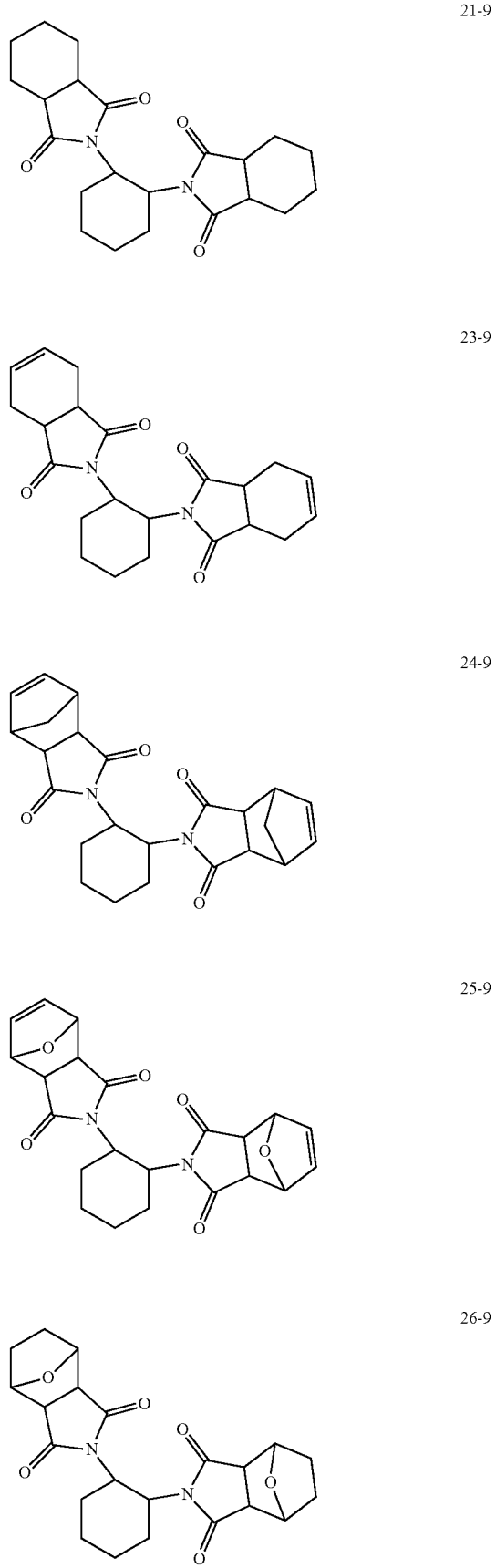

159
-continued
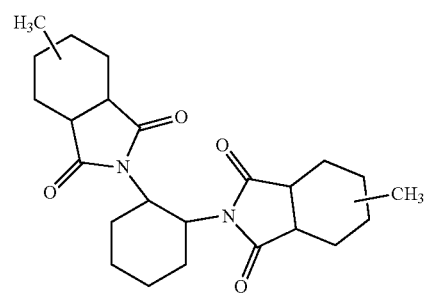
27-9
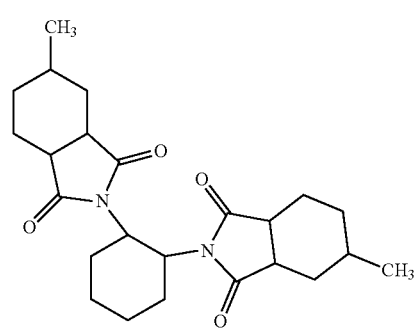
28-9
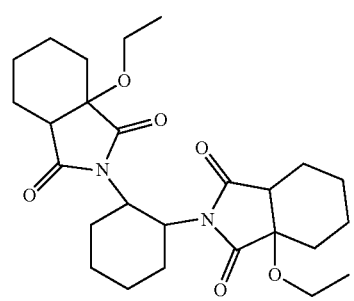
29-9
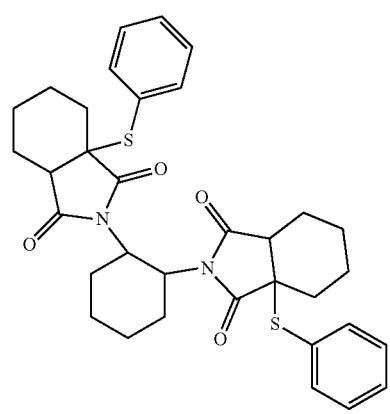
30-9
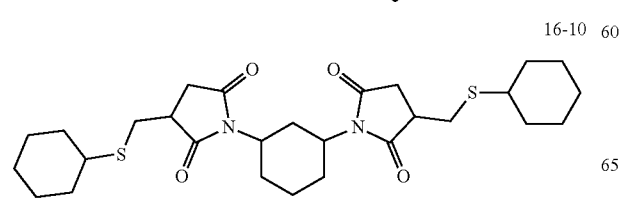
16-10
160
-continued
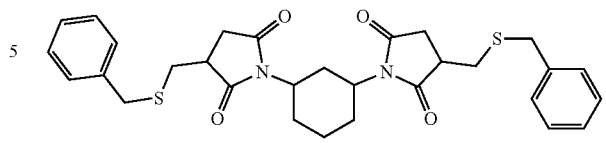
15-10
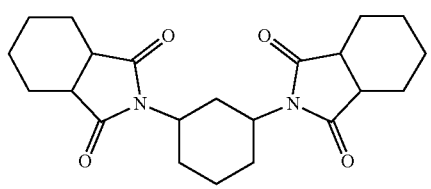
21-10
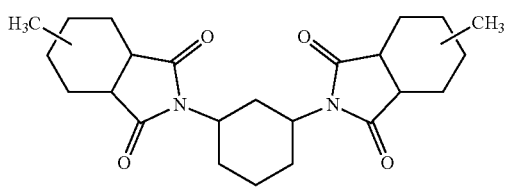
27-10
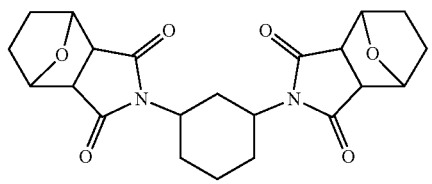
26-10
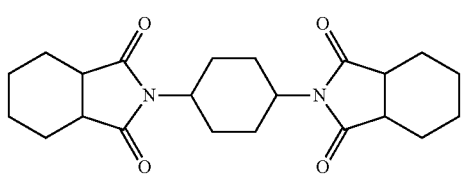
21-11
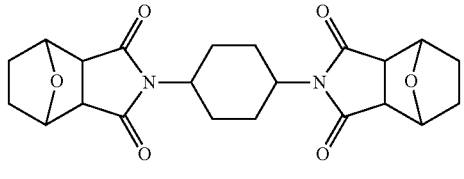
26-11
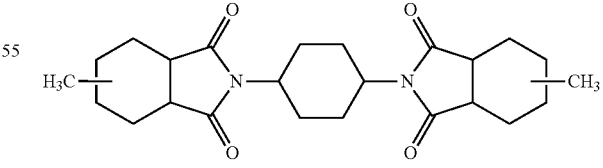
27-11
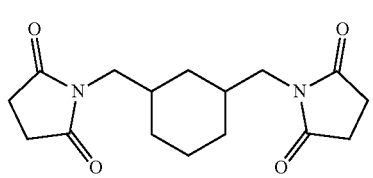
1-12

21-12
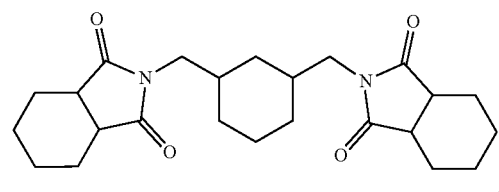
26-12
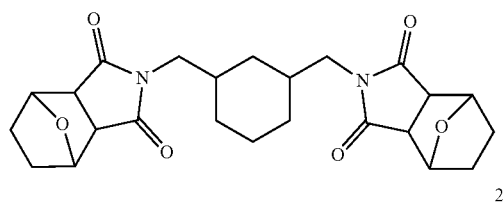
27-12
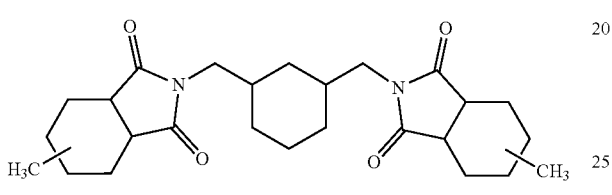
1-13
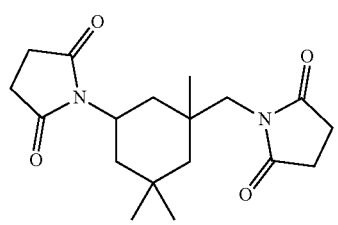
2-13
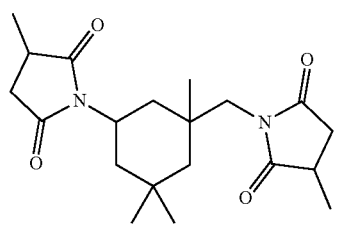
10-13
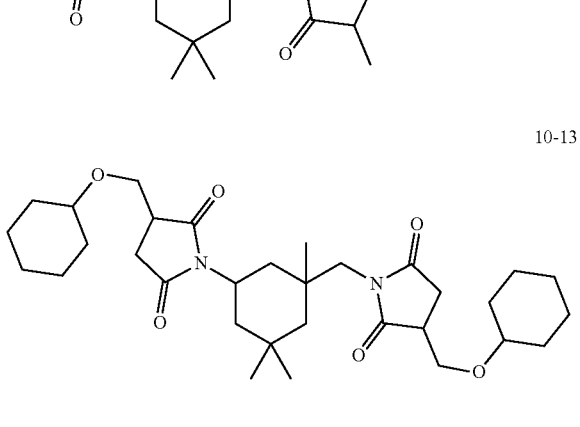
16-13
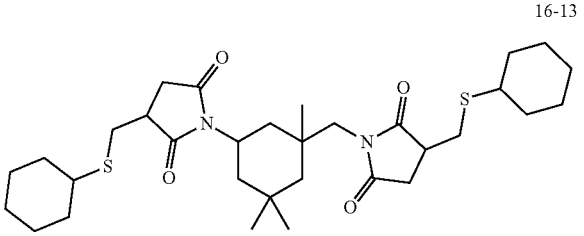
21-13
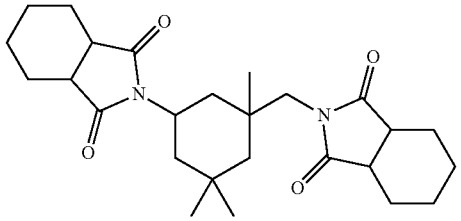
26-13
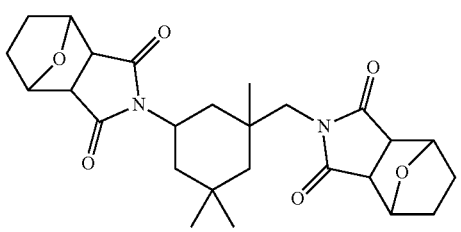
27-13
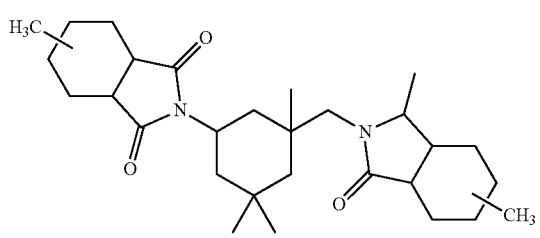
21-14
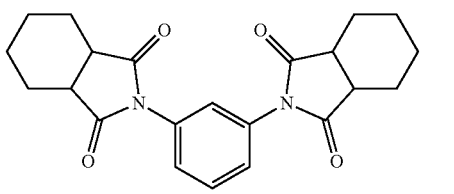
16-15
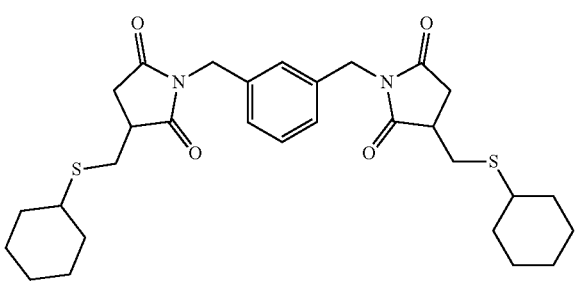
21-15
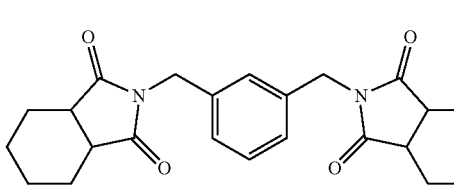

27-7
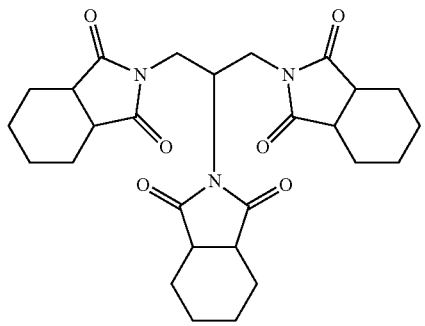
26-15
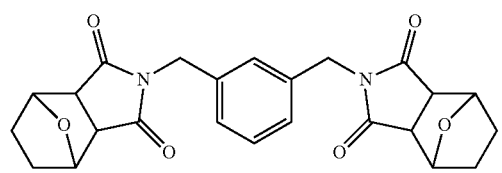
27-15
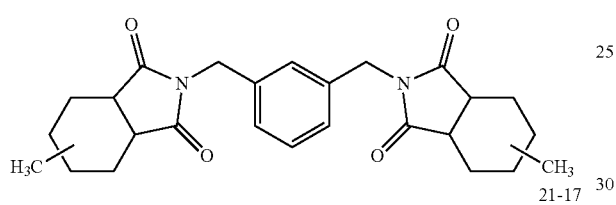
21-17
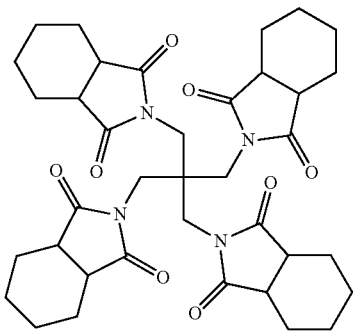
32-15
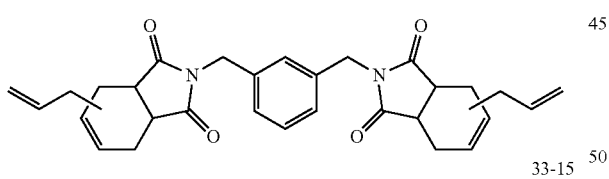
33-15
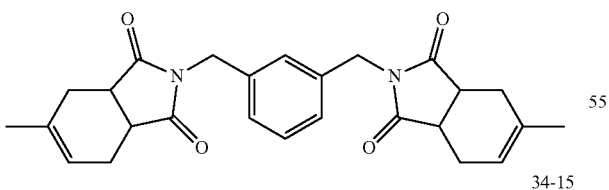
34-15
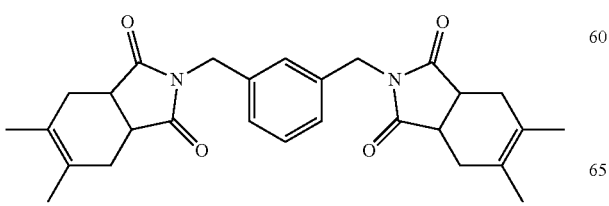
35-15
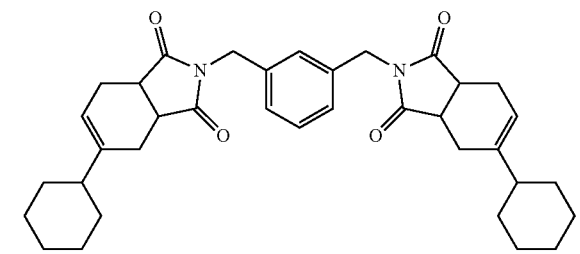
36-15
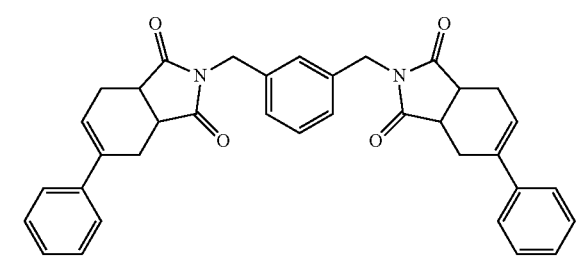
1-1-1
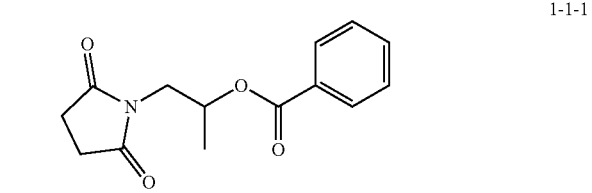
2-1-1
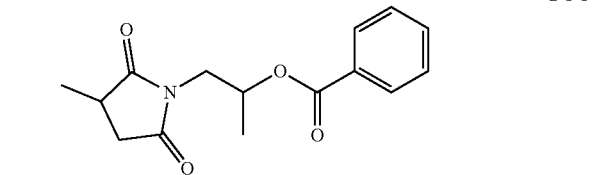
5-1-1
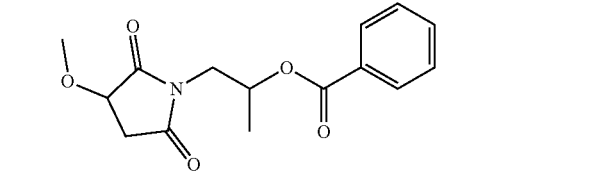
6-1-1
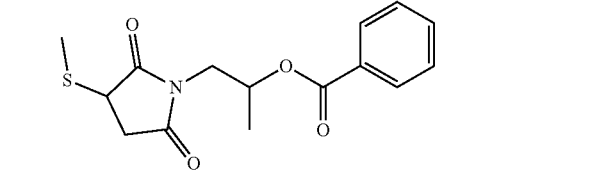
8-1-1
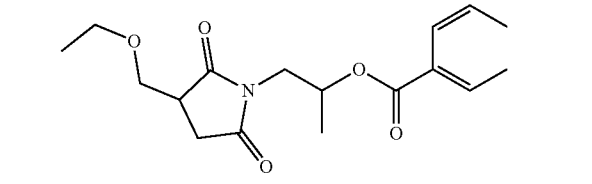

10-1-1
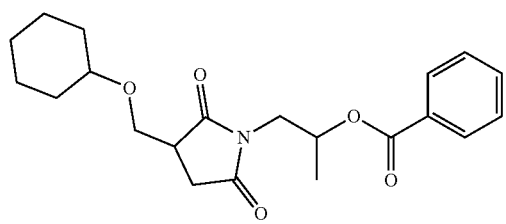
11-1-1
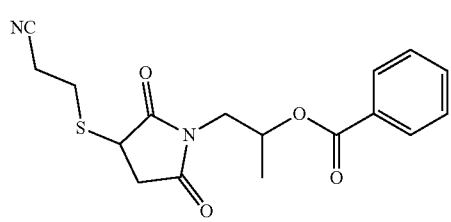
15-1-1
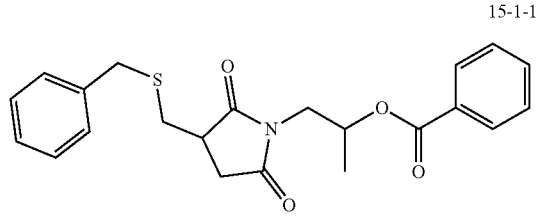
13-1-1
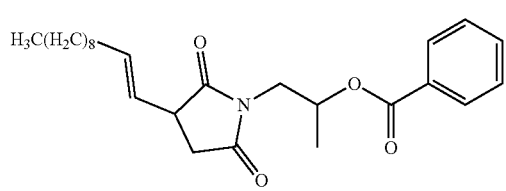
23-1-1
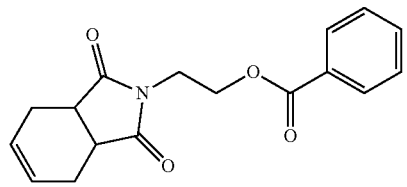
24-1-1
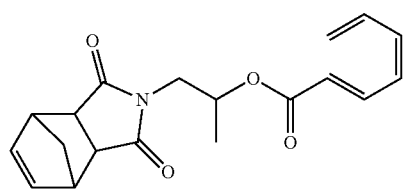
25-1-1
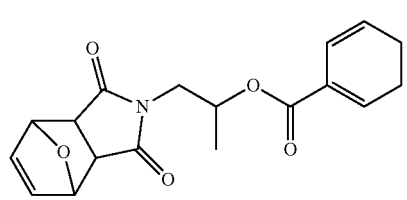
26-1-1
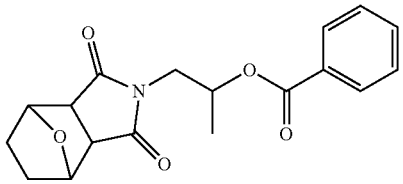
27-1-1
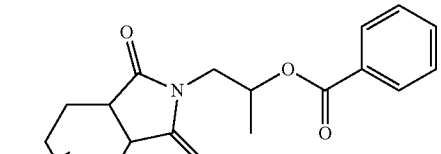
41-1-1
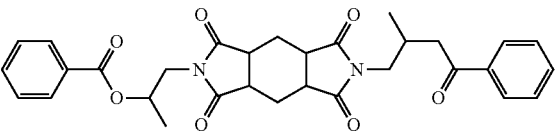
42-1-1
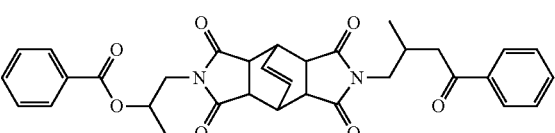
43-1-1
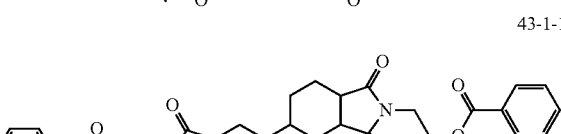
44-1-1
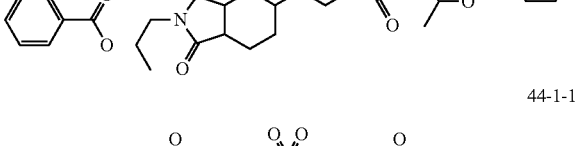
45-1-1
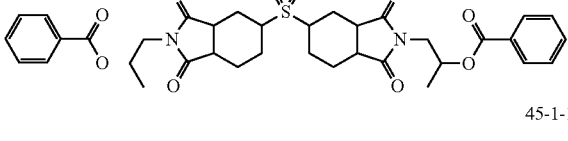
46-1-1
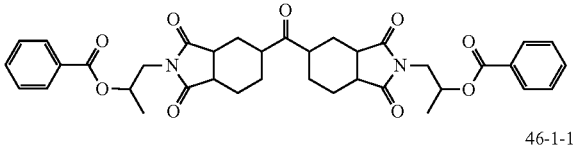
27-1-5
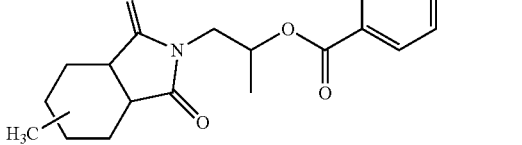

27-1-6
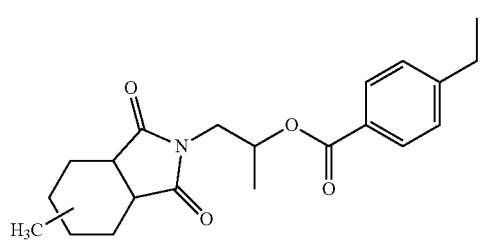
21-1-16
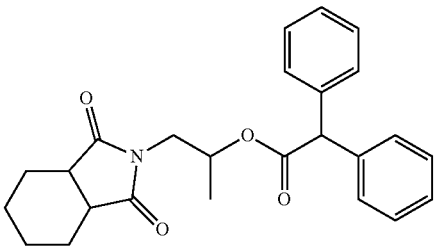
27-1-13
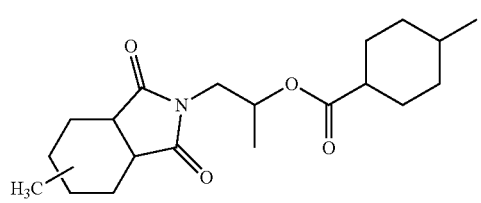
21-1-17
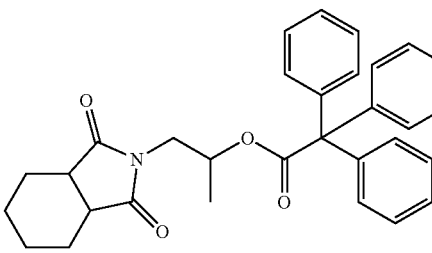
21-1-1
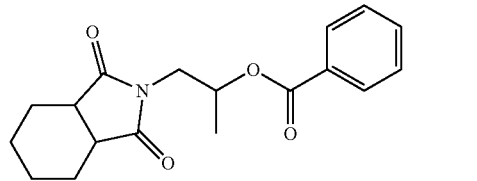
21-1-18
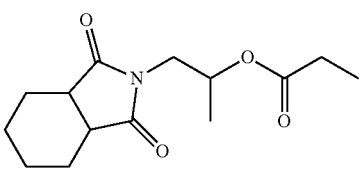
21-1-3
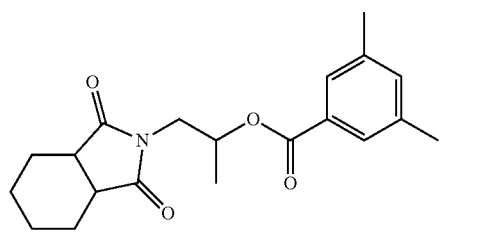
21-1-19
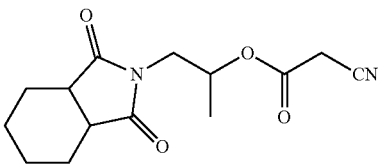
21-1-8
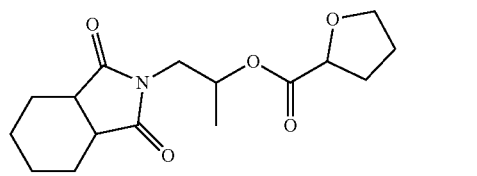
21-1-20
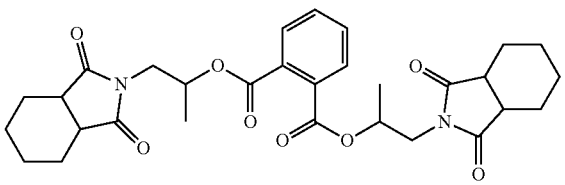
21-1-9
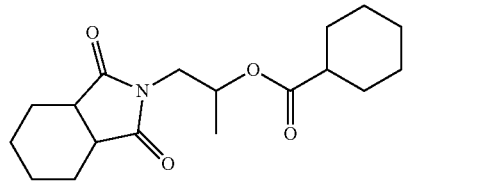
21-1-21
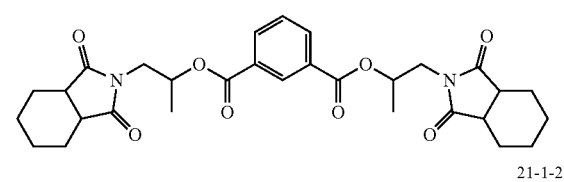
21-1-14
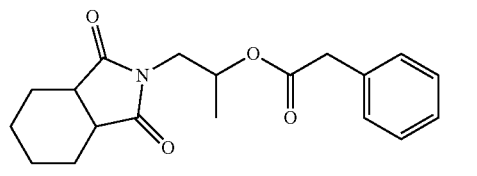
21-1-22
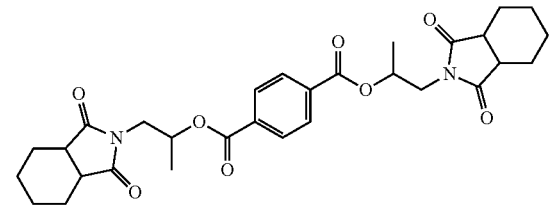

169
-continued
21-1-23
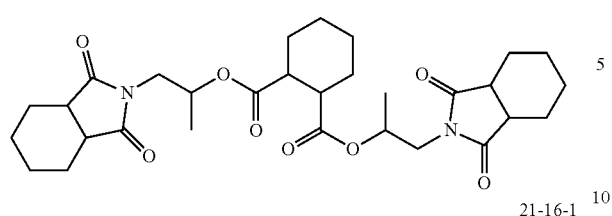
21-16-1
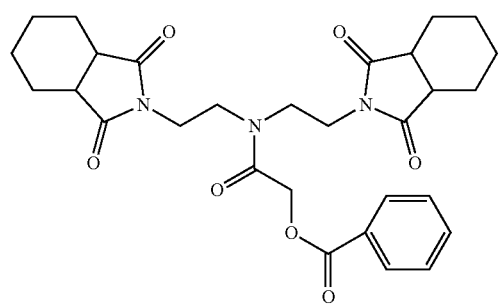
2-2-1
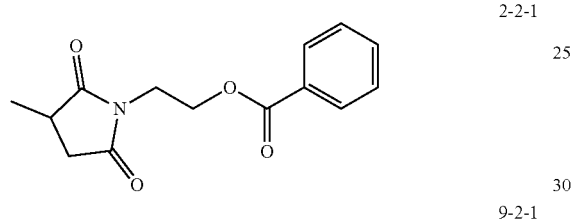
9-2-1
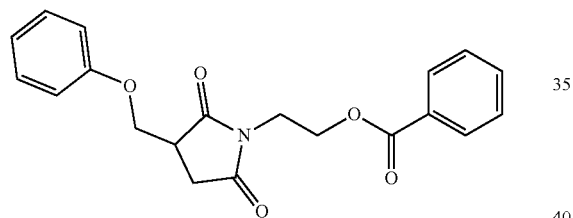
10-2-1
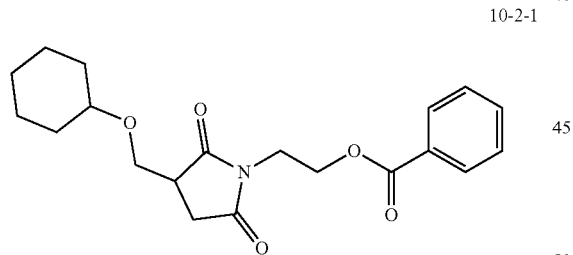
11-2-1
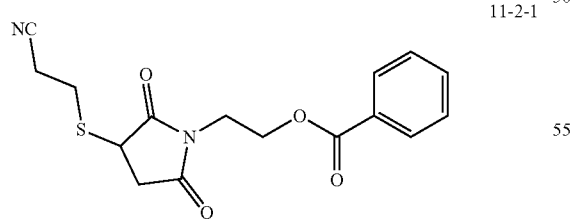
21-2-1
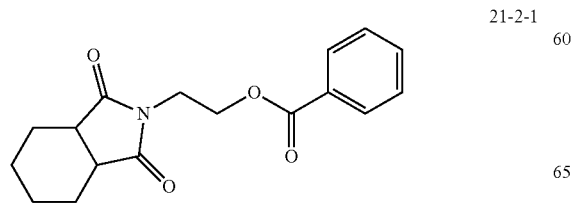
170
-continued
24-2-1
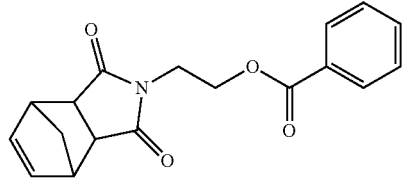
26-2-1
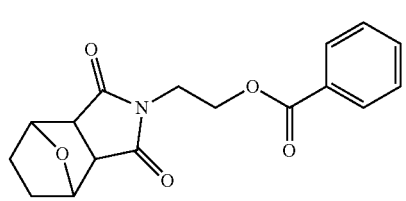
27-2-1
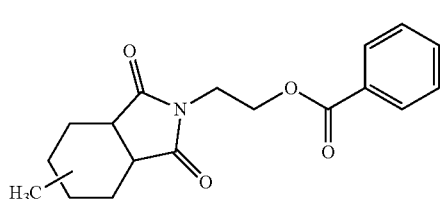
27-2-26
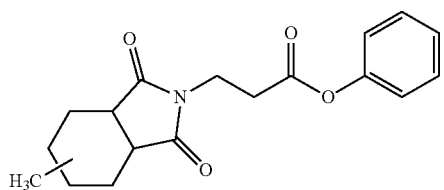
42-2-1
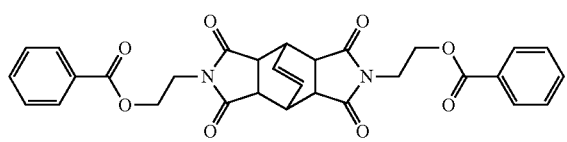
21-2-27
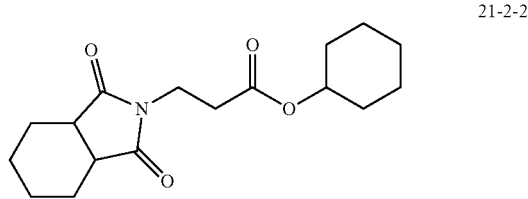
21-2-9
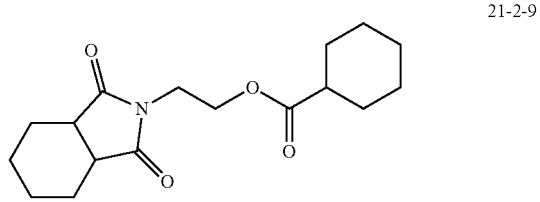
21-2-14
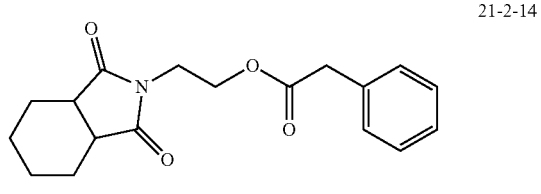

-continued 21-2-20

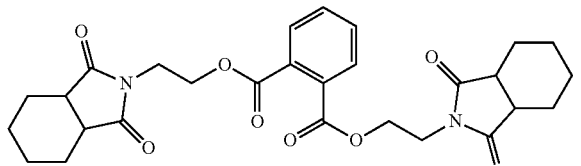

21-2-21

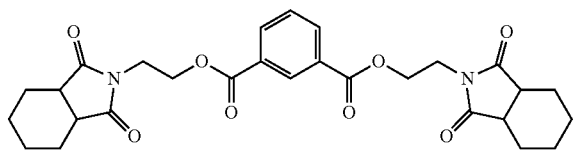

21-2-23

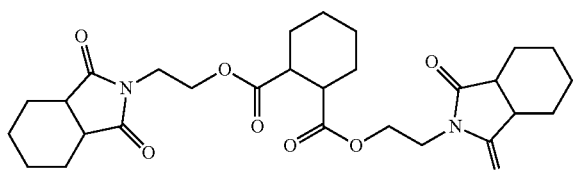

21-7-1

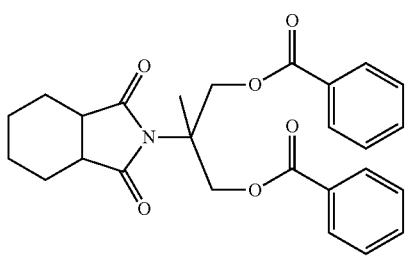

21-7-9

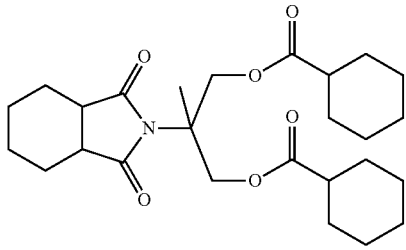

21-8-1

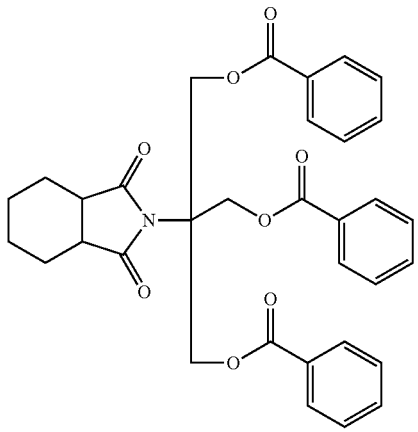

-continued 21-8-19

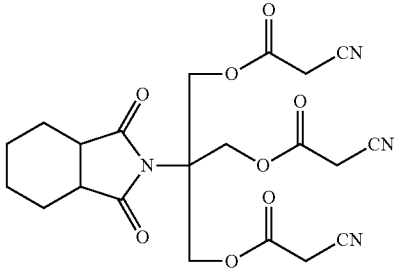

The compound denoted by General Formula (VII) is able to be manufactured by a known method.

For example, the compound denoted by General Formula (VII-1) is able to be obtained by a dehydration condensation reaction between a corresponding acid anhydride and amine, or the like. In addition, compound denoted by General Formula (VII-4) is able to be obtained by forming the structure denoted by General Formula (VIII) by a dehydration condensation reaction between a corresponding acid anhydride and amine, and then, by forming the structure denoted by General Formula (IX) by a reaction between alcohol and an acid chloride.

(Added Amount)

The added amount of the compound having an NRCO structure described above is not particularly limited, but is preferably 1 to 50 parts by mass, is more preferably 2 parts by mass to 30 parts by mass, is even more preferably 2 parts by mass to 20 parts by mass, and is particularly preferably 4 parts by mass to 15 parts by mass, with respect to 100 parts by mass of cellulose acylate. Furthermore, two or more types of compounds having different NRCO structures may be added. Even in a case where two or more types of compounds are added, a specific example and a preferred range of the added amount are as described above.

Cellulose Ester

Known cellulose ester which is used for manufacturing a cellulose ester film is able to be used as the cellulose ester without any limitation. The cellulose ester is preferably cellulose acylate. The degree of substitution of the cellulose acylate indicates the ratio of the acylation of three hydroxyl groups existing in the constitutional unit of cellulose (glucose having a (β)1,4-glycoside bond). The degree of substitution (an acylation degree) is able to be calculated by measuring the amount of bonded fatty acid per the mass of the constitutional unit of the cellulose. In the present invention, the degree of substitution of a cellulose body is able to be calculated by dissolving the cellulose body in a solvent such as dimethyl sulfoxide substituted with deuterium, by measuring a $^{13}C$-NMR spectrum, and by obtaining a peak intensity ratio of carbonyl carbon in an acyl group. A residual hydroxyl group of the cellulose acylate is substituted with other acyl groups different from the acyl group of the cellulose acylate itself, and then, the degree of substitution of a cellulose body is able to be obtained by $^{13}C$-NMR measurement. The details of a measurement method are disclosed in (Carbohydrate. Res., 273 (1995) 83-91) edited by TEZUKA et. al.

The degree of substitution of the cellulose acylate is preferably greater than or equal to 1.5 and less than or equal to 3.0, is more preferably 2.00 to 2.97, is even more preferably greater than or equal to 2.50 and less than 2.97, and is particularly 2.70 to 2.95.

In addition, in cellulose acetate using only an acetyl group as the acyl group of the cellulose acylate, the degree of substitution is preferably greater than or equal to 2.0 and less than or equal to 3.0, 2.3 to 3.0, is more preferably 2.60 to 3.0, is even more preferably 2.6 to 2.97, and is particularly preferably 2.70 to 2.95, from the viewpoint of increasing a scratch resistance improvement effect by the compound described above.

An acetyl group, a propionyl group, and a butyryl group are particularly preferable as the acyl group of the cellulose acylate which is able to be used in the present invention, and the acetyl group is more particularly preferable.

Mixed fatty acid ester formed of two or more types of acyl groups is also able to be preferably used as the cellulose acylate in the present invention. Even in this case, an acetyl group and an acyl group having 3 to 4 carbon atoms are preferable as the acyl group. In addition, in a case where the mixed fatty acid ester is used, the degree of substitution in a case of having the acetyl group as the acyl group is preferably less than 2.5, and is more preferably less than 1.9. On the other hand, the degree of substitution in a case of having the acyl group having 3 to 4 carbon atoms is preferably 0.1 to 1.5, is more preferably 0.2 to 1.2, and is particularly preferably 0.5 to 1.1.

In the present invention, two types of cellulose acylates having different substituents and/or different degrees of substitution may be used together or may be used by being mixed, or a film having a plurality of layers, which is formed of different cellulose acylates, may be formed by a co-casting method or the like described below.

Further, mixed acid ester having a fatty acid acyl group and a substitutional or non-substitutional aromatic acyl group, which is disclosed in paragraphs 0023 to 0038 of JP2008-20896A, is also able to be preferably used in the present invention.

The cellulose acylate which is used in the present invention preferably has a mass average polymerization degree of 250 to 800, and preferably has a mass average polymerization degree of 300 to 600. In addition, the cellulose acylate which is used in the present invention preferably has a number average molecular weight of 40,000 to 230,000, more preferably has a number average molecular weight of 60,000 to 230,000, and most preferably has a number average molecular weight of 75,000 to 200,000.

The cellulose acylate is able to be synthesized by using an acid anhydride or an acid chloride as an acylation agent. In a case where the acylation agent described above is an acid anhydride, an organic acid (for example, an acetic acid) or methylene chloride are used as a reaction solvent. In addition, a protonic catalyst such as sulfuric acid is able to be used as a catalyst. In a case where the acylation agent is the acid chloride, a basic compound is able to be used as the catalyst. In a synthesis method which is most general in the industry, the cellulose acylate is synthesized by esterifying cellulose with a mixed organic acid component containing an acetyl group, an organic acid corresponding to other acyl groups (an acetic acid, a propionic acid, and a nitric acid), or an acid anhydride thereof (an acetic anhydride, a propionic anhydride, and a nitric anhydride).

In the method described above, there are many cases in which the cellulose such as cotton linters or wood pulp is subjected to an activation treatment by an organic acid such as an acetic acid, and then, is esterified by using a mixed liquid of the organic acid component as described above in the presence of a sulfuric acid catalyst. In general, an organic anhydride component is used in the excessive amount with respect to the amount of hydroxyl group existing in the cellulose. In this esterification treatment, a hydrolysis reaction of a cellulose main chain (a (β)1,4-glycoside bond) (a depolymerization reaction) progresses in addition to an esterification reaction. In a case where the hydrolysis reaction of the main chain progresses, the degree of polymerization of the cellulose acylate decreases, and the physical properties of a cellulose ester film to be manufactured decrease. For this reason, it is preferable that reaction conditions such as a reaction temperature are determined in consideration of the degree of polymerization or the molecular weight of cellulose acylate to be obtained.

The cellulose ester film according to one embodiment of the present invention may contain other additives in addition to the cellulose ester and the compound described above. A known plasticizer, a known organic acid, a known dye, a known polymer, a known retardation adjusting agent, an ultraviolet absorbent, an antioxidant, a matting agent, and the like are exemplified as such an additive. The additives can be referred to the description in paragraphs 0062 to 0097 of JP2012-155287A, and the contents thereof are incorporated herein. The total formulation amount thereof is preferably less than or equal to 50 mass % of the cellulose acylate, and is more preferably less than or equal to 30 mass % of the cellulose acylate.

Manufacturing Method of Cellulose Ester Film

A manufacturing method the cellulose ester film according to one embodiment of the present invention is not particularly limited, it is preferable that the cellulose ester film is manufactured by a melting film formation method or a solution film formation method (a solvent casting method), and it is more preferable that the cellulose ester film is manufactured by a solution film formation method (a solvent casting method). A manufacturing example of the cellulose ester film using the solvent casting method can be referred to each specification of U.S. Pat. Nos. 2,336,310A, 2,367,603A, 2,492,078A, 2,492,977A, 2,492,978A, 2,607,704A, 2,739,069A, and 2,739,070A, each specification of GB640731A and GB736892A, and each publication of JP1970-4554B (JP-S45-4554B), JP1974-5614B (JP-S49-5614B), JP1985-176834A (JP-S60-176834A), JP1985-203430A (JP-S60-203430A), JP1987-115035A (JP-S62-115035A), and the like. In addition, the cellulose ester film may be subjected to a stretching treatment. A method and conditions of the stretching treatment, for example, can be referred to each publication of JP1987-115035B (JP-S62-115035B), JP1992-152125A (JP-H04-152125A), JP1992-284211A (JP-H04-284211A), JP1992-298310 A (JP-H04-298310A), JP1999-48271A (JP-H11-48271A), and the like.

(Casting Method)

Examples of a casting method of a solution include a method in which a prepared dope is evenly extruded onto a metal support from a pressurization die, a method using a doctor blade in which a film thickness of a dope once cast on a metal support is adjusted by a blade, a method using a reverse roll coater in which a film thickness of a dope is adjusted by a reversely rotating roll, and the like, and the method using the pressurization die is preferable. Examples of the pressurization die include a coat hanger type pressurization die, a T die type pressurization die, and the like, and any of them is able to be preferably used. In addition, and various methods of forming a casting film by casting a cellulose acylate solution, which have been known in the related art, are able to be performed in addition to the methods exemplified herein, and each condition is able to be set in consideration of a difference in the boiling point of a solvent to be used, and the like.

Co-Casting

In the formation of the cellulose ester film, a lamination casting method such as a co-casting method, a sequential casting method, and a coating method is preferably used, and it is particularly preferable that the simultaneous co-casting method is used from the viewpoint of stable manufacturing and a reduction in production costs reduce.

In a case where the cellulose ester film is manufactured by the co-casting method and the sequential casting method, first, a cellulose acetate solution for each layer (a dope) is prepared. The co-casting method (multi-layered simultaneous casting) is a casting method in which a dope is extruded onto a casting support (a band or a drum) from a casting geeser simultaneously extruding a casting dope for each layer (three layers, or three or more layers may be used) from a different slit, each of the layers is simultaneously cast, is peeled off from the support at a suitable timing, and is dried, and thus, a film is molded. Three layers of a dope for a surface layer and a dope for a core layer are able to be simultaneously extruded and cast onto the casting support by using the co-casting geeser.

The sequential casting method is a casting method of sequentially casting and laminating dopes in a manner where a dope for casting a first layer is first extruded onto the casting support from the casting geeser, is cast, and is dried or is not dried, and then, a dope for casting a second layer is extruded onto the dope for casting a first layer from the casting geeser, as necessary, until a third layer is formed, of peeling off the dopes from the support at a suitable timing, and of drying the dopes, and this, of molding a cellulose ester film. In general, a coating method is a method in which a core layer is molded into the shape of a film by a solution film formation method, a coating liquid to be applied onto a surface layer is prepared, a coating liquid is simultaneously applied onto each one surface or both surfaces of the core layer by using a suitable coating machine and is dried, and thus, a cellulose ester film having a laminated structure is molded.

Any one or all of the layers contain the compound described above, and thus, a cellulose ester film having high scratch resistance is able to be obtained.

(Stretching Treatment)

It is preferable that the manufacturing method of the cellulose ester film include a step of forming a film and stretching the formed film. It is preferable that a stretching direction of the cellulose ester film is either a transport direction (an MD direction) of the cellulose ester film or a direction orthogonal to the transport direction (a TD direction), it is particularly preferable that the stretching direction of the cellulose ester film is the direction orthogonal to the transport direction of the cellulose ester film (the TD direction) from the viewpoint of a polarizing plate processing process continuously using the cellulose ester film afterward.

A method of performing stretching in the TD direction, for example, is disclosed in each publication of JP1987-115035A (JP-S62-115035A), JP1992-152125A (JP-H04-152125A), JP1992-284211A (JP-H04-284211A), JP1992-298310A (JP-104-298310A), JP1999-48271A (JP-H11-48271A), and the like. In a case of performing stretching in the MD direction, for example, the speed of a transport roller of the cellulose ester film is adjusted, and in a case where a winding speed of the cellulose ester film is faster than a peeling speed of the cellulose ester film, the cellulose ester film is stretched. In a case of performing the stretching in the TD direction, the cellulose ester film is transported while retaining the width of the cellulose ester film with a tenter, and the width of the tenter gradually decreases, and thus, the cellulose ester film is able to be stretched. After the cellulose ester film is dried, the stretching (preferably monoaxial stretching using a long stretching machine) is also able to be performed by using a stretching machine.

In a case where the cellulose ester film is used as a protective film of a polarizer, it is necessary that a transmission axis of the polarizer is arranged to be parallel to an in-plane slow axis of the cellulose ester film in order to suppress a light leakage at the time of viewing the polarizing plate from a tilt direction. In general, a transmission axis of a roll film-like polarizer to be continuously manufactured is parallel to a width direction of the roll film, and thus, it is necessary that an in-plane slow axis of the roll film-like protective film is parallel to a width direction of the cellulose ester film in order to continuously bond the roll film-like polarizer described above to a protective film formed of the roll film-like cellulose ester film. Accordingly, it is preferable that the stretching is usually performed in the TD direction. In addition, the stretching treatment may be performed in the middle of a film forming step, or a raw fabric which has been formed and wound may be subjected to the stretching treatment.

The stretching in the TD direction is preferably stretching of 5% to 100%, is more preferably stretching of 5% to 80%, and particularly preferably stretching of 5% to 40%. Furthermore, un-stretching indicates that stretching is 0%. The stretching treatment may be performed in the middle of the film forming step, or a raw fabric which has been formed and wound may be subjected to the stretching treatment. In the former case, the stretching may be performed in a case of including the amount of residual solvent, and the stretching is able to be preferably performed in a state where Amount of Residual Solvent=(Residual Volatile Content Mass/Film Mass after Heating Treatment)×100% is 0.05 to 50%. It is particularly preferable that the stretching is performed at a stretching ratio of 5% to 80% in a state where the amount of residual solvent is 0.05 to 5%.

The cellulose ester film containing the compound having an NRCO structure described above is subjected to the stretching treatment, and thus, it is possible to further increase the scratch resistance of the film.

Physical Properties of Cellulose Ester Film

The surface hardness (the knoop hardness) and tan δ (25° C.) of the cellulose ester film according to one embodiment of the present invention are as described above.

Modulus of Elasticity:

The cellulose ester film has a practically sufficient modulus of elasticity. The range of the modulus of elasticity is not particularly limited, but is preferably in a range of 1.0 to 7.0 GPa, is more preferably in a range of 2.0 to 6.0 GPa, and is even more preferably in a range of 3.0 to 6.0 GPa, from the viewpoint of manufacturing suitability and handling properties. The cellulose ester film has an action of being hydrophobized by adding the compound described above into the cellulose ester film, and thus, of improving the modulus of elasticity, and this is also an advantage of the present invention.

The modulus of elasticity is able to be measured by the following method.

A long cellulose ester film is cut, and a cellulose ester film sample having a size of 10 mm×150 mm is formed. The cellulose ester film sample is subjected to humidity adjustment in conditions of a temperature of 25° C. and relative humidity of 65% for 2 hours. The cellulose ester film sample after the humidity adjustment is subjected to a stretching treatment in a long side direction in an atmosphere of a temperature of 25° C. and relative humidity of 60% and at an initial sample length of 50 mm and 10%/minute by using a universal tensile tester STM T50BP manufactured by Baldwin Corporation, and a stress strain curve is measured, and thus, the film modulus of elasticity E (unit: GPa) in the transport direction is obtained.

Photoelastic Coefficient:

The absolute value of the photoelastic coefficient of the cellulose ester film is preferably less than or equal to $8.0\times10^{-12}$ m$^2$/N, is more preferably less than or equal to $6\times10^{-2}$ m$^2$/N, and is even more preferably less than or equal to $5\times10^{-12}$ m$^2$/N. The photoelastic coefficient of the cellulose ester film decreases, and thus, the occurrence of unevenness is able to be suppressed under high temperature and high humidity at the time of incorporating the cellulose ester film of the present invention in a liquid crystal display device as a polarizing plate protective film. The photoelastic coefficient is not particularly limited, and is measured and calculated by the following method.

The lower limit value of the photoelastic ratio is not particularly limited, and is practically greater than or equal to $0.1\times10^{-12}$ m$^2$/N.

The photoelastic coefficient is obtained by cutting the cellulose ester film to have a size of 3.5 cm×12 cm, by measuring Re at each load of no load, 250 g, 500 g, 1,000 g, and 1,500 g using an ellipsometer (M150, manufactured by JASCO Corporation), and by performing calculation from the slope of a straight line of a Re change with respect to the stress.

Moisture Content:

The moisture content of the cellulose ester film is able to be evaluated by measuring an equilibrium moisture content at constant temperature and humidity. The equilibrium moisture content is calculated by being left to stand at the temperature and humidity described above for 24 hours, and then, by measuring the amount of moisture of the sample which has reached equilibrium by a KARL FISCHER Method, and by dividing the amount of moisture (g) by a sample mass (g).

The moisture content of the cellulose ester film at a temperature of 25° C. and relative humidity of 80% is preferably less than or equal to 5 mass %, is more preferably less than or equal to 4 mass %, and is even more preferably less than 3 mass %. The moisture content of the cellulose ester film decreases, and thus, it is possible to suppress the occurrence of the display unevenness of the liquid crystal display device at high temperature and high humidity at the time of incorporating the cellulose ester film of the present invention in the liquid crystal display device as the polarizing plate protective film. The lower limit value of the moisture content is not particularly limited, and is practically greater than or equal to 0.1 mass %.

Moisture Permeability:

The moisture permeability of the cellulose ester film is able to be evaluated by measuring the mass of water vapor passing through the sample for 24 hours in an atmosphere of a temperature 40° C. and relative humidity of 90% RH on the basis of a moisture permeability test (a cup method) of JIS Z0208, and by converting the measured value into a value per a sample area of 1 m$^2$.

The moisture permeability of the cellulose ester film is preferably 500 to 2,000 g/m$^2$·day, is more preferably 900 to 1,300 g/m$^2$·day, and is even more preferably 1,000 to 1,200 g/m$^2$·day.

Haze:

The haze of the cellulose ester film is preferably less than or equal to 1%, is more preferably less than or equal to 0.7%, and is particularly preferably less than or equal to 0.5%. By setting the haze to be less than or equal to the upper limit value described above, an advantage is obtained in which the transparency of the cellulose ester film further increases, and the cellulose ester film is easily used as an optical film. The haze is measured and calculated by the following method, unless otherwise particularly stated. The lower limit value of the haze is not particularly limited, and is practically greater than or equal to 0.001%.

The haze is obtained by measuring a cellulose ester film having a size of 40 mm×80 mm under an environment of a temperature of 25° C. and relative humidity of 60% by using a hazemeter (HGM-2DP, manufactured by Suga Test Instruments Co., Ltd.) according to JIS K7136.

Film Thickness:

The average film thickness of the cellulose ester film is able to be suitably determined according to the application, and for example, is 5 µm to 100 µm. The average film thickness of the cellulose ester film is preferably 5 µm to 100 µm, is more preferably 8 µm to 80 µm, and is even more preferably 10 µm to 70 µm. It is preferable that the average film thickness of the cellulose ester film is greater than or equal to 10 µm since the handling properties at the time of preparing a web-like film are improved. In addition, by setting the average film thickness of the cellulose ester film to be less than or equal to 70 µm, it is easy to cope with a humidity change, and it is easy to maintain optical properties.

In addition, in a case where the cellulose ester film has a laminated structure of three of more layers, the film thickness of a core layer is preferably 3 µm to 70 µm, and is more preferably 5 µm to 60 µm, and both of the film thicknesses of a skin layer A and a skin layer B are more preferably 0.5 µm to 20 µm, are particularly preferably 0.5 µm to 10 µm, and are most preferably 0.5 µm to 3 µm. The core layer indicates a layer positioned on the center portion of the three-layer structure, and the skin layer indicates a layer positioned on the outside of the three-layer structure.

Width:

The width of the cellulose ester film is preferably 700 mm to 3,000 mm, is more preferably 1,000 mm to 2,800 mm, and is particularly preferably 1,300 mm to 2,500 mm.

(Saponification Treatment)

The cellulose ester film described above is able to be used as the polarizing plate protective film by imparting adhesiveness with respect to the material of the polarizer such as polyvinyl alcohol according to an alkali saponification treatment.

A method disclosed in paragraph 0211 and paragraph 0212 of JP2007-86748A is able to be used as a saponification method.

For example, it is preferable that the alkali saponification treatment with respect to the cellulose ester film is performed in a cycle in which the surface of the film is dipped in an alkali solution, and then, is neutralized with an acidic solution, is washed with water, and is dried. Examples of the alkali solution described above include a potassium hydroxide solution and a sodium hydroxide solution, and the concentration of hydroxide ions is preferably in a range of 0.1 mol/L to 5.0 mol/L, and is more preferably in a range of 0.5 mol/L to 4.0 mol/L. An alkali solution temperature is preferably in a range of room temperature to 90° C., and is more preferably in a range of 40° C. to 70° C.

Easily adhesive processing as disclosed in JP1994-94915A (JP-H06-94915A) and JP1994-118232A (JP-H06-118232A) may be performed instead of the alkali saponification treatment.

[Polarizing Plate]

A polarizing plate of the present invention includes the cellulose ester film described above and a polarizer.

In one embodiment, the cellulose ester film described above is included in the polarizing plate as a protective film. The polarizing plate according to this embodiment includes the polarizer, and two polarizing plate protective films (transparent films) protecting both surfaces of the polarizer, and includes the cellulose ester film of the present invention as at least one polarizing plate protective film.

In particular, the cellulose ester film of the present invention is preferably used as a visible side protective film of an upper side polarizing plate 10. FIG. 1 is an example illustrating one embodiment of a positional relationship between the polarizing plate of the present invention and the liquid crystal display device, 1 represents the cellulose ester film of one embodiment of the present invention, 2 represents the polarizer, 3 represents a retardation film, and 4 represents a liquid crystal cell. In addition, the upper side of FIG. 1 is the visible side.

As illustrated in FIG. 1, the retardation film 3 is preferably used as the polarizing plate protective film on a side where the cellulose ester film according to one embodiment of the present invention is not used, and a retardation film exhibiting desired retardation by formulating various additives in the cellulose ester film or by stretching the cellulose ester film, or a retardation film including an optically anisotropic layer formed of a liquid crystal composition on the surface of a support is exemplified as this retardation film 3. Specifically, the retardation film can be referred to the description in JP2008-262161A, and the contents thereof are incorporated herein.

In addition, for example, a polarizer which is obtained by dipping a polyvinyl alcohol film in an iodine solution, and by stretching the polyvinyl alcohol film, and the like is able to be used as the polarizer. In a case of using the polarizer which is obtained by dipping the polyvinyl alcohol film in the iodine solution and by stretching the polyvinyl alcohol film, a surface treatment surface of the cellulose ester film of one embodiment of the present invention is able to be directly bonded onto at least one surface of the polarizer by using an adhesive. An aqueous solution of polyvinyl alcohol or polyvinyl acetal (for example, polyvinyl butyral), a latex of a vinyl-based polymer (for example, polybutyl acrylate) is able to be used as the adhesive described above. An adhesive which is particularly preferable is an aqueous solution of completely saponified polyvinyl alcohol.

In a method of bonding the polarizing plate protective film to the polarizer, it is preferable that the transmission axis of the polarizer is substantially parallel to a slow axis of the polarizing plate protective film. The slow axis is able to be measured by a various known methods, and for example, is able to be measured by using a birefringence meter (KOBRA DH, manufactured by Oji Scientific Instruments).

Here, being substantially parallel indicates that both of the direction of a main refractive index nx of the polarizing plate protective film and the direction of a transmission axis of the polarizing plate are less than or equal to 5°, and both of the directions are preferably less than or equal to 1°, and are more preferably less than or equal to 0.5°. It is preferable that both of the directions are less than or equal to 1°, since polymerization performance rarely decreases under polarizing plate crossed nicols, and a light leakage rarely occurs.

Functionalization of Polarizing Plate

The polarizing plate of the present invention is preferably used as a functionalized polarizing plate which is composed with an optical film including a functional layer such as an antireflection film, a brightness enhancement film, a hard coat layer, a forward scattering layer, and an antiglare layer, for improving the visibility of display, in a range not departing from the gist of the present invention. The details thereof can be referred to the description in paragraphs 0229 to 0242 and paragraphs 0249 to 0250 of JP2012-082235A and paragraphs 0086 to 0103 of JP2012-215812, the contents thereof are incorporated herein.

(Hard Coat Layer)

A hard coat layer which is disposed onto the cellulose ester film as desired, is a layer for imparting hardness or scratch resistance to the polarizing plate of the present invention. For example, a coating composition is applied onto the cellulose ester film, and is cured, and thus, the hard coat layer is able to be formed on the cellulose ester film. By adding fillers or additives to the hard coat layer, mechanical performance, electrical performance, optical performance, physical performance, or chemical performance such as water repellency or oil repellency is able to be imparted to the hard coat layer itself. The thickness of the hard coat layer is preferably in a range of 0.1 to 6 μm and is more preferably in a range of 3 to 6 μm. By including such a thin hard coat layer in the range described above, it is possible to obtain the polarizing plate including the hard coat layer in which physical properties such as suppression in brittleness or curling are improved, and a reduction in weight and manufacturing costs is realized.

It is preferable that the hard coat layer is formed by curing a curable composition. It is preferable that the curable composition is prepared as a liquid coating composition. An example of the coating composition contains a monomer or an oligomer for a matrix forming binder, a polymers, and an organic solvent. The coating composition is applied, and then, is cured, and thus, the hard coat layer is able to be formed. In the curing, a cross-linking reaction or a polymerization reaction is able to be used. The details thereof can be referred to the description in paragraphs 0088 to 0101 of JP2012-215812A, and the contents thereof are incorporated herein.

A curable composition which is particularly suitable for forming the hard coat layer is a composition containing a (meth)acrylate-based compound to be used in examples described below.

It is preferable that the curable composition is prepared as a coating liquid. The coating liquid is able to be prepared by dissolving and/or dispersing the component described above in an organic solvent, (Properties of Hard Coat Layer)

It is preferable that the hard coat layer on the cellulose ester film has high adhesiveness with respect to the cellulose ester film. The hard coat layer formed of the suitable curable composition described above on the cellulose ester film containing the compound described above, both of the curable composition and the compound described above are able to exhibit high adhesiveness with respect to the cellulose ester film. The polarizing plate of the present invention includes such cellulose ester film and hard coat layer, and thus, the adhesiveness between the cellulose ester film and the hard coat layer is able to be maintained even in a case where light irradiation or the like is performed, and therefore, excellent light durability is able to be exhibited.

It is preferable that the hard coat layer has excellent scratch resistance. Specifically, in a case where a pencil hardness test which is the index of the scratch resistance is performed, it is preferable that pencil hardness of greater than or equal to 3H is attained.

[Liquid Crystal Display Device]

The liquid crystal display device of the present invention includes at least one polarizing plate of the present invention. The details of the liquid crystal display device can be referred to the description in paragraphs 0251 to 0260 of JP2012-082235A, and the contents thereof are incorporated herein.

Furthermore, even though it is not exemplified, the polarizing plate according to one embodiment of the present invention is able to be used a part of a circular polarization plate arranged as antireflection application of a spontaneous light emitting element such as a reflective type or half transmission type liquid crystal display device, or an organic EL, as other configurations.

EXAMPLES

Hereinafter, the present invention will be described in detail with reference to the following examples. Materials, use amounts, ratios, treatment contents, treatment sequences, and the like of the following examples are able to be suitably changed unless the changes cause deviance from the gist of the present invention. Accordingly, the range of the present invention will not be restrictively interpreted by the following specific examples.

All compounds were immobilized by using $^1$H-NMR (300 MHz) and MALDI-TOF-MS. In addition, a melting point was measured by using a trace amount melting point measurement device (MP-500D manufactured by YANACO TECHNICAL SCIENCE CO., LTD.).

In Examples 1 to 19 and Comparative Examples 1, 3, and 4, compounds 1, and 3 to 16 described below were added to a cellulose acylate film. A compound 2 added to a cellulose acylate film in Comparative Example 2 is polyurethane which is a condensate between polyester formed of polyethylene glycol/1,4-butylene glycol/a succinic acid (a number average molecular weight of 2,000) and tolylene diisocyanate, and was synthesized by a method disclosed in paragraph 0043 of JP2004-175971A. Furthermore, the average molecular weight described above is a value obtained in terms of standard polystyrene by being measured using a gel permeation chromatography (GPC).

Compound 1

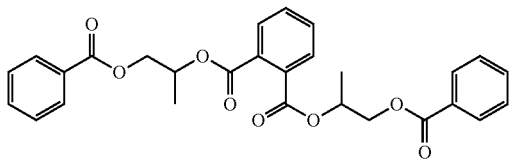

Compound 3

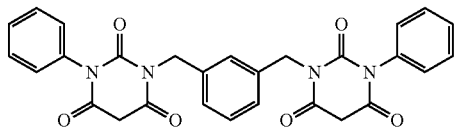

Compound 4

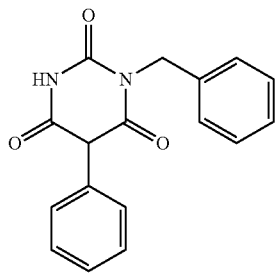

Compound 5

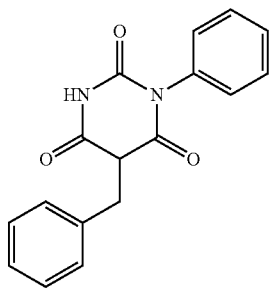

Compound 6

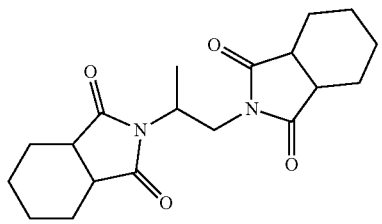

Compound 7

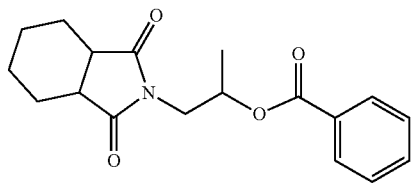

Compound 8

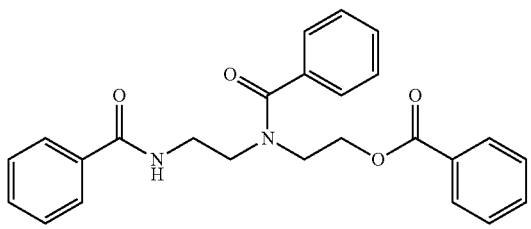

-continued

Compound 9

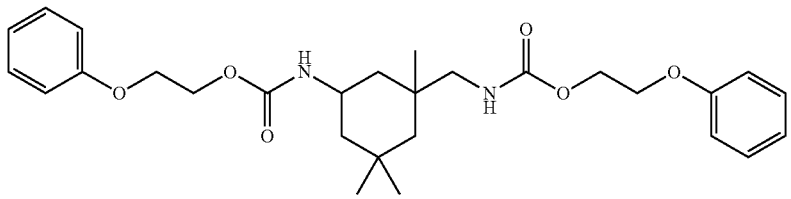

Compound 10

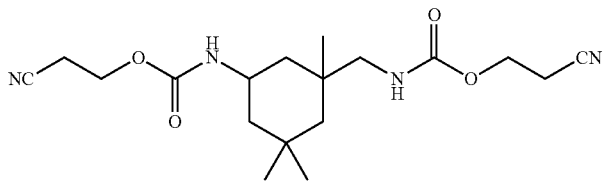

Compound 11

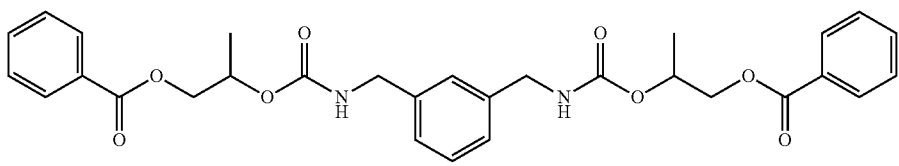

Compound 12 | Compound 13

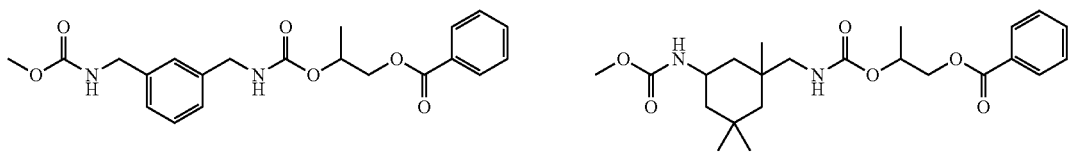

Compound 14

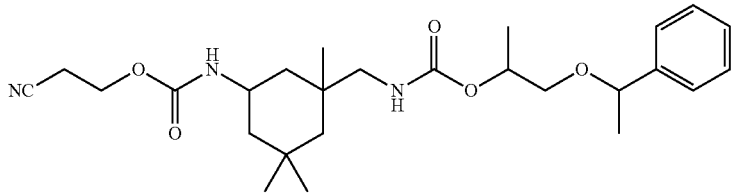

Compound 15

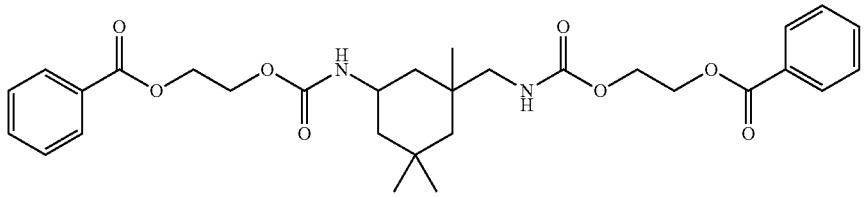

Compound 16

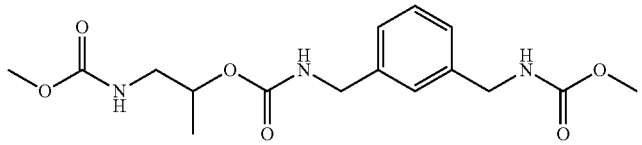

1. Synthesis Example of Compound
<Synthesis of Compound 5>

27.2 g (0.20 mol) of N-phenyl urea, 60.1 g (0.24 mol) of benzyl malonic acid ethyl, and 102.1 g (0.30 mol) of a solution of sodium ethoxide/ethanol of 20% were put into a three-neck flask of 300 ml provided with a thermometer, a reflux cooling pipe, and a stirrer, and were continuously stirred for 4 hours under heating and refluxing. After that, a part of ethanol was distilled, and then, was cooled to room temperature, and here, 100 mL of acetic acid ethyl was added. The precipitated solid was filtered by suction filtration, and was washed with acetic acid ethyl. The solid (a sodium salt) was dissolved in 100 mL of water, and a hydrochloric acid was dropped such that pH became 1, and thus, precipitation was performed. The precipitated solid was filtered by suction filtration, and was washed with water. Further, the crude body was heated and washed with isopropyl alcohol, and then, was cooled to room temperature, was filtered, and was dried in the reduced pressure, and thus, 43.1 g of a compound 5 was obtained as a white solid (a yield of 68%).

$^1$H-NMR (300 MHz, DMSO-d6): δ3.34(2H), 4.08(m, 1H), 7.00-7.48(m, 10H), 11.52(br, 1H)

Melting Point: 122° C.

C log P Value: 1.75

<Synthesis of Compound 4>

A compound 4 was synthesized on the basis of the synthesis of the compound 5.

<Synthesis of Compound 6>

10.0 g (0.135 mol) of cis-cyclohexane dicarbon acid anhydride and 30 mL of toluene were put into a three-neck flask provided with a thermometer, a reflux cooling pipe, and a stirrer, and were stirred and dissolved at room temperature. The mixture was cooled in a bath at 0° C., and 43.7 g (0.283 mol) of 1,2-propane diamine was dropped for 15 minutes. After the dropping ended, a reaction liquid was heated at 130° C., and was stirred for 4 hours. The reaction liquid was condensed, and the condensate was refined by a silica gel column chromatography, and thus, a compound 6 was obtained (a yielded amount of 16 g, and a yield of 34%).

$^1$H-NMR (CDCl$_3$) δ1.5-1.2(m, 10H), 1.9-1.6(m, 9H), 2.9-2.6(m, 4H), 3.5(dd, J=18.4 Hz, 3.2 Hz, 1H), 4.2-4.0(m, 1H), 4.5-4.3(m, 1H)

<Synthesis of Compound 7>

A compound 7 was synthesized on the basis of the synthesis of the compound 6.

<Synthesis of Compound 8>

2-(2-aminoethyl amino) ethanol (20 g) and pyridine (50.1 g) were ice-cooled and stirred in acetonitrile (300 mL), and benzoyl chloride (89 g) was dropped thereinto, and then, a reaction was performed at 30° C. to 40° C. for 3 hours. The reaction liquid was cooled to room temperature, and then, a liquid separating operation was performed with 300 mL of acetic acid ethyl and 400 mL of sodium bicarbonate water, drying was performed with magnesium sulfate, and then, a solvent was distilled by an evaporator. The crude product was refined by a silica gel column chromatography, and thus, a compound 8 was obtained as a white solid (48 g).

$^1$H-NMR (300 MHz, CDCl$_3$): δ3.7-3.9(m, 4H), 3.9-4.0 (m, 2H), 4.4-4.5(m, 2H), δ7.2-7.6(m, 12H), δ7.8(m, 2H), δ7.9(m, 2H)

<Synthesis of Compound 9>

157.1 g of phenoxy ethanol, 150 mg of n-dibutyl tin diacetate, and 500 mL, of THF were put into a three-neck flask of 2 L provided with a mechanical stirrer, a thermometer, a cooling pipe, and a dropping funnel, and 100 mL of a THF solution of 136.9 g of isophorone diisocyanate was dropped into the three-neck flask at room temperature for 30 minutes. After that, a reaction was performed at 40° C. for 4 hours. A reaction mixture was condensed, and was refined by a silica gel column chromatography (a solvent of acetic acid ethyl/n-hexane), and thus, 238 g of a compound 9 was obtained as a white solid (a yield of 84%).

$^1$H-NMR (300 MHz, DMSO-d6): δ0.75-1.16(m, 13H), 1.43(br, 2H), 2.71(br, 2H), 3.60(br, 1H), 4.12(m, 4H), 4.25 (m, 4H), 6.93(m, 6H), 7.28(m, 4H), 7.08-7.35(m, 2H)

Melting Point: 96° C.

Molecular Weight: 499

<Synthesis of Compound 10>

(Synthesis of Compounds 1 to 9)

107 g (1.5 mol) of cyanoethanol, 200 mg of n-dibutyl tin diacetate, and 750 mL of acetic acid ethyl were put into a three-neck flask of 2 L provided with a mechanical stirrer, a thermometer, a cooling pipe, and a dropping funnel, and 100 mL of an acetic acid ethyl solution of 167 g (0.75 mol) of isophorone diisocyanate was dropped into the three-neck flask for 30 minutes under ice-cooling. After that, a reaction was performed at 50° C. for 4 hours. A reaction mixture was condensed, and was refined by a silica gel column chromatography (a solvent of acetic acid ethyl/n-hexane), and thus, 189 g of a compound 10 was obtained as a white solid (a yield of 70%).

MALDI-TOF-MS: M+Na; 387

<Synthesis of Compound 11>

In the synthesis of the compound 9, a compound 11 was synthesized by the same method as that in the synthesis of the compound 9 except that the phenoxy ethanol was changed to 1-benzoyl oxy-2-propanol, and the isophorone diisocyanate was changed to xylylene diisocyanate.

MALDI-TOFMS M+Na: 571

$^1$H-NMR (300 MHz, DMSO-d6): δ1.25(d, 6H), 4.10(d, 4H), 4.22(m, 2H), 5.05(m, 2H), 7.03(m, 2H), 7.50(t, 4H), 7.63(m, 4H), 7.95(d, 4H)

<Synthesis of Compounds 12 to 16>

Compounds 12 to 16 were synthesized on the basis of the synthesis of the compounds 9 and 11 described above.

<Synthesis of Compounds 1 and 3>

Compounds 1 and 3 used in Comparative Examples 1, 3, and 4 were synthesized on the basis of the synthesis of the compounds 9 and 11 described above.

2. Preparation Example of Cellulose Acylate Film

—Film Formation of Cellulose Acylate Film—

(Preparation of Cellulose Acylate Solution)

The composition described below was put into a mixing tank and was stirred, and each component was dissolved, and thus, a cellulose acylate solution was prepared.

Composition of Cellulose Acylate Solution

| | |
|---|---|
| Cellulose Acetate | 100.0 parts by mass |
| Acetyl Degree of Substitution of 2.87 and Degree of Polymerization of 370 Compound Shown in Table 3 Described below | Shown in Table 3 |
| Methylene Chloride (First Solvent) | 353.9 parts by mass |
| Methanol (Second Solvent) | 89.6 parts by mass |
| n-Butanol (Third Solvent) | 4.5 parts by mass |

The cellulose acylate solution prepared as described above was cast by using a drum casting device. Peeling was performed in a state where the amount of residual solvent in a dope was approximately 70 mass %, and drying was performed in a state where the amount of residual solvent was 3 to 5 mass %. After that, drying was further performed by transporting the cast solution between rolls of a heat treatment device, and thus, a cellulose acylate film having a film thickness shown in Table 3 was obtained.

3. Evaluation Method (1) Measurement of Knoop Hardness of Cellulose Acylate Film The surface of a sample fixed to a glass substrate by a knoop indenter in which the direction of a short axis of the indenter was arranged to be parallel to a transport direction (a longitudinal direction; a test direction in a pencil hardness test) at the time of forming the cellulose acylate film was measured in conditions of a loading time of 10 sec, a creeping time of 5 sec, an unloading time of 10 sec, and a maximum load of 50 mN by using a "FISCHERSCOPE H100Vp type hardness meter" manufactured by Fischer Instruments K.K. Hardness was calculated by a relationship between a contact area between the indenter and the sample, which was obtained from the indentation depth, and the maximum load, and the average value of five points was set to surface hardness.

In addition, the surface of the sample fixed to the glass substrate was measured in conditions of a loading time of 10 sec, a creeping time of 5 sec, an unloading time of 10 sec, and an indentation load of 50 mN by using a "FISCHERSCOPE H100Vp type hardness meter" manufactured by Fischer Instruments K.K., on the basis of a method in JIS Z 2251, and the hardness was calculated from the relationship between the contact area between the indenter and the sample, which was obtained from the indentation depth, and the maximum load. Furthermore, JIS Z 2251 is Japanese Industrial Standards prepared on the basis of ISO4545.

Further, in the same indentation position, total 18 azimuths measured by rotating the knoop indenter by 10° each were measured by being rotated at an equal angle, omniazimuth knoop hardness was measured, the minimum value was obtained, and as a result thereof, the value was coincident with the surface hardness measured by arranging the direction of the short axis of the knoop indenter described above to be parallel to the transport direction (the longitudinal direction; the test direction in the pencil hardness test) at the time of forming the cellulose acylate film.

The results are shown in Table 3. Furthermore, the knoop hardness of the surface on a side opposite to the surface which had been subjected to the measurement described above was similarly measured, and it was confirmed that both surfaces had the same knoop hardness.

(2) Determination of Presence or Absence of Absorption in Wavelength Range of Greater than or Equal to 280 nm and Less than or Equal to 780 nm In the examples and the comparative examples, a dichloromethane solution containing 0.01 mass % of each compound used for preparing the cellulose acylate film (a liquid temperature of 20° C. to 25° C.) was prepared, and light absorbance was measured in a wavelength range of greater than or equal to 280 nm and less than or equal to 780 nm by a spectrophotometer. In the wavelength range described above, not having light absorbance of greater than or equal to 1.0 abs was determined as the absence of absorption, and having light absorbance of greater than or equal to 1.0 abs was determined as the presence of absorption. The results are shown in Table 3.

(3) Measurement of Tan δ (25° C.)

Tan δ (25° C.) the cellulose acylate films of the examples and the comparative examples was measured by the method described above. The results are shown in Table 3.

(4) Pencil Hardness Test

The cellulose acylate films of the examples and the comparative examples were subjected to humidity adjustment in conditions of a temperature of 25° C. and relative humidity of 60% for 2 hours, the surfaces of the cellulose acylate films were repeatedly scratched with a pencil having each hardness 5 times by using 500 g of a weight according to a pencil hardness evaluation method defined in JIS-K5400 using a pencil for a test defined in JIS-S6006, and were stored under the conditions described above, and the presence or absence of a scratch on the surfaces of the cellulose acylate films after 1 day was observed. Furthermore, the scratch defined in JIS-K5400 is the breakage of a coated film or the scratch of a coated film, and a dent on the coated film is not an evaluation target in JIS-K5400, but in this evaluation, the dent on the coated film was also determined as the scratch. Pencil hardness was evaluated on the basis of the following criteria.

A: A scratch was not observed in both of a test using a pencil of 2H and a test using a pencil of 3H.

B: A scratch was not observed in the test using the pencil of 2H, but one or more scratches were observed in the test using the pencil of 3H.

(5) Evaluation of Photocoloration Suppression the cellulose acylate film obtained as described above was irradiated with light for 96 hours by using a SUPER XENON WEATHER METER (SX75 manufactured by Suga Test Instruments Co., Ltd.), and the presence or absence of photocoloration was evaluated according to a change in hue b* before and after the irradiation. The evaluation was performed according to the following criteria. The results are shown in Table 3.

The hue b* of the film was obtained by using a spectrophotometer UV3150 manufactured by SHIMADZU CORPORATION. In a case where the value of the hue b* increases towards a minus side, a bluish tint in transmitted light increases, and in a case where the value of the hue b* increases towards a plus side, yellowish tint in the transmitted light increases.

A: The width of the change in b* before and after the irradiation is less than or equal to 0.1.

B: The width of the change in b* before and after the irradiation is greater than 0.1 and less than or equal to 0.4.

C: The width of the change in b* before and after the irradiation is greater than 0.4.

TABLE 3

| | Compound | | | | | | | | | Test |
| | Type | Molecular Weight | Equivalence U | Added Amount (Parts by Mass) | Presence or Absence of Absorption in Wavelength Range of greater than or equal to 280 nm and Less than or equal to 780 nm | Film Thickness | Photocoloration Properties | Knoop Hardness | tan δ (25° C.) | Result of Pencil Hardness |
|---|---|---|---|---|---|---|---|---|---|---|
| Example 1 | Compound 4 | 294 | 147 | 10 | Absent | 54 | A | 226 | 0.032 | A |
| Example 2 | Compound 5 | 294 | 147 | 10 | Absent | 58 | A | 223 | 0.031 | A |
| Example 3 | Compound 6 | 346 | 173 | 10 | Absent | 56 | A | 211 | 0.034 | A |
| Example 4 | Compound 7 | 359 | 359 | 10 | Absent | 53 | A | 211 | 0.033 | A |
| Example 5 | Compound 8 | 417 | 209 | 10 | Absent | 58 | B | 221 | 0.033 | A |
| Example 6 | Compound 9 | 499 | 250 | 10 | Absent | 56 | A | 219 | 0.032 | A |

TABLE 3-continued

| | Compound | | | | | | | | Test |
|---|---|---|---|---|---|---|---|---|---|
| | Type | Molecular Weight | Equivalence U | Added Amount (Parts by Mass) | Presence or Absence of Absorption in Wavelength Range of greater than or equal to 280 nm and Less than or equal to 780 nm | Film Thickness | Photocoloration Properties | Knoop Hardness | tan δ (25° C.) | Result of Pencil Hardness |
| Example 7 | Compound 10 | 364 | 182 | 10 | Absent | 52 | A | 227 | 0.035 | A |
| Example 8 | Compound 11 | 549 | 275 | 10 | Absent | 61 | A | 225 | 0.034 | A |
| Example 9 | Compound 12 | 400 | 200 | 10 | Absent | 56 | A | 214 | 0.044 | A |
| Example 10 | Compound 9 | 499 | 250 | 25 | Absent | 54 | A | 238 | 0.033 | A |
| Example 11 | Compound 13 | 435 | 218 | 10 | Absent | 52 | A | 214 | 0.042 | A |
| Example 12 | Compound 14 | 474 | 237 | 10 | Absent | 60 | A | 213 | 0.033 | A |
| Example 13 | Compound 15 | 554 | 277 | 10 | Absent | 54 | A | 219 | 0.032 | A |
| Example 14 | Compound 16 | 353 | 118 | 10 | Absent | 52 | A | 221 | 0.047 | A |
| Example 15 | Compound 5 | 294 | 147 | 40 | Absent | 54 | A | 292 | 0.031 | A |
| Example 16 | Compound 15 | 554 | 277 | 10 | Absent | 26 | A | 251 | 0.034 | A |
| Example 17 | Compound 11 | 549 | 275 | 10 | Absent | 25 | A | 257 | 0.032 | A |
| Example 18 | Compound 10 | 364 | 182 | 10 | Absent | 24 | A | 244 | 0.036 | A |
| Example 19 | Compound 9 | 499 | 250 | 10 | Absent | 31 | A | 245 | 0.032 | A |
| Comparative Example 1 | Compound 1 | 491 | — | 10 | Absent | 54 | B | 200 | 0.042 | B |
| Comparative Example 2 | Compound 2 | >2000 | — | 10 | Present | 58 | C | 175 | 0.022 | B |
| Comparative Example 3 | Compound 3 | 511 | 128 | 10 | Absent | 57 | A | 227 | 0.028 | B |
| Comparative Example 4 | Compound 3 | 511 | 128 | 10 | Absent | 28 | A | 250 | 0.028 | B |

As shown in Table 3, in the cellulose acylate films of the examples which contains the compound having an NRCO structure, includes the surface having knoop hardness of greater than or equal to 210 N/mm² and has tan δ (25° C.) of greater than or equal to 0.03, the result of the pencil hardness test which is the index of the scratch resistance was excellent, compared to the cellulose acylate films of the comparative examples. For example, the cellulose acylate film of Comparative Example 3 includes the surface having knoop hardness of greater than or equal to 210 N/mm², but tan δ (25° C.) is less than 0.03. As a result thereof, the result of the pencil hardness test was lower than that of the examples. The present inventors have assumed that the results show that it is not satisfied only by increasing the surface hardness (the knoop hardness) in order to obtain the cellulose ester film having excellent scratch resistance, but is satisfied by also increasing tan δ (25° C.) to be greater than or equal to 0.03.

From the results described above, it was found that the cellulose ester film having excellent scratch resistance is able to be provided according to the present invention.

In addition, from the results shown in Table 3, it is able to confirm that the photocoloration of the cellulose ester film is able to be suppressed by using a compound which does not have absorption with respect to light in a wavelength range of greater than or equal to 280 nm and less than or equal to 780 nm as the compound having an NRCO structure.

4. Preparation Example of Polarizing Plate (1) Saponification Treatment of Polarizing Plate Protective Film Each of the cellulose acylate films obtained in the examples was dipped in 2.3 mol/L of an aqueous solution of sodium hydroxide at 55° C. for 3 minutes. Next, each of the cellulose acylate films was washed in a water washing bath at room temperature, and was neutralized at 30° C. by using a 0.05 mol/L of a sulfuric acid. Each of the cellulose acylate films was washed again in the water washing bath at room temperature, and was dried by hot air at 100° C. Thus, the surfaces of the cellulose acylate films were subjected to a saponification treatment.

(2) Preparation of Polarizing Plate

Iodine was adsorbed in a stretched polyvinyl alcohol film, and thus, a polarizer was prepared.

The cellulose acylate film which had been subjected to the saponification treatment was bonded to one side of the polarizer by using a polyvinyl alcohol-based adhesive. A commercially available cellulose triacetate film (FUJITAC TD80UF, manufactured by Fujifilm Corporation) was subjected to the same saponification treatment, and the commercially available cellulose triacetate film which had been subjected to the saponification treatment was bonded onto the surface of the polarizer on a side opposite to the side onto which each of the cellulose acylate films prepared as described above was bonded by using a polyvinyl alcohol-based adhesive.

At this time, a transmission axis of the polarizer was arranged to be parallel to the slow axis of the cellulose acylate film. In addition, the transmission axis polarizer was arranged to be orthogonal to the slow axis of the commercially available cellulose triacetate film.

Thus, each polarizing plate was prepared.

5. Preparation Example of Liquid Crystal Display Device

A polarizing plate on a visible side of a commercially available liquid crystal television (BRAVIA J5000 manufactured by Sony Corporation) was peeled off, and each polarizing plate prepared in 4. described above was bonded onto an observer side one by one as a polarizing plate through a pressure sensitive adhesive such that the polarizing plate protective film described above arranged on a side opposite to a liquid crystal cell side, and thus, a liquid crystal display device was obtained.

EXPLANATION OF REFERENCES
1: cellulose acylate film
2: polarizer
3: retardation film
4: liquid crystal cell
10: upper side polarizing plate

What is claimed is:

1. A cellulose ester film, containing:
a compound having a structural unit denoted by —NR—(C=O)— in which R represents a hydrogen atom or a substituent,
wherein a surface having knoop hardness of greater than or equal to 210 N/mm² is provided, and
loss tangent tan δ at 25° C. is greater than or equal to 0.03.

2. The cellulose ester film according to claim 1, wherein the loss tangent tan δ is less than 0.1.

3. The cellulose ester film according to claim 1, wherein the knoop hardness is less than or equal to 315 N/mm².

4. The cellulose ester film according to claim 1, wherein a molecular weight of the compound is greater than or equal to 250 and less than or equal to 1,500.

5. The cellulose ester film according to claim 1, wherein the compound has light absorption properties in which light absorbance of a dichloromethane solution containing 0.01 mass % of the compound in a wavelength range of greater than or equal to 280 nm and less than or equal to 780 nm is greater than or equal to 0 abs and less than 1.0 abs.

6. The cellulose ester film according to claim 1, wherein an equivalence U of the compound which is obtained as a value obtained by dividing the molecular weight of the compound by the number of the structural units contained in one molecule is less than or equal to 515.

7. The cellulose ester film according to claim 1, wherein the structural unit is denoted by —NH—(C=O)—, and
the structural unit is included in a structural unit denoted by —NH—(C=O)—O—.

8. The cellulose ester film according to claim 1, wherein the structural unit is included in a non-cyclic structural portion.

9. The cellulose ester film according to claim 8, wherein the compound has two or more structural units, and has a cyclic structure between at least two of the structural units.

10. The cellulose ester film according to claim 9, wherein the cyclic structure is selected from the group consisting of an aromatic ring and an aliphatic carbon ring.

11. The cellulose ester film according to claim 1, wherein the compound has the structural unit included in a non-cyclic structural portion and a cyclic structure as a terminal substituent.

12. The cellulose ester film according to claim 11, wherein the cyclic structure is selected from the group consisting of an aromatic ring and an aliphatic carbon ring.

13. The cellulose ester film according to claim 1, wherein the compound has a terminal substituent selected from the group consisting of an alkyl group, a cyano group, and an aromatic group.

14. The cellulose ester film according to claim 11, wherein the compound has a terminal substituent selected from the group consisting of an alkyl group, a cyano group, and an aromatic group.

15. The cellulose ester film according to claim 13, wherein the alkyl group is an alkyl group having 1 to 6 carbon atoms.

16. The cellulose ester film according to claim 1, wherein the structural unit is included in a cyclic structural portion.

17. The cellulose ester film according to claim 1, wherein the compound is a compound which is denoted by a general formula selected from the group consisting of General Formulas (I), (A-100), (III) to (V), and (VII) described below,

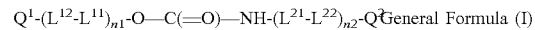

$Q^1\text{-}(L^{12}\text{-}L^{11})_{n1}\text{-}O\text{-}C(=O)\text{-}NH\text{-}(L^{21}\text{-}L^{22})_{n2}\text{-}Q^2$  General Formula (I)

in General Formula (I), $L^{11}$ and $L^{21}$ each independently represent an alkylene group, and the alkylene group may have a substituent,
$L^{12}$ and $L^{22}$ each independently represent a single bond, any one of —O—, —NR¹—, —S—, and —C(=O)—, or a group formed of a combination of two or more thereof,
$R^1$ represents a hydrogen atom or a substituent,
n1 and n2 each independently represent an integer of 0 to 20, any one of n1 and n2 is an integer of greater than or equal to 1, and in a case in which a plurality of $L^{11}$'s, $L^{12}$'s, $L^{21}$'s, and $L^{22}$'s exist, the plurality of $L^{11}$'s, $L^{12}$'s, $L^{21}$'s, and $L^{22}$'s may be identical to each other or different from each other, and
$Q^1$ and $Q^2$ each independently represent a substituent, and at least one of $Q^1$ or $Q^2$ has a cyclic structure,

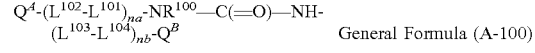

$Q^A\text{-}(L^{102}\text{-}L^{101})_{na}\text{-}NR^{100}\text{-}C(=O)\text{-}NH\text{-}(L^{103}\text{-}L^{104})_{nb}\text{-}Q^B$   General Formula (A-100)

in General Formula (A-100), $R^{100}$ represents a hydrogen atom or a substituent,
$L^{101}$ and $L^{103}$ each independently represent an alkylene group, and the alkylene group may have a substituent,
$L^{102}$ and $L^{104}$ each independently represent a single bond, any one of —O—, —NR¹⁰⁰ᵃ—, —S—, and —C(=O)—, or a group formed of a combination of two or more thereof,
$R^{100a}$ represents a hydrogen atom or a substituent,
na and nb each independently represent an integer of 0 to 20, and in a case in which a plurality of $L^{101}$'s, $L^{102}$'s, $L^{103}$'s, $L^{104}$'s exist, the plurality of $L^{101}$'s, $L^{102}$'s, $L^{103}$'s, $L^{104}$'s may be identical to each other or different from each other, $Q^A$ and $Q^B$ each independently represent a substituent, and at least one of $Q^A$ or $Q^B$ has a cyclic structure, and in a case in which na represents zero and $Q^A$ has a cyclic structure, the cyclic structure included in $Q^A$ may be a cyclic structure formed along with $R^{100}$ of —$NR^{100}$—, $$Q^{31}\text{-}L^{31}\text{-}X^3\text{—}C(=O)\text{—}NH\text{-}L^{32}\text{-}Q^{32} \qquad \text{General Formula (III)}$$

in General Formula (III), $X^3$ represents —O— or —NR—, and R represents a hydrogen atom or a substituent, $L^{31}$ and $L^{32}$ each independently represent a single bond, an alkylene group, any one of —O—, —$NR^1$—, —S—, and —C(=O)—, or a group formed of a combination of two or more thereof, $R^1$ represents a hydrogen atom or a substituent, $Q^{31}$ and $Q^{32}$ each independently represent a substituent, and at least one of $Q^{31}$ or $Q^{32}$ represents a polar group which is a residue of a compound having a ClogP value of less than or equal to 0.85, and in a case in which $X^3$ represents —$NR^1$—, $L^{31}$ represents a single bond, and $Q^{31}$ has a cyclic structure, the cyclic structure included in $Q^{31}$ may be a cyclic structure formed along with $R^1$ of —$NR^1$—, General Formula (IV)

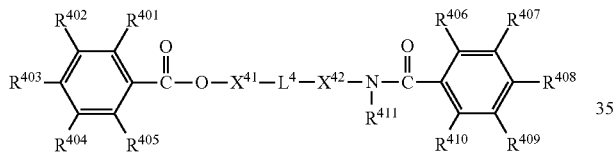

in General Formula (IV), $R^{401}$ to $R^{411}$ each independently represent a hydrogen atom or a substituent, $X^{41}$ and $X^{42}$ each independently represent a single bond or a divalent linking group, and $L^4$ represents a single bond, —$N(R^{412})$—, or —$C(R^{413})(R^{414})$—, and $R^{412}$ to $R^{414}$ each independently represent a hydrogen atom or a substituent, General Formula (V)

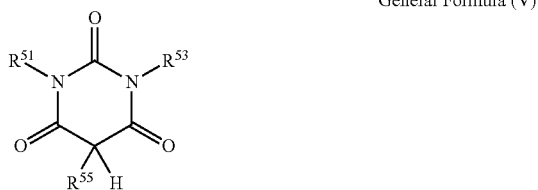

in General Formula (V), $R^{51}$ and $R^{53}$ each independently represent a hydrogen atom, an alkyl group having 1 to 20 carbon atoms, a cycloalkyl group having 3 to 20 carbon atoms, an alkenyl group having 2 to 20 carbon atoms, or an aromatic group having 6 to 20 carbon atoms, $R^{55}$ represents a hydrogen atom, a non-substitutional alkyl group having 1 to 20 carbon atoms, a cycloalkyl group having 3 to 20 carbon atoms, an alkenyl group having 2 to 20 carbon atoms, or an aralkyl group denoted by General Formula (VI) described below, and the total number of cyclic structures existing in $R^{51}$, $R^{53}$, and $R^{55}$ is one or two, $$\text{*-}L^{55}\text{-}Ar^{55} \qquad \text{General Formula (VI)}$$

in General Formula (VI), $L^{55}$ represents an alkylene group having 1 to 20 carbon atoms, $Ar^{55}$ represents an aromatic group having 6 to 20 carbon atoms, and * is a position linked to the cyclic structure of General Formula (V), $$(A^{71})_{nb}\text{-}L^7\text{-}(A^{72})_{nc} \qquad \text{General Formula (VII)}$$

in General Formula (VII), $L^7$ represents a (nb+nc)-valent linking group having less than or equal to 8 atoms which links $A^{71}$-$A^{72}$; nb+nc represents an integer of greater than or equal to 2, nb represents an integer of greater than or equal to 1, and nc represents an integer of greater than or equal to 0, $A^{71}$ represents a group denoted by General Formula (VIII), and $A^{72}$ represents a group denoted by General Formula (VIII) or General Formula (IX), General Formula (VIII)

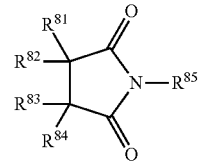

in General Formula (VIII), any one of $R^{81}$ to $R^{85}$ represents a single bond or a divalent linking group which is linked to $L^7$ of General Formula (VII), the others of $R^{81}$ to $R^{85}$ which are not linked to $L^7$ each independently represent a hydrogen atom, a substitutional or non-substitutional alkyl group, a substitutional or non-substitutional acyl group, a substitutional or non-substitutional alkoxy carbonyl group, a substitutional or non-substitutional alkoxy group, a substitutional or non-substitutional aryl oxy group, a substitutional or non-substitutional alkyl thio group, a substitutional or non-substitutional aryl thio group, a substitutional or non-substitutional carbamoyl group, a carboxyl group, a cyano group, or a hydroxyl group, $R^{81}$ and $R^{82}$ may form a non-aromatic ring by being bonded to each other, and $R^{83}$ and $R^{84}$ may form a non-aromatic ring by being bonded to each other, General Formula (IX)

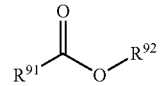

in General Formula (IX), at least one of $R^{91}$ or $R^{92}$ represents a single bond or a divalent linking group which is linked to $L^7$ of General Formula (VII), and the other of $R^{91}$ and $R^{92}$ which is not linked to $L^7$ represents a substitutional or non-substitutional phenyl group or a substitutional or non-substitutional alkyl group.

18. The cellulose ester film according to claim 7, wherein the compound has the structural unit included in a non-cyclic structural portion and a cyclic structure as a terminal substituent.

19. A polarizing plate, comprising:
the cellulose ester film according to claim 1; and
a polarizer.

20. A liquid crystal display device, comprising:
the polarizing plate according to claim 19.

21. The liquid crystal display device according to claim 20,
wherein the polarizing plate is provided on at least a visible side.

* * * * *